US005181387A

United States Patent [19]

Meckler

[11] Patent Number: 5,181,387

[45] Date of Patent: Jan. 26, 1993

[54] AIR CONDITIONING APPARATUS

[76] Inventor: Gershon Meckler, 725 Campbell Way, Herndon, Va. 22070

[21] Appl. No.: 644,464

[22] Filed: Jan. 17, 1991

Related U.S. Application Data

[63] Continuation of Ser. No. 508,191, Apr. 12, 1990, abandoned, which is a continuation-in-part of Ser. No. 484,551, Feb. 26, 1990, abandoned, which is a continuation-in-part of Ser. No. 144,300, Jan. 14, 1988, Pat. No. 4,903,503, which is a continuation-in-part of Ser. No. 49,260, May 12, 1987, abandoned, which is a continuation-in-part of Ser. No. 861,058, May 8, 1986, abandoned, which is a continuation-in-part of Ser. No. 841,454, Mar. 19, 1986, abandoned, which is a continuation-in-part of Ser. No. 732,561, May 9, 1985, abandoned, which is a continuation-in-part of Ser. No. 719,357, Apr. 3, 1985, abandoned.

[51] Int. Cl.[5] .............................................. F25D 17/06

[52] U.S. Cl. ....................................... 62/59; 62/176.1; 62/93

[58] Field of Search ..................... 62/59, 271, 311, 93, 62/176.1, 90

[56] References Cited

U.S. PATENT DOCUMENTS

| | | | |
|---|---|---|---|
| 1,969,187 | 8/1934 | Schutt | 62/59 X |
| 2,737,027 | 3/1956 | Kleist | 62/59 X |
| 3,102,399 | 9/1963 | Meckler | 62/271 |
| 3,200,606 | 8/1965 | Hewett et al. | 62/271 X |
| 4,513,574 | 4/1985 | Humphreys et al. | 62/59 |
| 4,753,080 | 6/1988 | Jones et al. | 62/59 |
| 4,831,830 | 5/1989 | Swenson | 62/59 |
| 4,905,479 | 3/1992 | Wilkinson | 62/221 |

*Primary Examiner*—William E. Tapolcai
*Attorney, Agent, or Firm*—John C. Purdue; David C. Purdue

[57] ABSTRACT

Air conditioning apparatus is disclosed. The apparatus includes a plurality of air outlets, refrigeration apparatus operable to make ice by pumping heat from water to a heat sink and to store the ice, a coil for dehumidifying outside air or a mixture of outside air and return air, means for causing air to be dehumidified to flow in heat transfer relationship with the coil, means for circulating dehumidified air to the air outlets, means operable to control the moisture content and temperature of the dehumidified air, means operable to control the rates at which dehumidified air is delivered by the air outlets to the spaces they serve to ones not less than the predetermined minimum rate, and means for controlling the temperature of the air delivered to the air outlets to maintain the temperature of the spaces within control limits. Each of the air outlets is operable to deliver air to a space to be conditioned. The apparatus also includes means for circulating a low temperature heat transfer fluid through the coil, the circulating means including means for transferring heat from the heat transfer fluid to ice made and stored by the means operable to make and store ice. The apparatus is operable to deliver air to the outlets at a rate per unit of area in the spaces served by the air outlets which varies between a predetermined minimum rate greater than zero and a maximum rate, the maximum rate being substantially less than that which would be required to maintain the design temperature in each of the spaces at the maximum design cooling load with air supplied to the space at a dry bulb temperature of 55° F. The transfer of heat from the coil is controlled so that the dehumidified air is incapable, at the rate at which it is required for humidity control, of maintaining the desired space temperature at the maximum design cooling load. In a preferred embodiment, the means for controlling the temperature of the air delivered to the air outlets includes means for transferring heat from air that has not yet flowed in heat transfer relationship with the coil to air that has flowed in heat transfer relationship with the coil.

87 Claims, 103 Drawing Sheets

AIR CONDITIONING APPARATUS

REFERENCE TO RELATED APPLICATIONS

This is a continuation of Ser. No. 508,191, filed Apr. 12, 1990 which is a continuation in part of application Ser. No. 484,551, filed Feb. 26, 1990 as a continuation in part of application Ser. No. 144,300, filed Jan. 14, 1988 as a continuation in part of application Ser. No. 049,260, filed May 12, 1987 as a continuation in part of application Ser. No. 861,058, filed May 8, 1986; the latter application is also a continuation in part of application Ser. No. 841,454, filed Mar. 19, 1986, as a continuation in part of application Ser. No. 732,561, filed May 9, 1985, as a continuation in part of application Ser. No. 719,357, filed Apr. 3, 1985. Application Ser. No. 484,551 is abd.; application Ser. No. 144,300 matured as U.S. Pat. No. 4,903,503 on Feb. 27, 1990; and the remaining related applications are now abandoned.

BACKGROUND OF THE INVENTION

1. Field of the Invention

This invention relates to air conditioning apparatus and to a method for operating that apparatus. The apparatus is admirably suited for a building which has a sprinkler system, an electrical grid, or both. Briefly, in one embodiment, the apparatus comprises an air handler, a plurality of induction mixing units, air circulating means, means for dehumidifying or for dehumidifying and cooling air circulated through the air handler, heat transfer means for carrying a part of the air conditioning load, cooling means for transferring heat from a heat transfer fluid, and a circulating system which preferably includes a part of the sprinkler system of the building for transferring heat from the heat transfer means to the cooling means. In another embodiment, the apparatus is a regenerator for an aqueous desiccant. In a third embodiment the apparatus is a sprinkler system, and in a fourth comprises compression and absorption refrigeration apparatus, a cogenerator, a dehumidifier, a regenerator for the dehumidifier, a storage tank, air circulating means and means for storing ice.

2. The Prior Art

Air conditioning apparatus for a building which has a sprinkler system, and which comprises an air handler, a plurality of induction mixing units, air circulating means, means for dehumidifying air circulated through the air handler, heat transfer means for carrying a part of the air conditioning load, cooling means for transferring heat from a heat transfer fluid, and a circulating system which includes a part of the sprinkler system of the building for transferring heat from the heat transfer means to the cooling means is suggested in "Westenhofer and Meckler", U.S. Pat. No. 4,286,667, 1981 (see, also, "Meckler", U.S. Pat. No. 4,033,740, 1977 and "Meckler (2)", U.S. Pat. No. 3,918,525, 1975). Such apparatus has been installed by The Social Security Administration in its Metro West Facility, Baltimore, Md., and in the Monroe County Court House, Stroudsburg, Pa. (see *Specifying Engineer*, January, 1986).

A variable air volume induction mixing unit in which a flow of primary, conditioned air through venturi nozzles induces a flow of room air to temper, or plenum air to reheat, the primary, conditioned air is suggested in "Meckler (3)", U.S. Pat. No. 3,883,071, 1975.

The use of a cogenerator to produce both shaft work and heat has been suggested, for example by "McGrath", U.S. Pat. No. 2,242,588, 1941; "Miller", U.S. Pat. No. 2,284,914, 1942; "Meckler(4)", U.S. Pat. No. 3,247,679, 1966; "Meckler (5)", U.S. Pat. No. 3,401,530, 1968; and "Meckler (6)", U.S. Pat. No. 4,304,955, 1981.

Both Meckler (4) and Meckler (5) disclose apparatus which includes an internal combustion engine operatively connected to drive the compressor of compression refrigeration apparatus and means for conducting heat from the engine to regenerate a chemical desiccant.

McGrath discloses a "heating system" which includes two compressors, both driven by an internal combustion engine for pumping heat in two stages from ambient air to a building. The internal combustion engine also drives an electric generator and furnishes heat to the refrigerant of the heat pump. Heat is transferred to the refrigerant both from the exhaust gases of the internal combustion engine and from the cooling jacket thereof.

Miller discloses apparatus wherein the shaft of an internal combustion engine drives both an electric generator and the compressor of compression refrigeration apparatus. The apparatus also includes means for transferring exhaust heat from the internal combustion engine to the desiccant of a regenerator of a chemical dehumidifier to provide heat necessary for regeneration of the desiccant.

Meckler (6) discloses apparatus including an electric generator driven by an internal combustion engine and operation of the engine to supplement a solar collector, as required, to provide heat for the regeneration of a chemical desiccant; the electricity generated when the engine is operated provides energy for pumps, blowers and the like of an air conditioning system.

Apparatus which heats a house by pumping heat from low temperature water and produces ice for subsequent cooling is disclosed by "Schutt", U.S. Pat. No. 1,969,187, 1934.

Air conditioning apparatus in which a humidistat controls a humidified air valve is disclosed in British patent No. 1,077,372, 1967, "Ozonair".

BRIEF DESCRIPTION OF THE INVENTION

This invention relates to air conditioning apparatus which is admirably suited for a building having a sprinkler system, an electrical grid, or both. In one embodiment, the apparatus is designed to maintain a dry bulb temperature of X and a dew point of Y in a conditioned space, and comprises an air handler, a plurality of induction mixing units, air circulating means, means for dehumidifying, cooling or both, air circulated through the air handler, heat transfer means for carrying a part of the air conditioning load, cooling means for transferring heat from a heat transfer fluid, and a circulating system which can include a part of the sprinkler system of the building for transferring heat from the heat transfer means to the cooling means. The means for dehumidifying, cooling or both, air circulated through the air handler is controlled so that the humidity of air leaving the air handler is sufficiently low that such air, at a given flow rate, can handle the maximum design humidity load, while the dry bulb temperature thereof is sufficiently high that, at such flow rate, that air has the capacity to handle not more than 60 percent of the maximum design sensible heat load. The cooling means is controlled to cool the heat transfer fluid to a temperature below X but above Y, and sufficiently low that the cooling means is operable to carry at least 40 percent of the maximum design sensible heat load, all that is not carried by the conditioned air circulated to the induction mixing units.

In another embodiment, the apparatus comprises compression refrigeration apparatus that is operable to make ice, absorption refrigeration apparatus, a cogenerator operable to provide electricity and heat, means for operably connecting the cogenerator to provide electricity to the electrical grid of the building, an air handler, a plurality of induction mixing units operable to receive conditioned air, to cause a flow of recirculated air from a space to be conditioned, and to deliver to the space a mixture of conditioned air and recirculated air, means for circulating air to be conditioned through the air handler and then to the induction mixing units, means for transferring heat from air in the air handler to ice which has been produced by the compression refrigeration apparatus, means operatively connecting the absorption refrigeration apparatus to pump heat to a heat sink from air in the induction mixing units or from air in the air handler, and means for transferring heat generated by the cogenerator into energizing relationship with the absorption apparatus.

In a preferred embodiment, the apparatus described in the preceding paragraph additionally includes a dehumidifier which uses an aqueous solution of a desiccant to remove moisture from air to be dehumidified, a regenerator for the aqueous desiccant solution, a tank for storing a quantity of the aqueous desiccant solution, and means for circulating air to be conditioned into dehumidifying relationship with the aqueous desiccant solution of the dehumidifier and then to the air handler. The compression refrigeration apparatus and the absorption refrigeration apparatus can be operatively connected to pump heat to a heat sink from dehumidified air in the air handler before it is circulated to the space. The apparatus can also include means for transferring heat in the air handler from air to ice which has been produced by the compression refrigeration apparatus. The apparatus is operated so that the last-named means transfers heat from dehumidified air from which heat has already been pumped by the compression refrigeration apparatus and by the absorption refrigeration apparatus, and lowers both the wet bulb and the dry bulb temperature of the air. Additionally, to compensate for decreases in the concentration of the aqueous desiccant solution in the dehumidifier which occur as dehumidification proceeds, the apparatus includes means for circulating desiccant solution between the storage tank and the dehumidifier and, to compensate for decreases in the concentration of the aqueous desiccant solution in the storage tank which occur as dehumidification proceeds, the apparatus includes means for circulating desiccant solution between the storage tank and the regenerator. The compression refrigeration apparatus is operatively connected to the building electrical grid for energization thereby. Finally, the apparatus comprises means for transferring heat generated by the cogenerator to the aqueous desiccant solution to enable the removal of water therefrom in the regenerator, and means for transferring heat generated by the cogenerator into energizing relationship with the absorption refrigeration apparatus.

The invention also includes a method for operating the apparatus described in the two preceding paragraphs. The method involves alternately circulating air to be dehumidified and cooled by the apparatus, and then interrupting the circulation of air to be conditioned. While air is being circulated to be conditioned, for example on summer-day cycle, the cogenerator is operated to provide electricity and heat, the former being introduced into the electrical grid of the building while the latter is transferred to energize the absorption refrigeration apparatus; electricity from the building grid is used to energize the compression refrigeration apparatus and heat is transferred from air in the air handler to ice which has been produced by the compression refrigeration apparatus. While the production of conditioned air is interrupted, for example on summer-night cycle, the concentration of the aqueous desiccant solution of the storage tank is increased while the cogenerator is operated to provide electricity and heat. The electricity is introduced into the electrical grid of the building, while the heat is transferred to the aqueous desiccant solution to enable the removal of water therefrom in the regenerator. Electricity is conducted from the building grid to energize the compression refrigeration apparatus to make ice by pumping heat from water to a heat sink.

The invention also includes a sprinkler through at least a part of which a heat transfer fluid is circulated between a heat transfer device of the HVAC system of the building and a device for transferring heat to or from the fluid. The sprinkler comprises two grids, each of which includes opposed headers, spaced conduits, and sprinkler heads at spaced intervals in the conduits. Each of the conduits is operably connected to at least one of the headers. Each header of the first grid is closely adjacent a header of the second grid. The sprinkler heads of the two grids are spaced from one another in a required pattern for a single area of the building.

Figure 1:
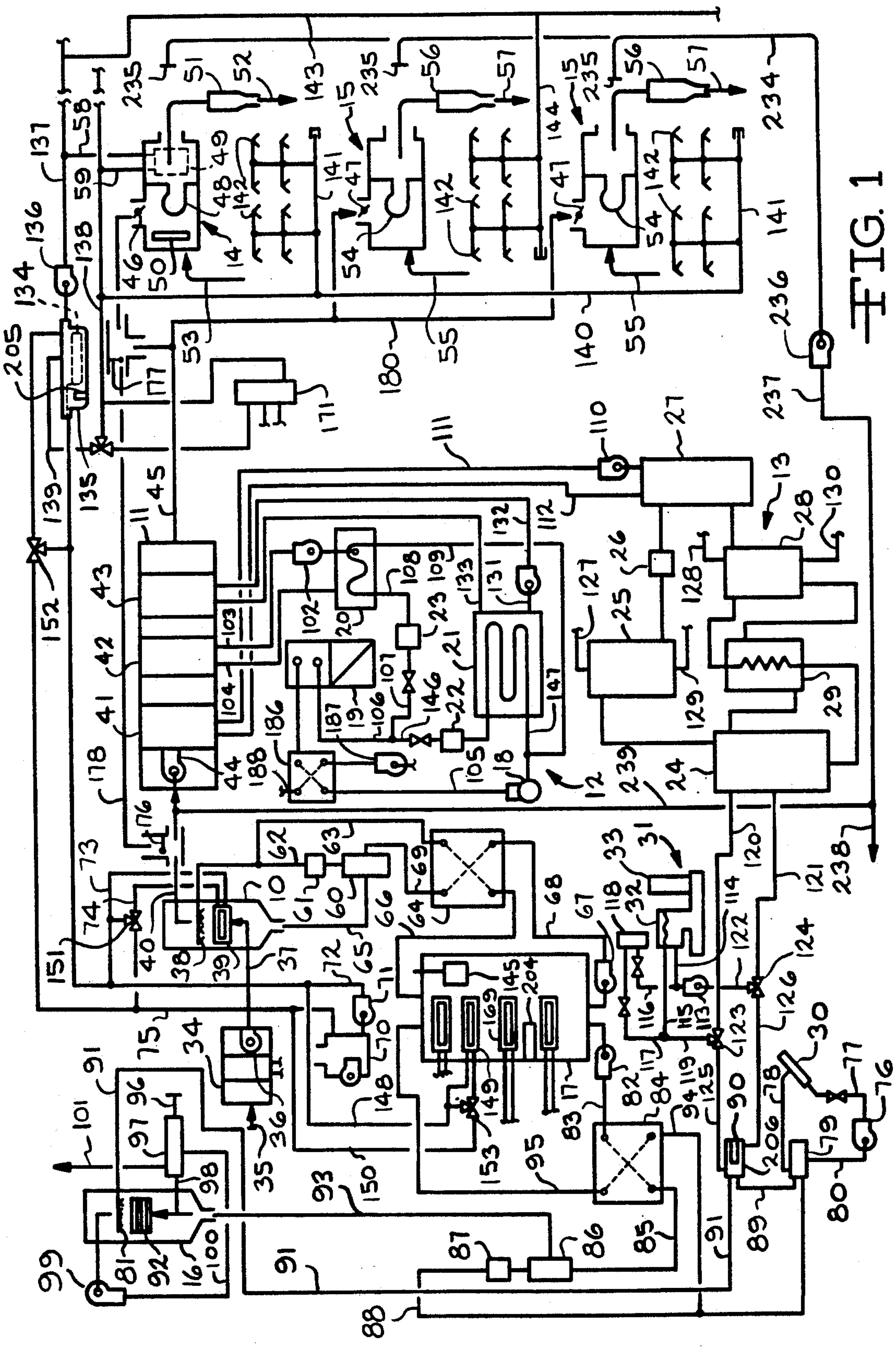
FIG. 1 is a schematic diagram of apparatus according to the instant invention, showing the connections among the components of the apparatus that are used on summer cycle.
Figure 2:
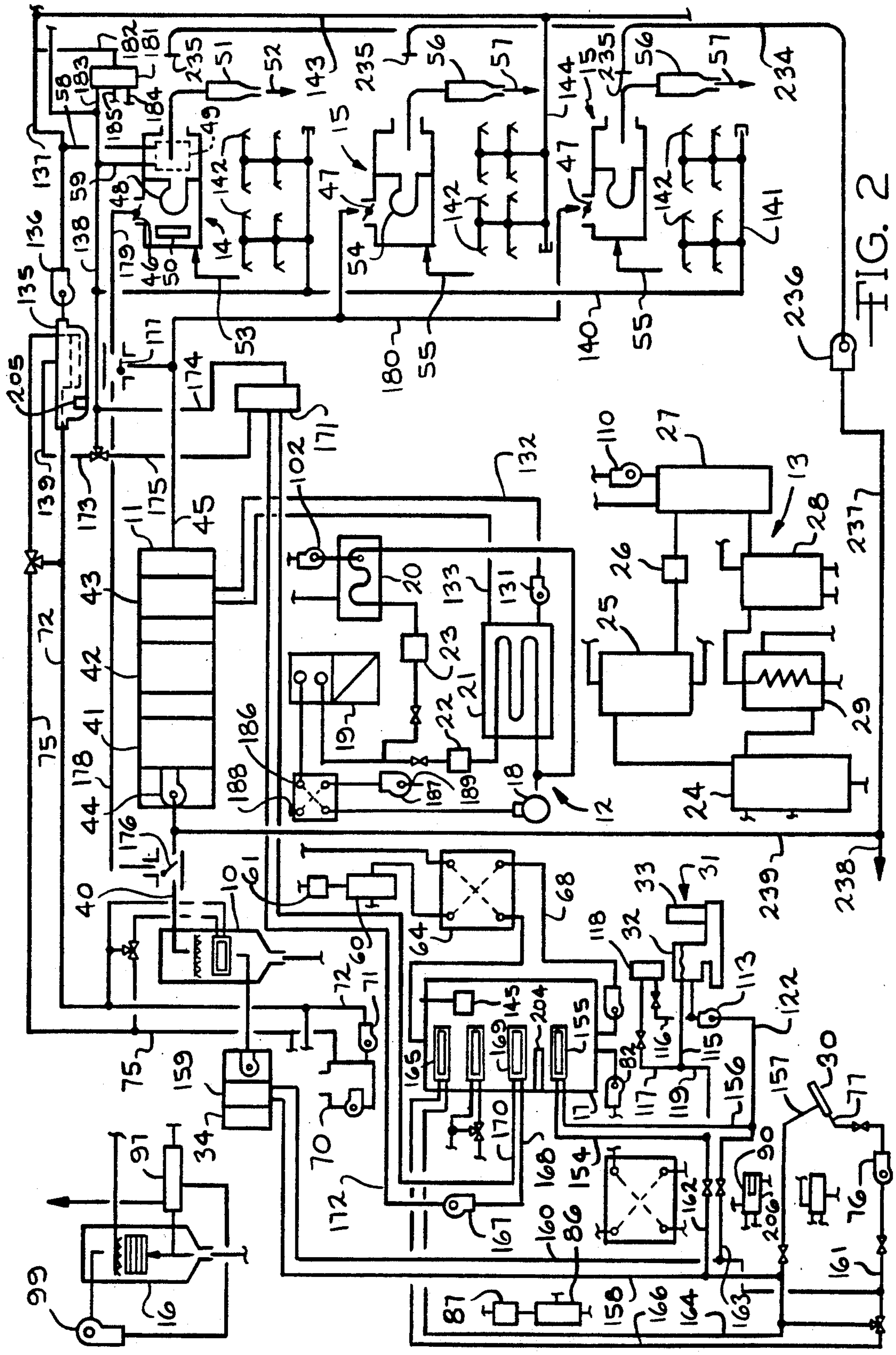
FIG. 2 is a schematic diagram of the apparatus of FIG. 1, but showing the connections among the various components of the apparatus that are used on winter cycle.
Figure 9:
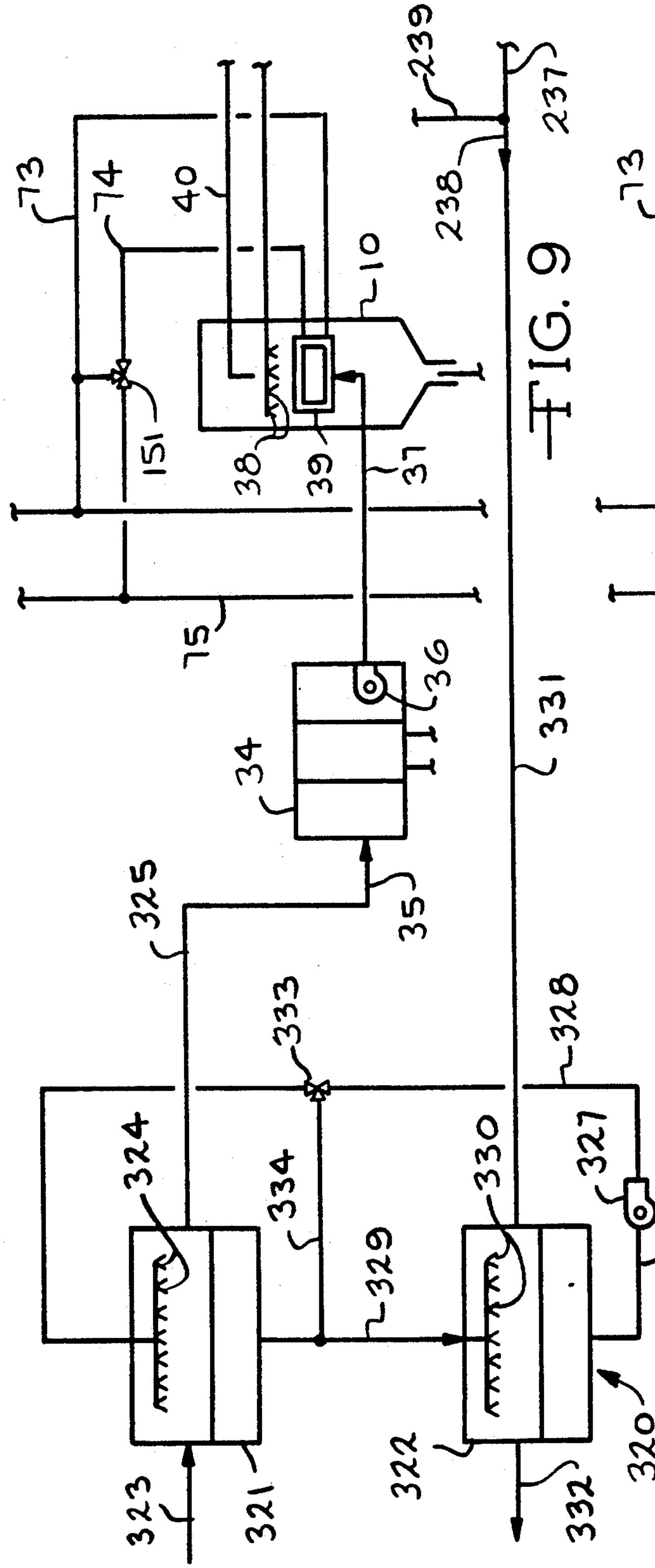
FIG. 9 is a fragmentary view showing a part of the apparatus of FIGS. 1 and 2 and a first stage dehumidifier that is advantageously used with the FIG. 1 and 2 apparatus and other apparatus under some operating conditions.
Figure 10:
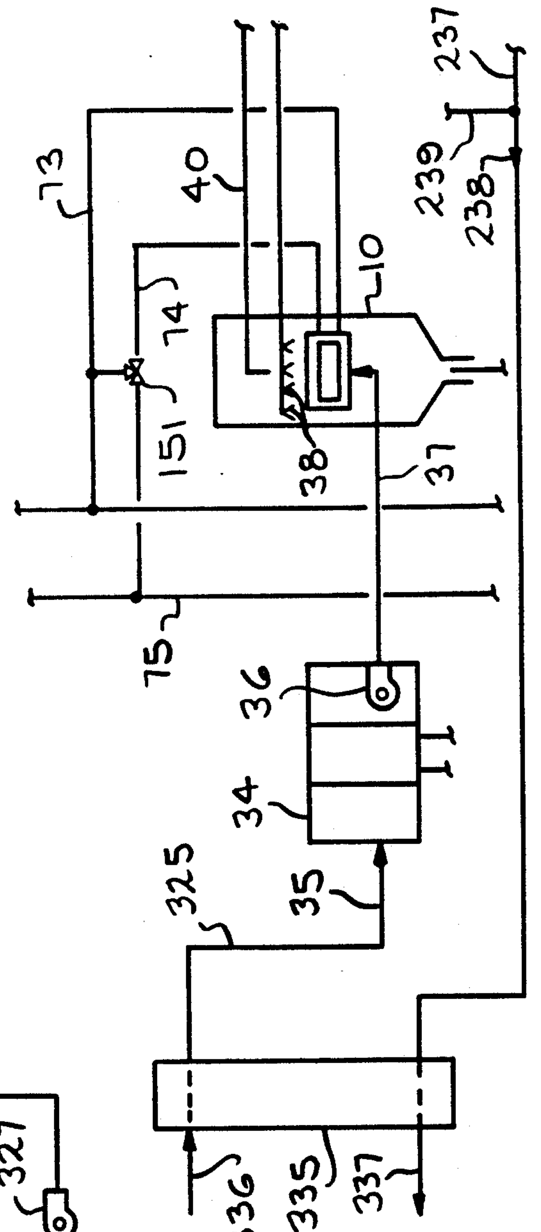

FIG. 10 is a fragmentary view similar to FIG. 9 showing a part of the apparatus of FIGS. 1 and 2 and a different first stage dehumidifier that is advantageously used with the apparatus of FIGS. 1 and 2 and with other apparatus under some operating conditions.

Figure 11:
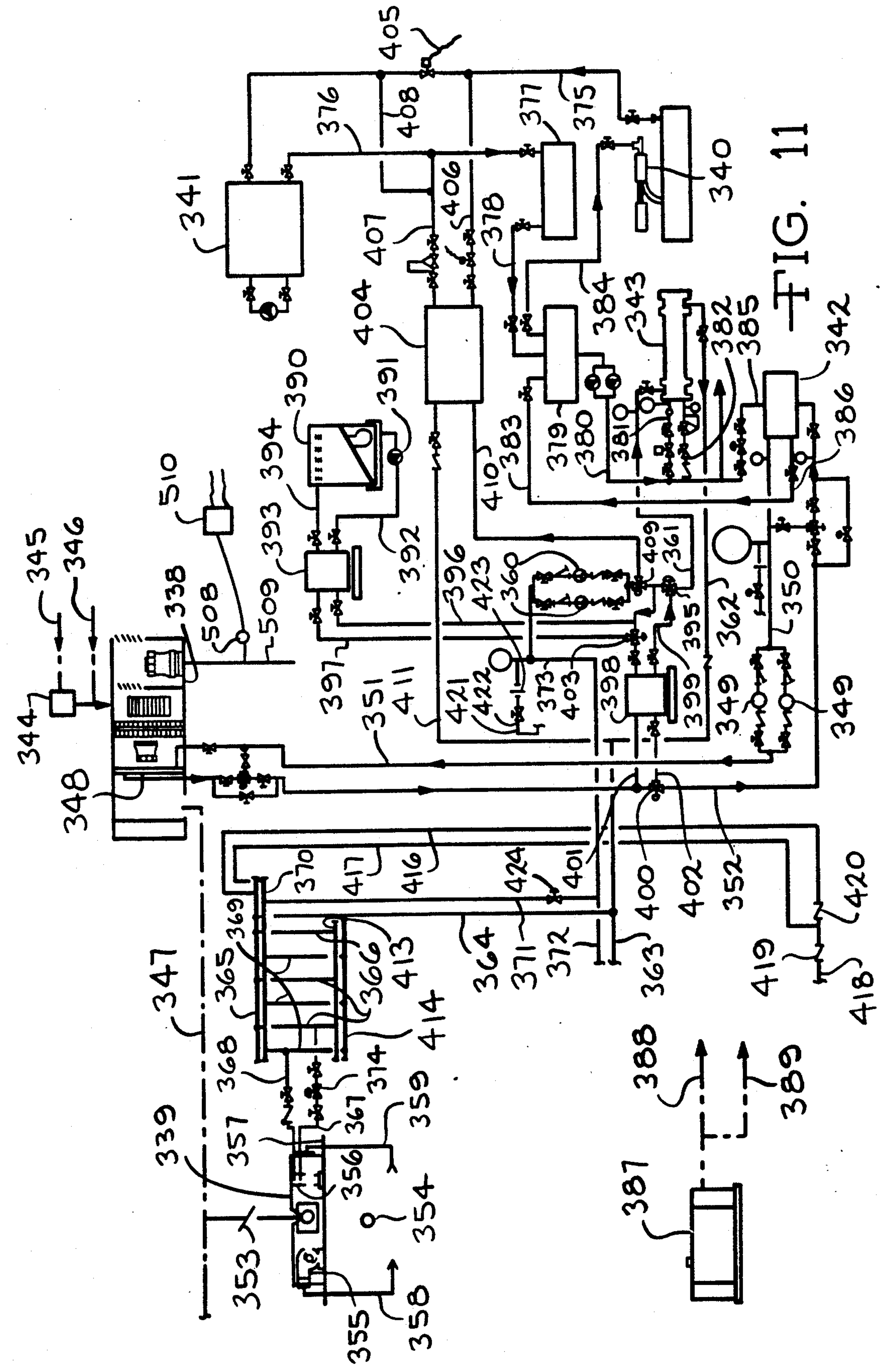

FIG. 11 is a schematic diagram of apparatus similar to that shown in FIGS. 1 and 2, differing mainly in that certain components have been omitted.

Figure 12:
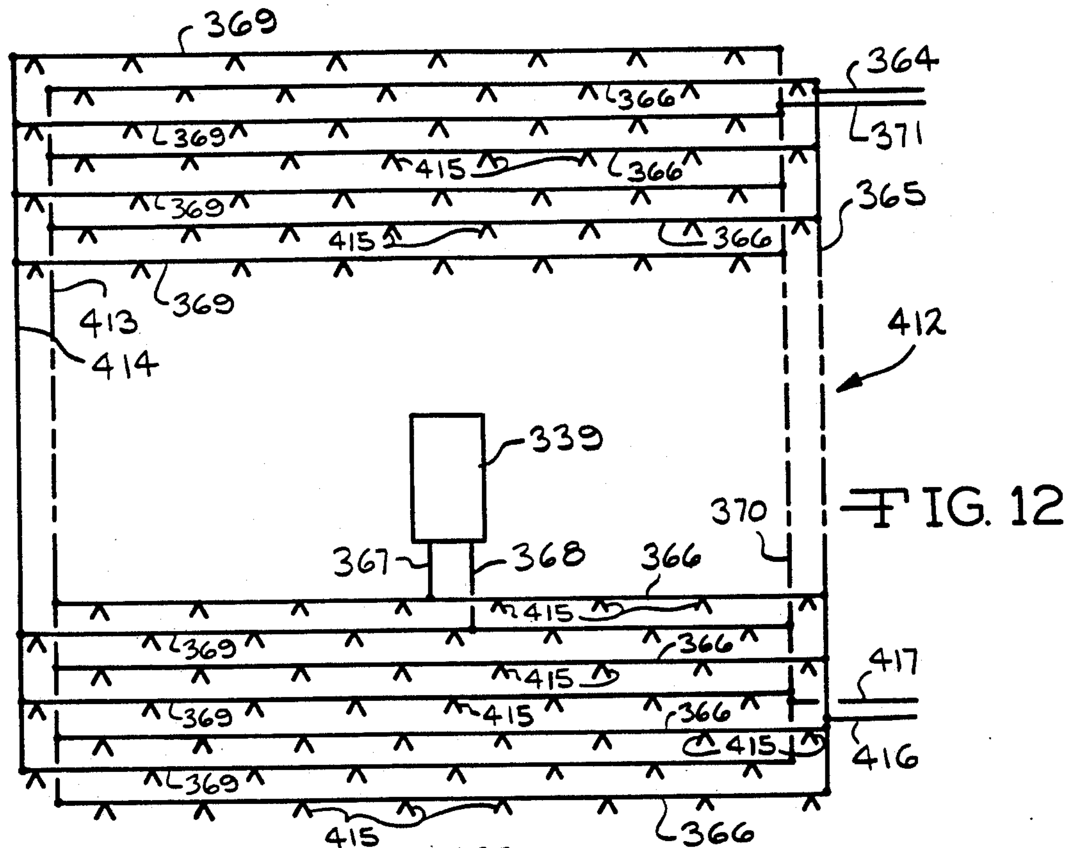

FIG. 12 is a fragmentary plan view showing a sprinkler system that is an important part of the apparatus of FIG. 11.

Figure 13:
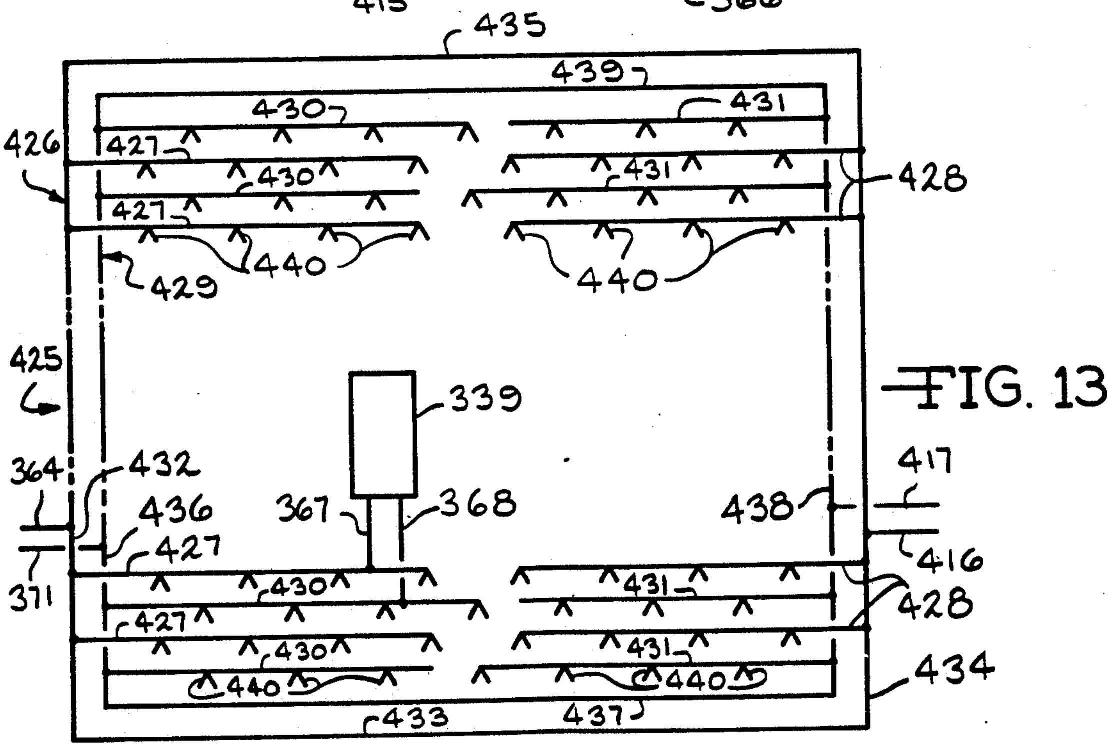

FIG. 13 is a fragmentary plan view showing another embodiment of a sprinkler system that can be used in the apparatus of FIG. 11.

Figure 14:
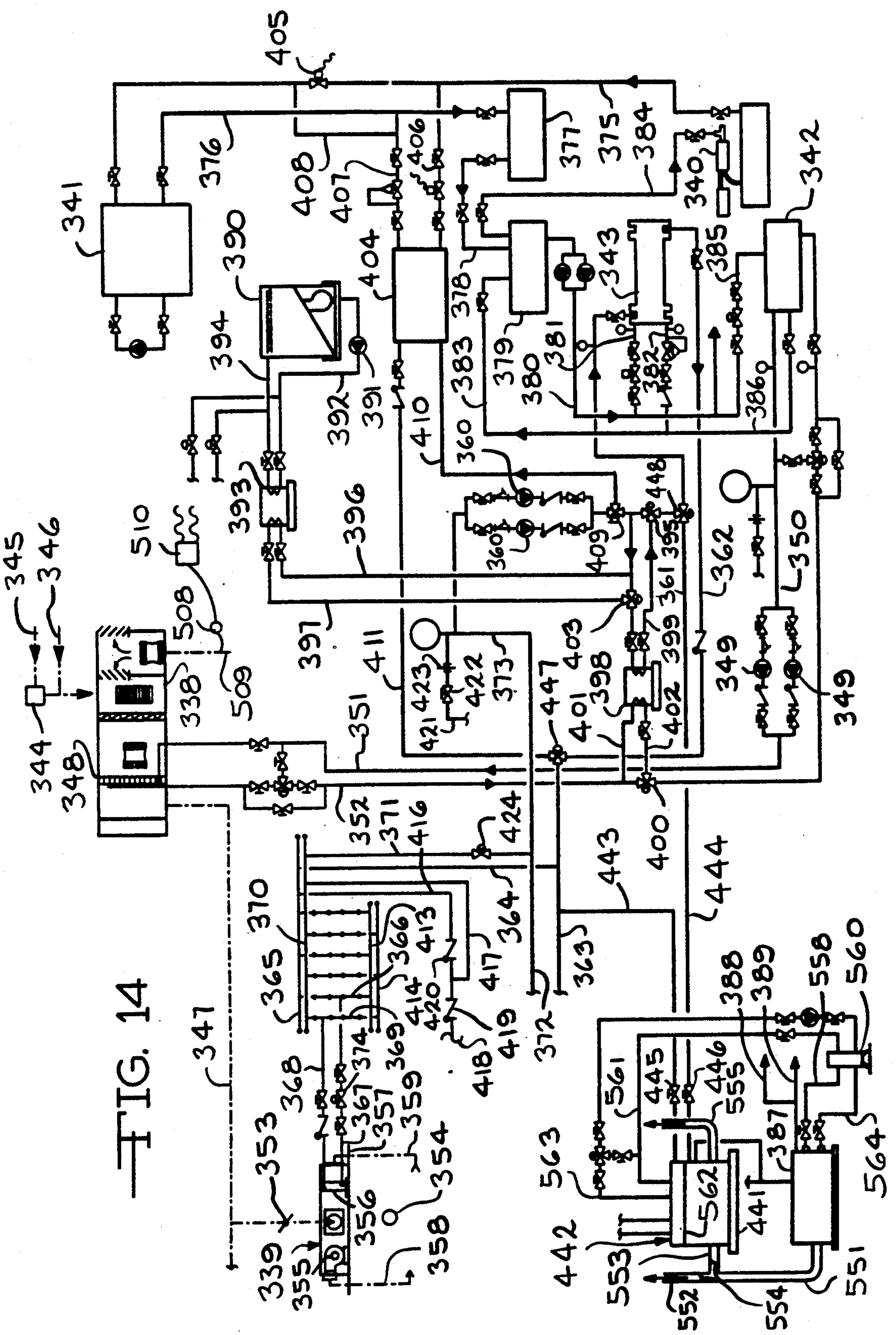

FIG. 14 is a schematic diagram of apparatus similar to that shown in FIG. 11, differing mainly in that certain components have been added.

Figure 15:
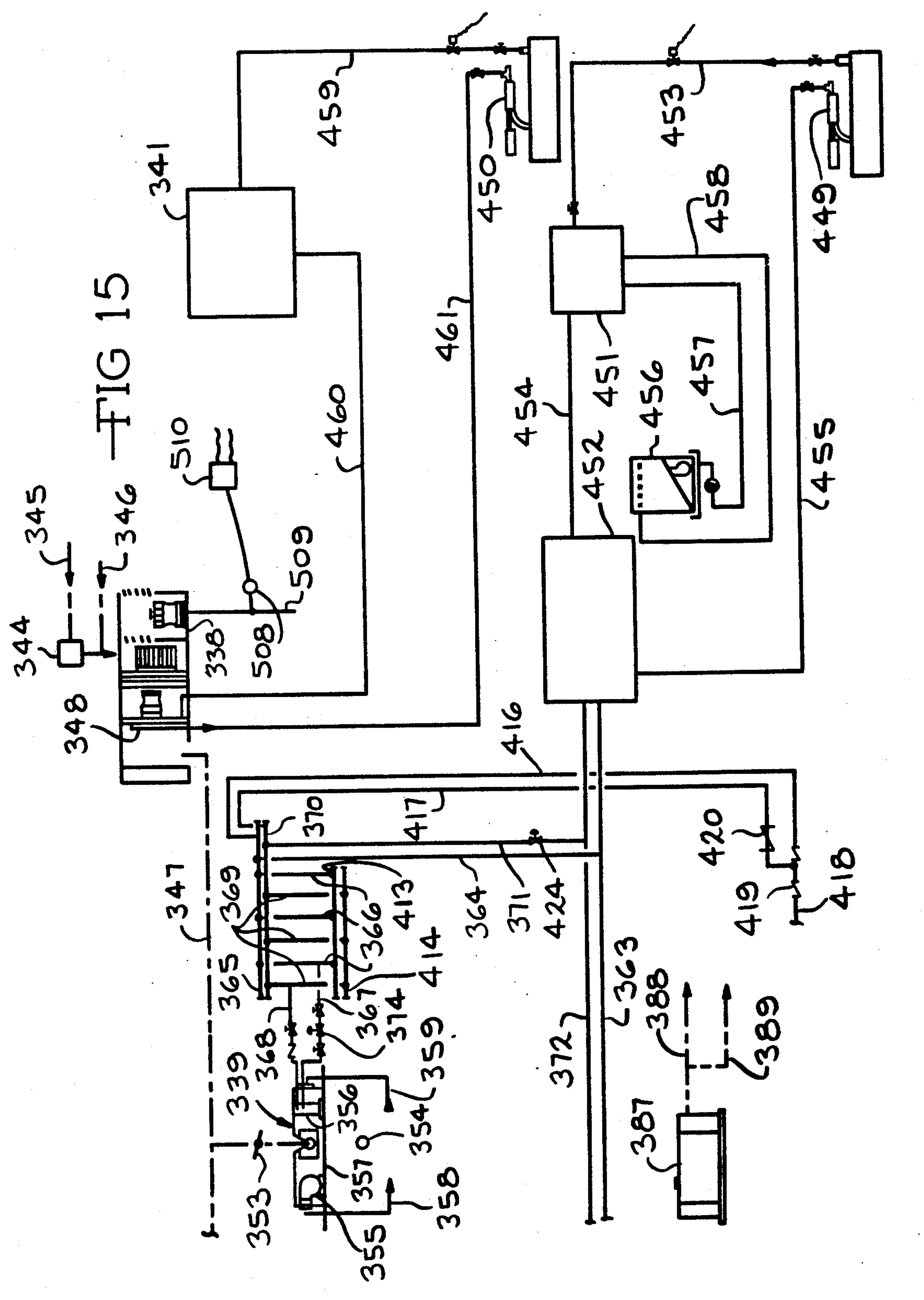

FIG. 15 is a schematic diagram of apparatus similar to that shown in FIGS. 11 and 14, differing mainly in that all components which are not absolutely essential, with the exception of a generator powered by a gas turbine, have been omitted.

Figure 16:
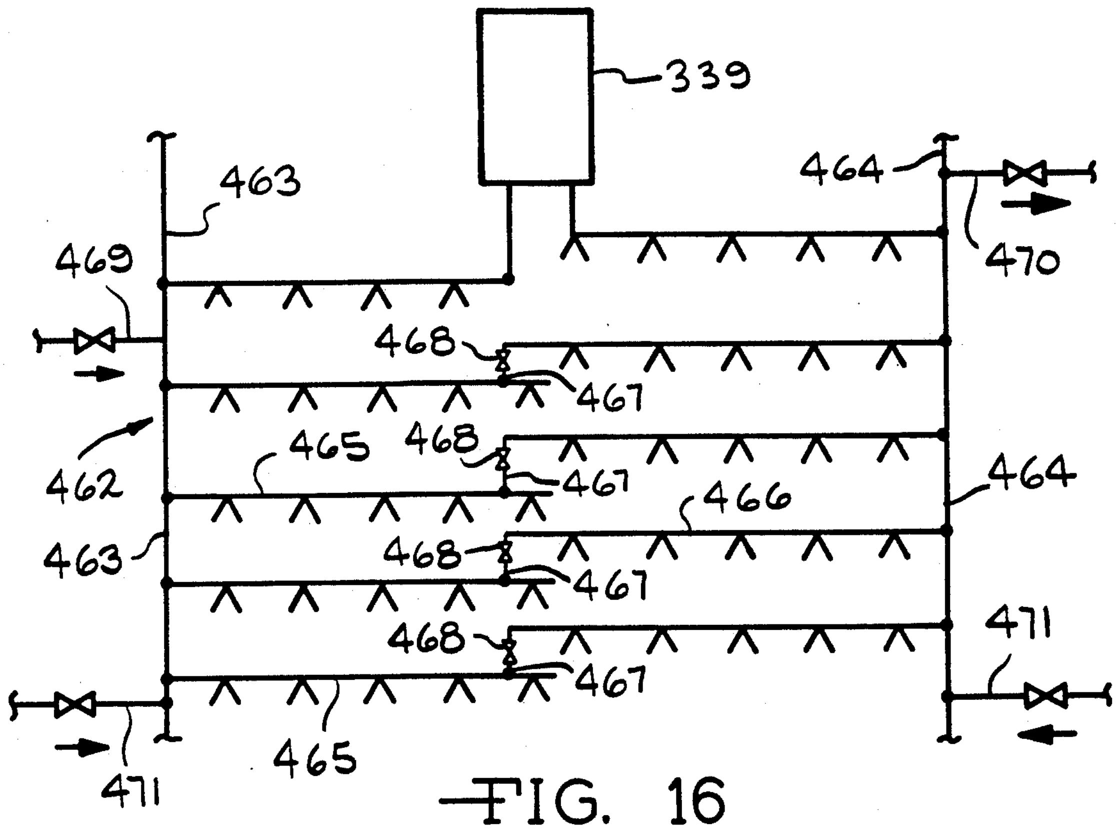

FIG. 16 is a fragmentary plan view showing a sprinkler system that can be used in the apparatus of FIGS. 1, 2, 6, 7, 8, 11, 14, 15, 22, 24, 25, 26, 27, 29 and 30, and to produce a cooled plenum.

Figure 17:
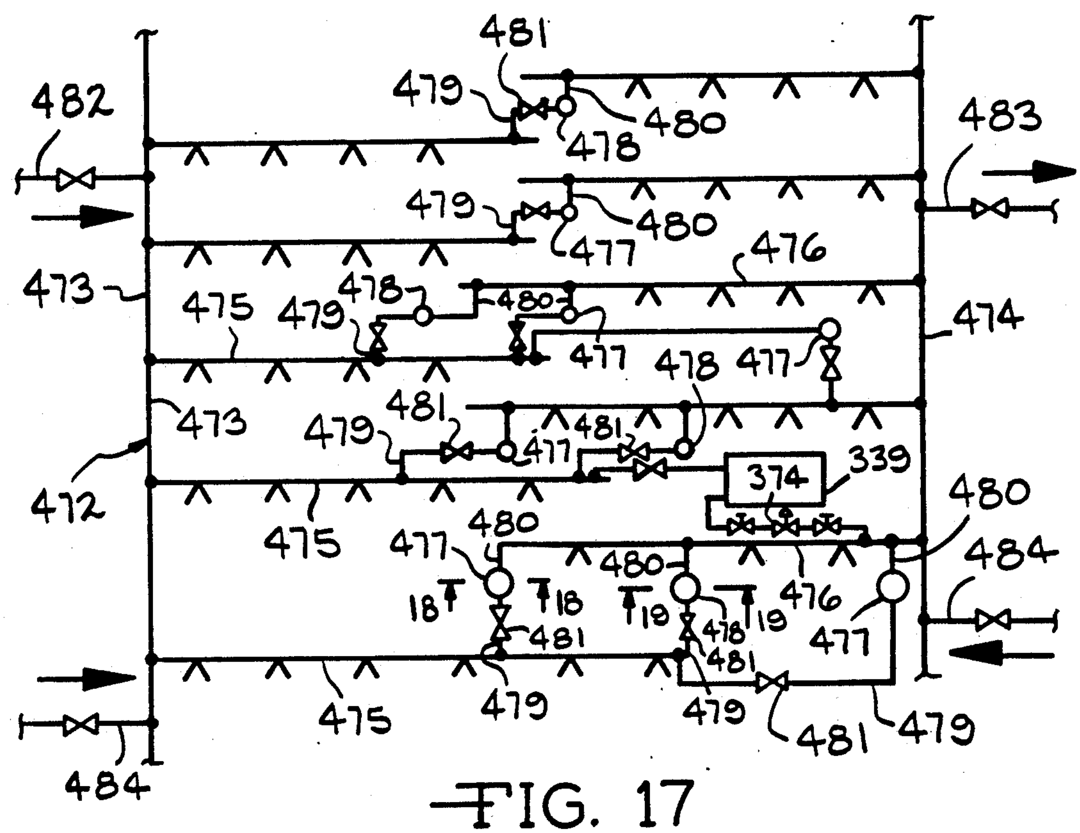

FIG. 17 is a fragmentary plan view showing a sprinkler system similar to that of FIG. 16, and additionally including a simplified induction mixing unit and a cooled light.

Figure 18:
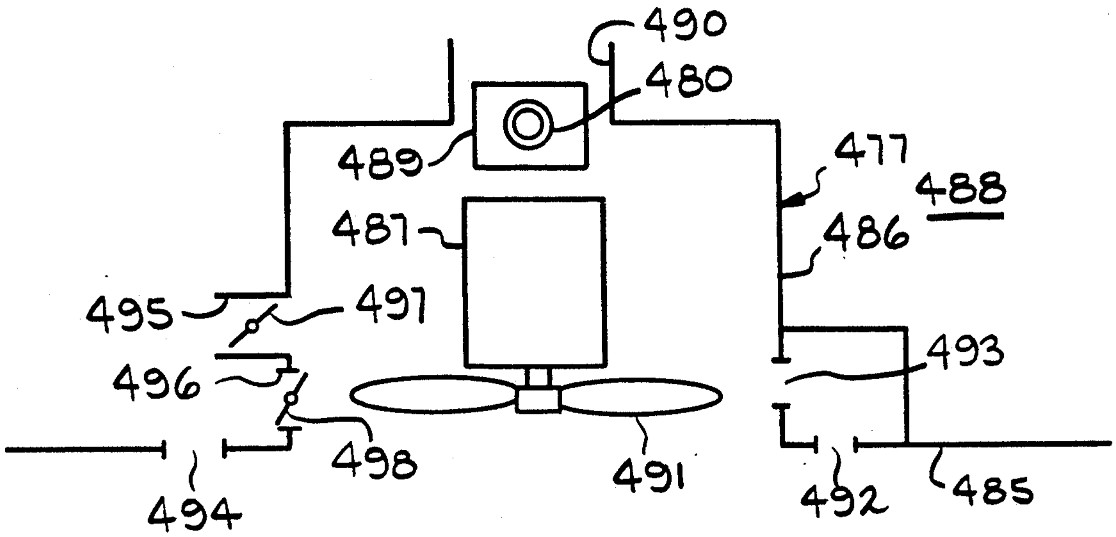

FIG. 18 is a vertical sectional view of the simplified induction mixing unit taken along the line 17—17 of FIG. 17.

Figure 19:
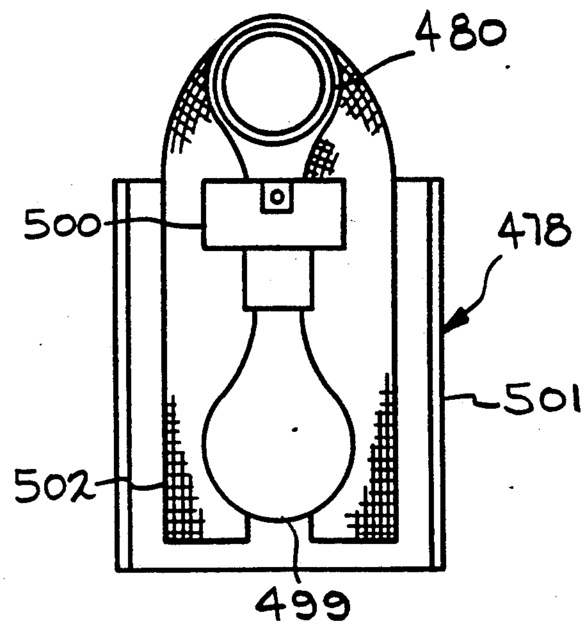

FIG. 19 is a view in vertical section of the cooled light taken along the line 19—19 of FIG. 17.

Figure 20:
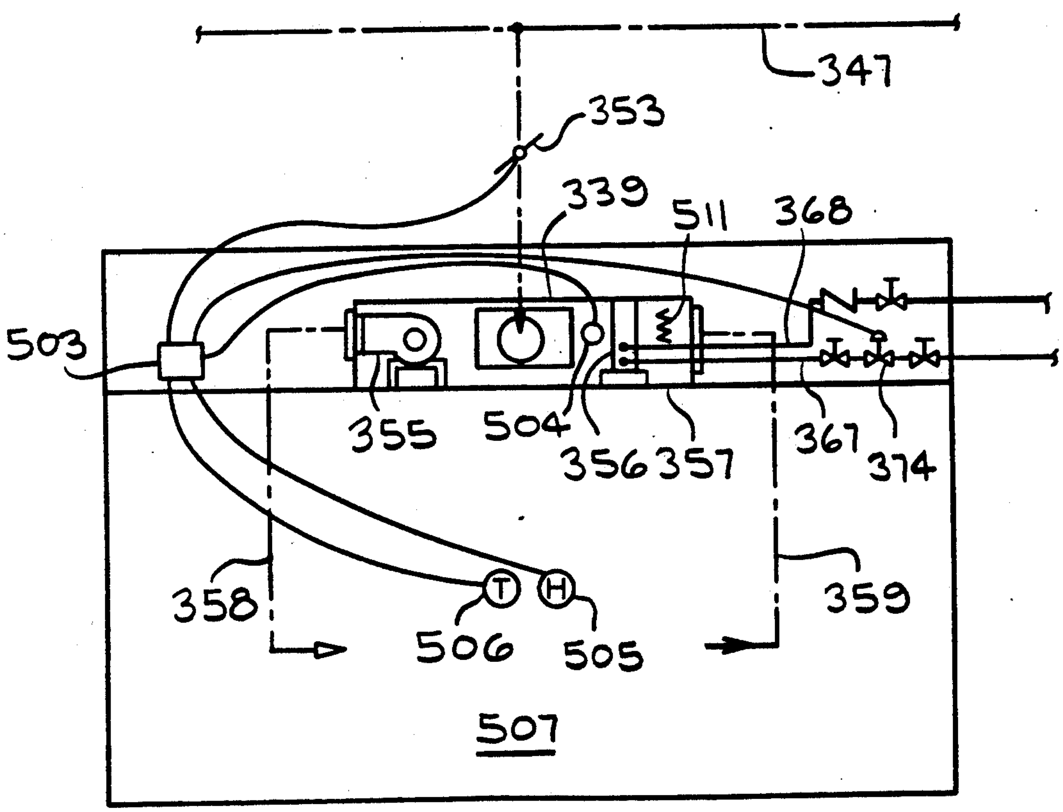

FIG. 20 is a partially schematic view of an induction mixing unit which is an important part of the apparatus of FIGS. 11, 14 and 15, and additionally including an improved control.

Figure 21:
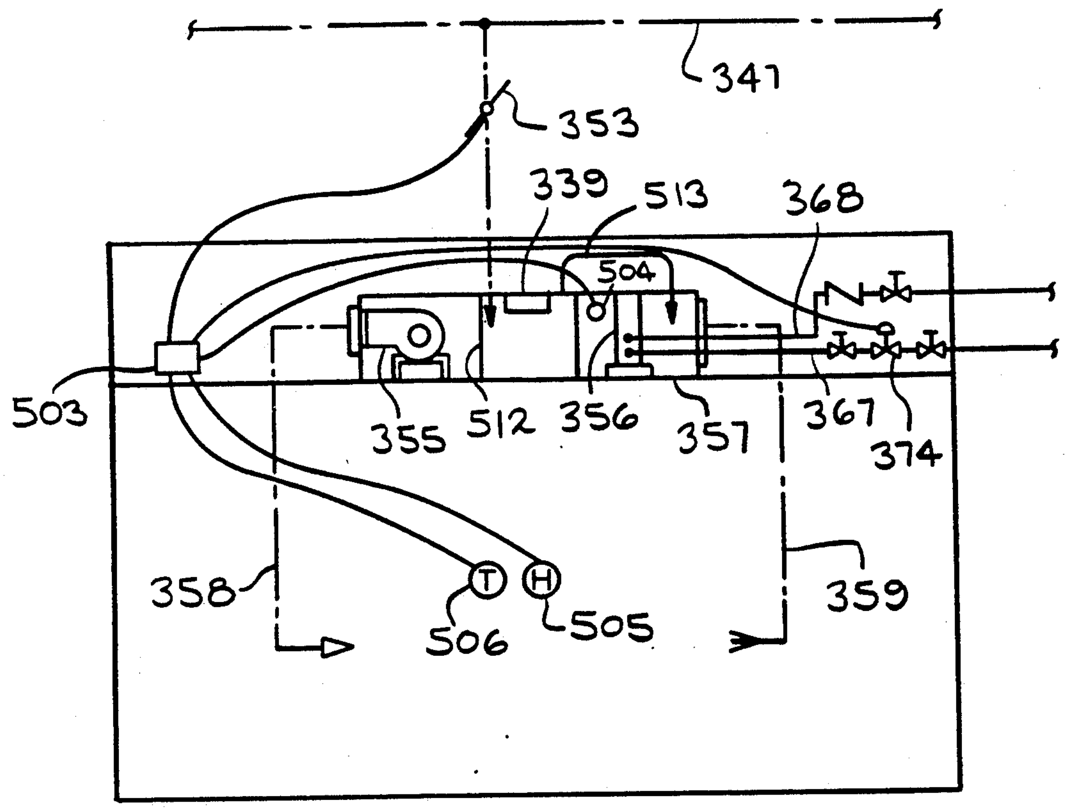

FIG. 21 is a partially schematic view of an induction mixing unit similar to that of FIG. 20 and additionally including a heat exchanger.

Figure 22:
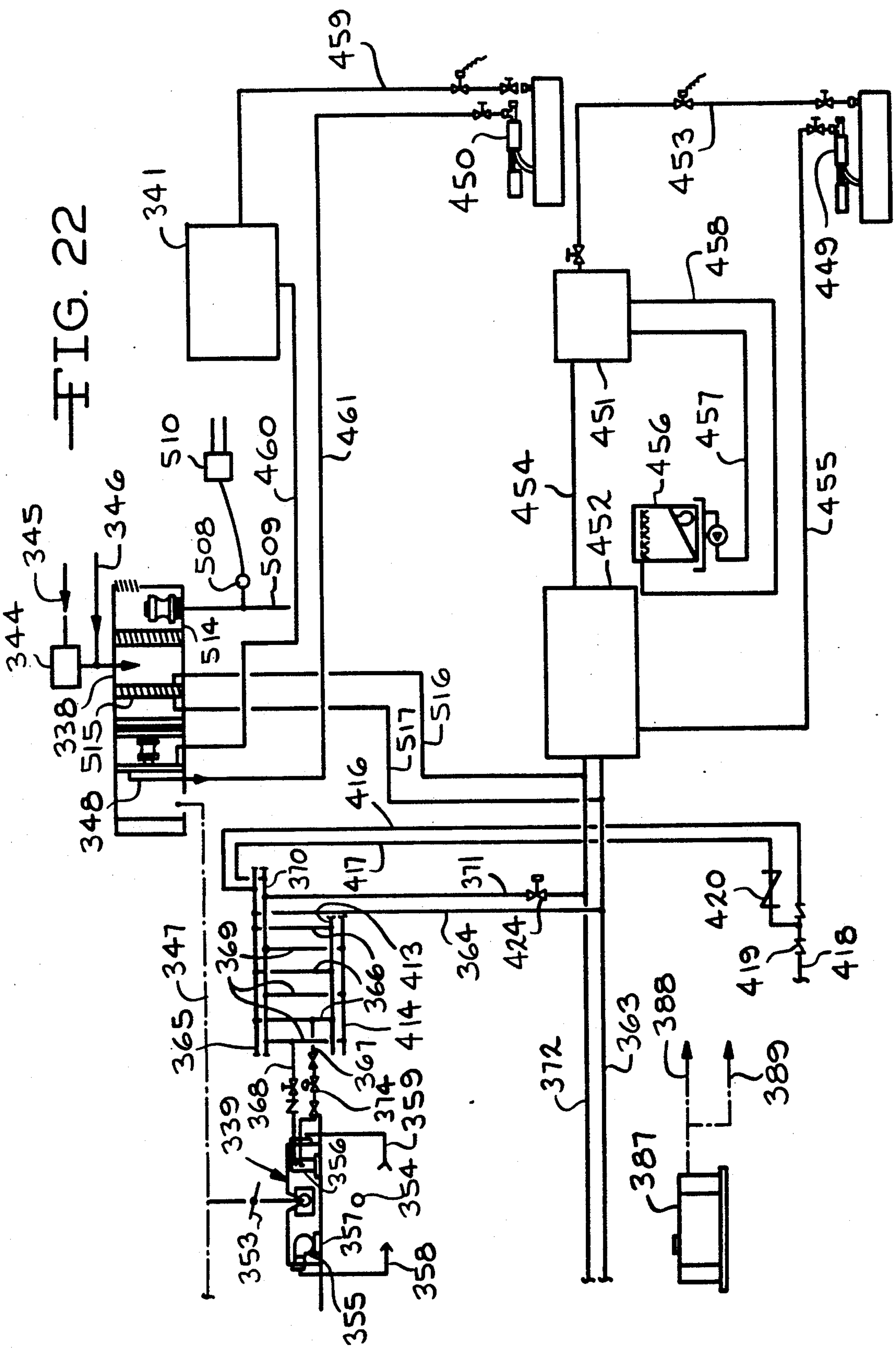

FIG. 22 is a schematic diagram of apparatus similar to that of FIG. 15 which additionally includes an induction mixing unit that increases the energy efficiency of the apparatus.

Figure 23:
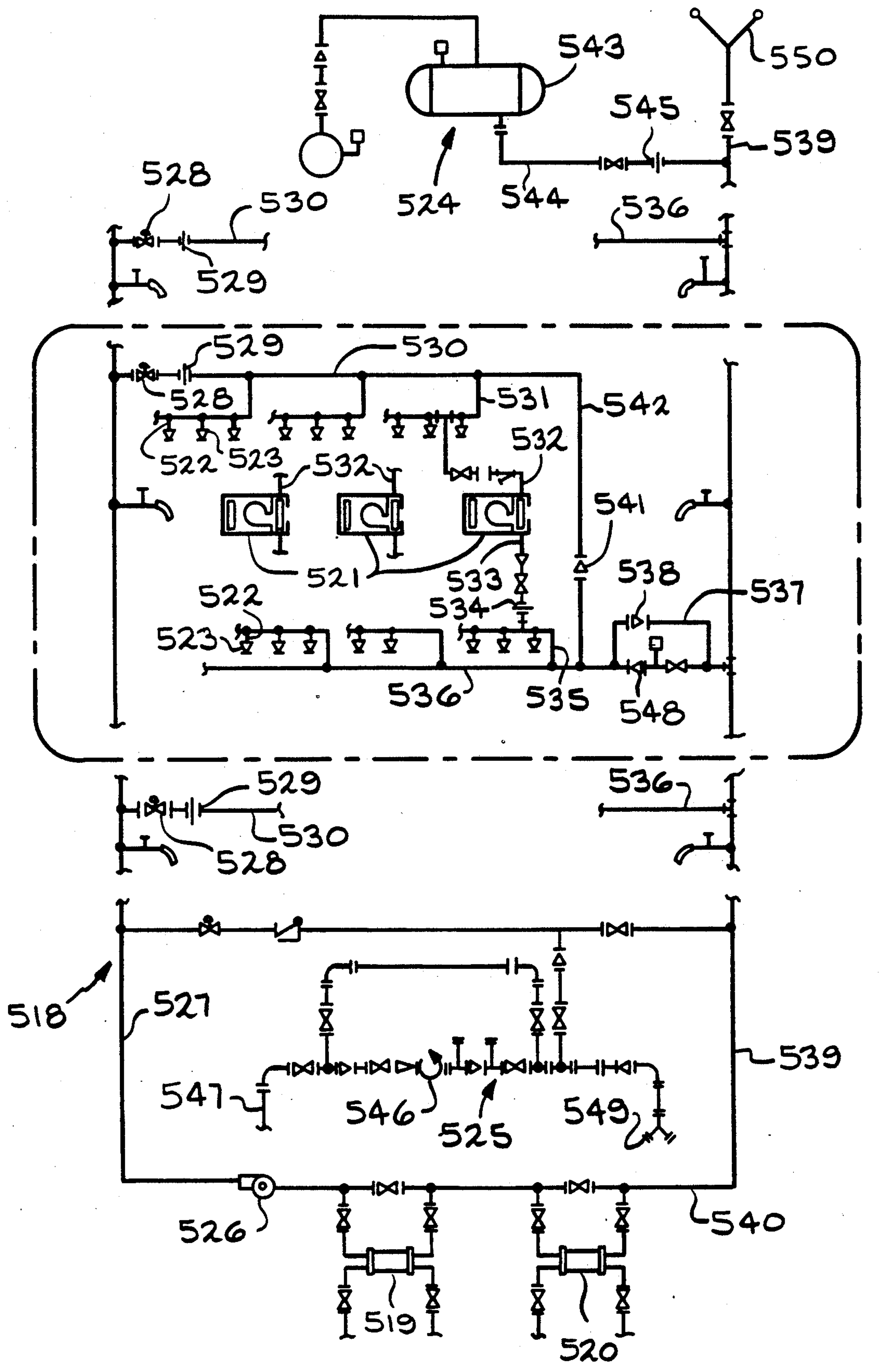

FIG. 23 is a fragmentary plan view showing another embodiment of a sprinkler system that can be used in the apparatus of FIGS. 1, 2, 6, 7, 8, 11, 14, 15, 22, 24, 25, 26, 27, 29 and 30.

Figure 24:
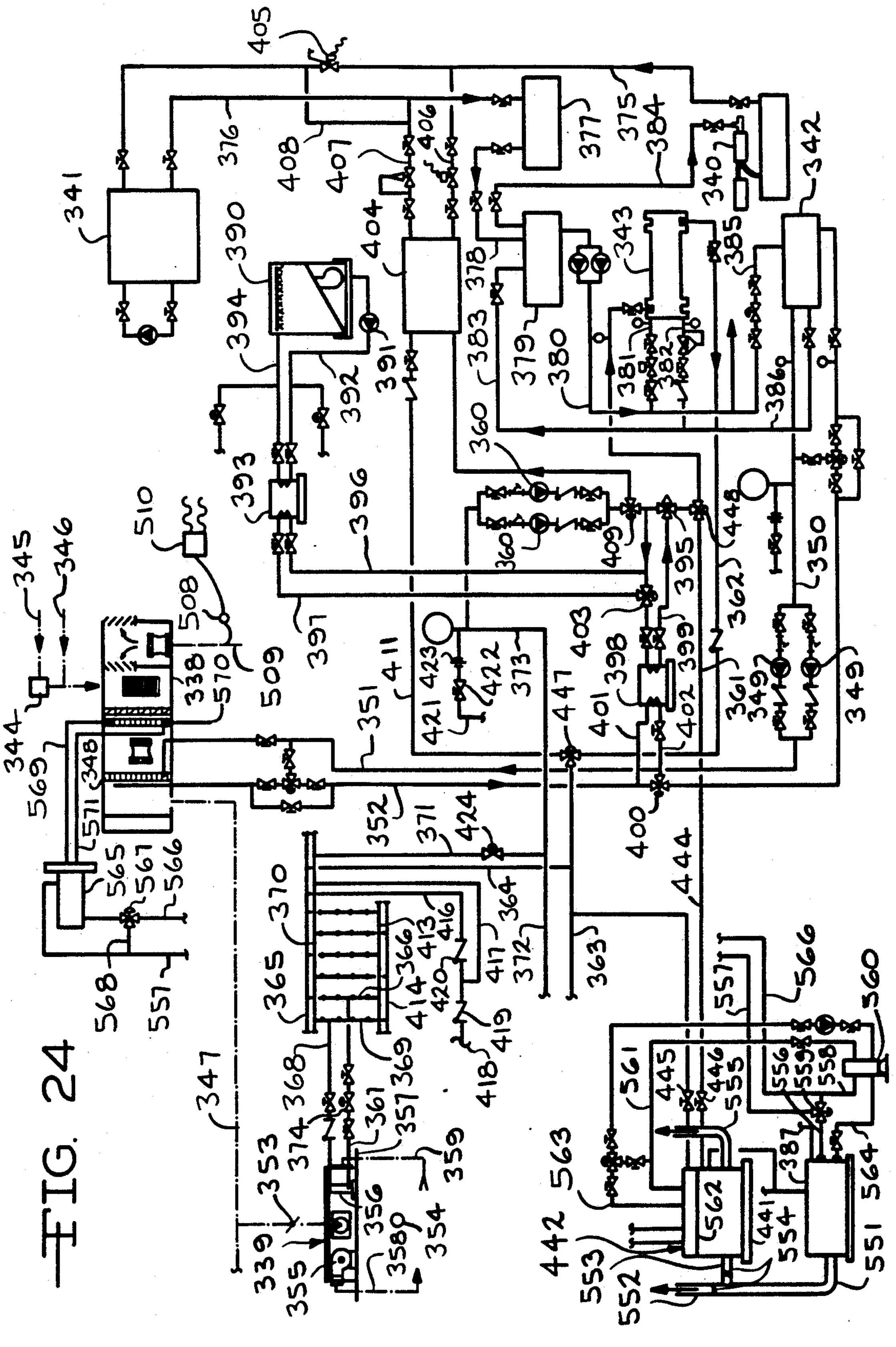

FIG. 24 is a fragmentary diagram of the apparatus of FIG. 14 showing connections for heating incoming air.

Figure 25:
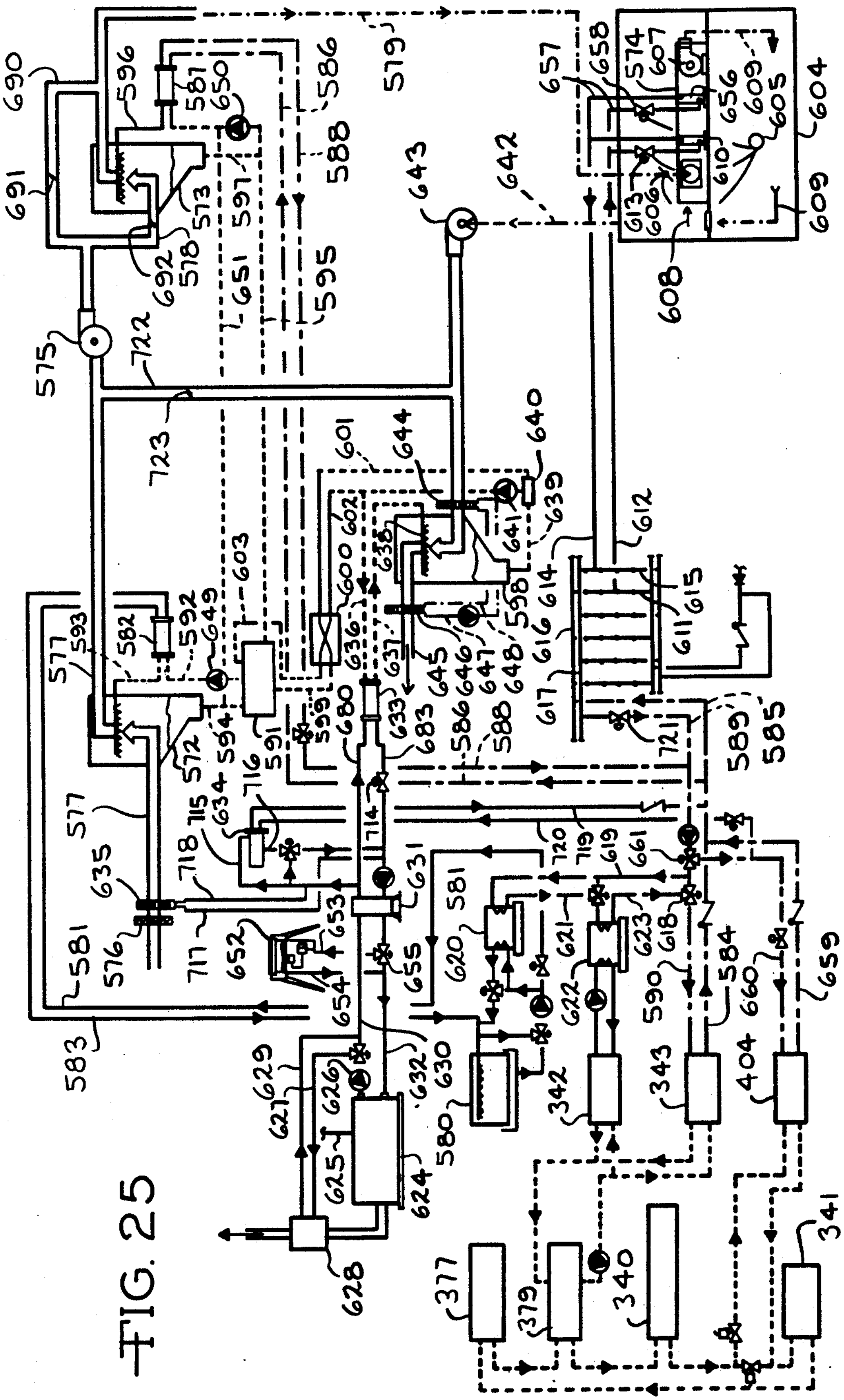

FIG. 25 is a schematic diagram of apparatus that is similar in function to that of FIGS. 11, 14 and 24, except that heat from a cogenerator is used to regenerate a liquid desiccant, and the desiccant is used in two stages of chemical dehumidification to dehumidify air that is circulated to the space to be conditioned.

Figure 26:
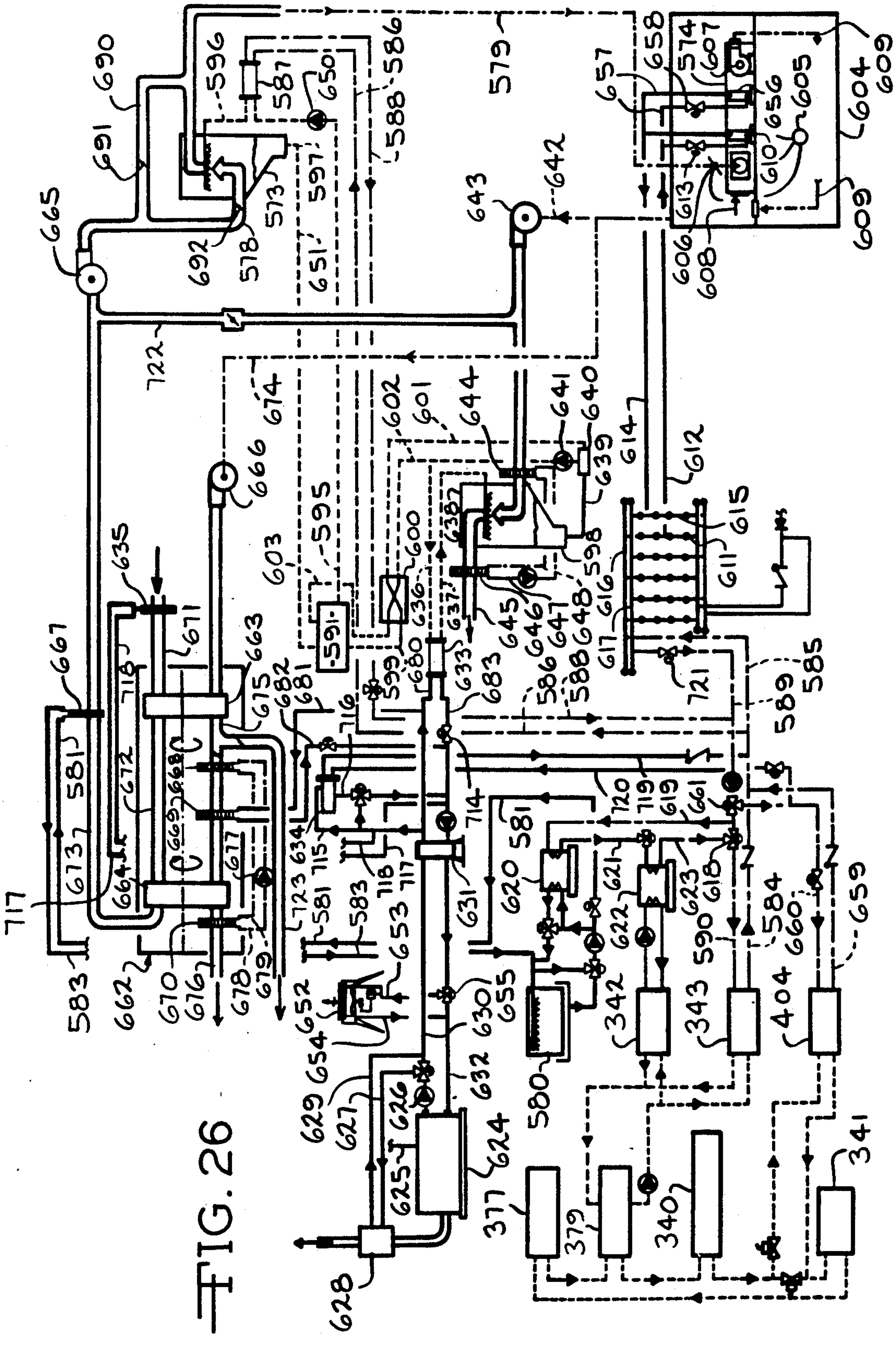

FIG. 26 is a schematic diagram of apparatus that is similar to that of FIG. 25, except that the first stage of chemical dehumidification uses a solid desiccant.

Figure 27:
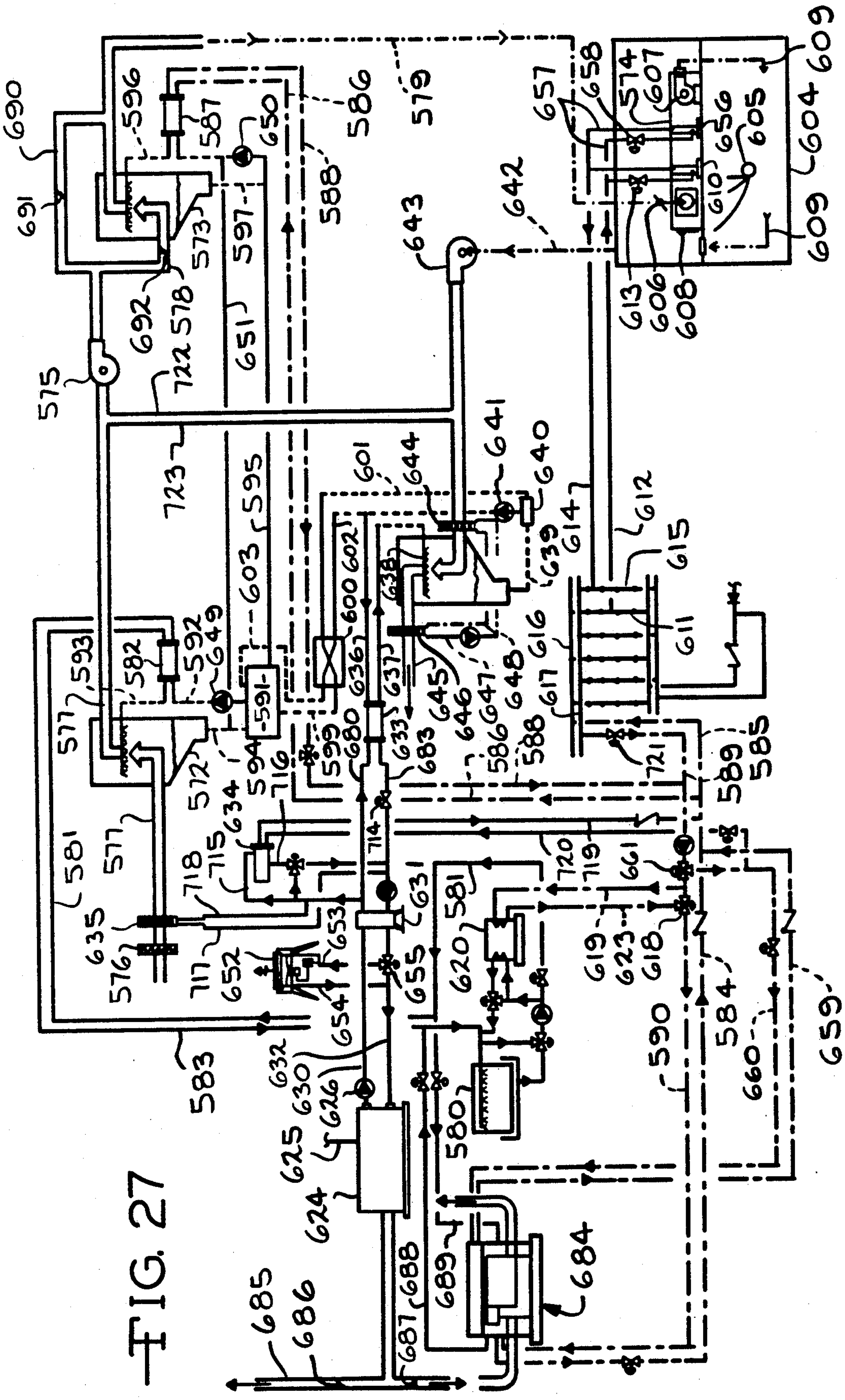

FIG. 27 is a schematic diagram of apparatus in which a heat engine drives an electric generator and furnishes heat both to regenerate a chemical desiccant and as an energy source for absorption refrigeration apparatus.

Figure 28:
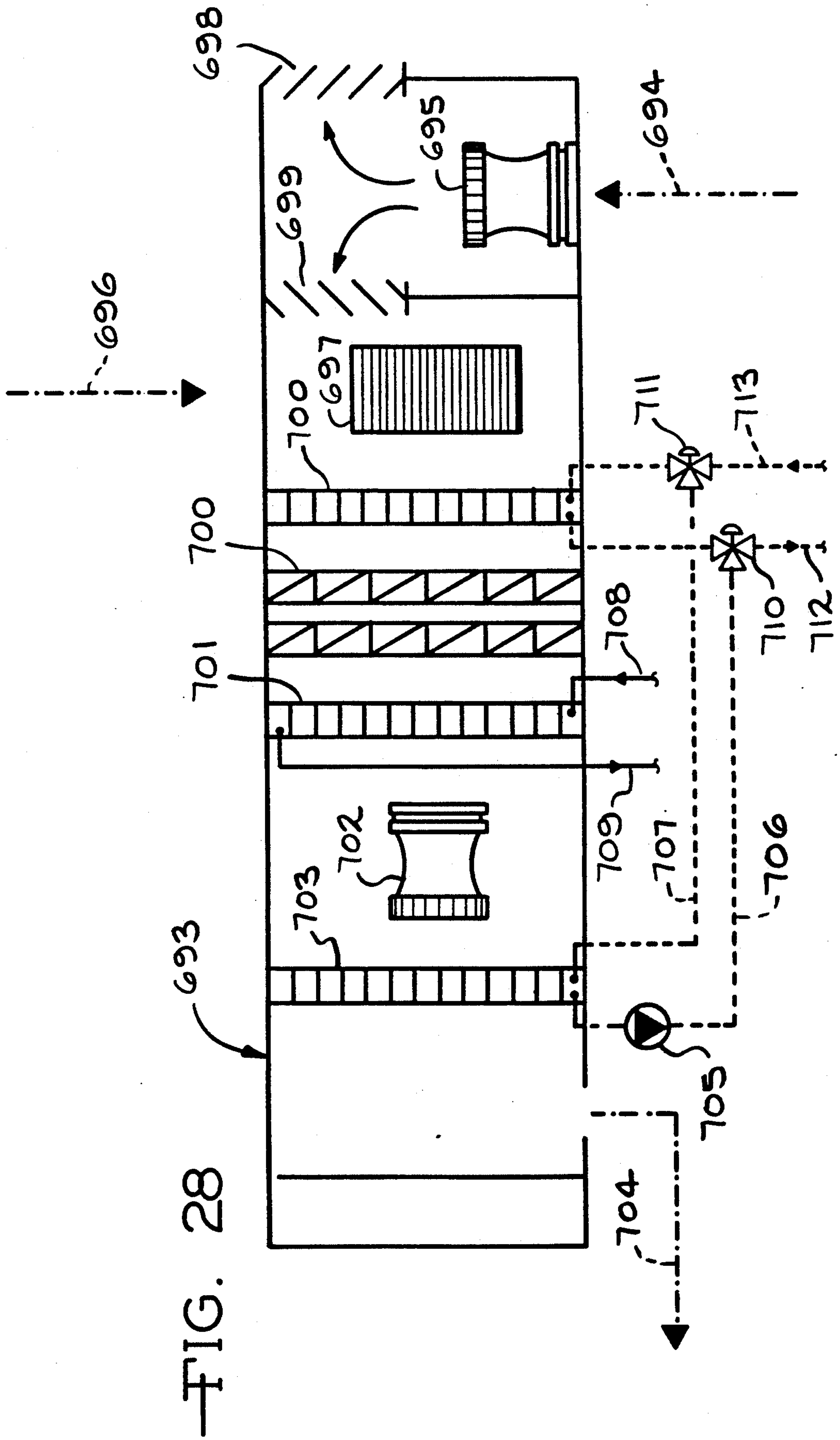

FIG. 28 is a partially schematic view of an air handler which is particularly advantageous as an element of the apparatus of FIGS. 1, 2, 6, 7, 11, 14, 15, 22, 24, 29 and 30.

Figure 29:
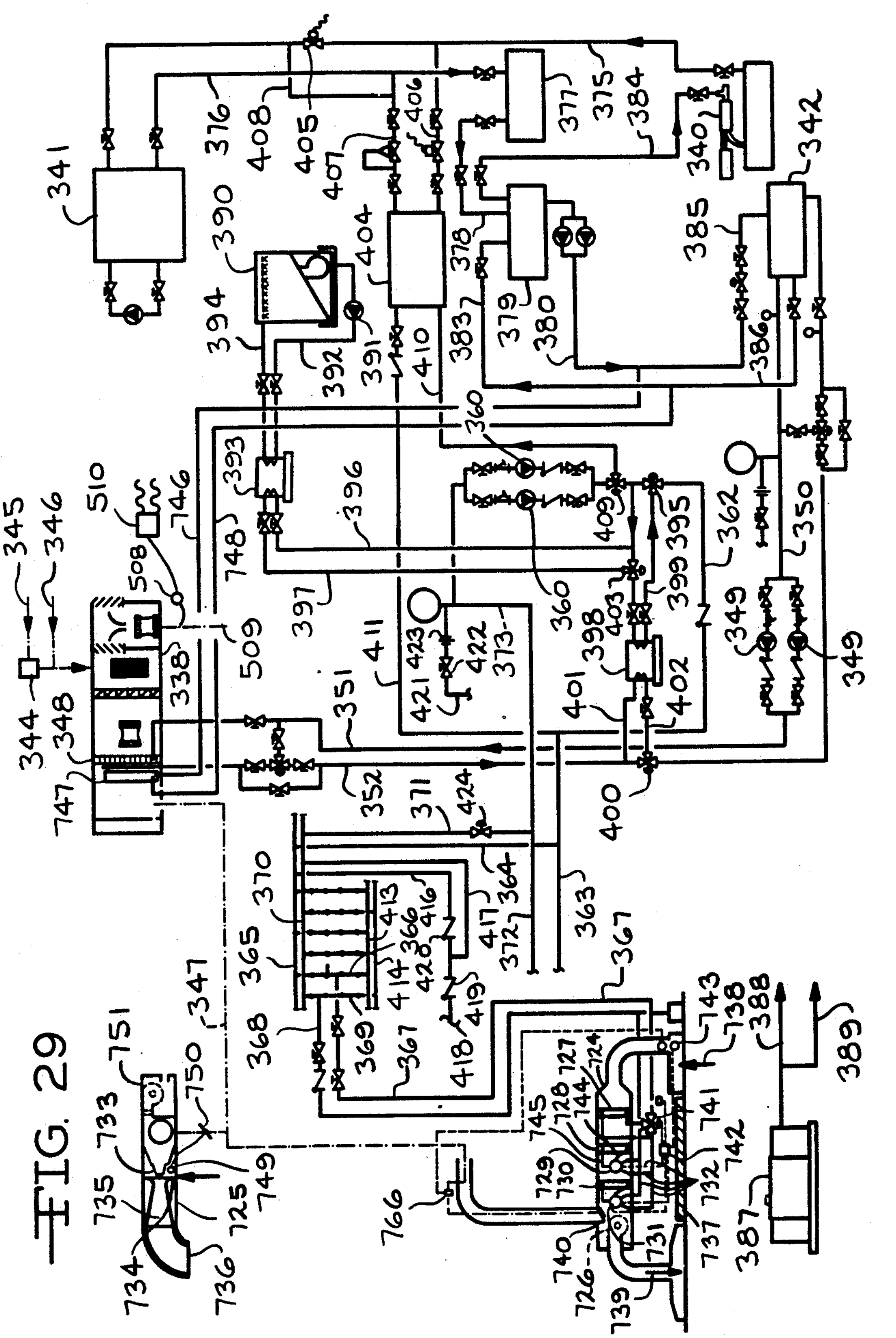

FIG. 29 is a schematic diagram showing apparatus similar to that of FIG. 11, differing mainly in that it includes induction mixing units of two different kinds.

Figure 30:
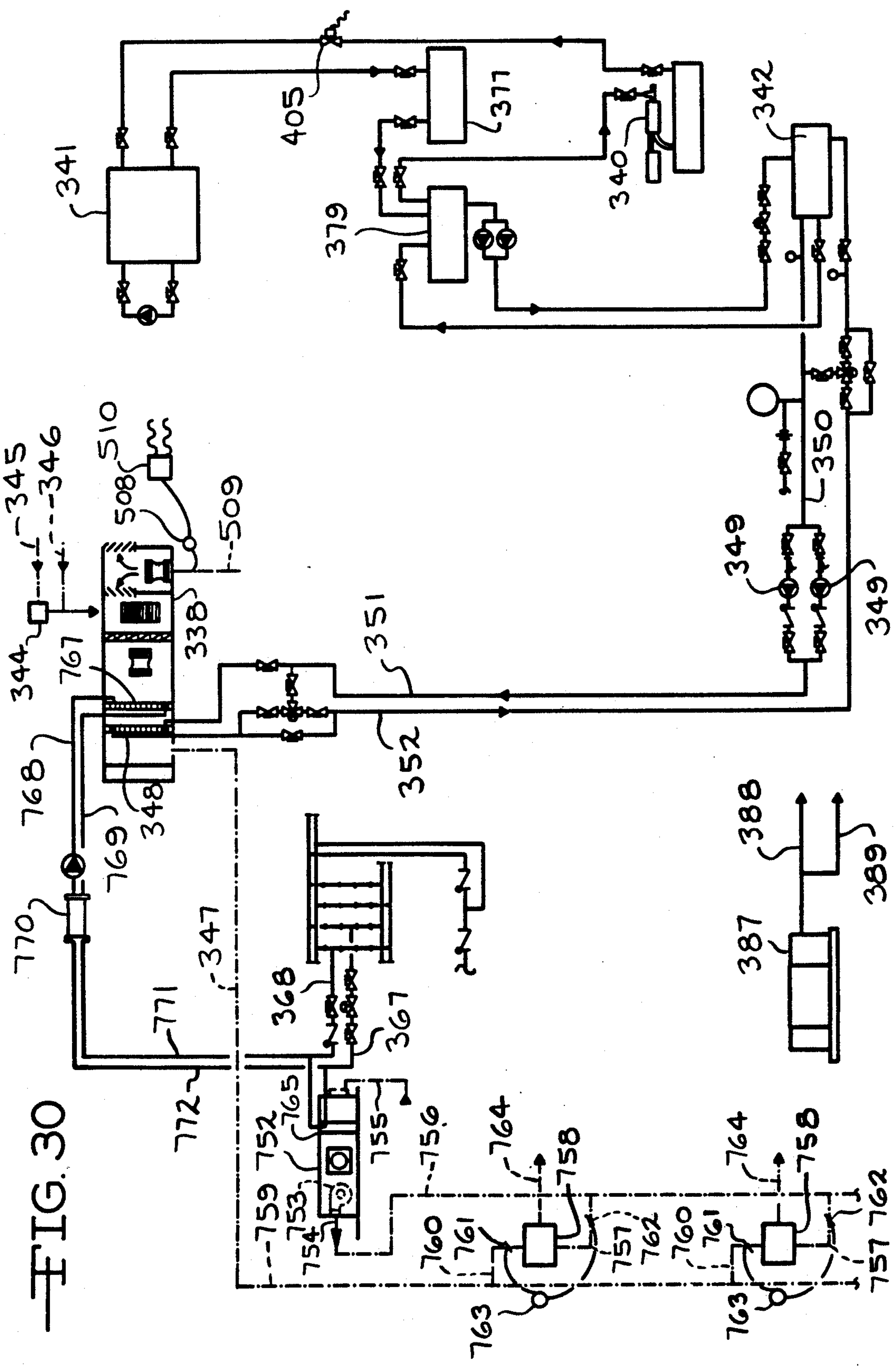

FIG. 30 is a schematic diagram showing apparatus similar to that of FIG. 29, but including an induction unit and mixing boxes instead of the two kinds of induction mixing units of the FIG. 29 apparatus.

Figure 31:
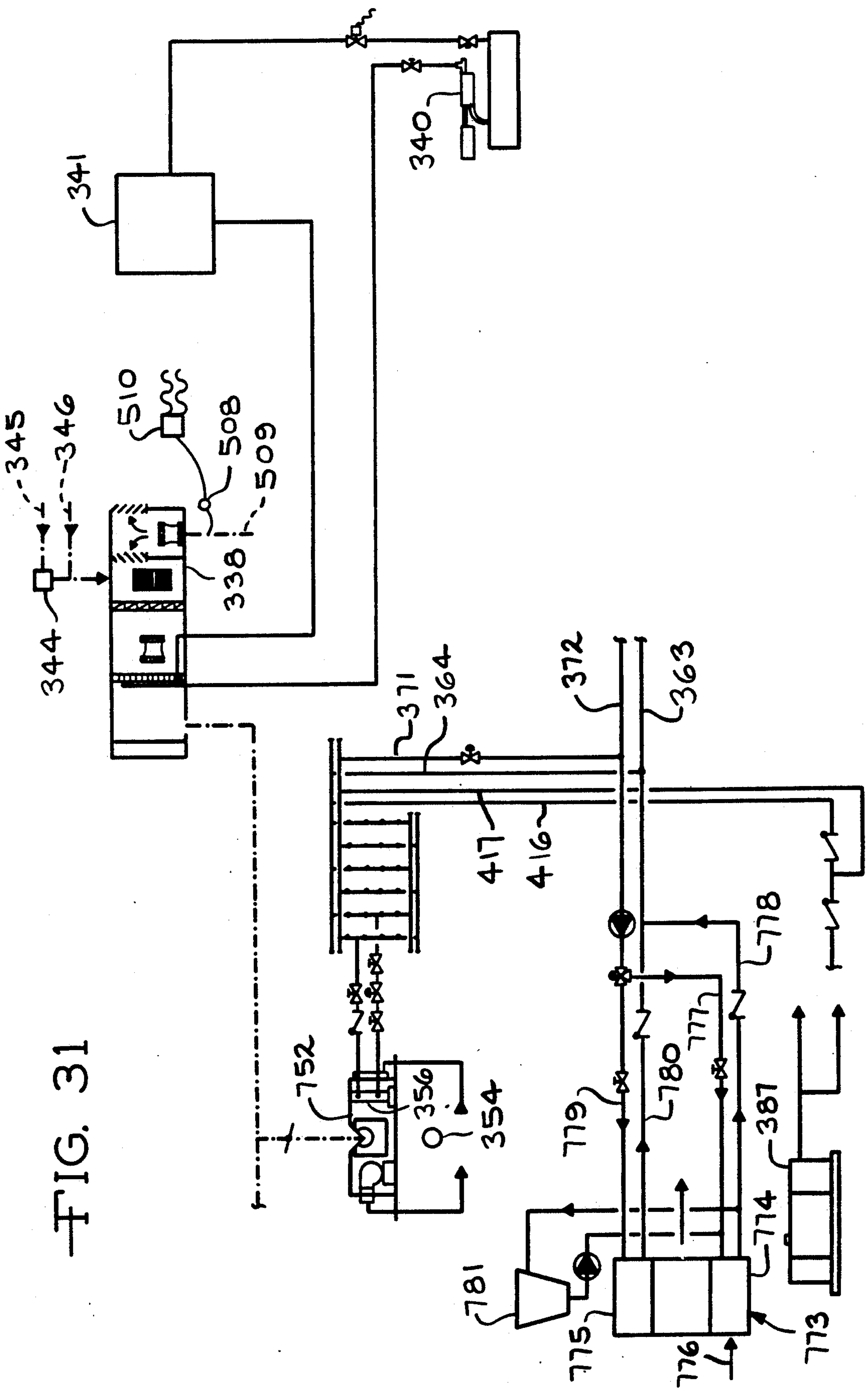

FIG. 31 is a schematic diagram showing apparatus similar to that of FIGS. 15 and 22, but differing in that compression refrigeration apparatus has been omitted and an absorption chiller/heater has been added.

Figure 32:
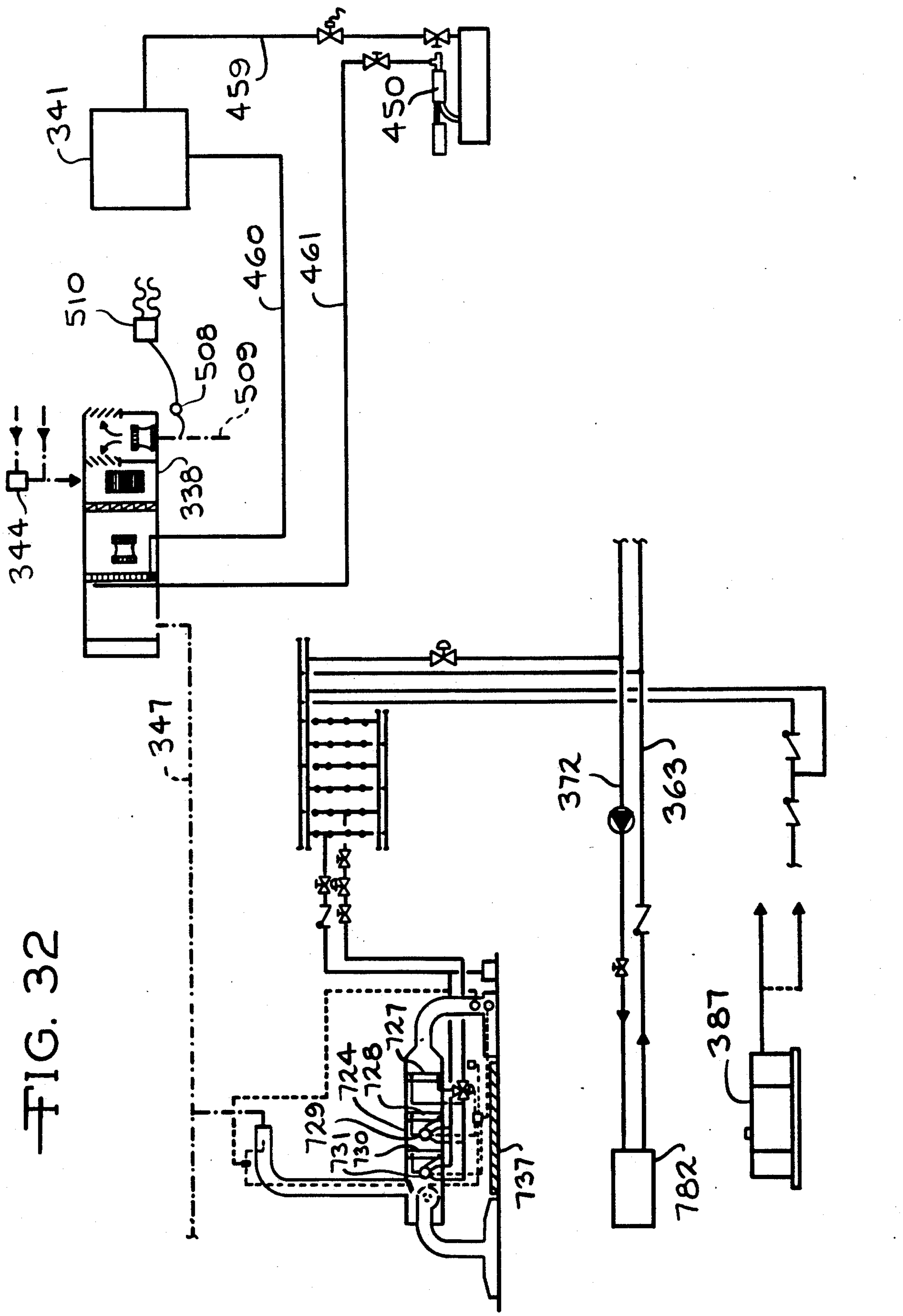

FIG. 32 is a schematic diagram showing apparatus similar to that of FIGS. 15 and 22, but differing in that compression refrigeration apparatus has been omitted and a closed circuit evaporative condenser has been added.

Figure 33:
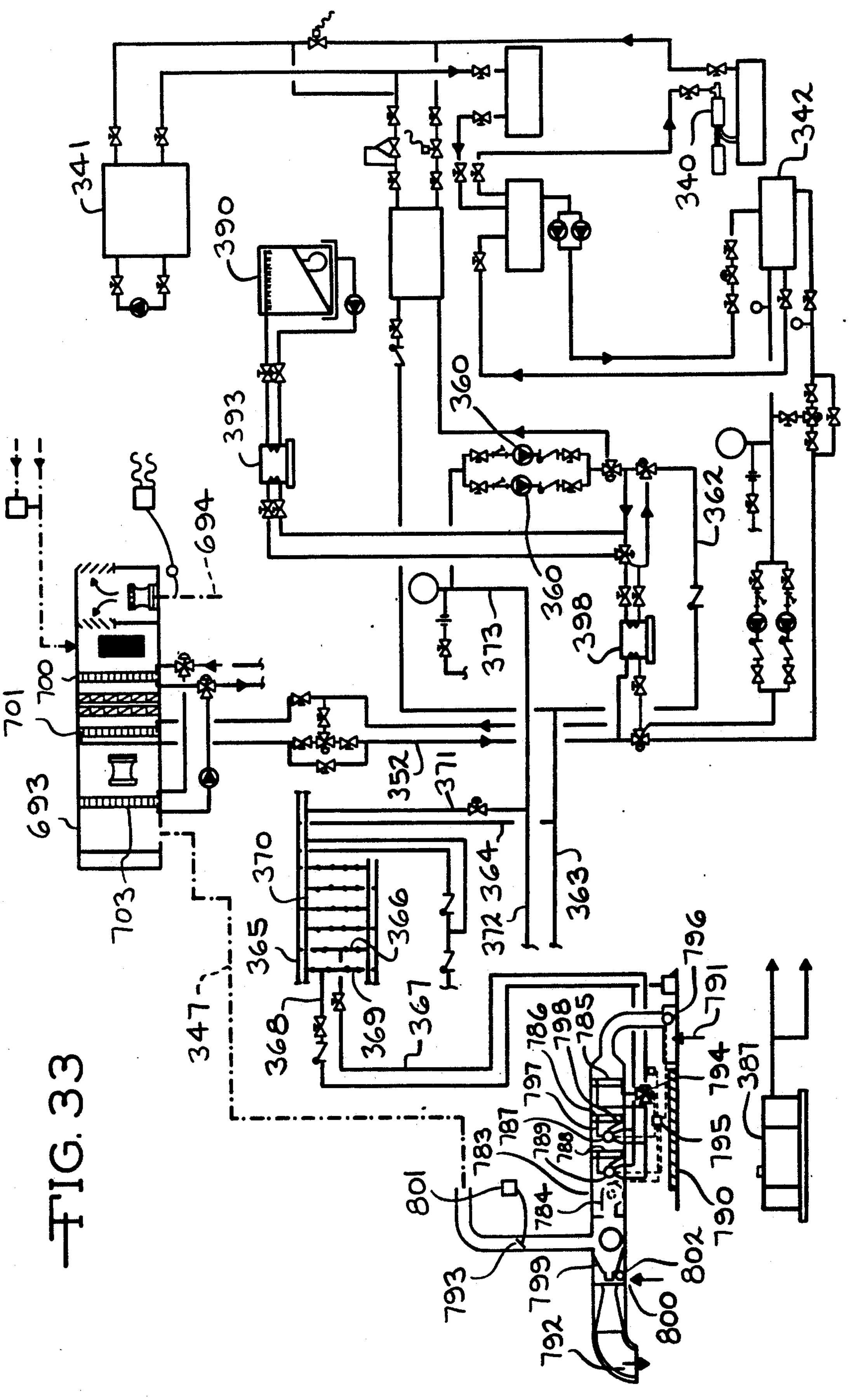

FIG. 33 is a schematic diagram showing apparatus similar to that of FIG. 11, differing mainly in that a different induction mixing unit has been substituted for that shown in FIG. 11.

Figure 34:
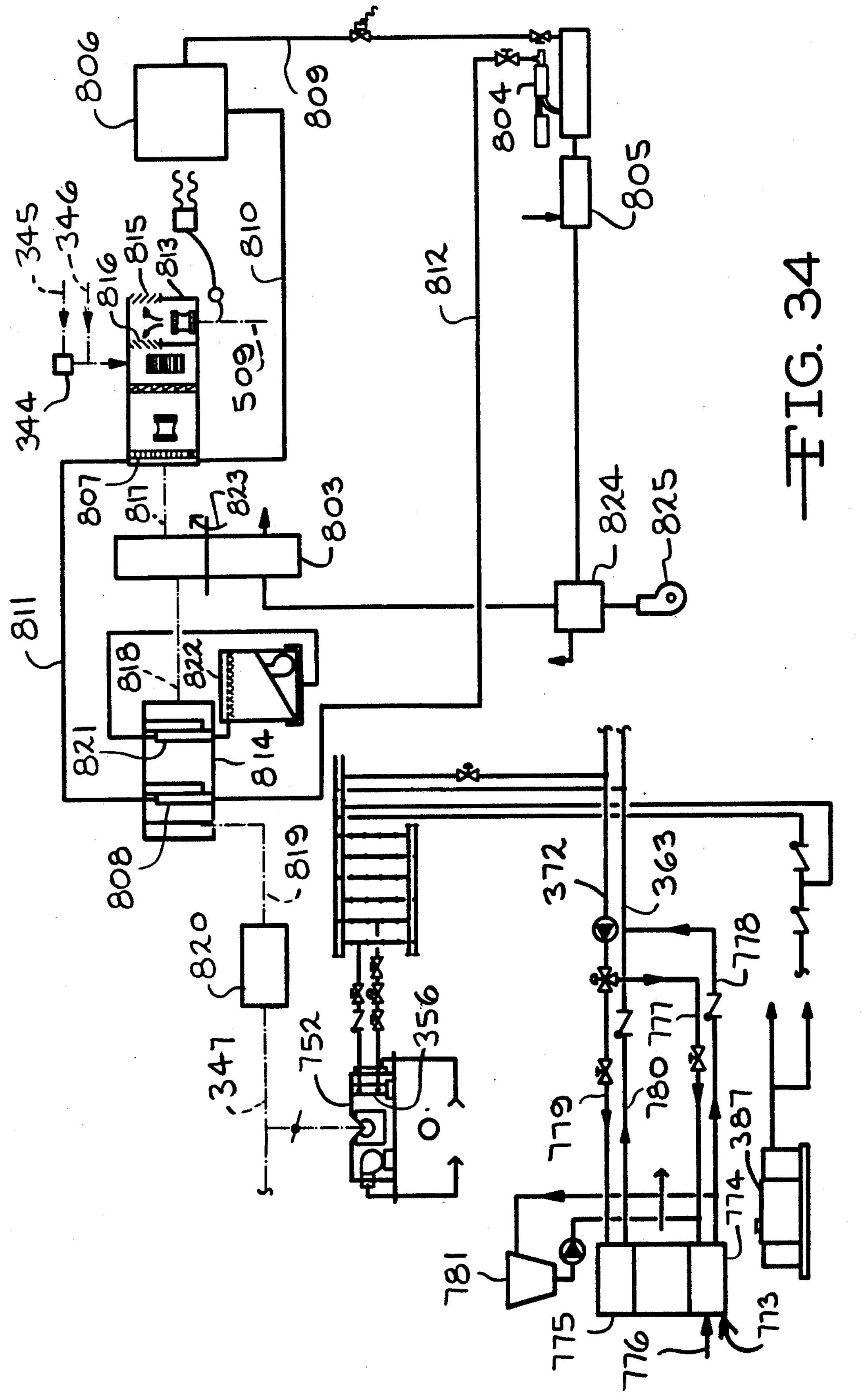

FIG. 34 is a schematic diagram showing apparatus similar to that of FIG. 31, but differing in that a combination comprising compression refrigeration apparatus driven by a gas engine and a chemical dehumidifier has been substituted for compression refrigeration apparatus.

Figure 35:
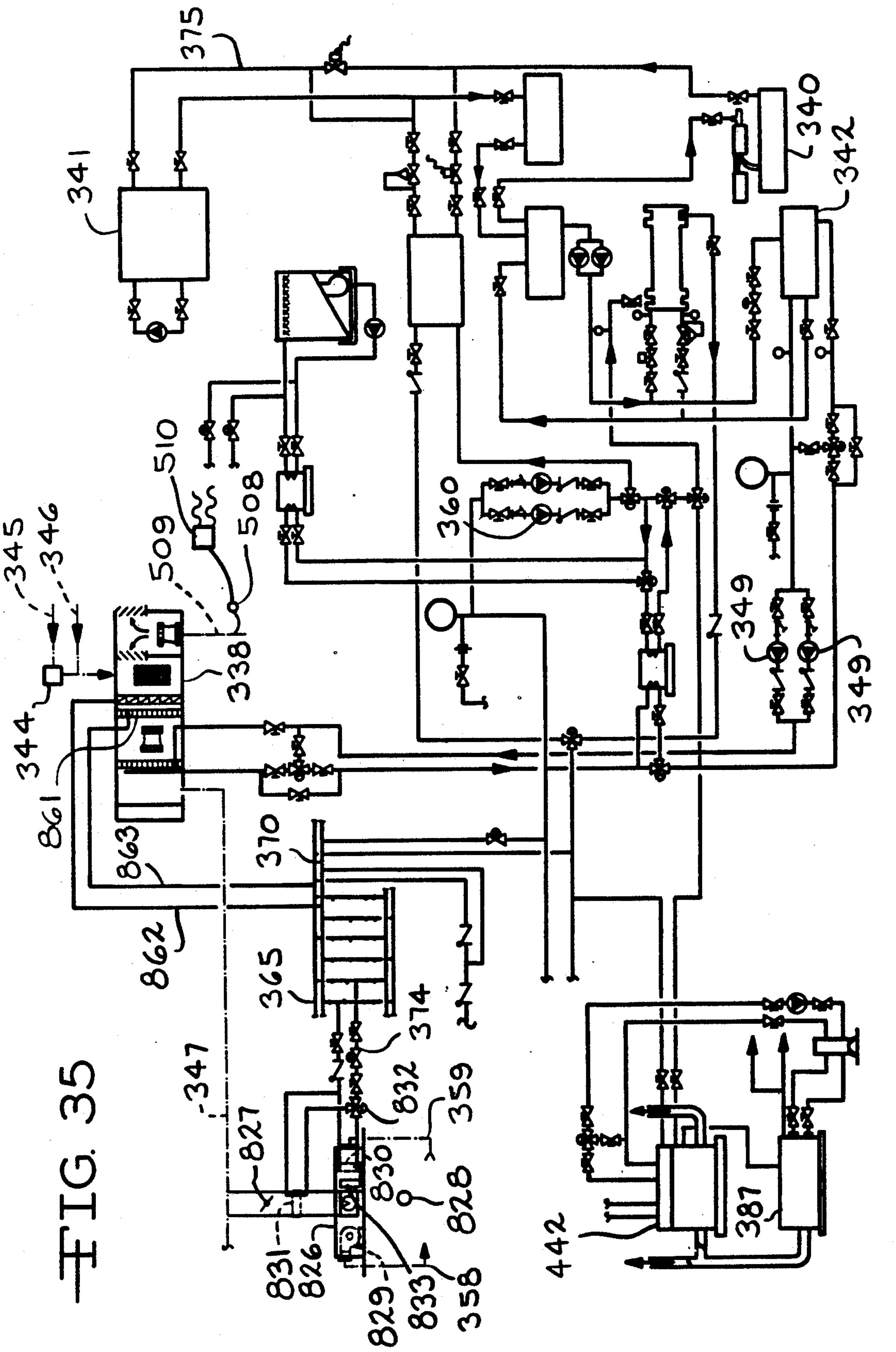

FIG. 35 is a schematic diagram showing apparatus similar to that of FIG. 14 but differing in that a reheat coil has been added to an induction mixing unit which is an essential part of the apparatus.

Figure 36:
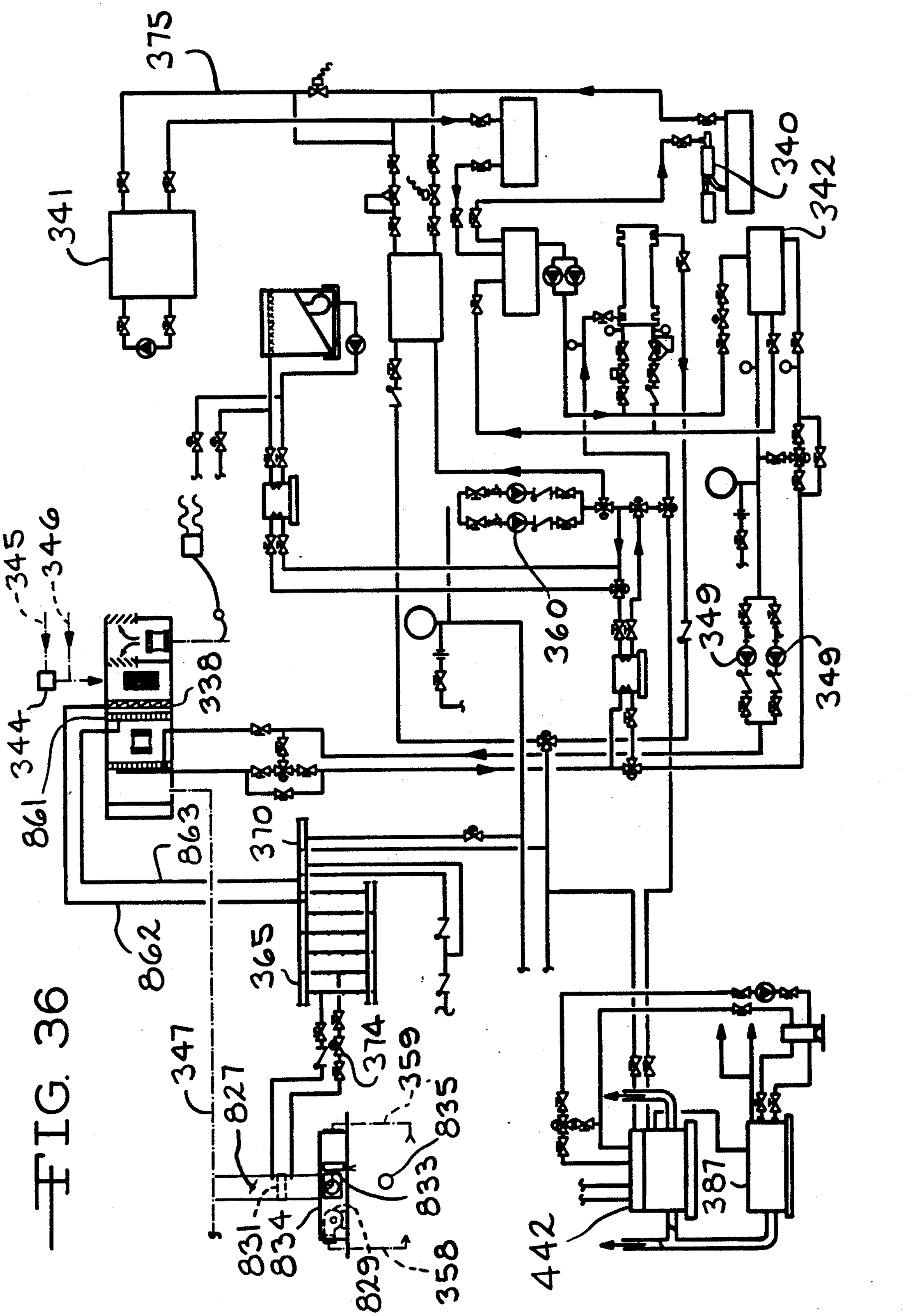

FIG. 36 is schematic diagram showing apparatus similar to that of FIG. 35, but differing in that a cooling coil has been omitted from the induction mixing which is an essential part of the apparatus.

Figure 37:
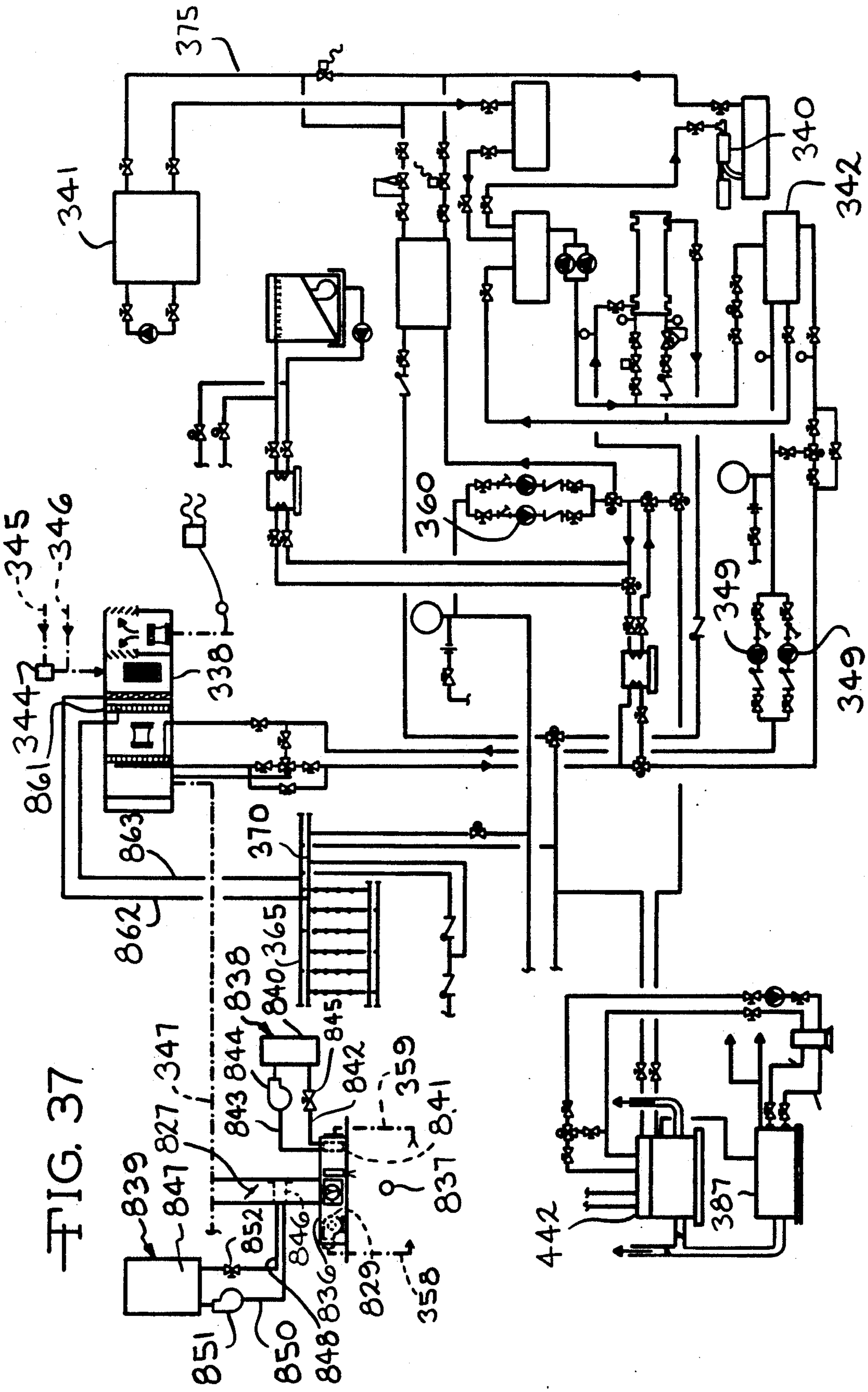

FIG. 37 is a schematic diagram showing apparatus similar to that of FIG. 35, but differing in that reheat and cooling coils of the induction mixing unit have been replaced by heat pipes.

Figure 38:
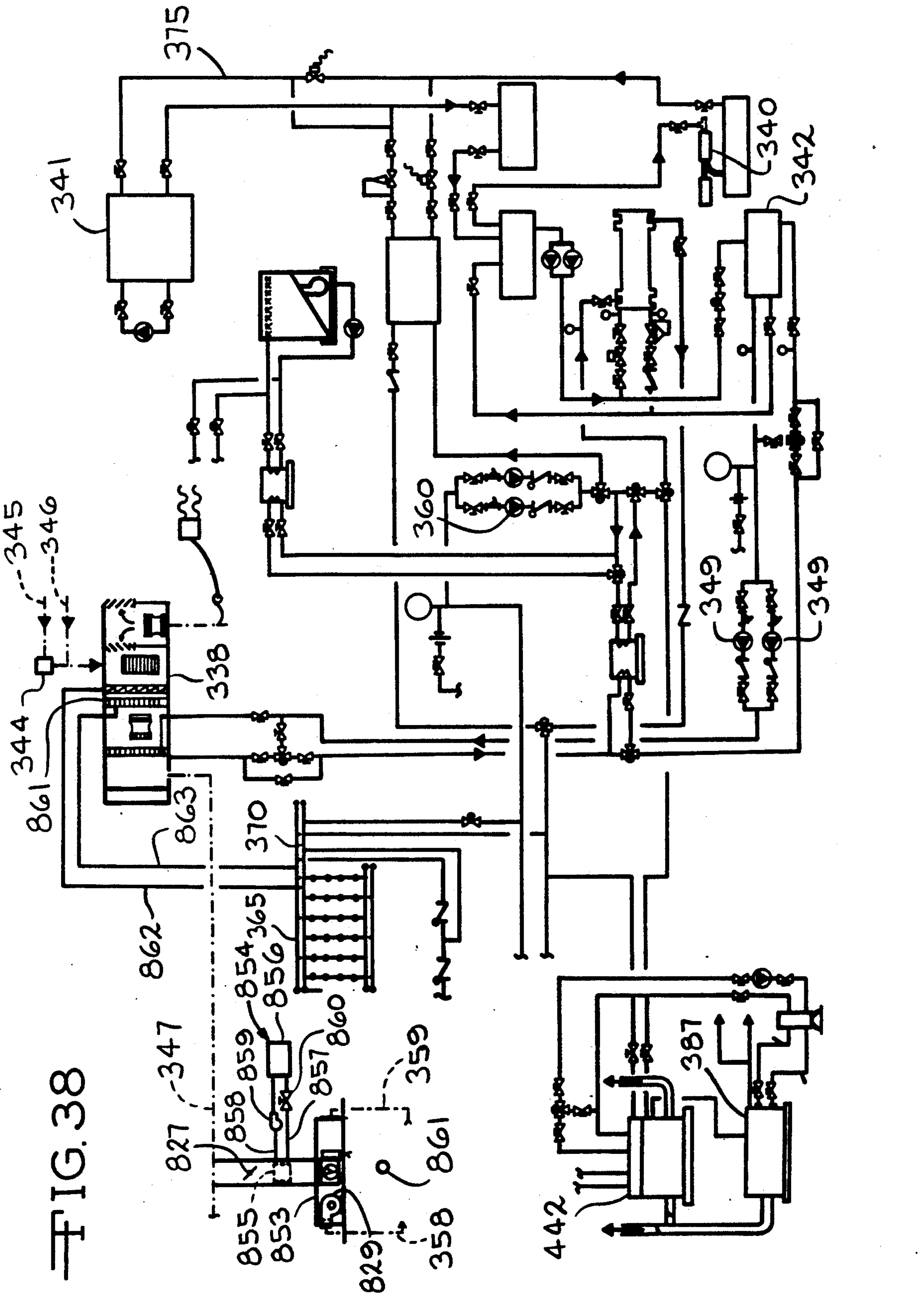

FIG. 38 is a schematic diagram showing apparatus similar to that of FIG. 37, but differing in that one of the heat pipes has been omitted from the induction mixing unit.

Figure 39:
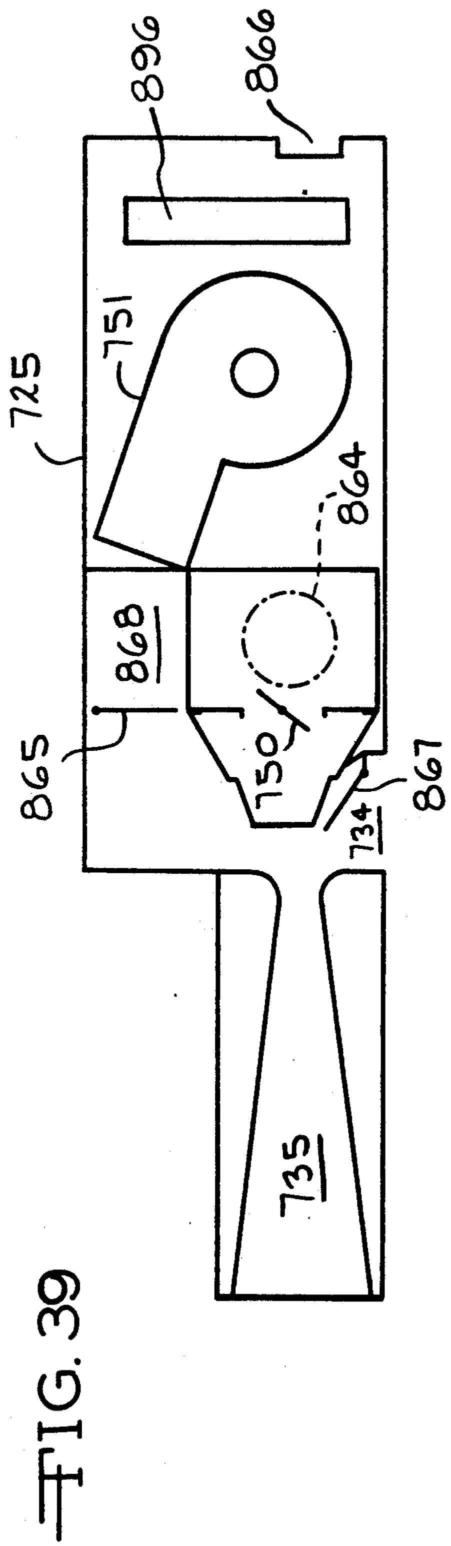

FIG. 39 is a schematic diagram in elevation showing details of one of the induction mixing units of the apparatus of FIG. 29.

Figure 40:
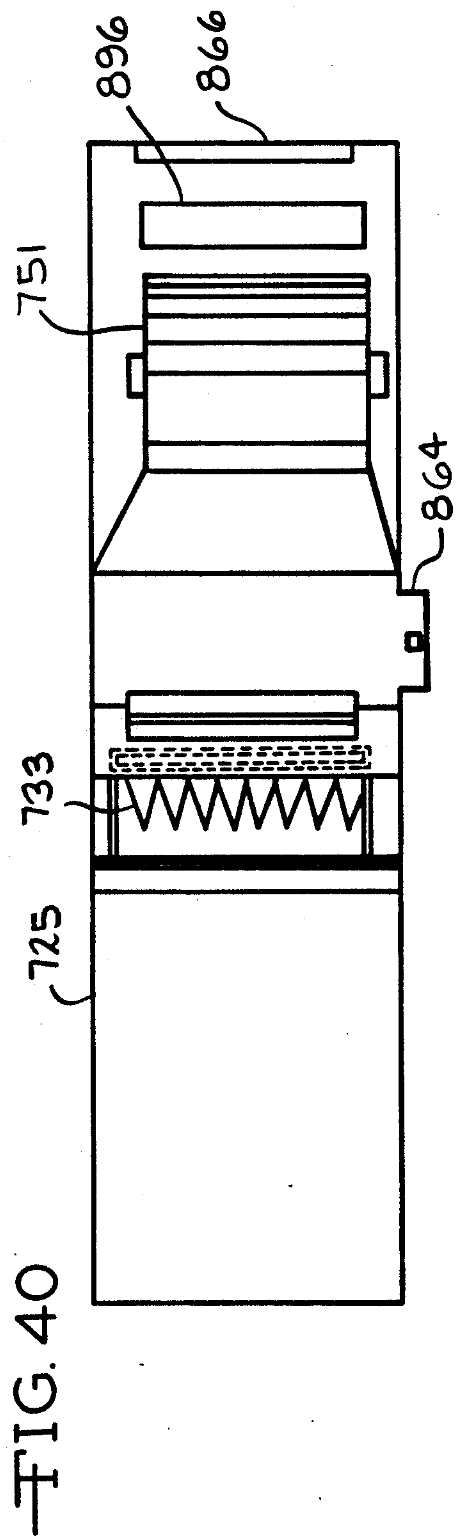

FIG. 40 is a schematic diagram in plan showing further details of the induction mixing unit of FIG. 39.

Figure 41:
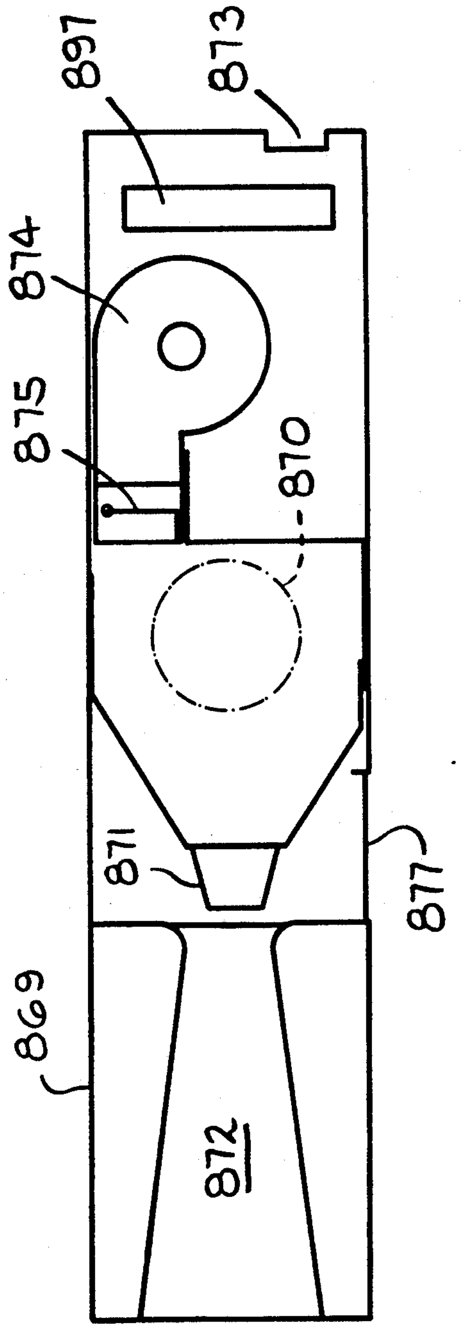

FIG. 41 is a schematic diagram in elevation showing another embodiment of an induction mixing unit similar to that of FIG. 39.

Figure 42:
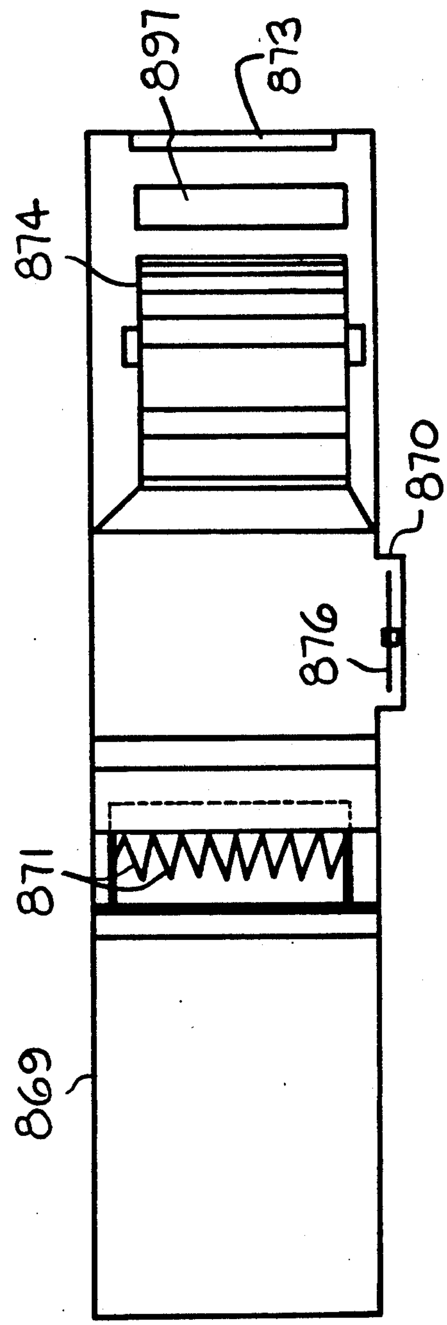

FIG. 42 is a schematic diagram in plan showing further details of the induction mixing unit of FIG. 41.

Figure 43:
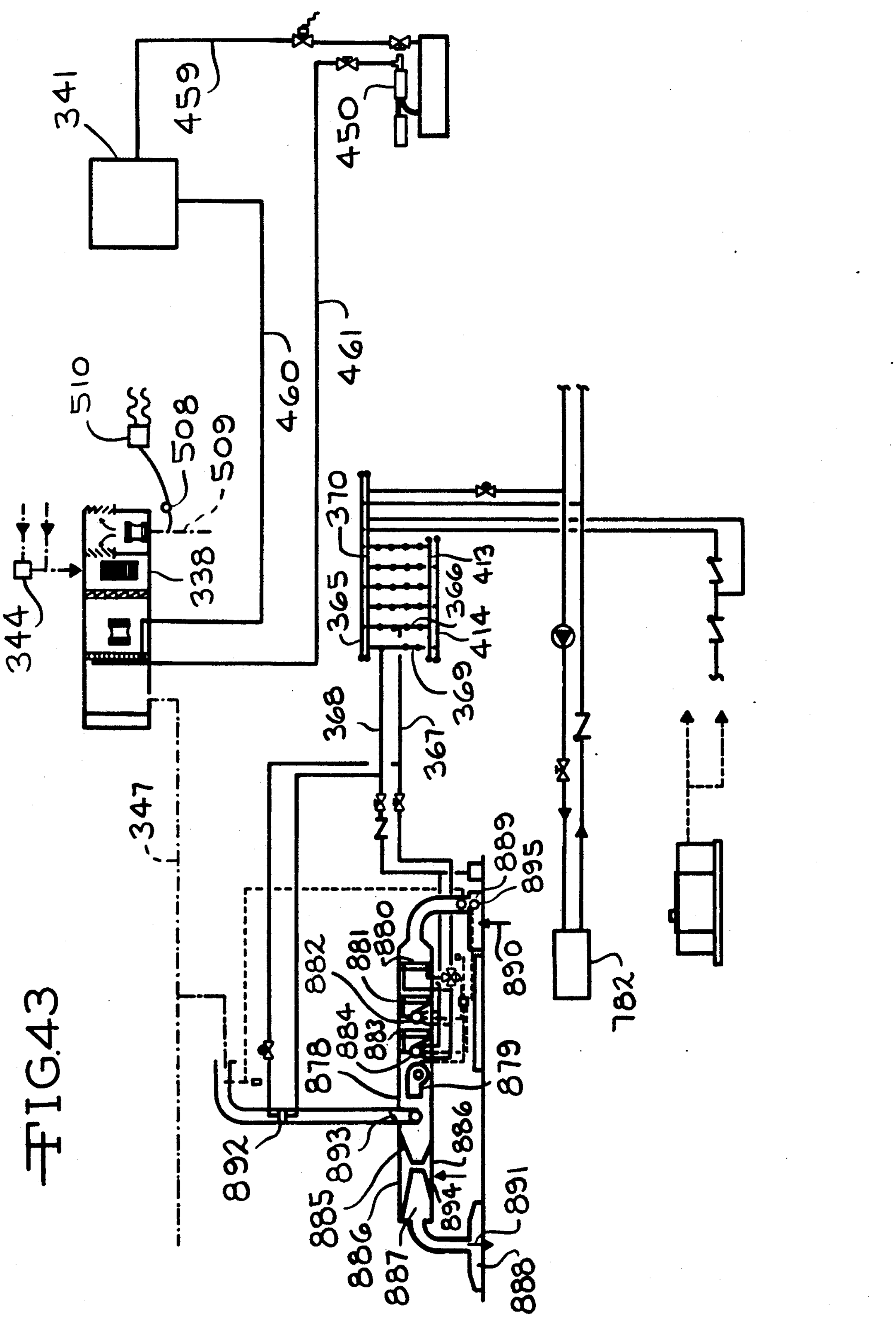

FIG. 43 is a schematic diagram showing apparatus similar to that of FIG. 32 but differing in that it shows another embodiment of an induction mixing unit.

Figure 44:
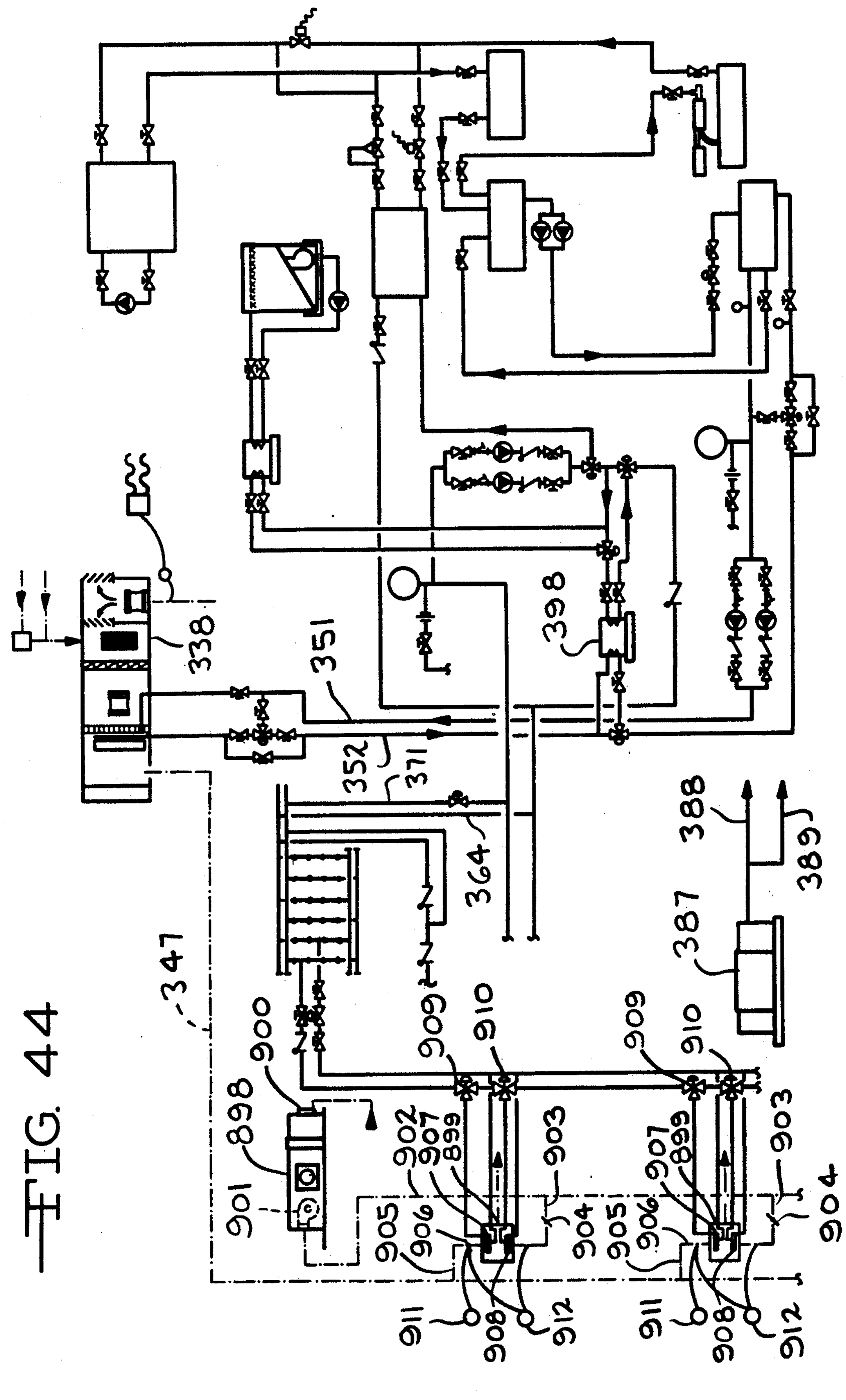

FIG. 44 is a schematic diagram showing apparatus similar to that of FIG. 30, but differing in that cooling and reheat coils have been added to mixing boxes of the dual duct type which are part of the apparatus.

Figure 45:
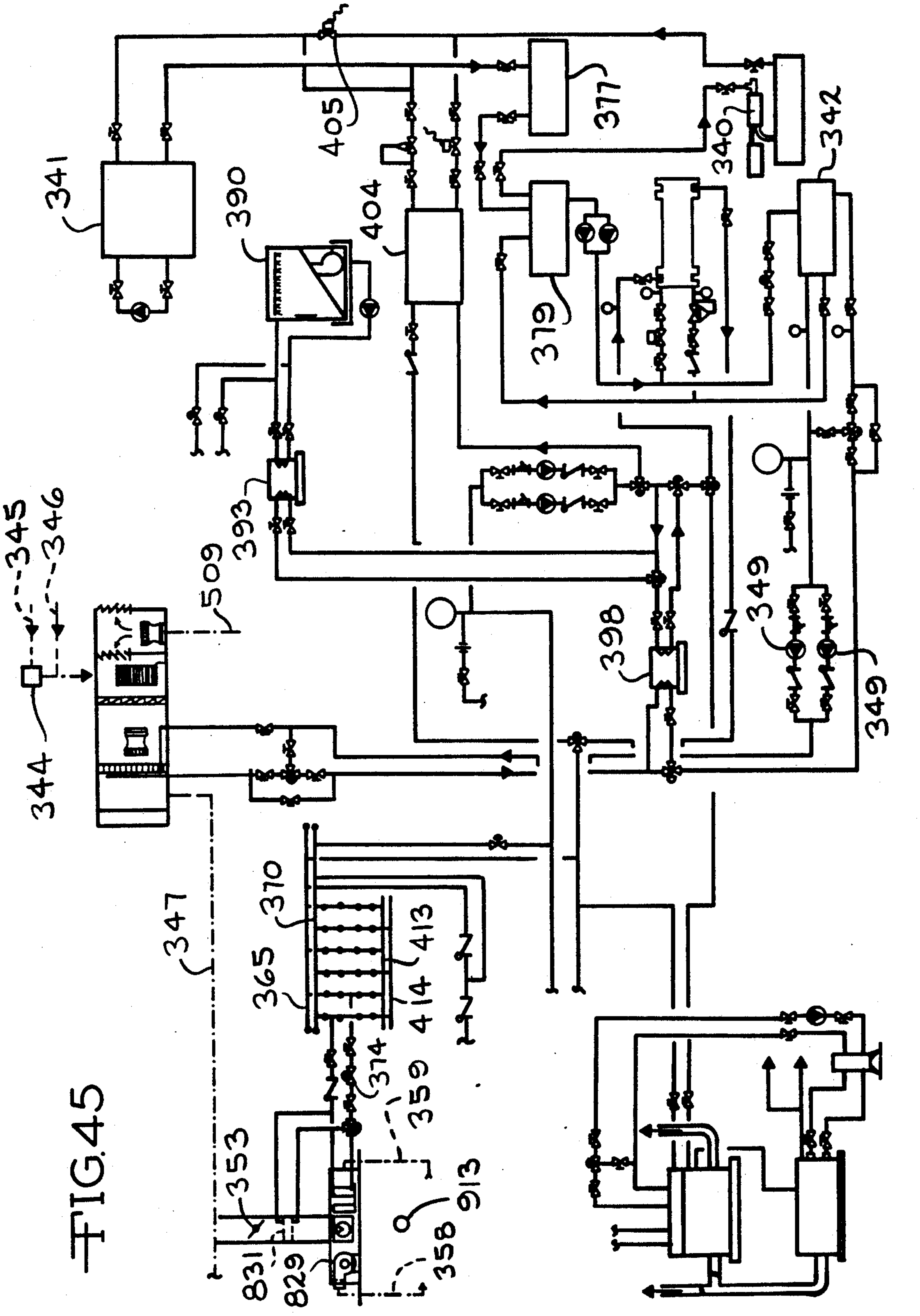

FIG. 45 is a schematic diagram showing apparatus similar to that of FIG. 35 differing in that a humidistat which measures the moisture content of the return air has been omitted and thermostat/humidistat-controllers associated with each of several induction mixing units have been added.

Figure 46:
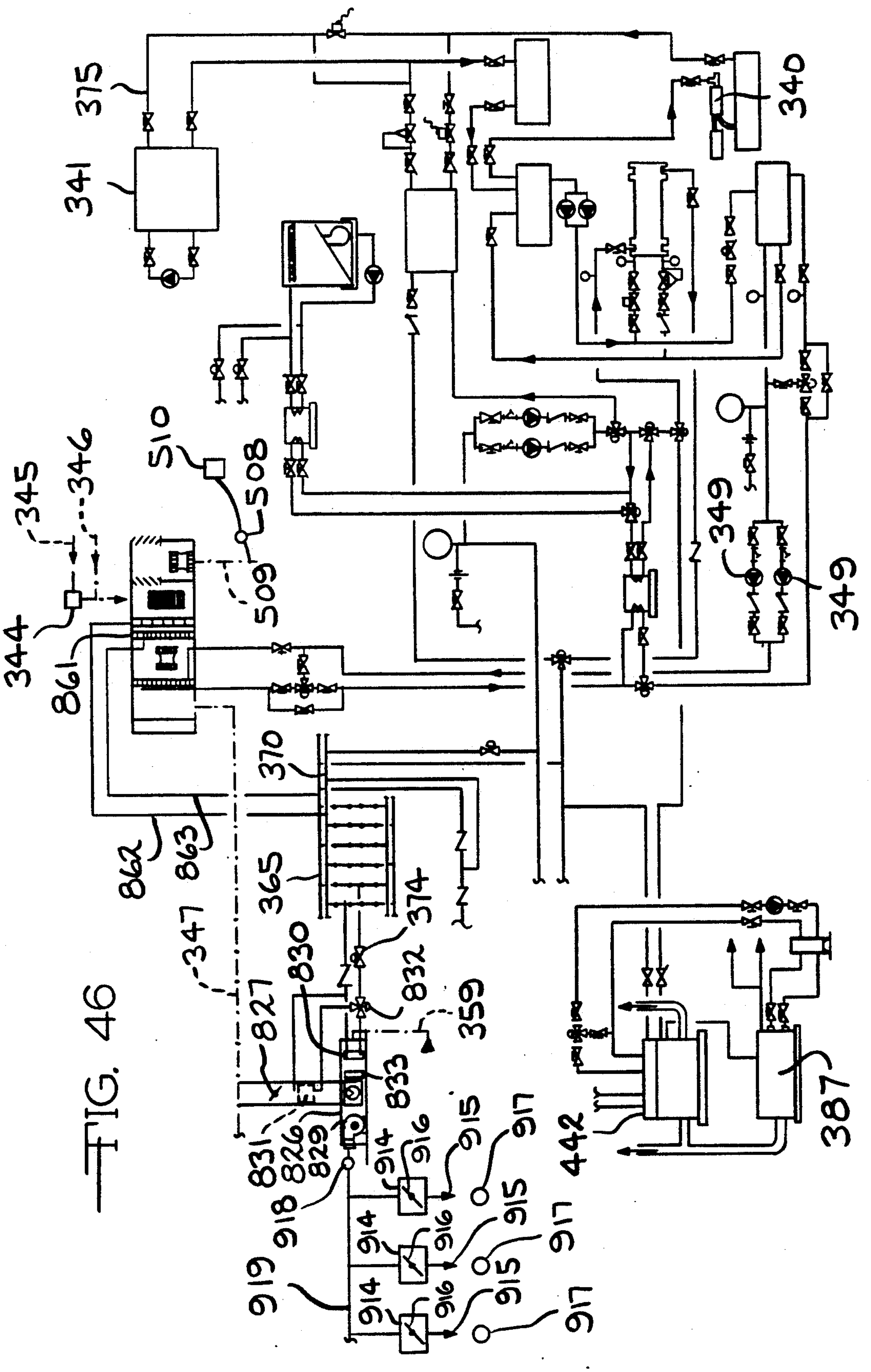

FIG. 46 is a schematic diagram showing apparatus similar to that of FIG. 35, differing in that an induction mixing unit, in the apparatus of FIG. 46, delivers a mixture of primary conditioned air and recirculated air to a plurality of variable air volume diffusers, each of which serves a zone, while, in the apparatus of FIG. 35, that induction mixing unit delivers a mixture of primary conditioned air and recirculated air to a single zone at a constant rate.

Figure 47:
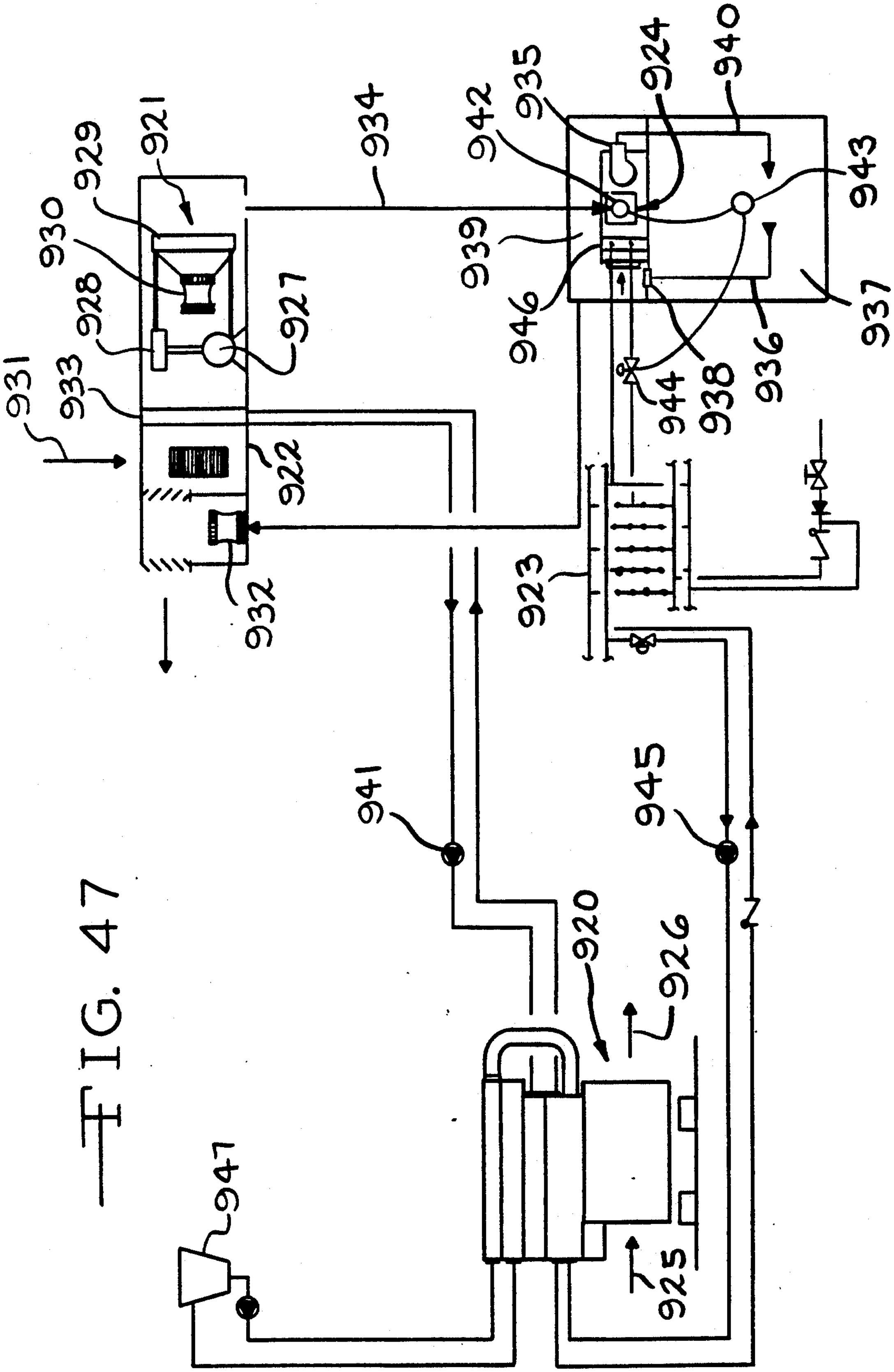

FIG. 47 is a schematic diagram showing apparatus comprising absorption refrigeration apparatus, compression refrigeration apparatus, an air handler, a circulating system which includes a plurality of sprinkler branches, and a plurality of induction mixing units.

Figure 48:
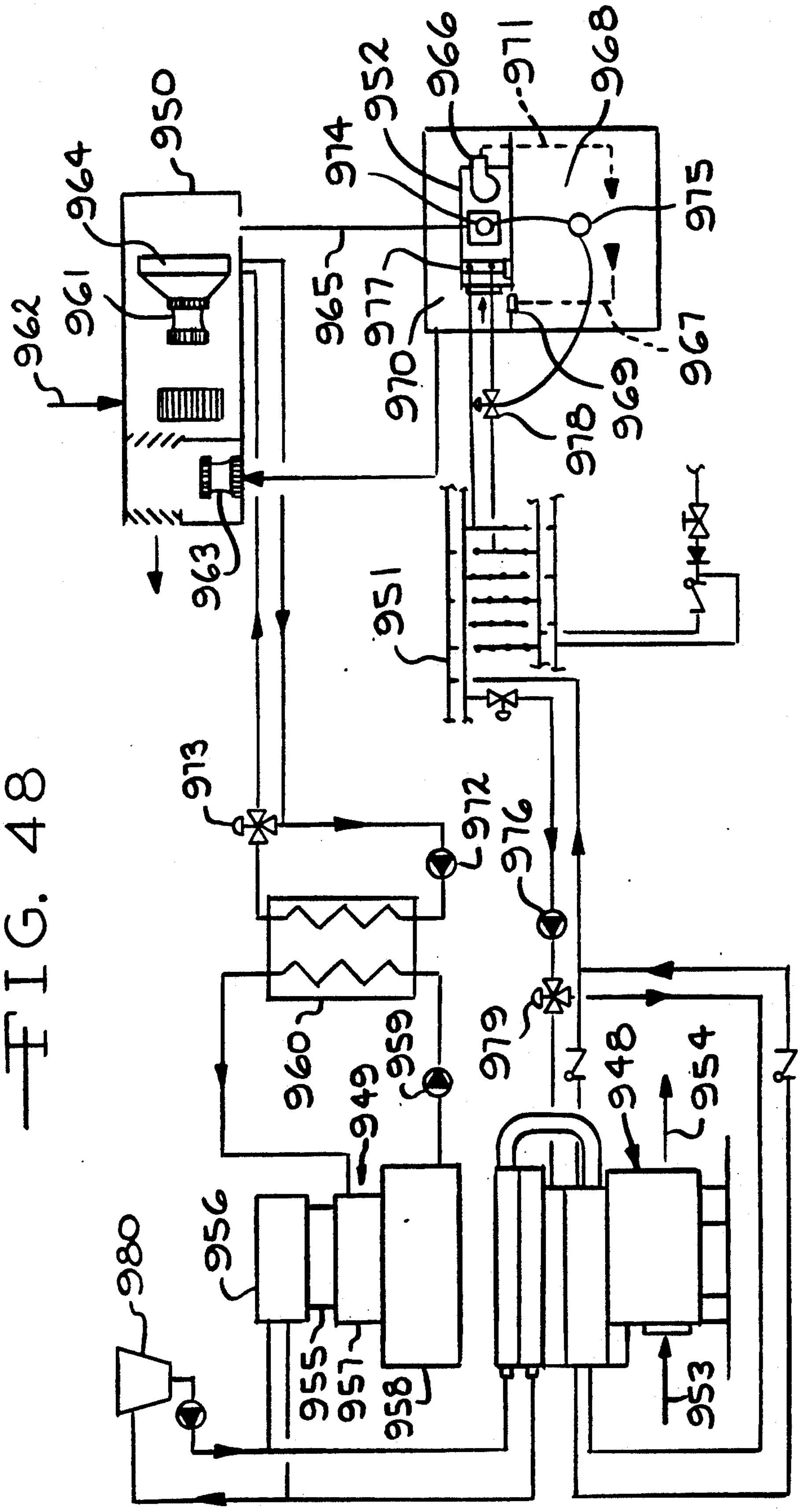

FIG. 48 is a schematic diagram showing apparatus comprising absorption refrigeration apparatus, compression refrigeration apparatus, an air handler, a circulating system which includes a plurality of sprinkler branches, one of which is designated generally at 951, and a plurality of induction mixing units.

Figure 49:
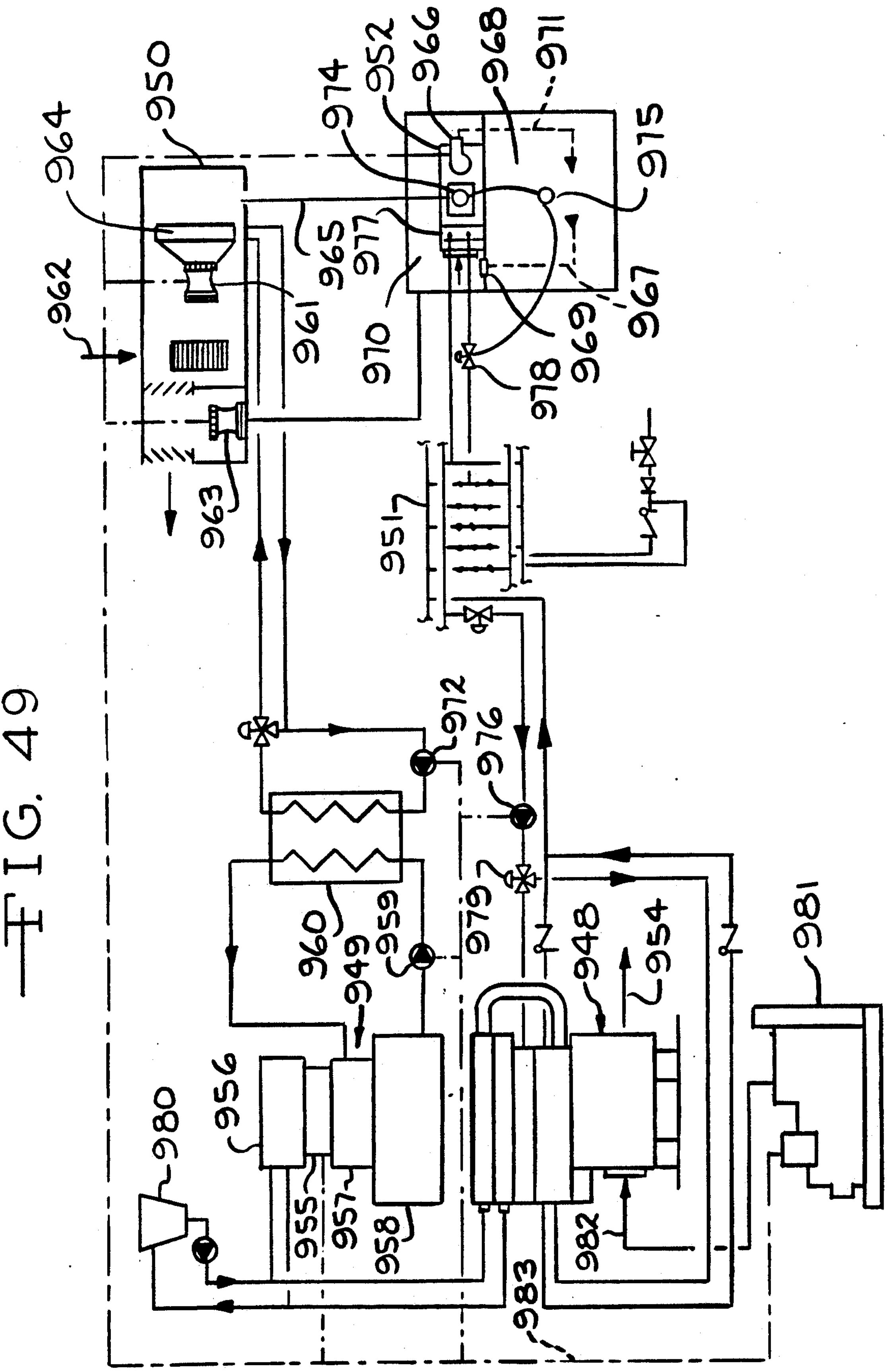

FIG. 49 is a schematic diagram showing apparatus identical to that of FIG. 48 which additionally includes a cogenerator.

Figure 50:
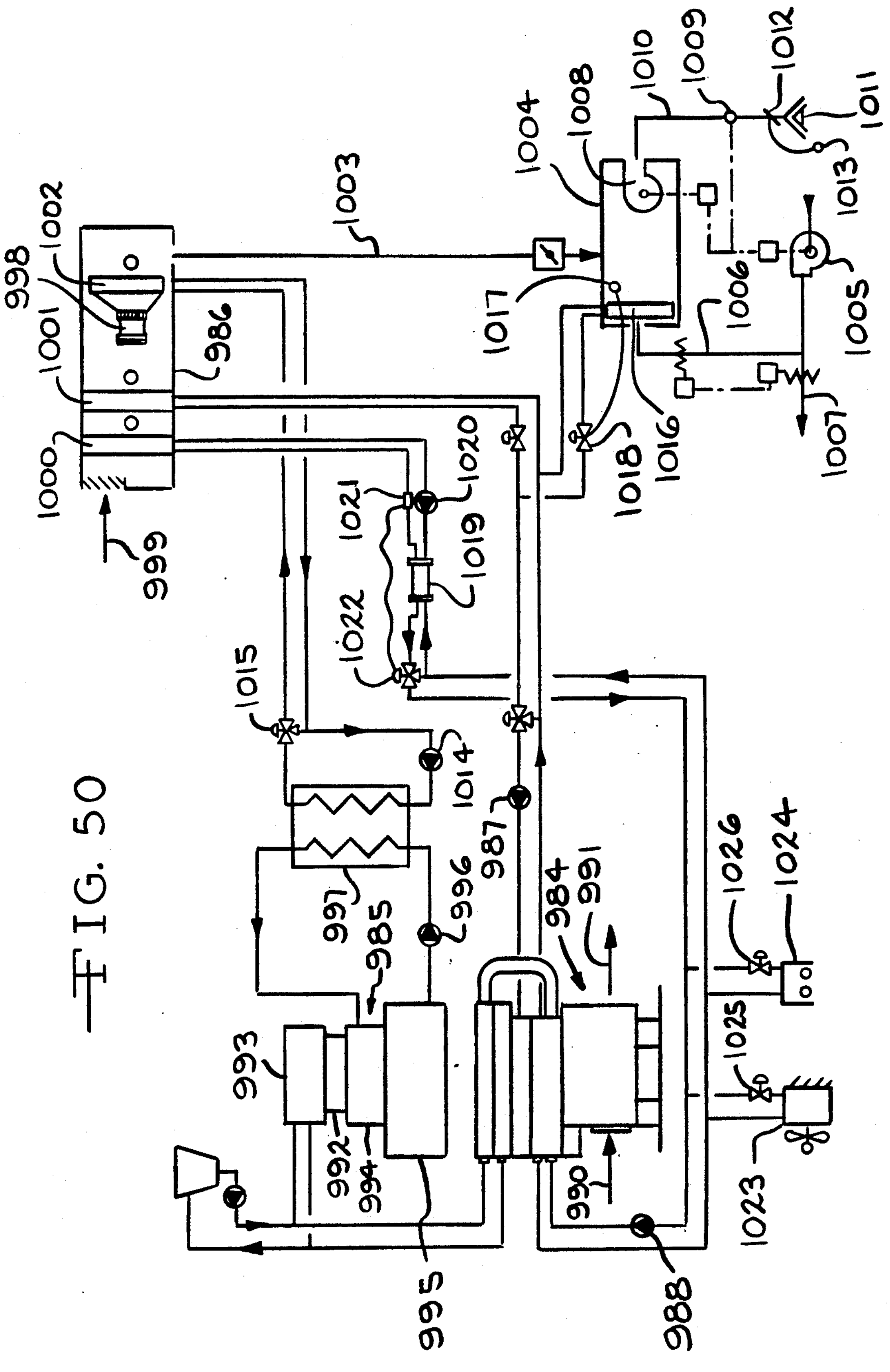

FIG. 50 is a schematic diagram comprising absorption refrigeration apparatus, compression refrigeration apparatus, an air handler, a circulating system which includes a pump, a circulating system which includes a second pump, and a plurality of induction mixing units.

Figure 51:
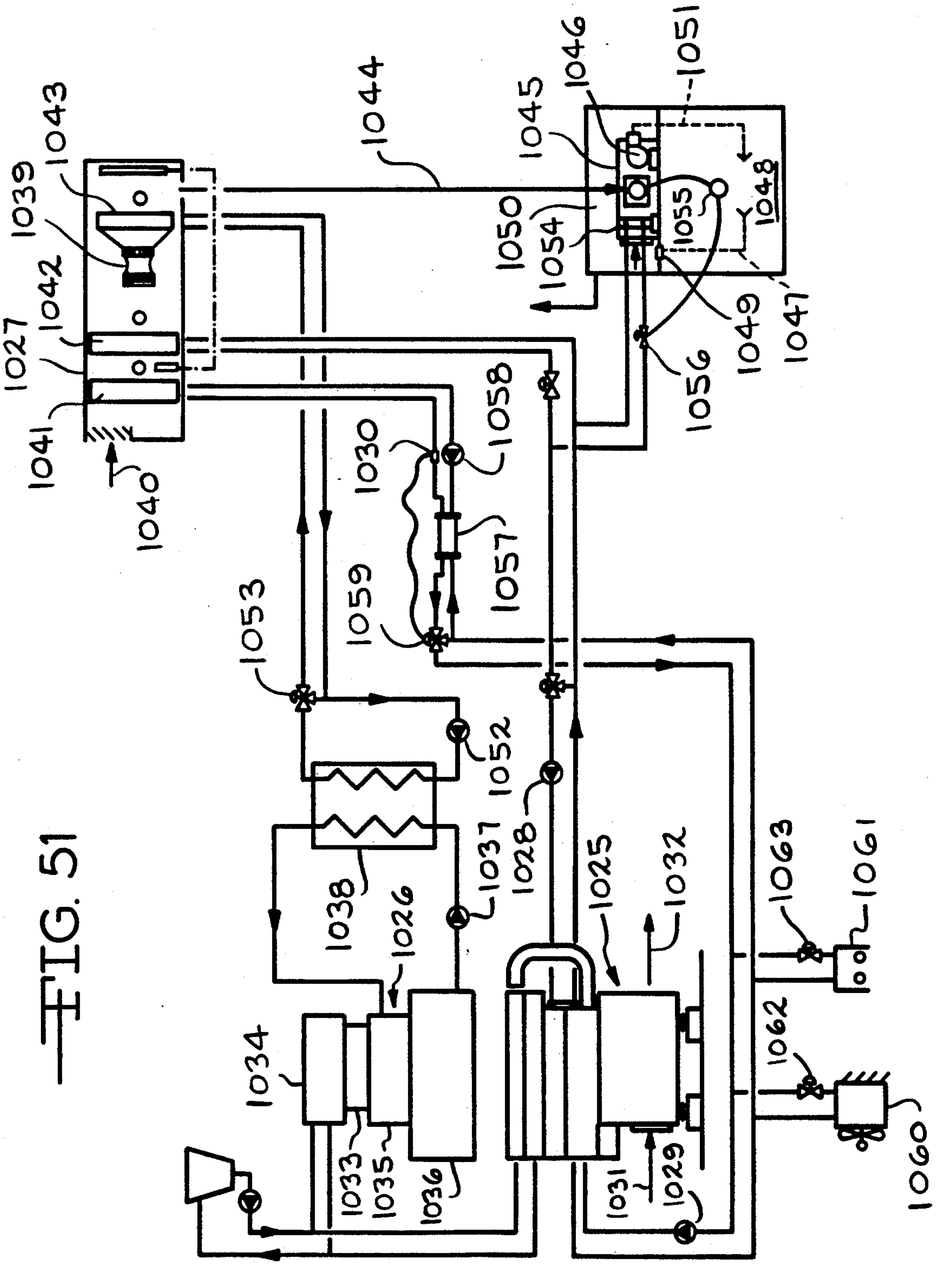

FIG. 51 is a schematic diagram showing apparatus comprising absorption refrigeration apparatus, compression refrigeration apparatus, an air handler, a circulating system which includes a pump, a circulating system which includes a second pump, and a plurality of induction mixing units.

Figure 52:
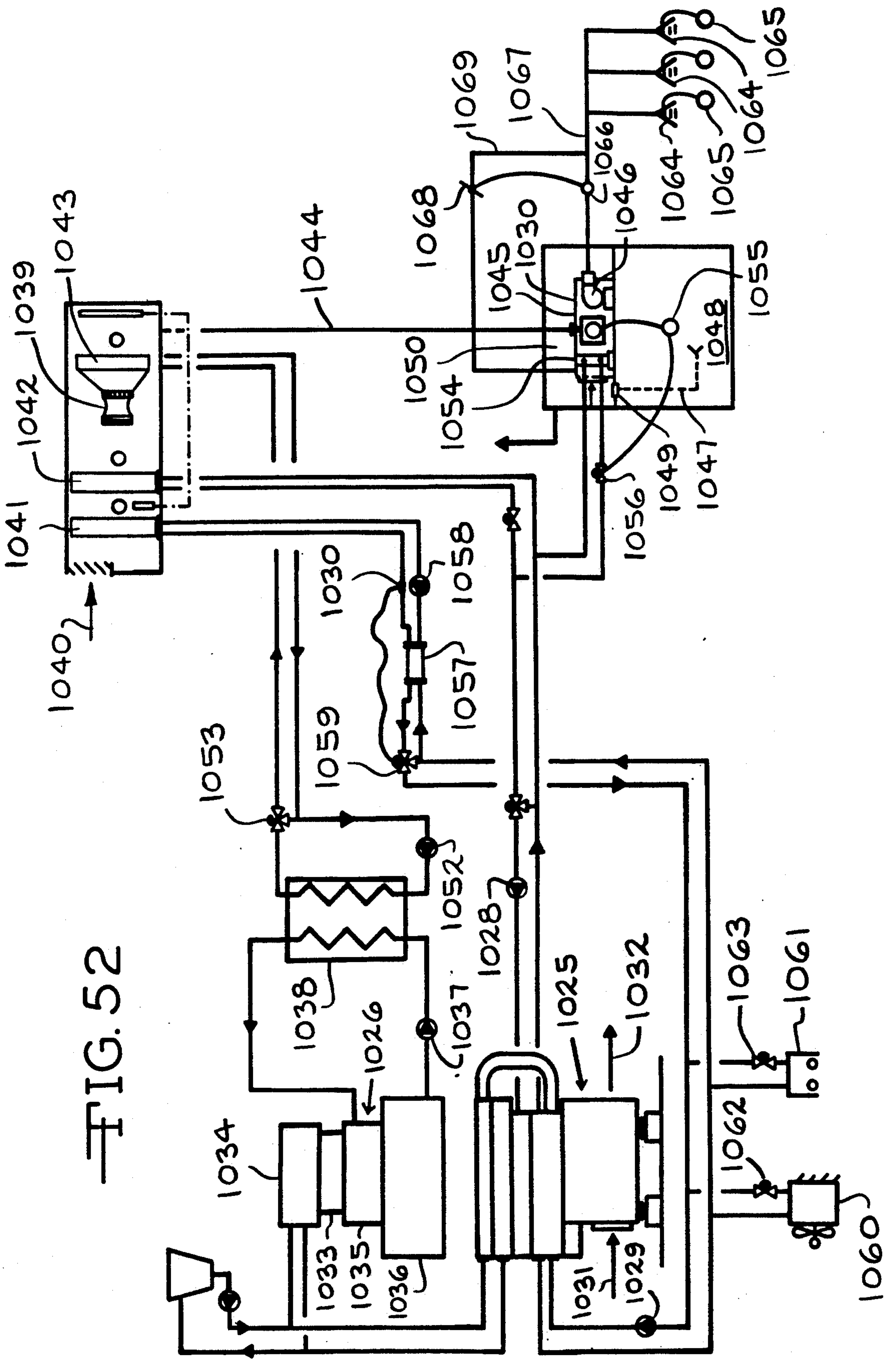

FIG. 52 is a schematic diagram showing apparatus identical with that of FIG. 51 except that the former includes a by-pass from the discharge side to the suction side of a blower which serves the plurality of induction mixing units and a damper in the by-pass which is controlled to maintain a constant pressure in a duct which serves the induction mixing units.

Figure 53:
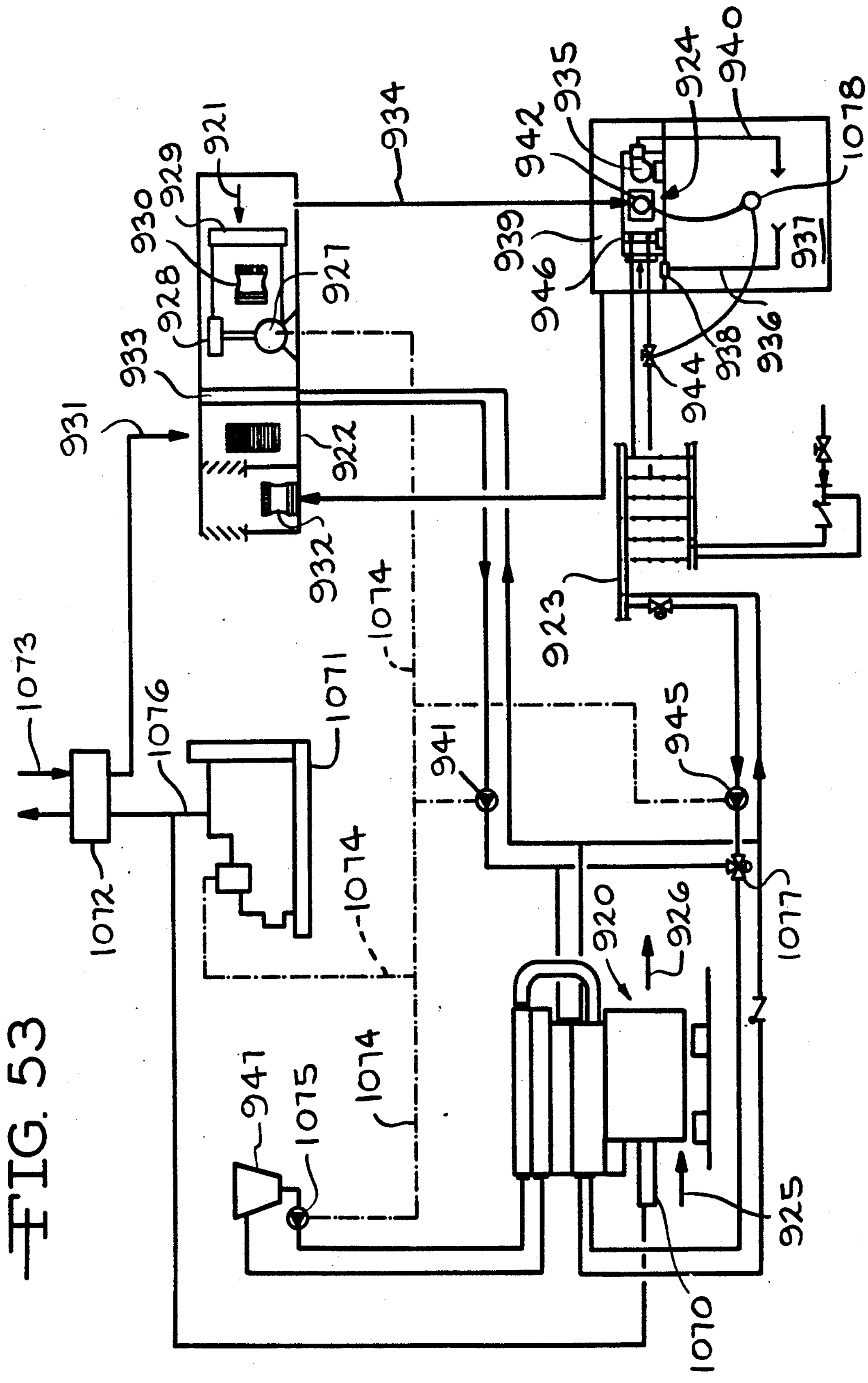

FIG. 53 is a schematic diagram showing apparatus similar to that of FIG. 47 in comprising absorption refrigeration apparatus, compression refrigeration apparatus, an air handler, a circulating system which includes a plurality of sprinkler branches, and a plurality of induction mixing units, and additionally including a cogenerator and a dehumidifying wheel.

Figure 54:
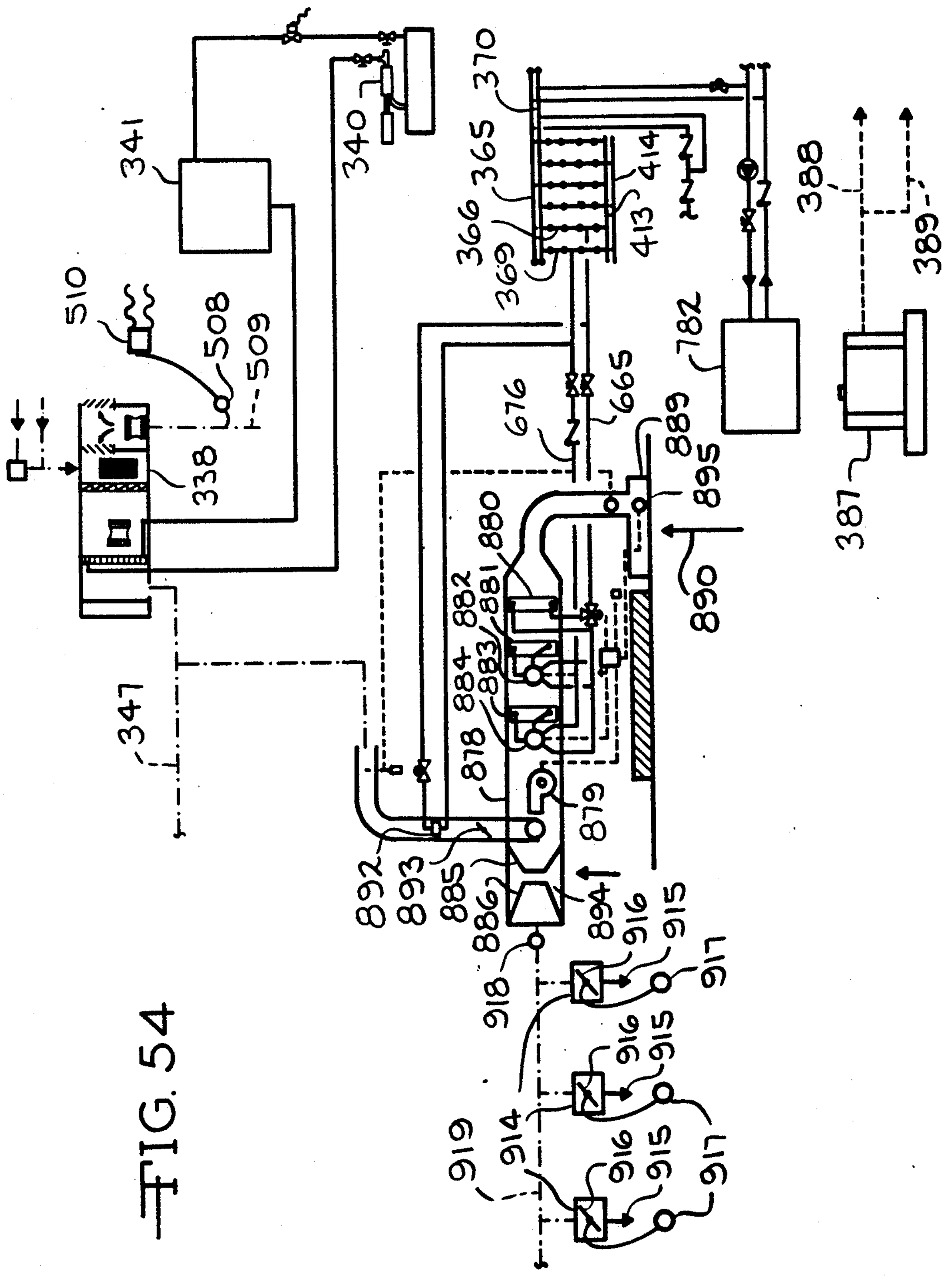

FIG. 54 is a schematic diagram showing apparatus similar to that of FIG. 46, differing in that the former includes a different induction mixing unit and a closed circuit evaporative cooler replaces absorption refrigeration apparatus.

Figure 55:
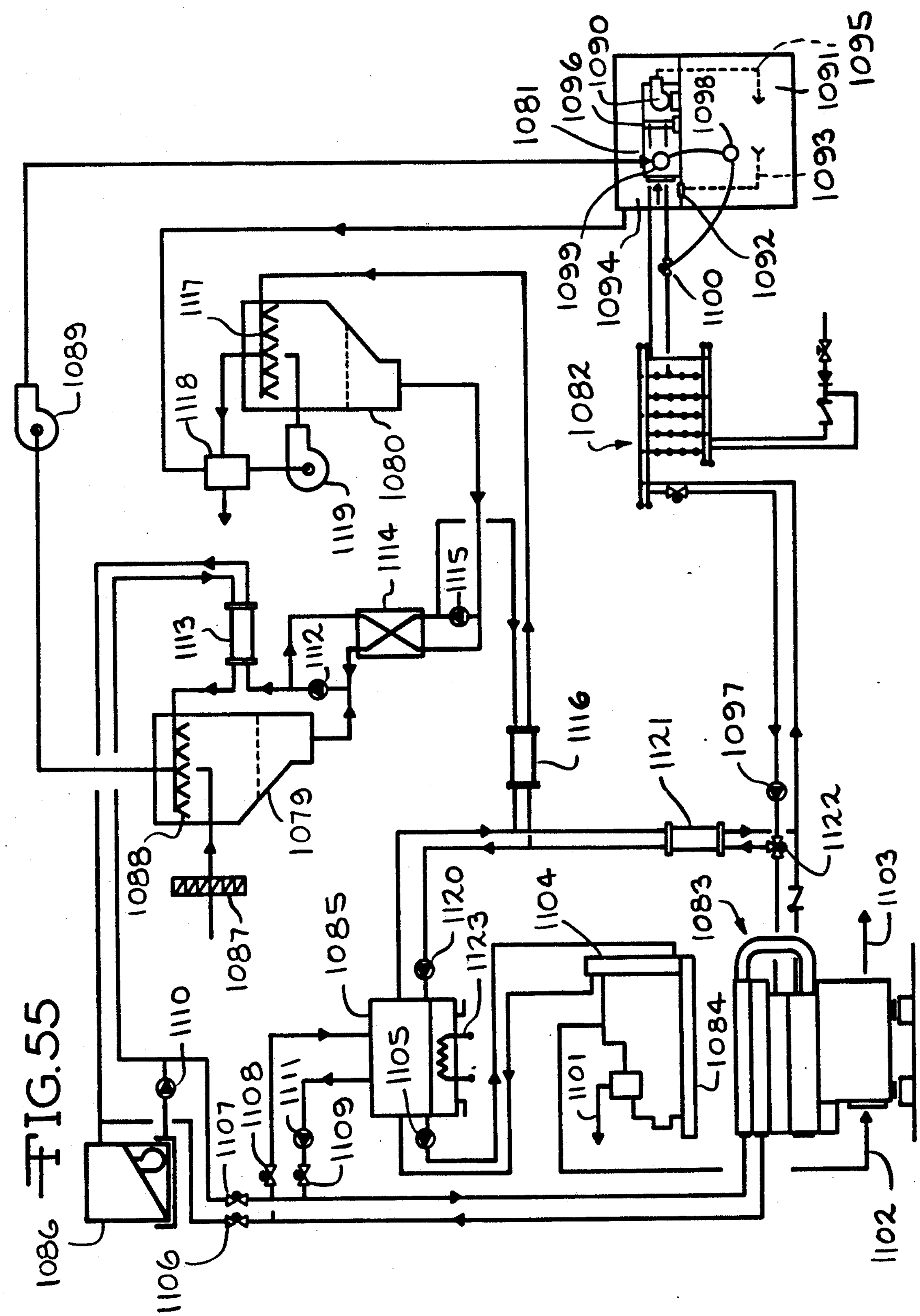

FIG. 55 is a schematic diagram showing apparatus comprising a conditioner, a regenerator, an induction mixing unit, a sprinkler branch, absorption refrigeration apparatus, a cogenerator, a hot water storage tank and a cooling tower.

Figure 56:
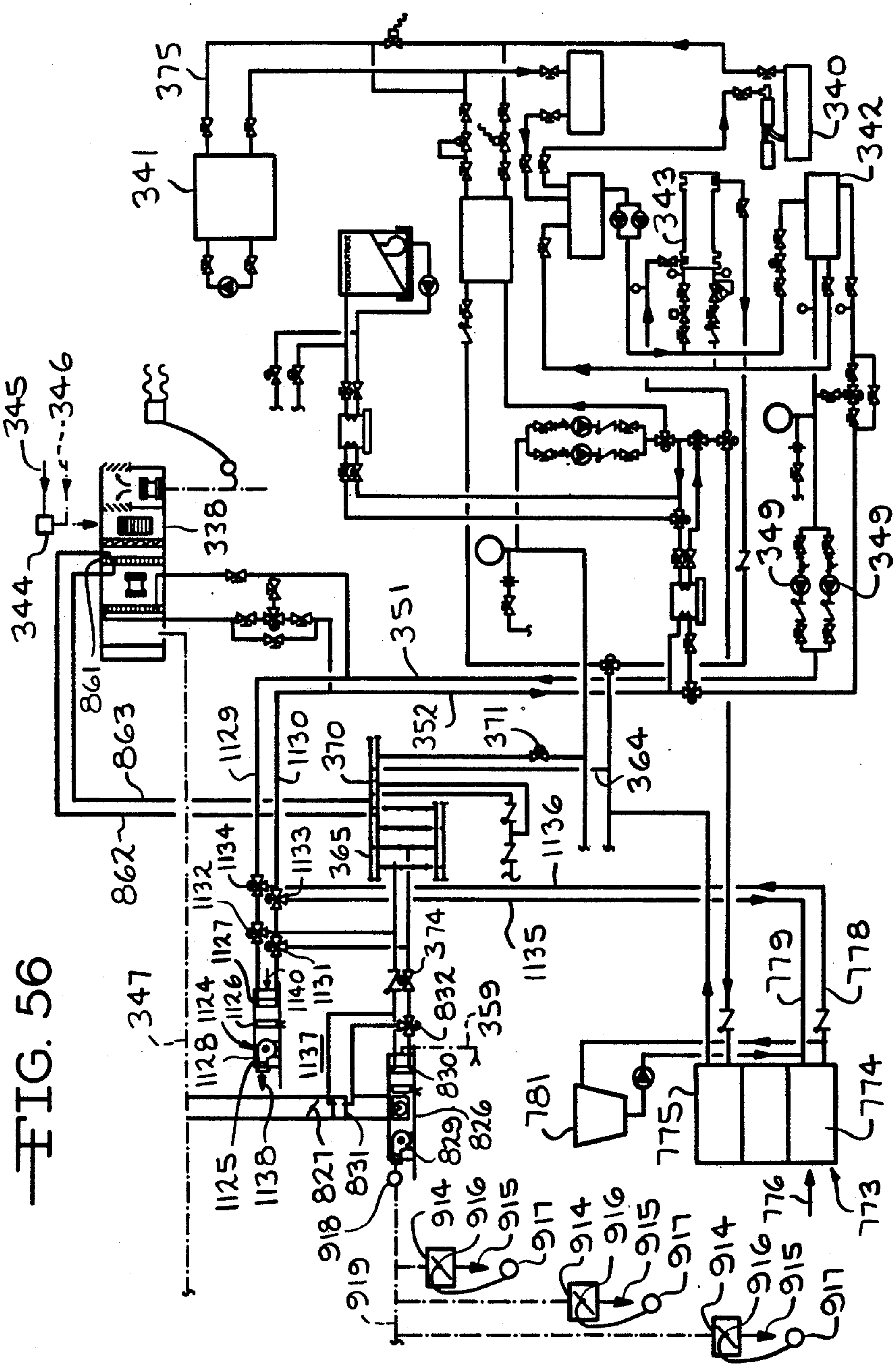

FIG. 56 is a schematic diagram showing apparatus similar to that of FIG. 46, but differing in that the gas engine-generator and the absorption refrigeration apparatus of the latter have been replaced by the absorption chiller/heater of FIG. 31, and a circulating unit positioned to transfer heat to or from air in a plenum above a space to be conditioned has been added.

Figure 57:
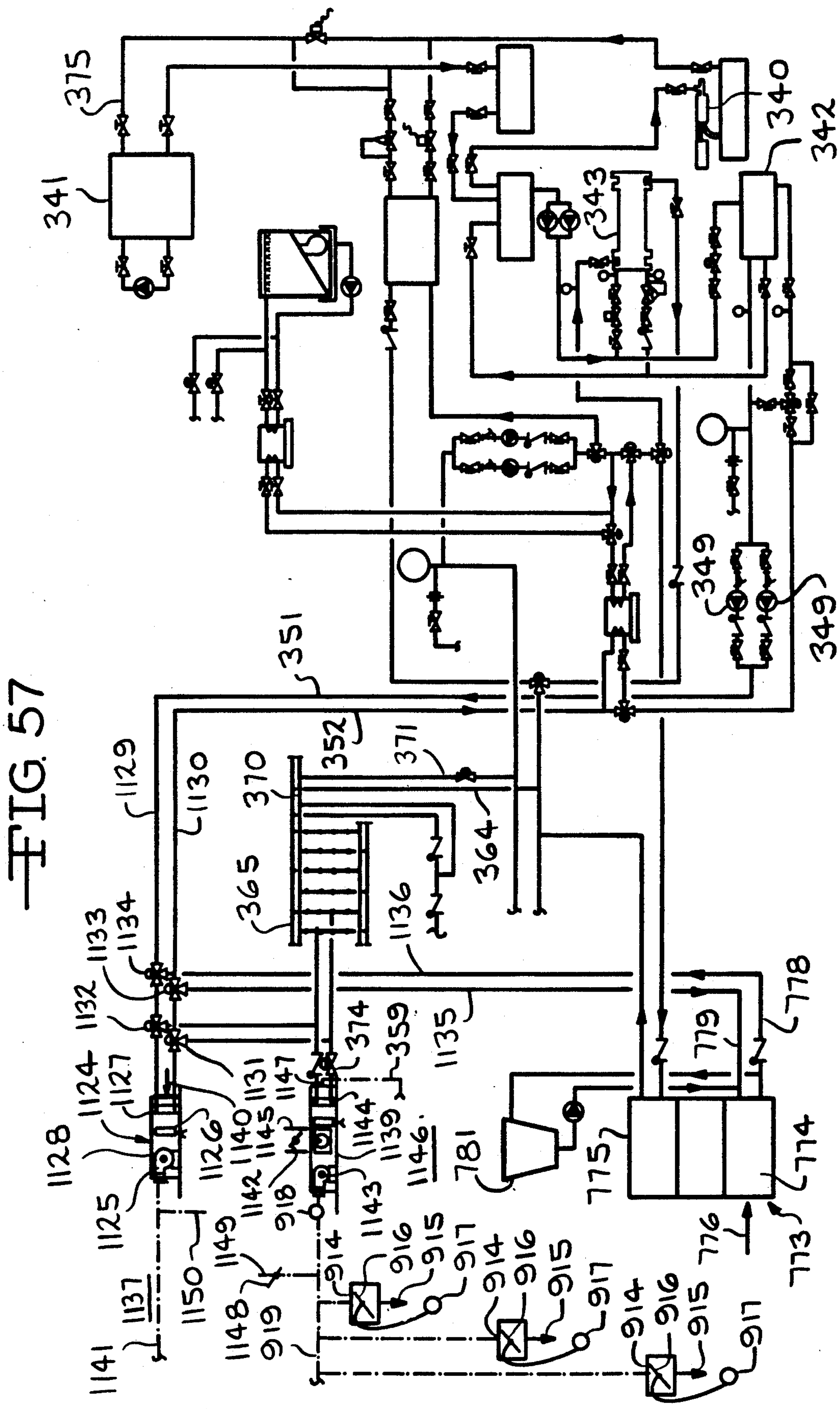

FIG. 57 is a schematic diagram showing apparatus similar to that of FIG. 56, but differing in that the air handler and the primary air duct of the latter have been omitted, and the circulating unit has been connected to the apparatus so that it can condition plenum air as required to maintain a comfort condition, without the necessity for primary air from an air handler.

Figure 58:
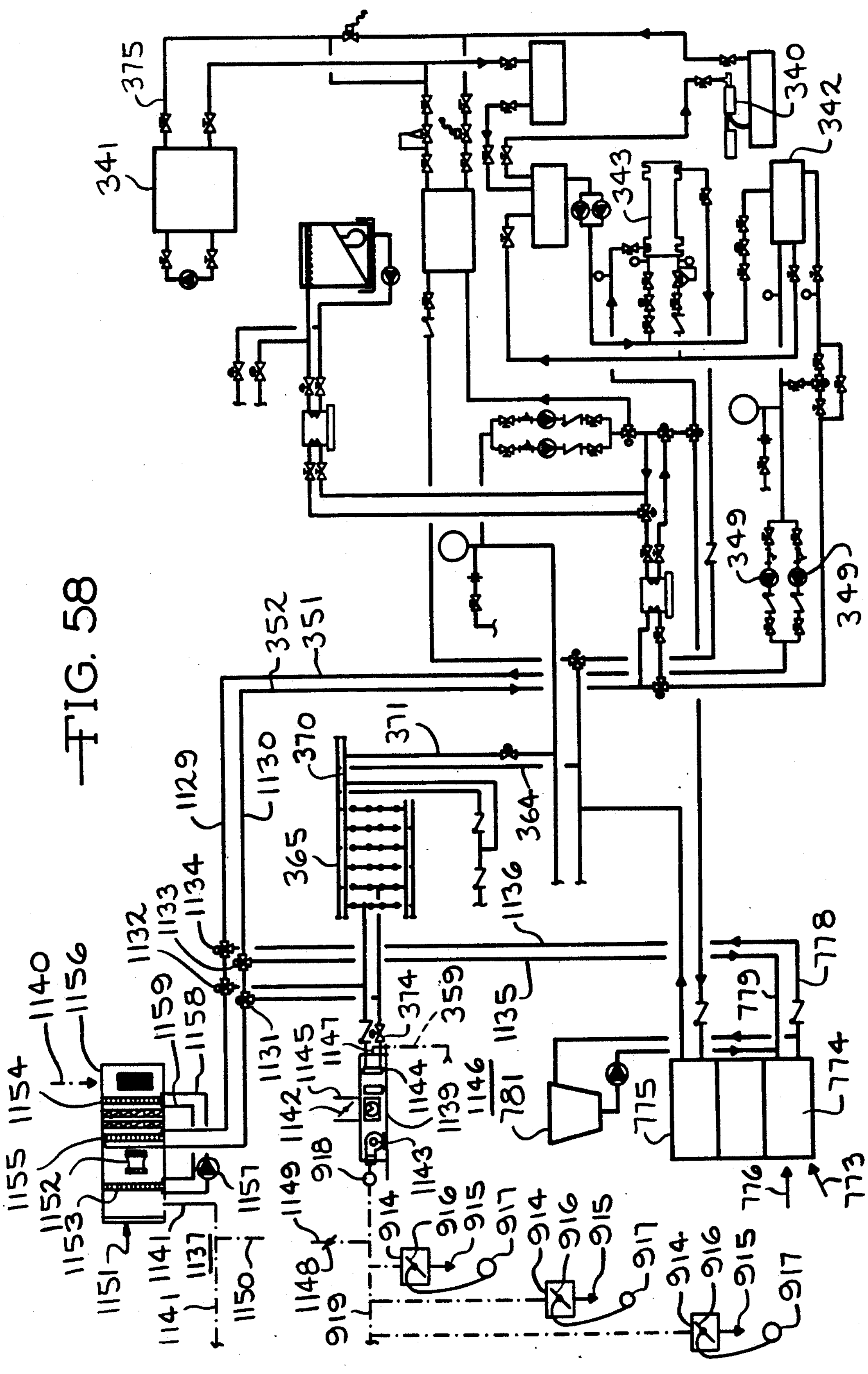

FIG. 58 is a schematic diagram showing apparatus similar to that of FIG. 57, differing mainly in that the circulating unit thereof is different from that of the FIG. 57 apparatus.

Figure 59:
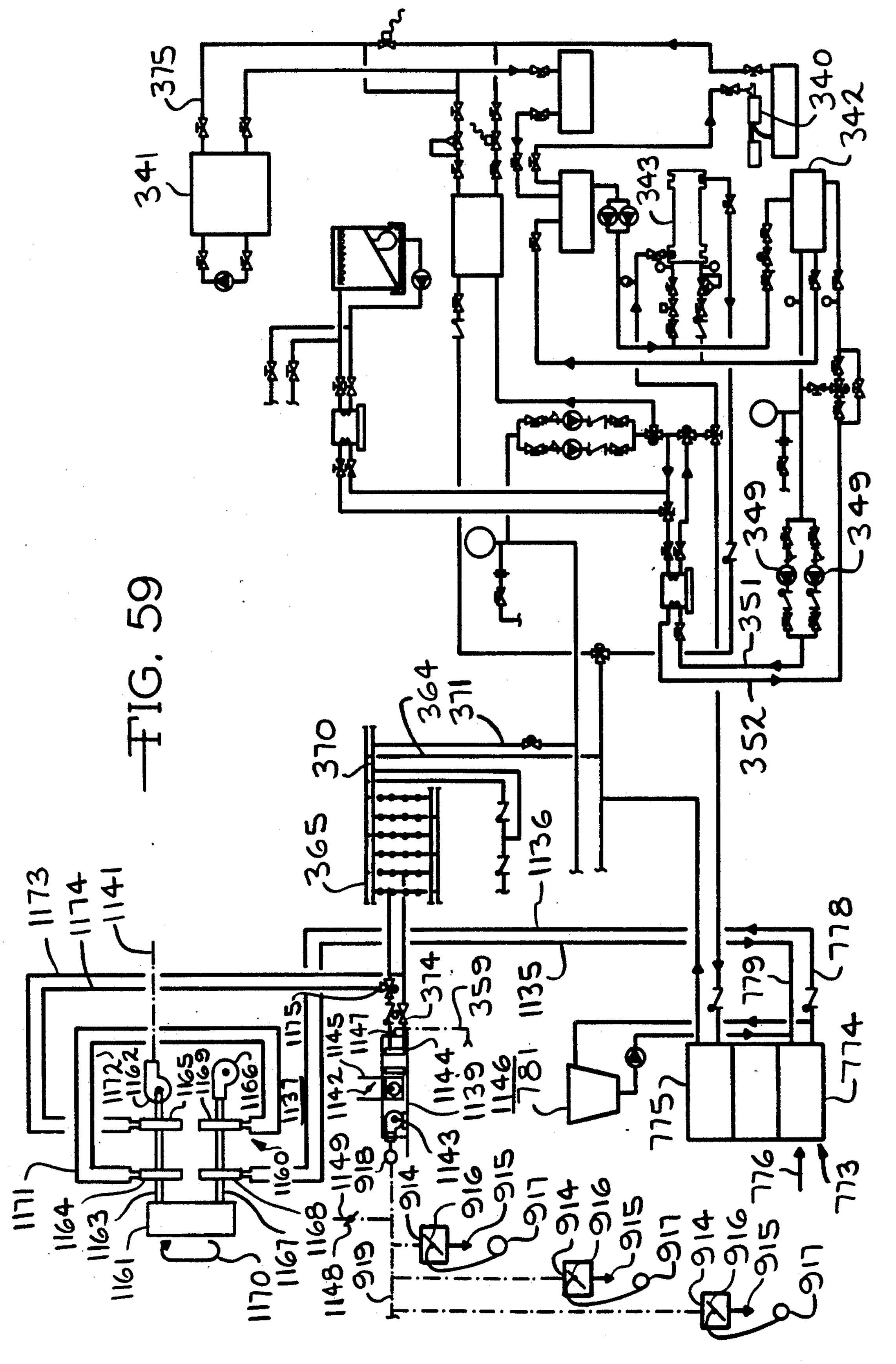

FIG. 59 is a schematic diagram showing apparatus similar to that of FIGS. 57 and 58, differing mainly in that a desiccant dehumidifier which is used to dehumidify the air of a plenum above a space to be conditioned takes the place of the circulating units of the apparatus of the latter Figs.

Figure 60:
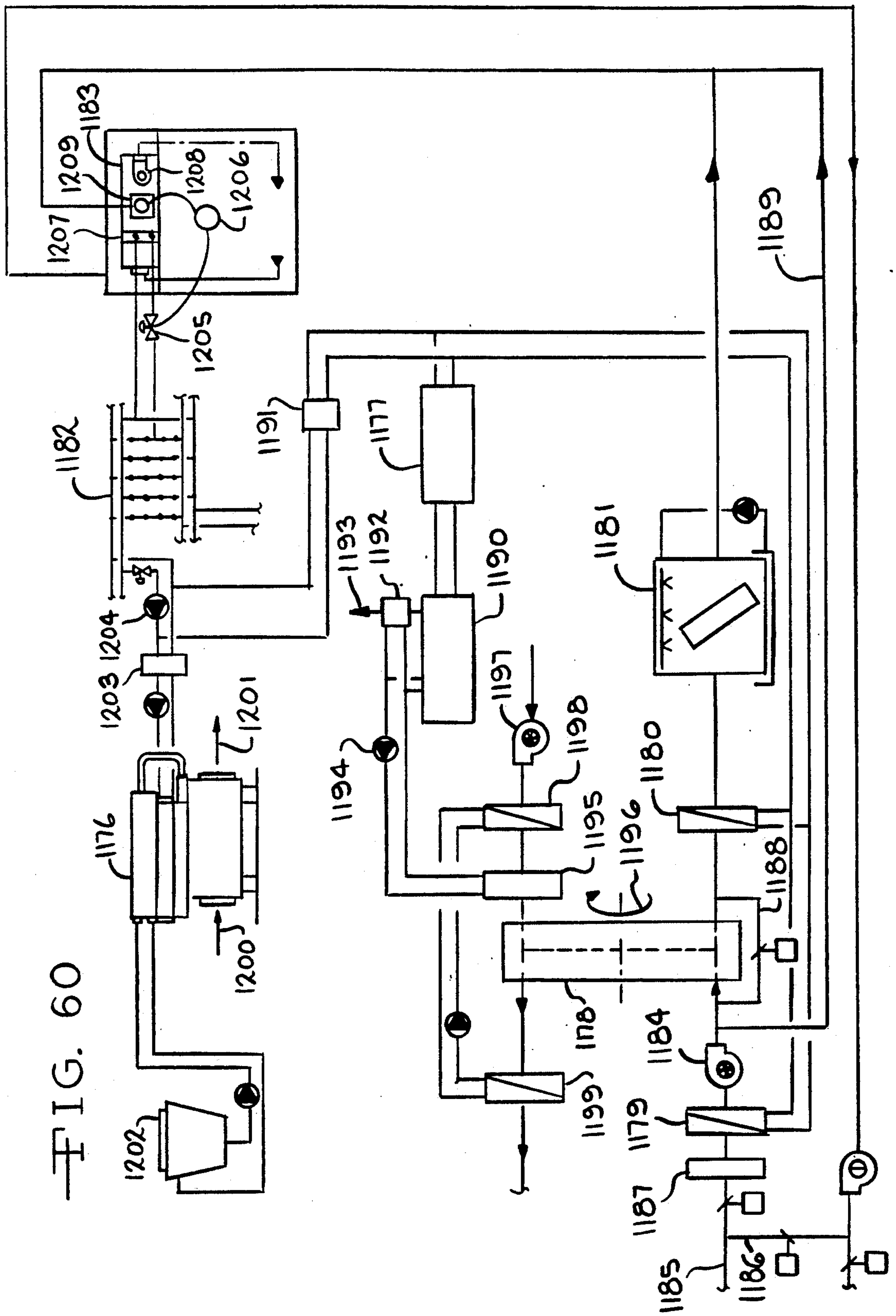

FIG. 60 is a schematic diagram showing apparatus according to the invention which includes absorption refrigeration apparatus and compression refrigeration apparatus to produce relatively high temperature chilled water to remove heat from air that is recirculated locally and from air that is conditioned centrally and circulated to spaces to be conditioned, a solid desiccant chemical dehumidifier to dehumidify air that is conditioned centrally and circulated, and a washer to transfer heat from air that is conditioned centrally and circulated.

Figure 61:
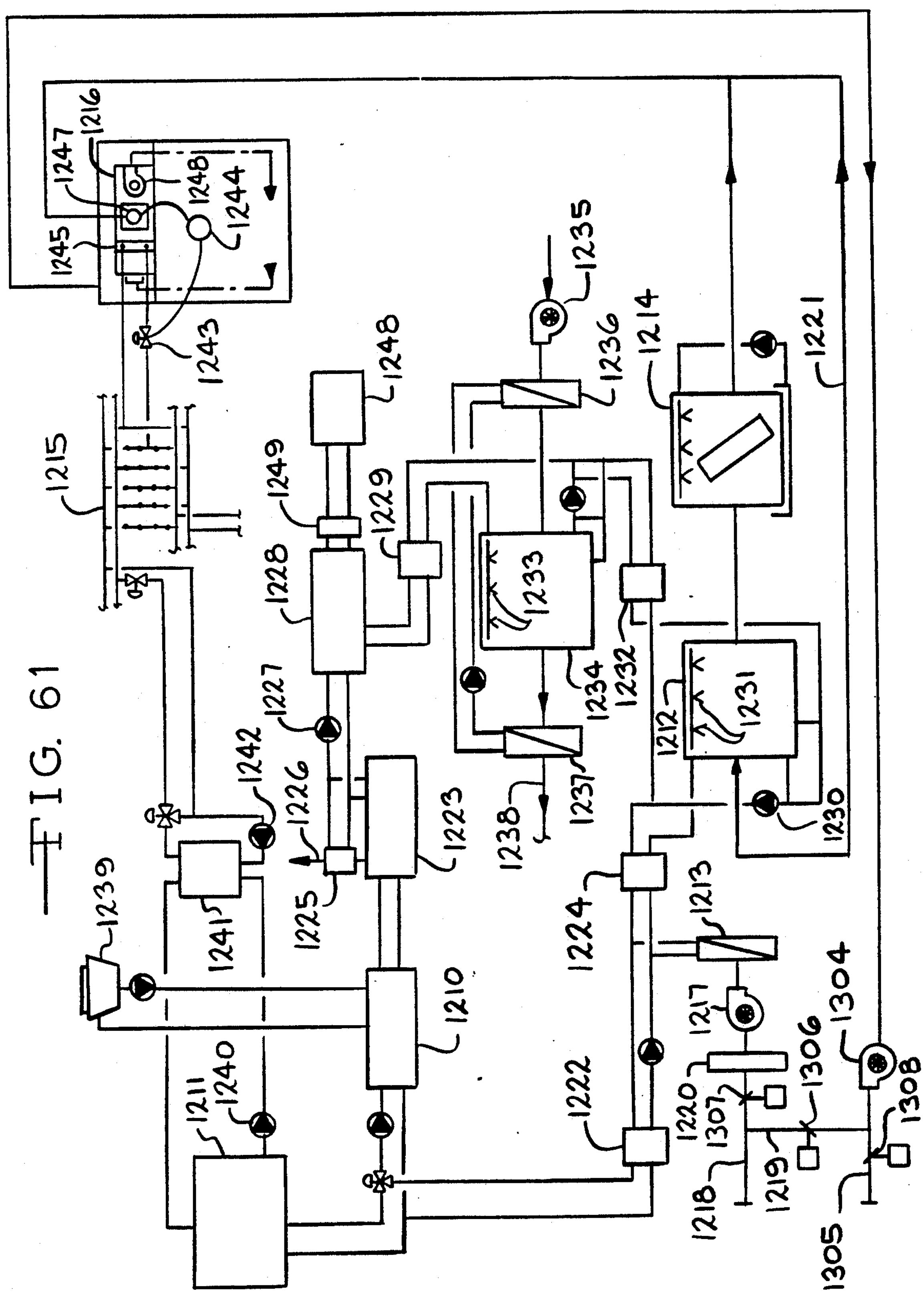

FIG. 61 is a schematic diagram showing apparatus according to the invention which is similar to that of FIG. 60, differing mainly in that the absorption refrigeration apparatus and solid desiccant chemical dehumidifier of the apparatus of FIG. 60 have been replaced in that of FIG. 61 by second compression refrigeration apparatus and a liquid desiccant chemical dehumidifier.

Figure 62:
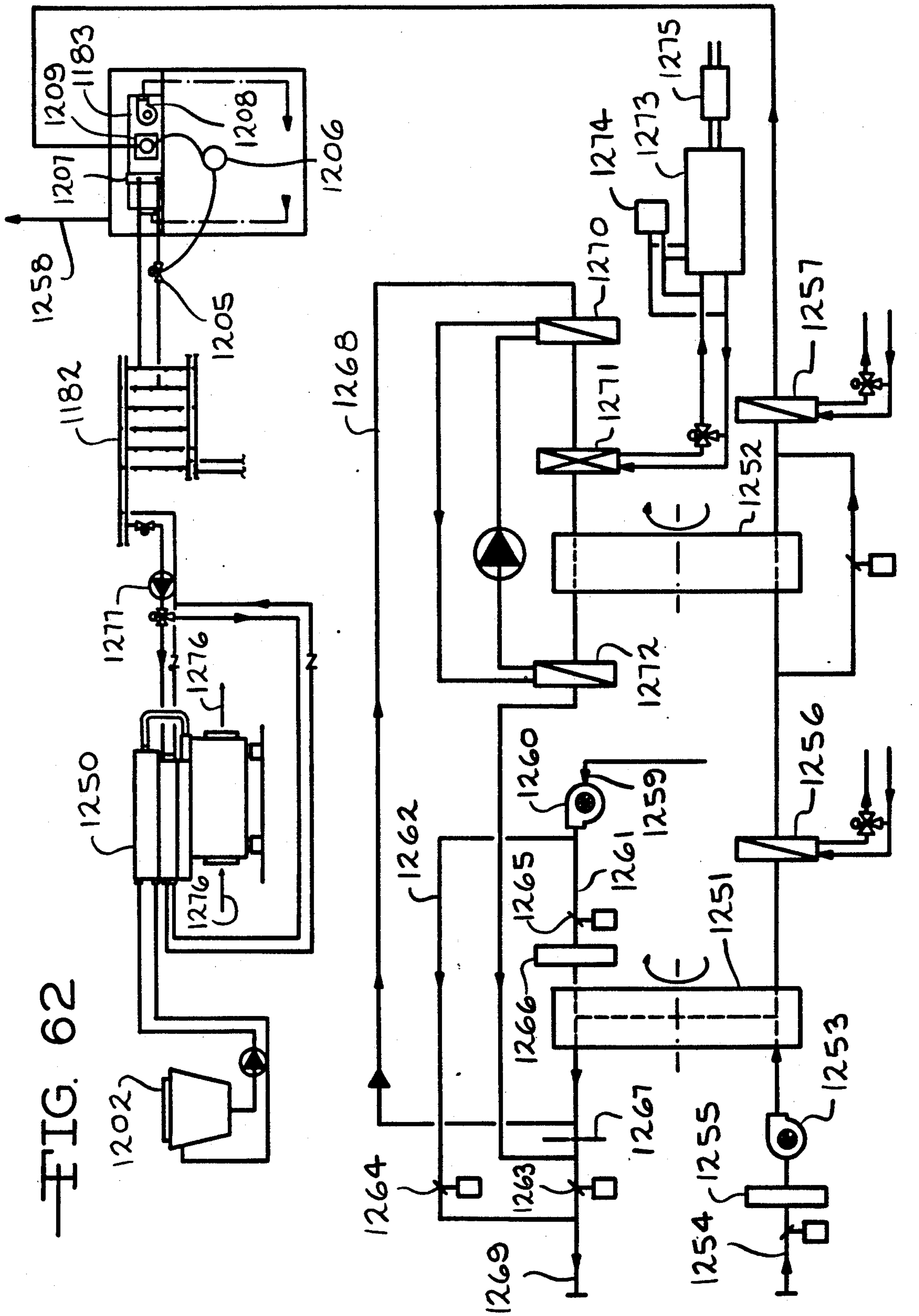

FIG. 62 is a schematic diagram showing apparatus according to the invention which is similar to that of FIG. 60, differing mainly in that a second stage solid desiccant chemical dehumidifier has been added, and the compression refrigeration apparatus has been eliminated.

Figure 63:
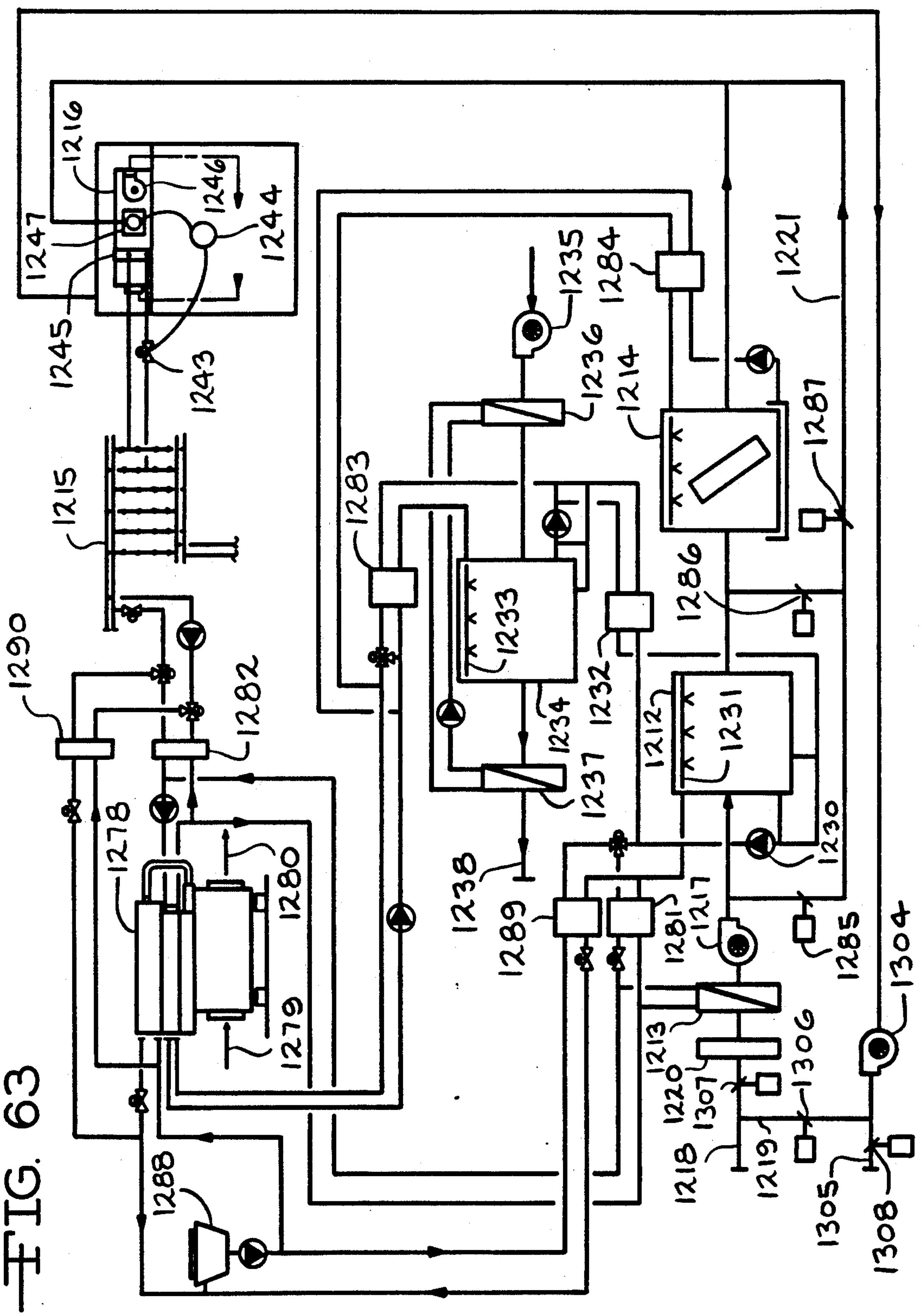

FIG. 63 is a schematic diagram showing apparatus similar to that of FIG. 61, differing mainly in that a gas engine, compression refrigeration apparatus and an ice builder have been replaced by direct fired absorption refrigeration apparatus.

Figure 64:
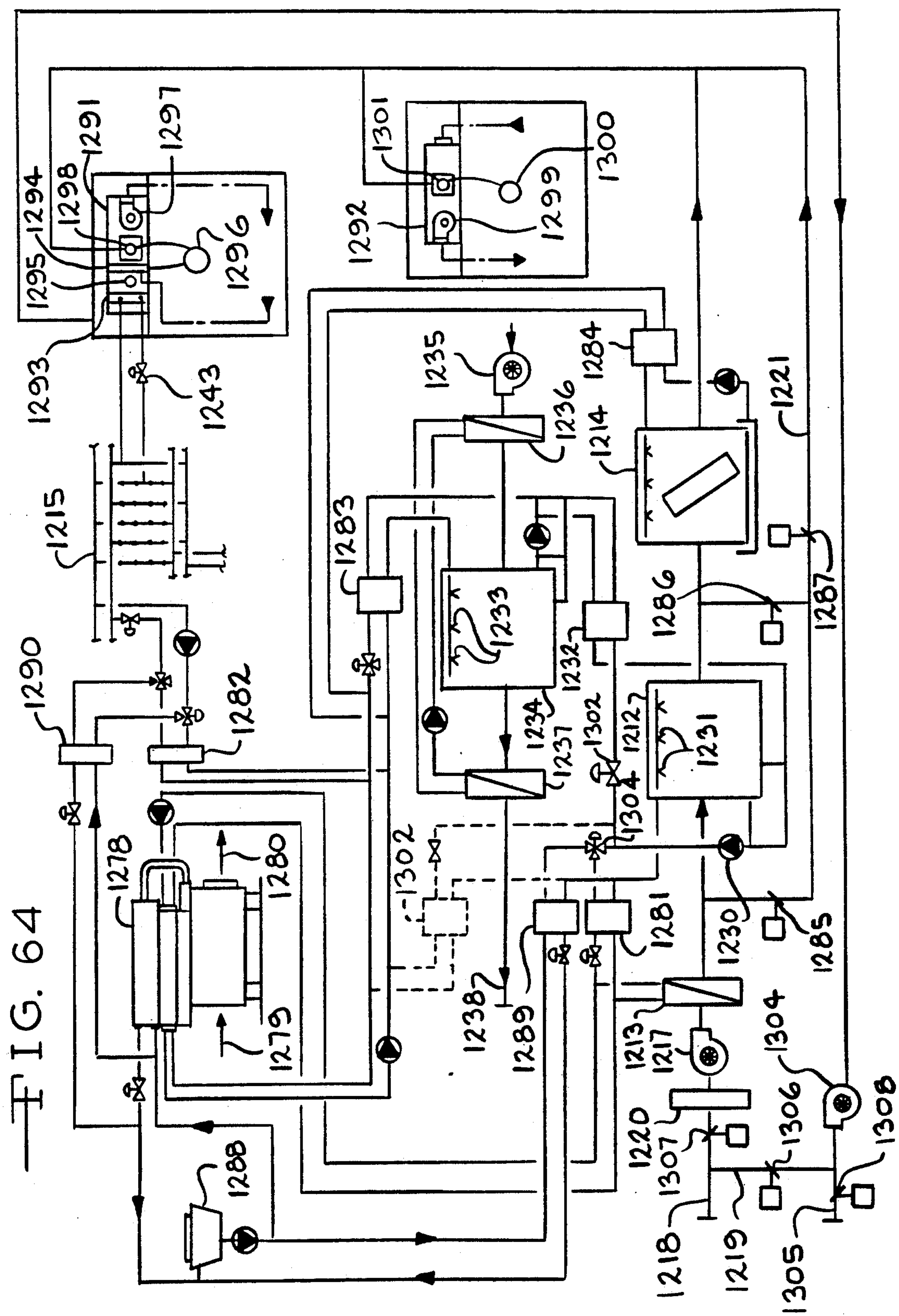

FIG. 64 is a schematic diagram showing apparatus similar to that of FIG. 63, differing mainly in that induction mixing units are replaced by heat pump induction mixing units which serve perimeter zones and by powered induction terminals which serve interior zones.

Figure 65:
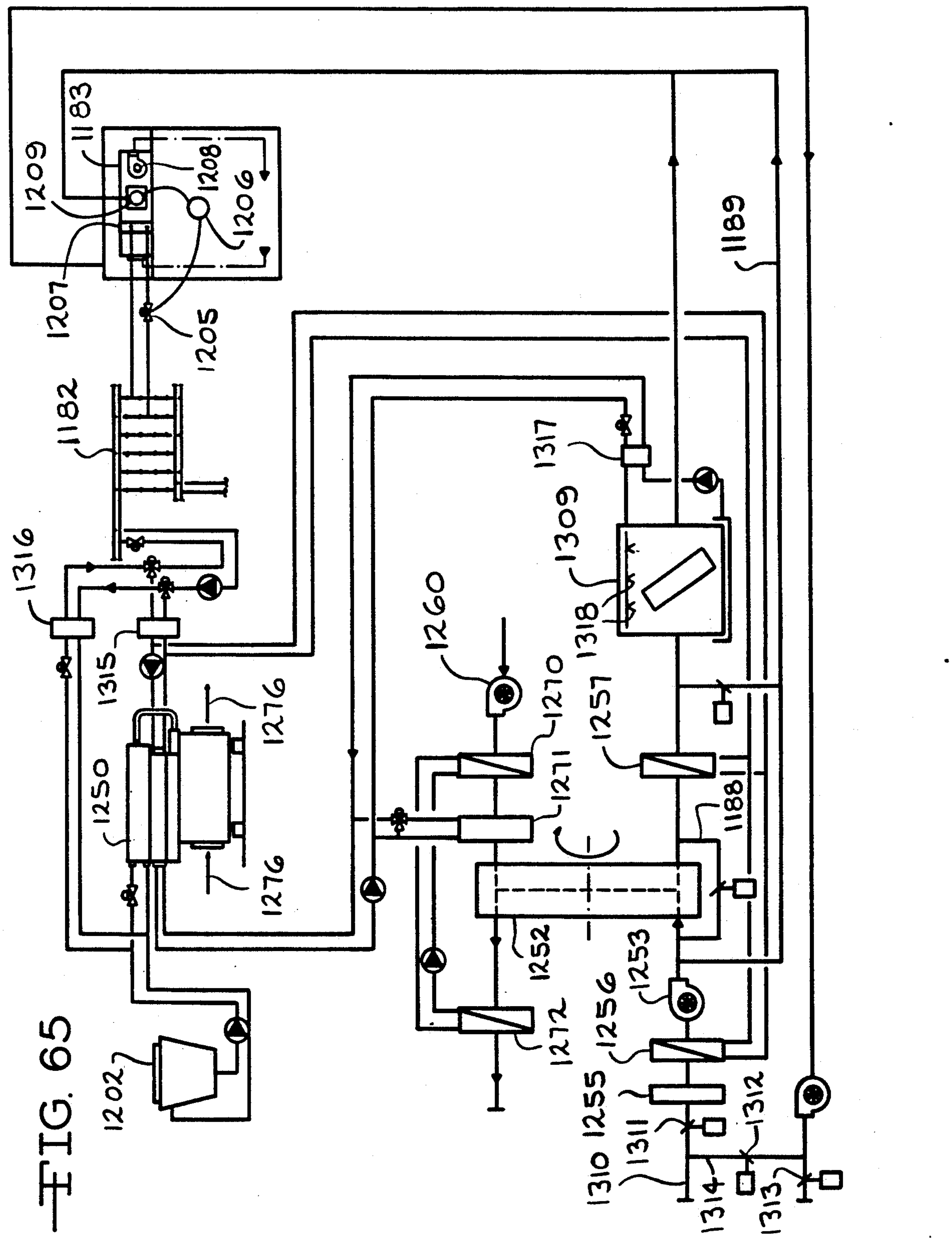

FIG. 65 is a schematic diagram showing apparatus similar to that of FIG. 62, differing mainly in that a desiccant wheel has been omitted and a washer has been added.

Figure 66:
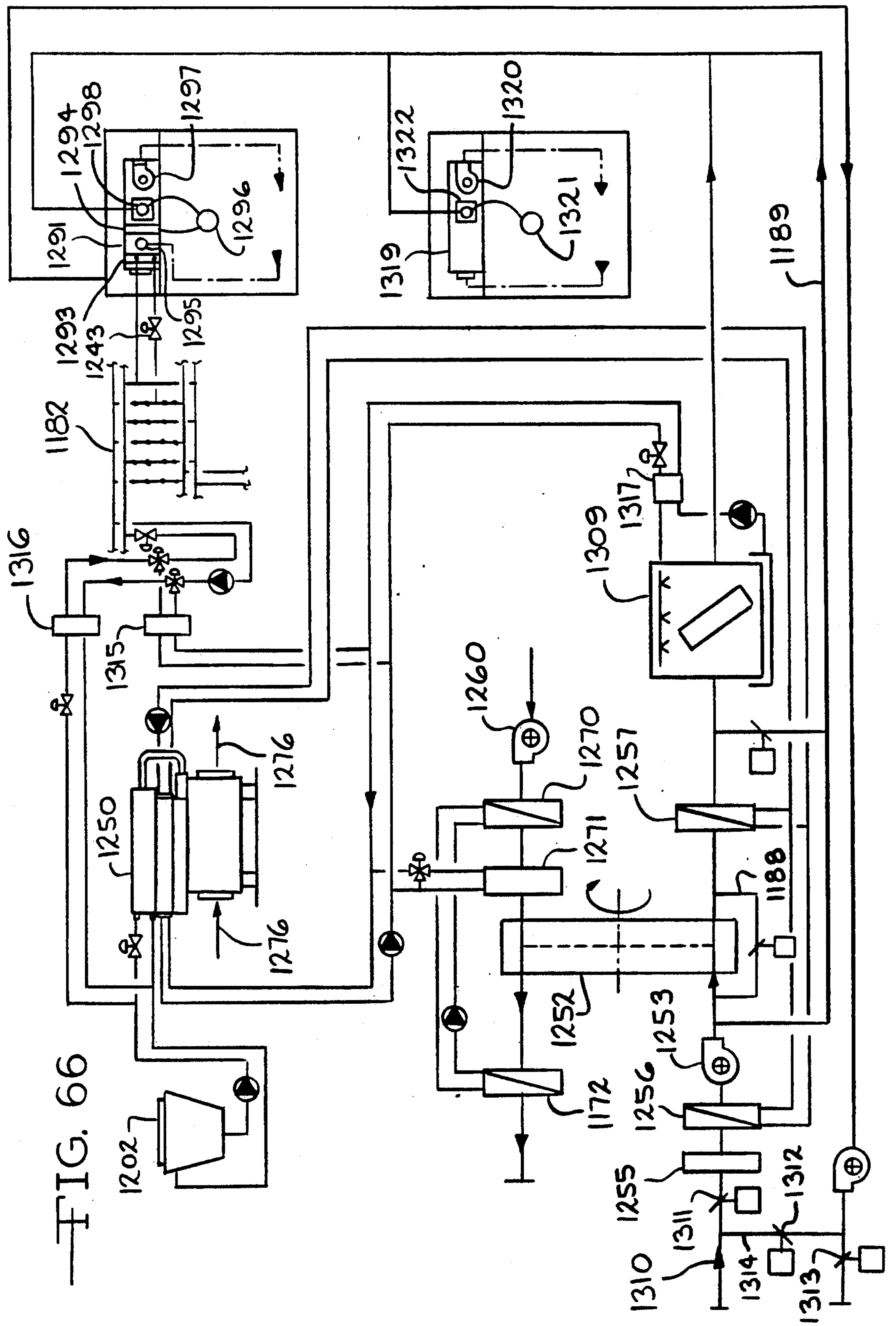

FIG. 66 is a schematic diagram showing apparatus substantially identical to that of FIG. 65, differing mainly in that induction mixing units have been replaced by the heat pump induction mixing units and the powered induction terminals, both shown in FIG. 64.

Figure 67:
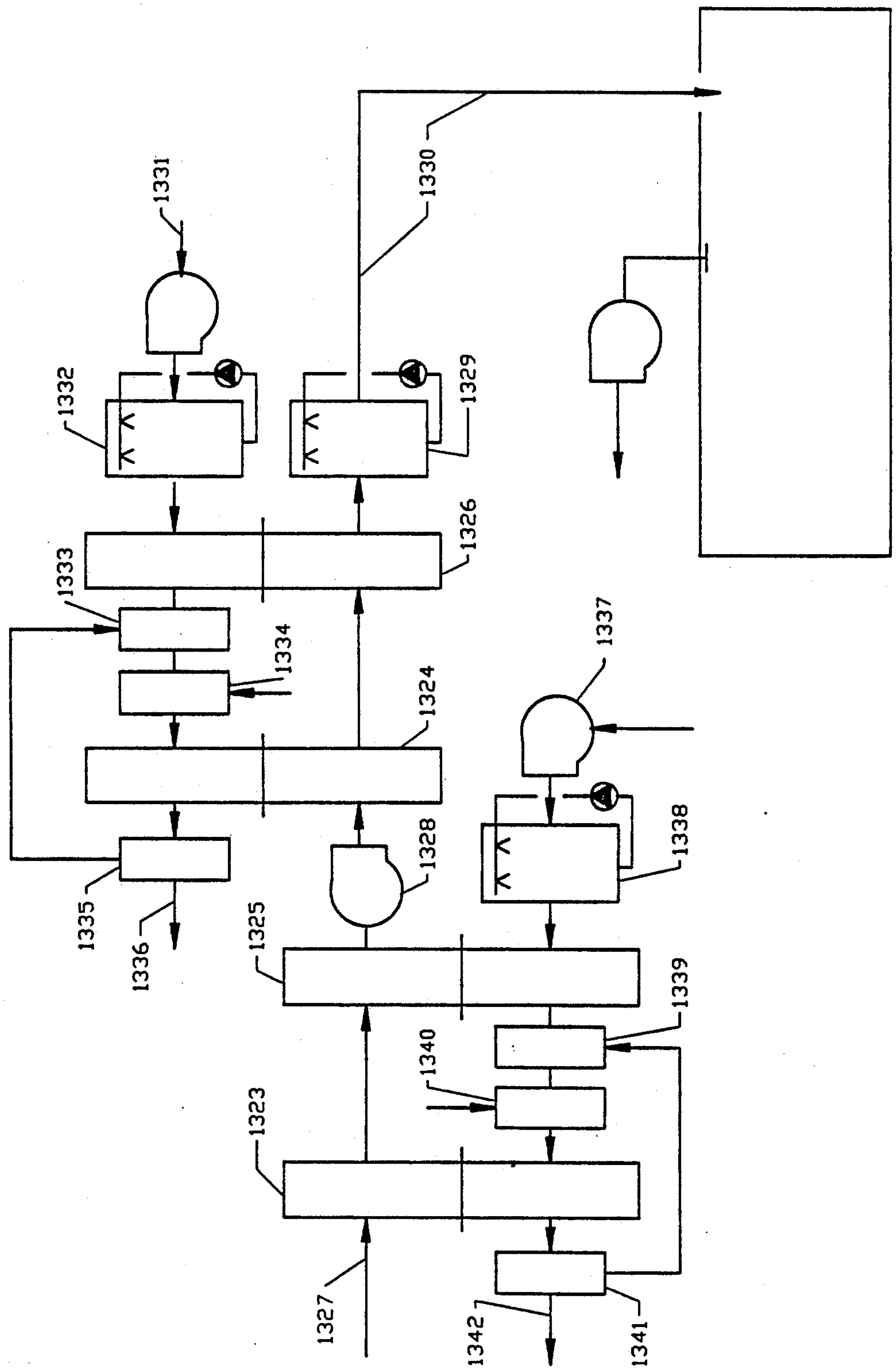

FIG. 67 is a schematic diagram showing central plant apparatus including two solid desiccant chemical dehumidifiers and a washer to dehumidify and cool air that is circulated to spaces in a building served by the apparatus.

Figure 68:
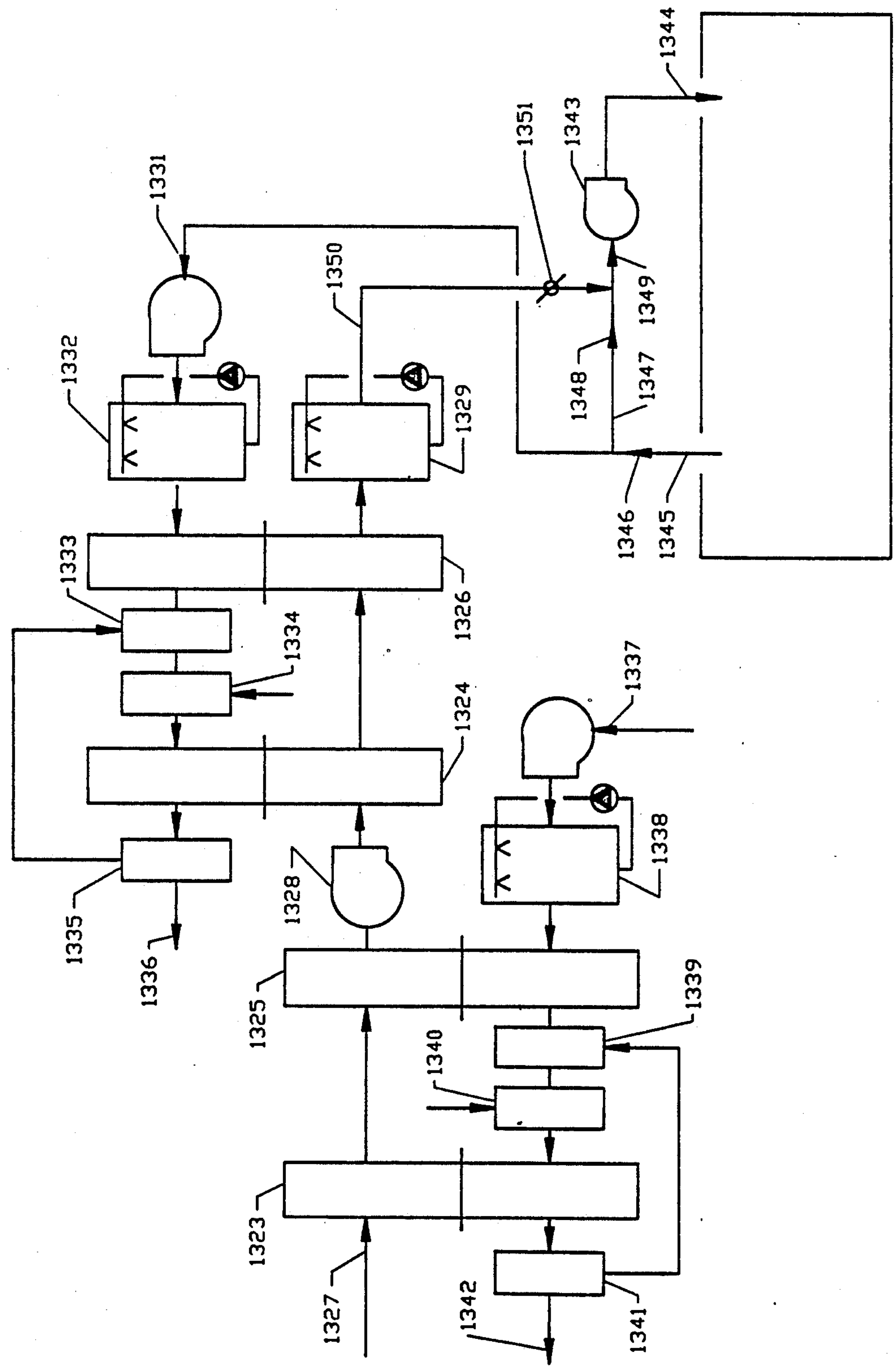

FIG. 68 is a schematic diagram showing the central plant apparatus of FIG. 67 associated with a different distribution system.

Figure 69:
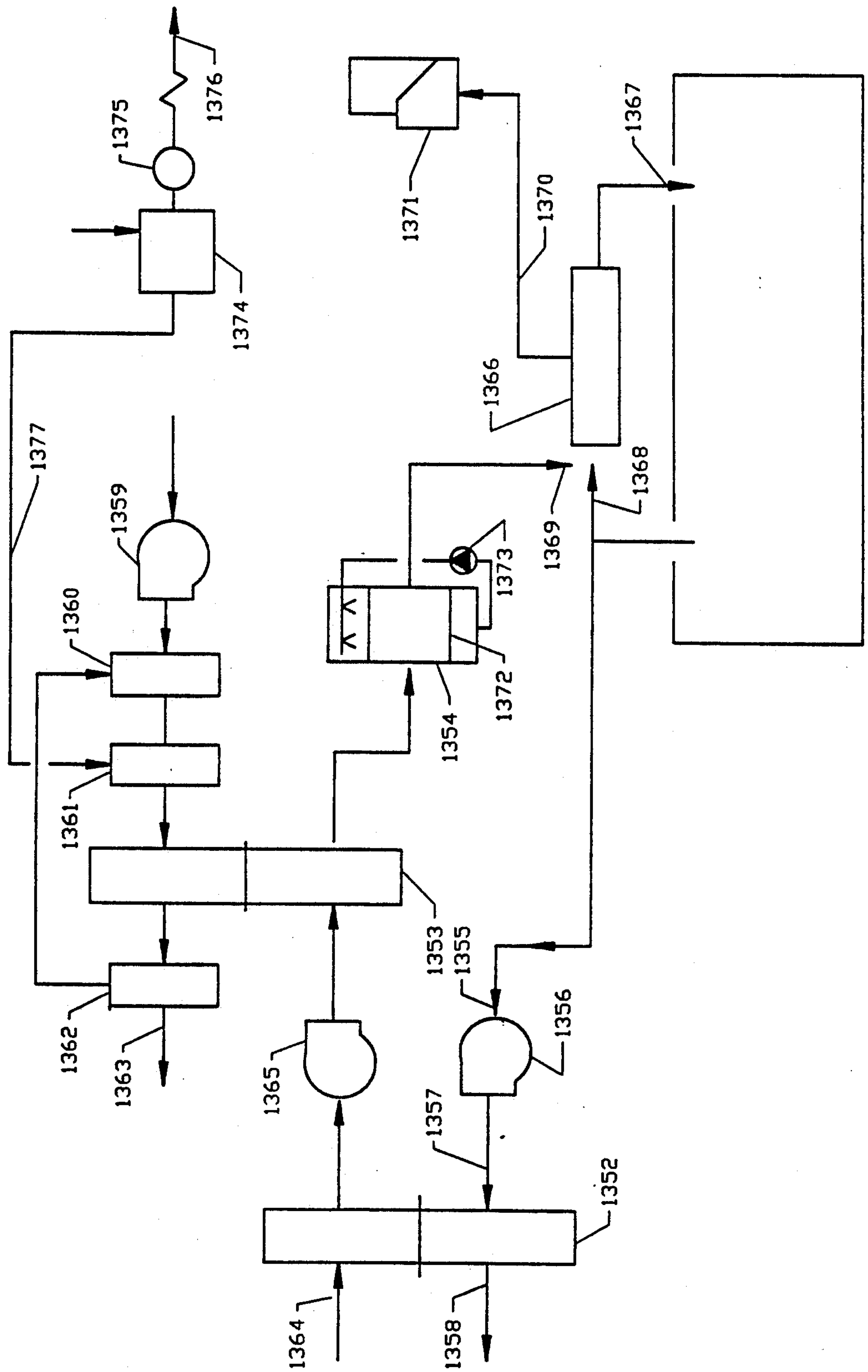

FIG. 69 is a schematic diagram showing central plant apparatus including two solid desiccant chemical dehumidifiers and an indirect evaporative cooler to dehumidify and cool air that is circulated to spaces in a building served by the apparatus and and a cogenerator to provide electricity for a building served by the apparatus and heat for regeneration of the desiccants.

Figure 70:
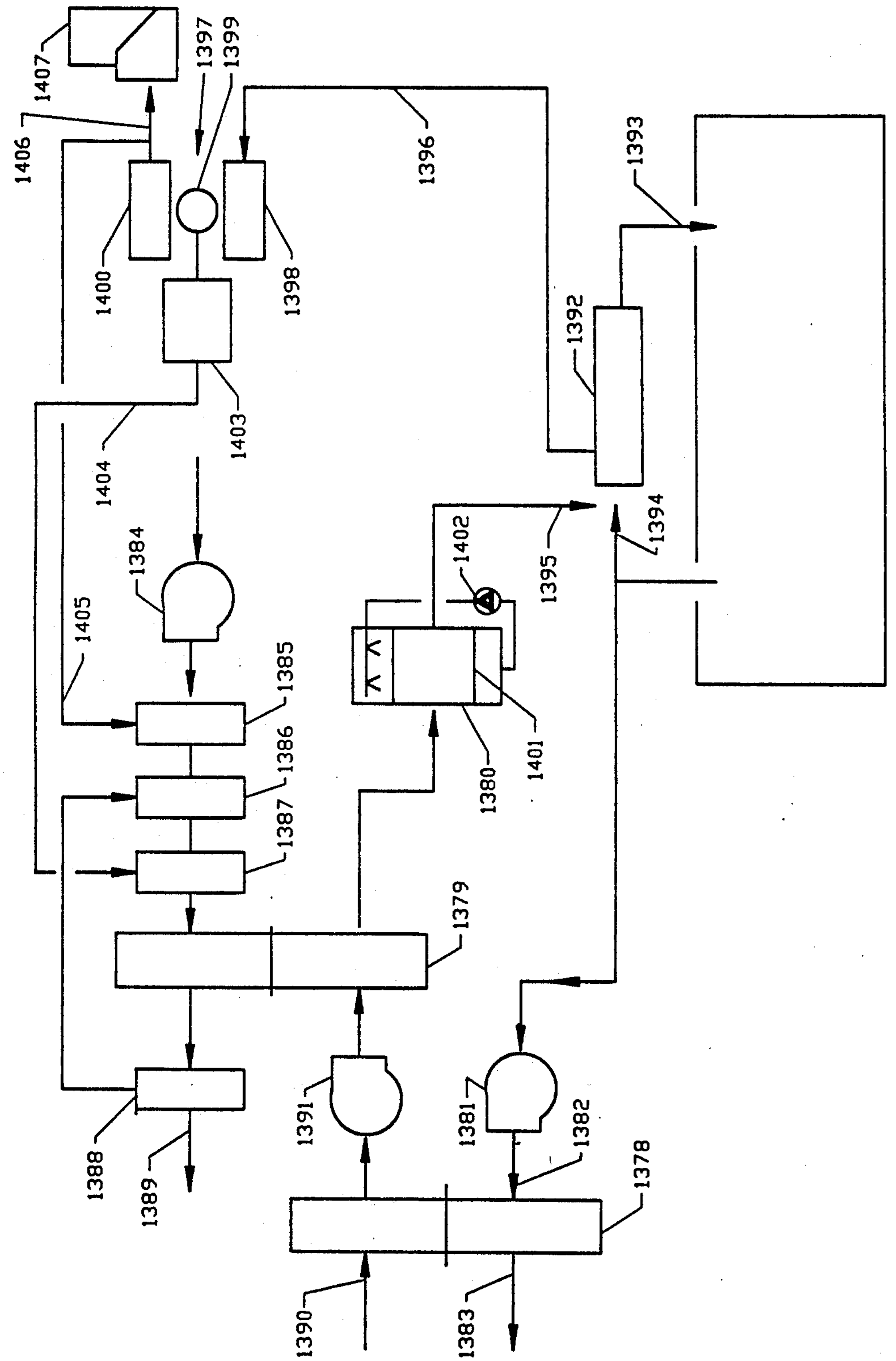

FIG. 70 is a schematic diagram showing central plant apparatus including two solid desiccant chemical dehumidifiers and an indirect evaporative cooler to dehumidify and cool air that is circulated to spaces in a building served by the apparatus and engine-driven refrigeration apparatus to provide refrigeration for the air conditioning system and heat for regeneration of the desiccants.

Figure 71:
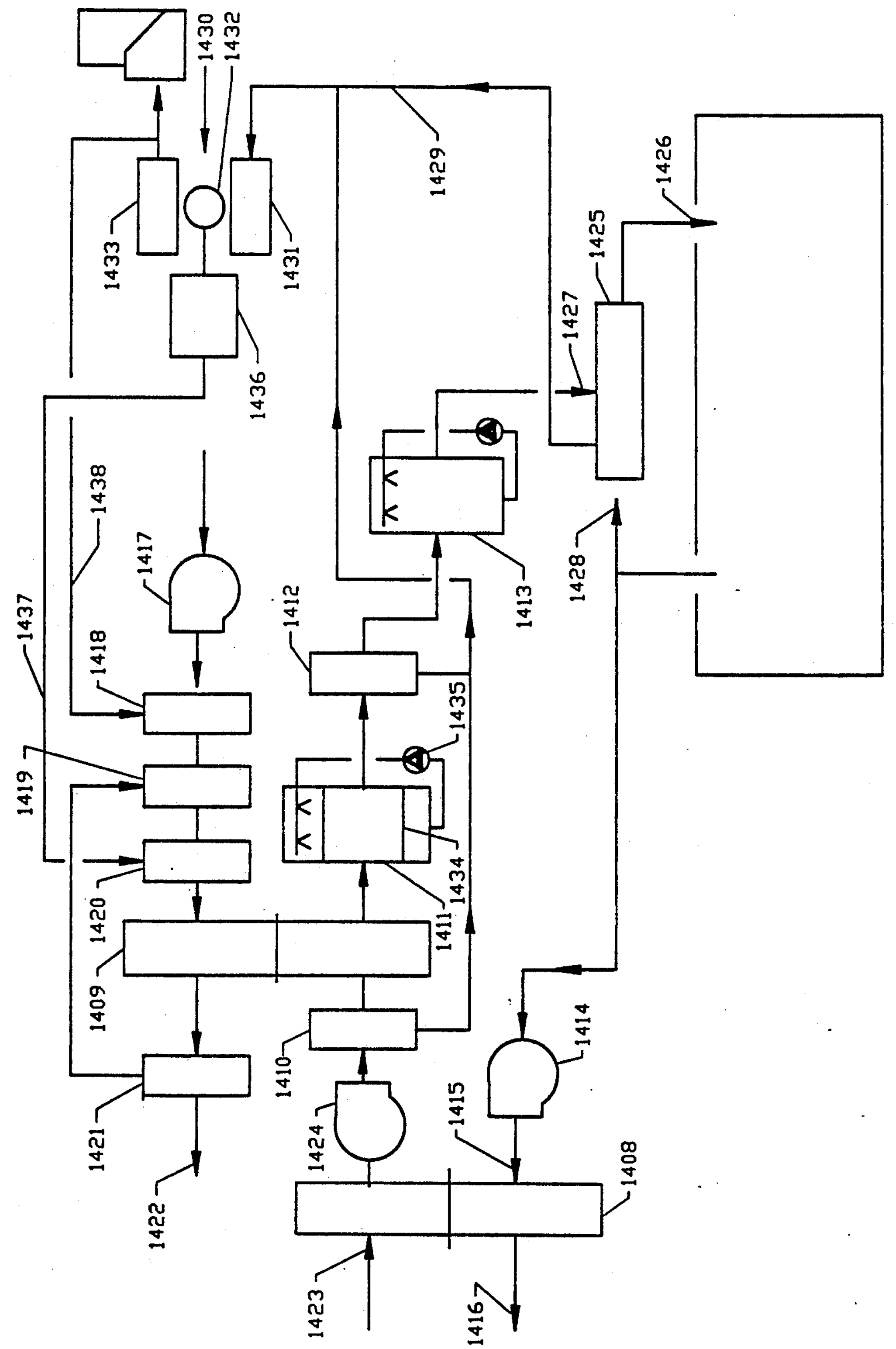

FIG. 71 is a schematic diagram showing central plant apparatus including two solid desiccant chemical dehumidifiers, two cooling coils, an indirect evaporative cooler and a direct evaporative cooler to dehumidify and cool air that is circulated to spaces in a building served by the apparatus and engine-driven refrigeration apparatus to provide refrigeration for the air conditioning system and heat for regeneration of the desiccants.

Figure 72:
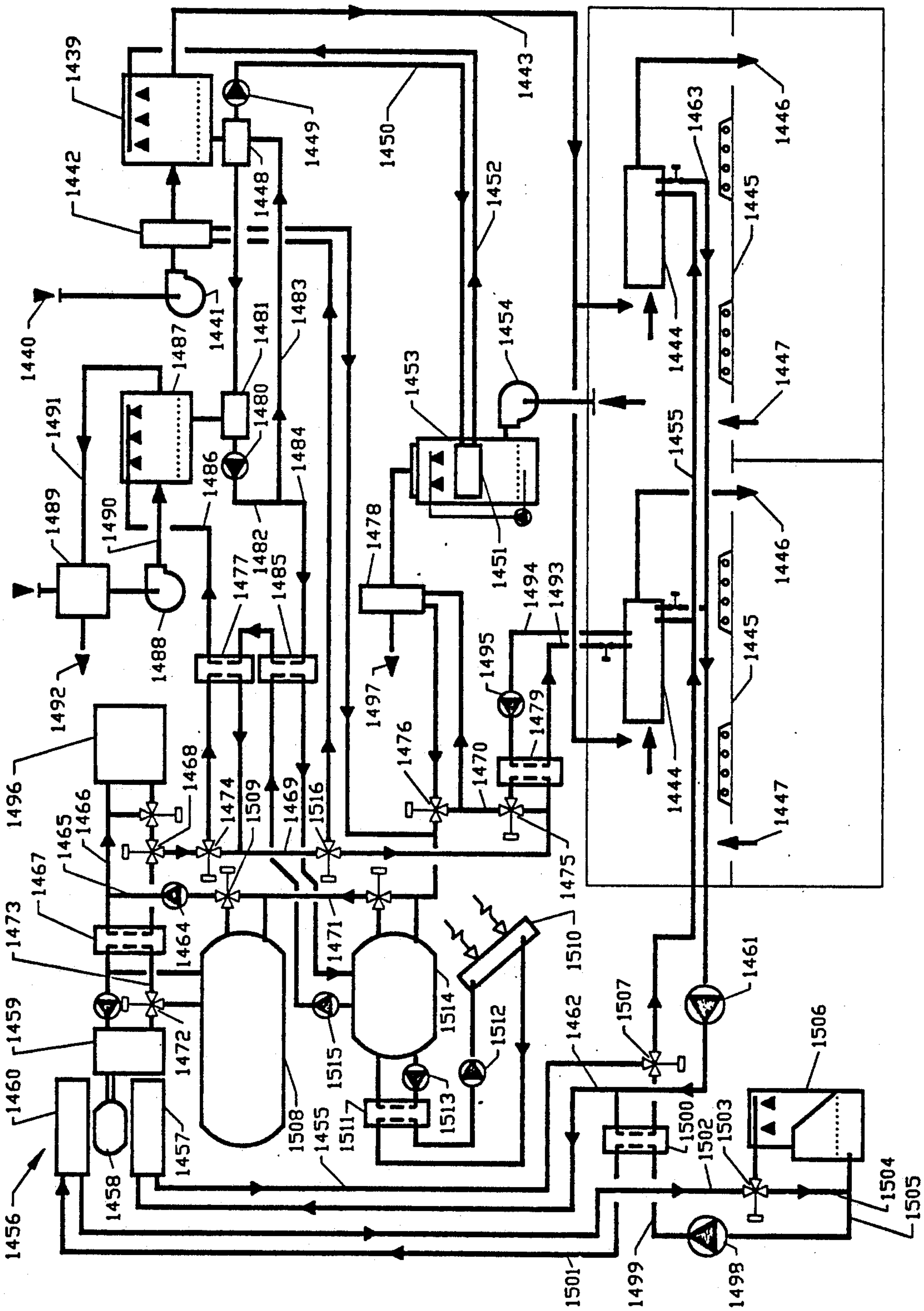

FIG. 72 is a schematic diagram showing central plant apparatus including a liquid desiccant chemical dehumidifier and engine-driven refrigeration apparatus to provide refrigeration for the air conditioning system and heat for regeneration of the desiccant of the dehumidifier.

Figure 73:
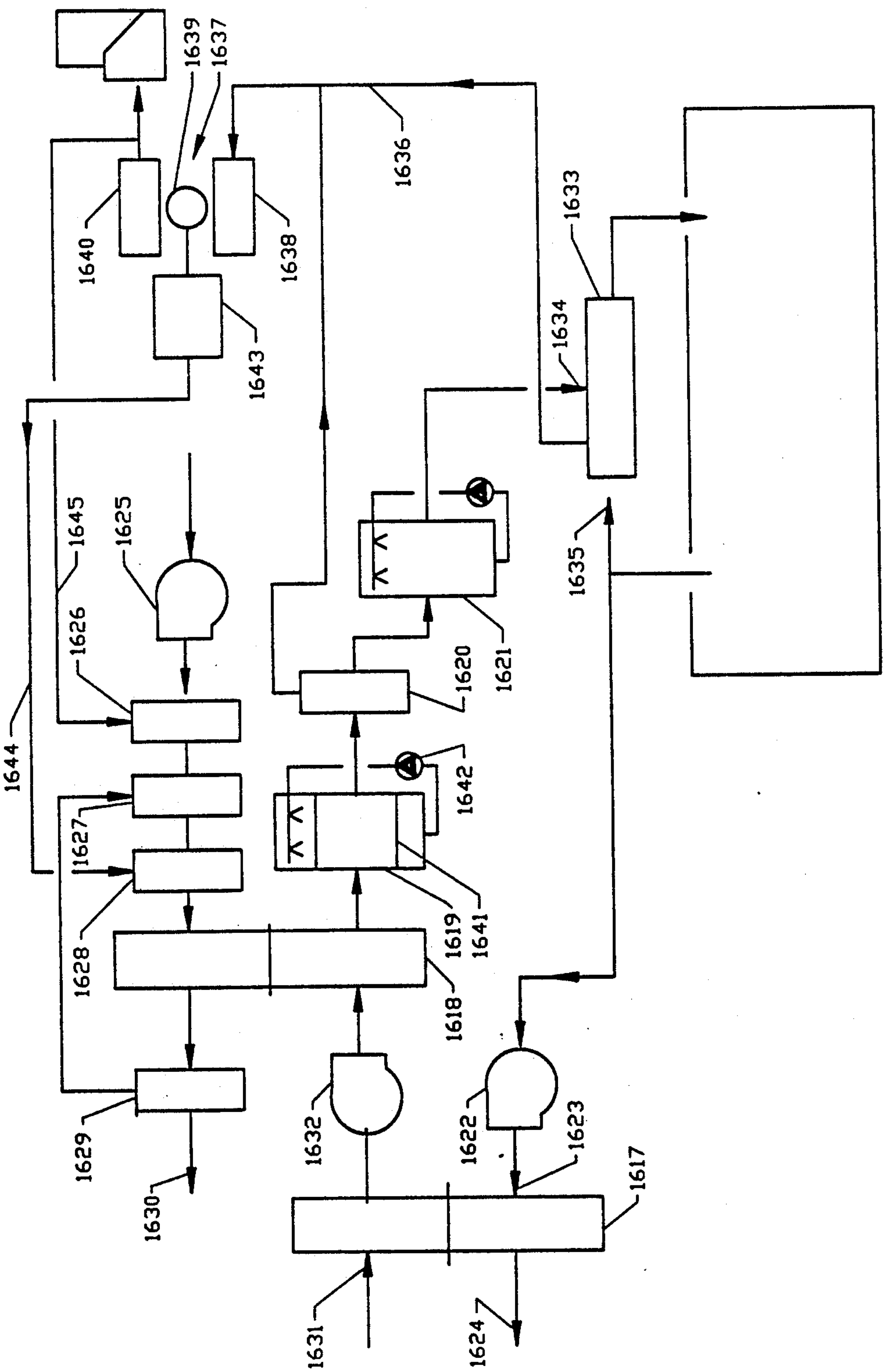

FIG. 73 is a schematic diagram showing central plant apparatus including two solid desiccant chemical dehumidifiers, a cooling coil, an indirect evaporative cooler and a direct evaporative cooler to dehumidify and cool air that is circulated to spaces in a building served by the apparatus and engine-driven refrigeration apparatus to provide refrigeration for the air conditioning system and heat for regeneration of the desiccants.

Figure 74:
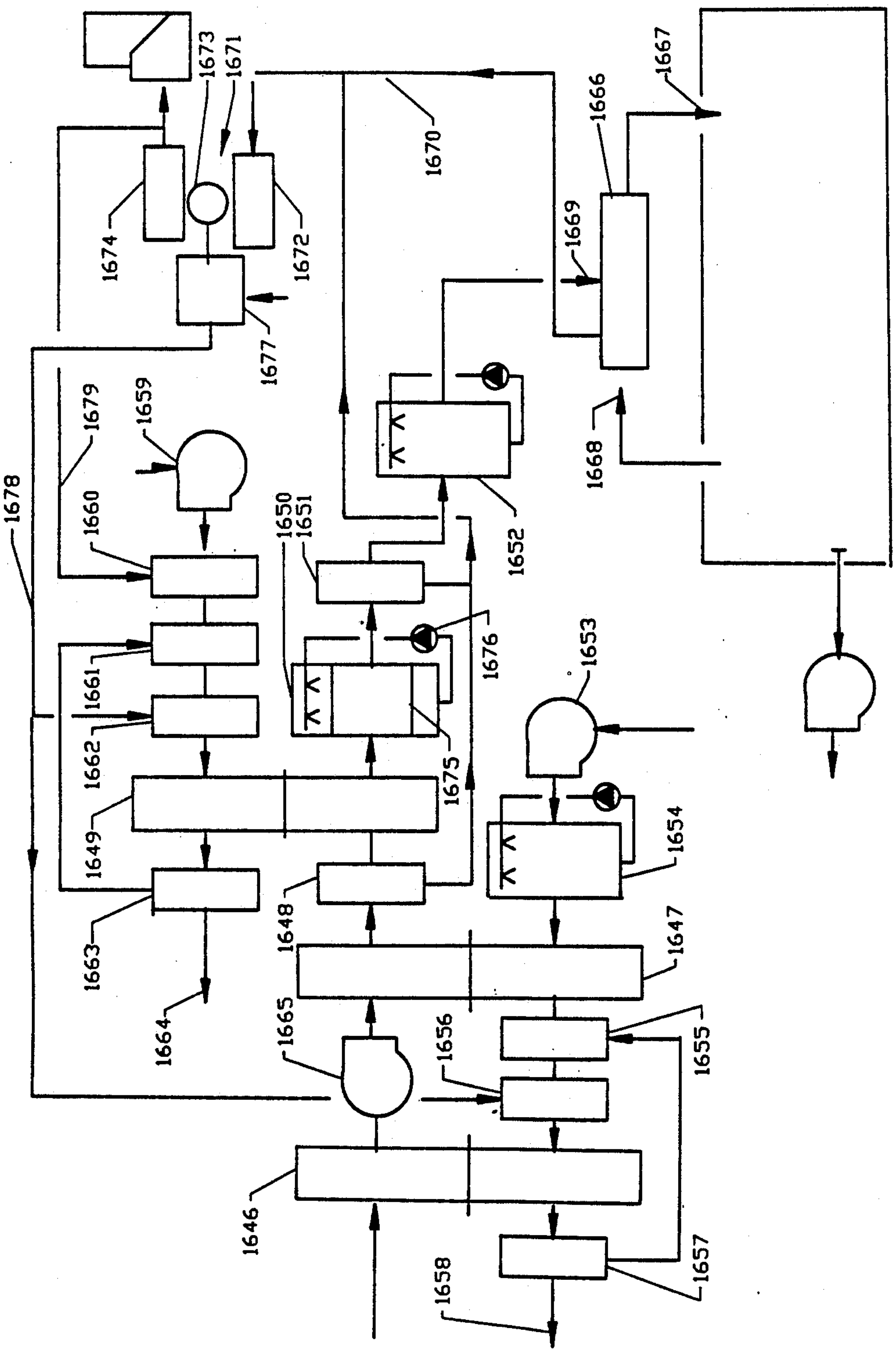

FIG. 74 is a schematic diagram showing central plant apparatus including two solid desiccant chemical dehumidifiers, two cooling coils, a heat exchanger, an indirect evaporative cooler and a direct evaporative cooler to dehumidify and cool air that is circulated to spaces in a building served by the apparatus and engine-driven refrigeration apparatus to provide refrigeration for the air conditioning system and heat for regeneration of the desiccants.

Figure 75:
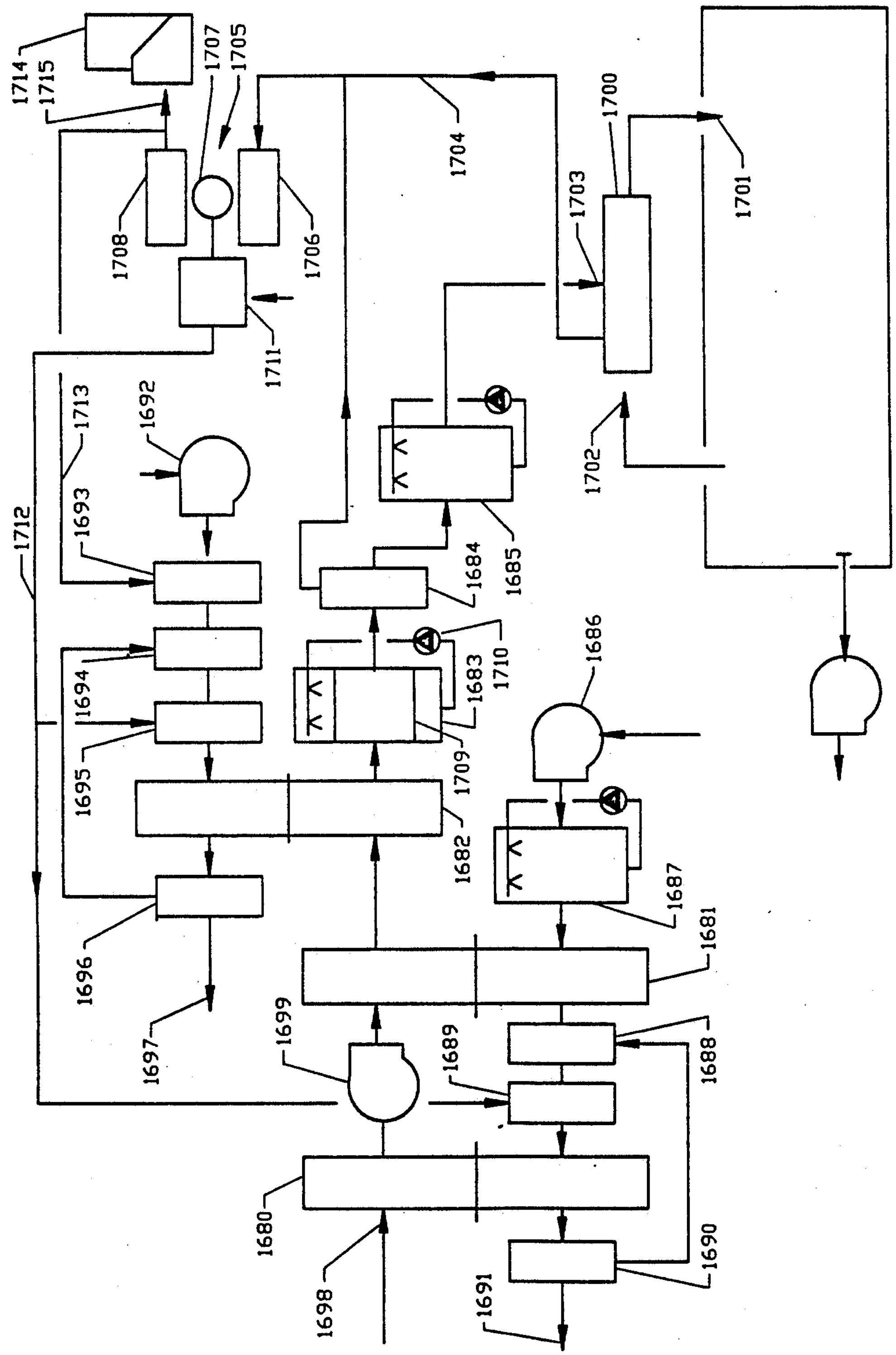

FIG. 75 is a schematic diagram showing central plant apparatus including two solid desiccant chemical dehumidifiers, a cooling coil, a heat exchanger, an indirect evaporative cooler and a direct evaporative cooler to dehumidify and cool air that is circulated to spaces in a building served by the apparatus and engine-driven refrigeration apparatus to provide refrigeration for the air conditioning system and heat for regeneration of the desiccants.

Figure 76:
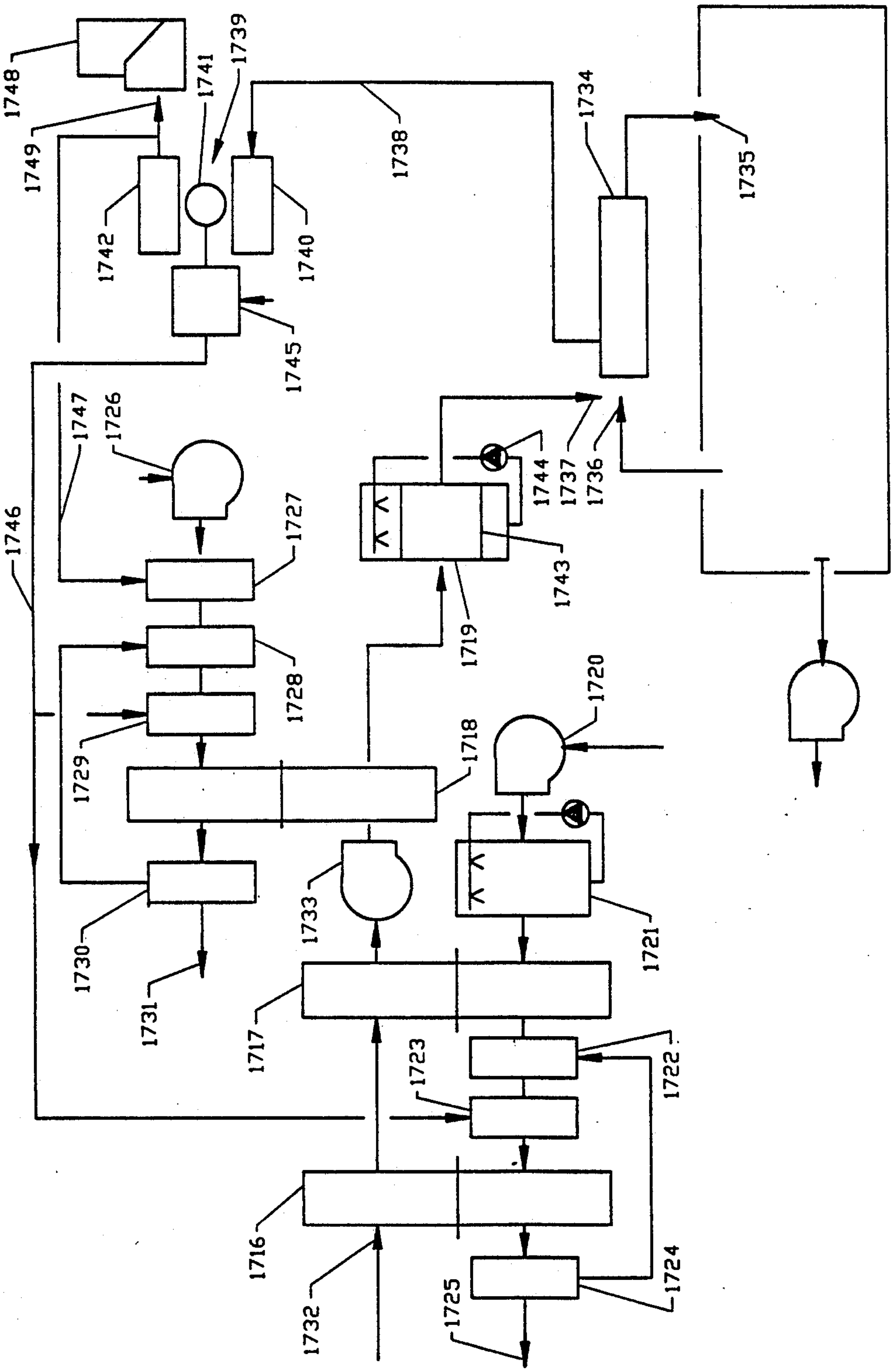

FIG. 76 is a schematic diagram showing central plant apparatus including two solid desiccant chemical dehumidifiers, a heat exchanger, and an indirect evaporative cooler to dehumidify air that is circulated to spaces in a building served by the apparatus and engine-driven refrigeration apparatus to provide refrigeration for the air conditioning system and heat for regeneration of the desiccants.

Figure 77:
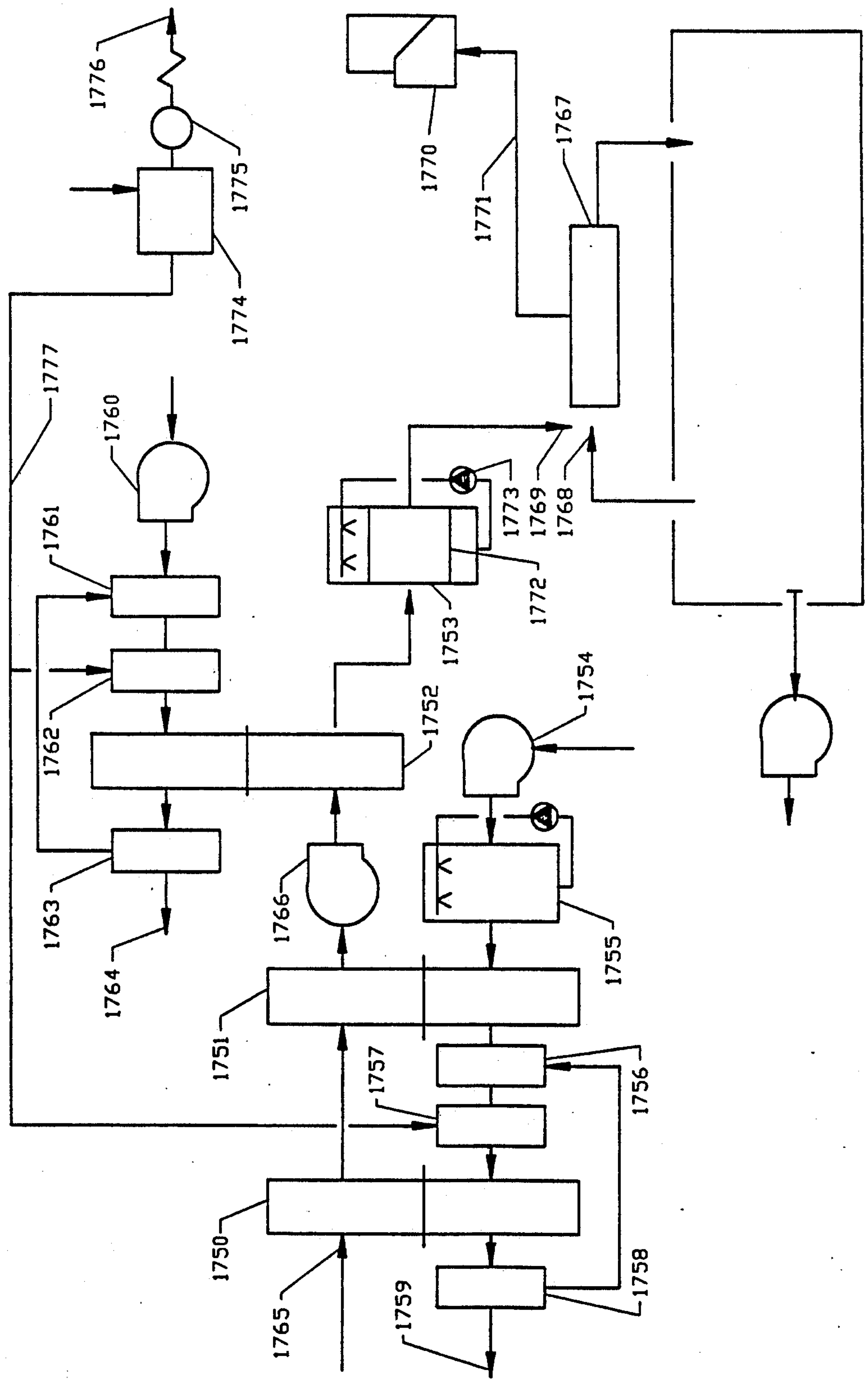

FIG. 77 is a schematic diagram showing central plant apparatus including two solid desiccant chemical dehumidifiers, a heat exchanger, and an indirect evaporative cooler to dehumidify air that is circulated to spaces in a building served by the apparatus, an engine-driven generator to provide electricity for the building and heat for regeneration of the desiccants and heat pumps to provide cooling for the air conditioning system.

Figure 78:
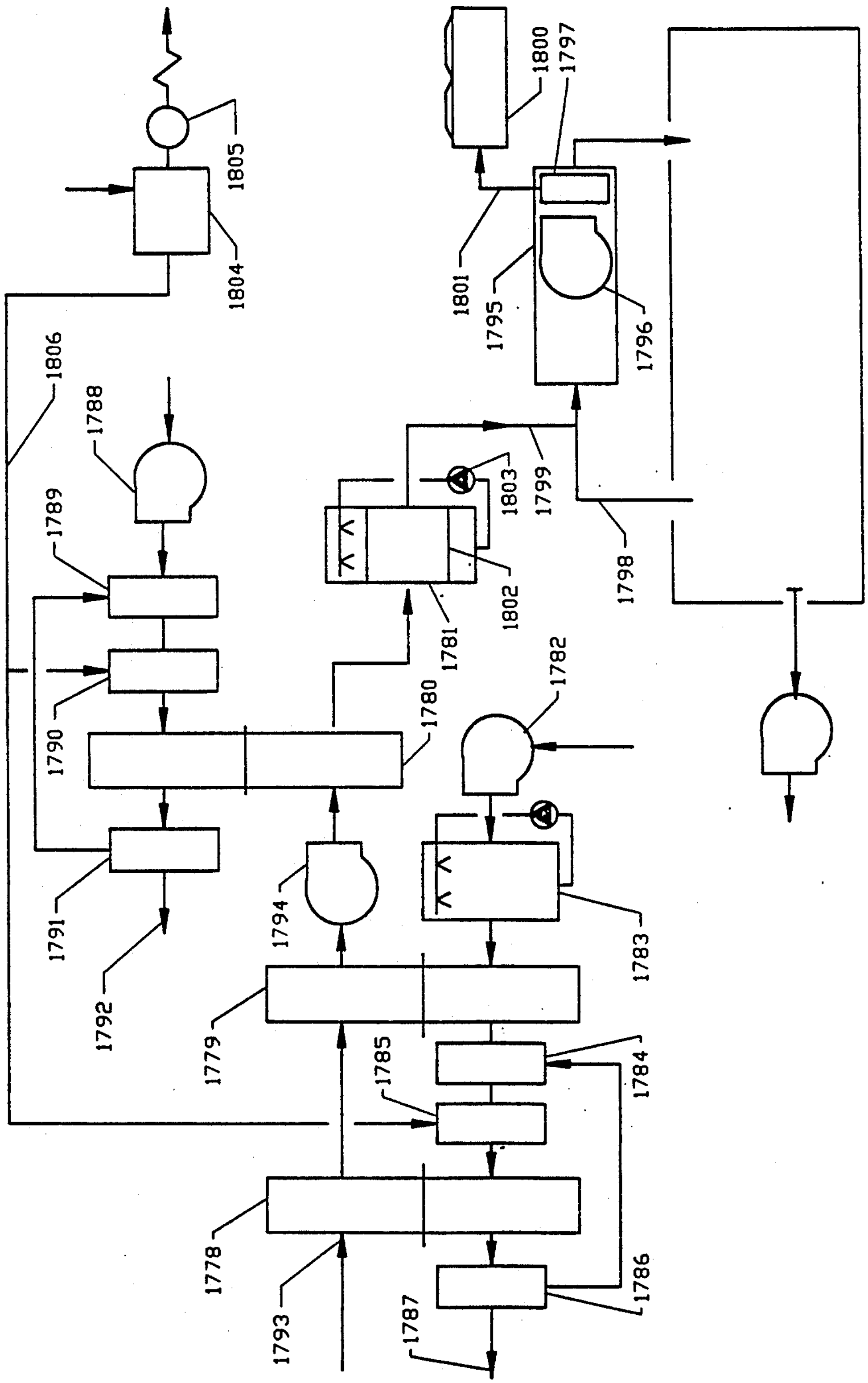

FIG. 78 is a schematic diagram showing central plant apparatus including two solid desiccant chemical dehumidifiers, a heat exchanger, and an indirect evaporative cooler to dehumidify air that is circulated to spaces in a building served by the apparatus, an engine-driven generator to provide electricity for the building and heat for regeneration of the desiccants and refrigeration apparatus to provide cooling for the air conditioning system.

Figure 79:
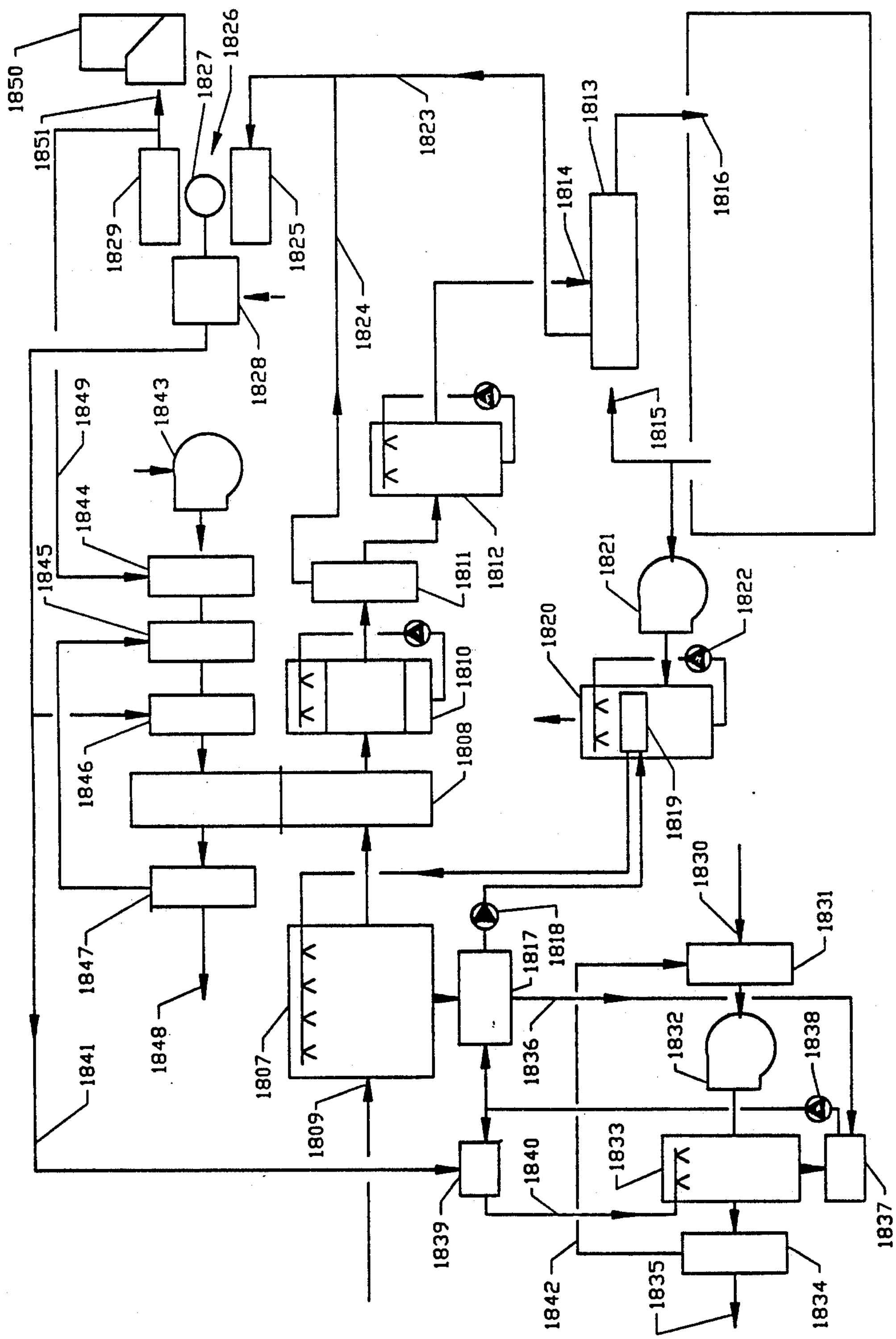

FIG. 79 is a schematic diagram showing central plant apparatus including two liquid desiccant chemical dehumidifiers and engine-driven refrigeration apparatus to provide refrigeration for the air conditioning system and heat for regeneration of the desiccant of one of the dehumidifiers.

Figure 80:
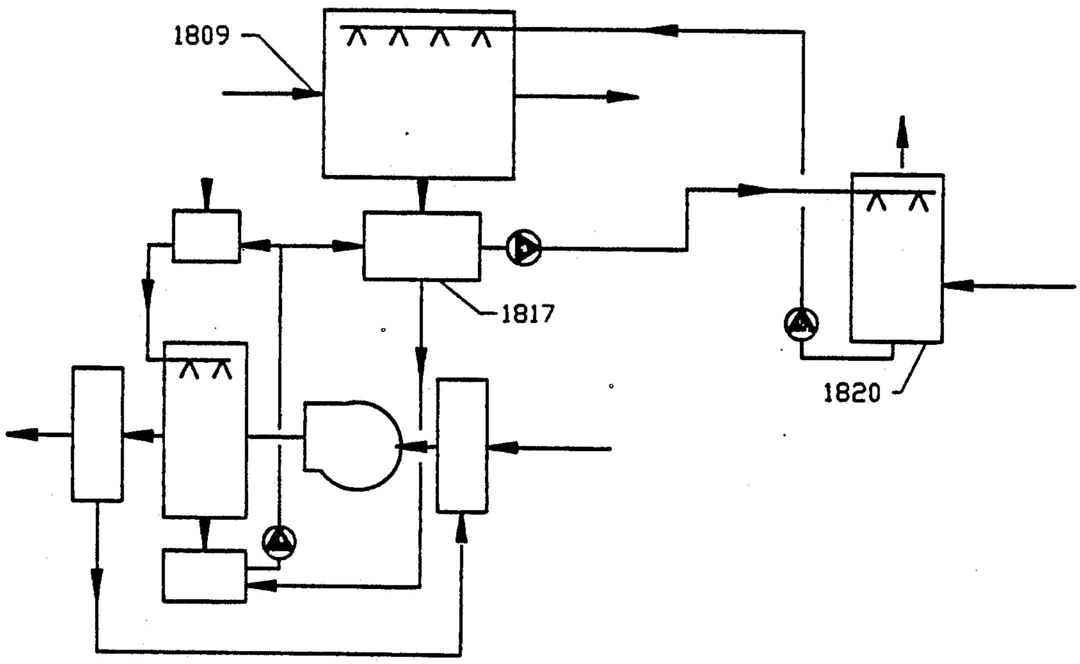

FIG. 80 is a schematic diagram showing liquid desiccant dehumidification apparatus which includes a regenerator in which building exhaust air is used to remove water from the liquid desiccant.

Figure 81:
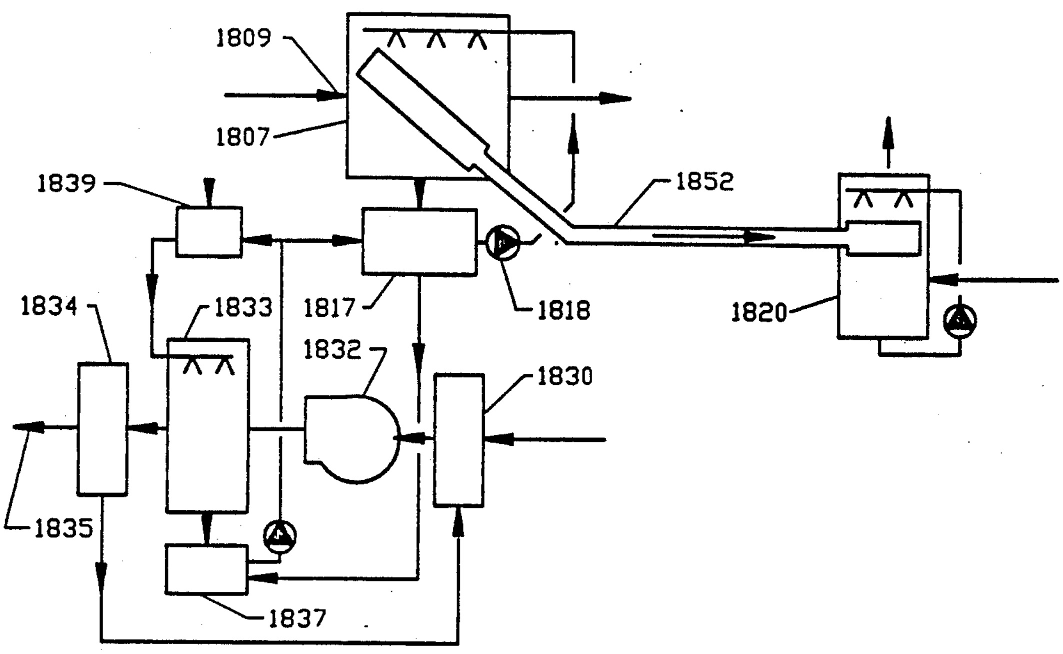

FIG. 81 is a schematic diagram showing liquid desiccant dehumidification apparatus which includes an evaporative fluid cooler in which building exhaust air is used to cool a heat transfer fluid which is then used to cool the liquid desiccant.

Figure 82:
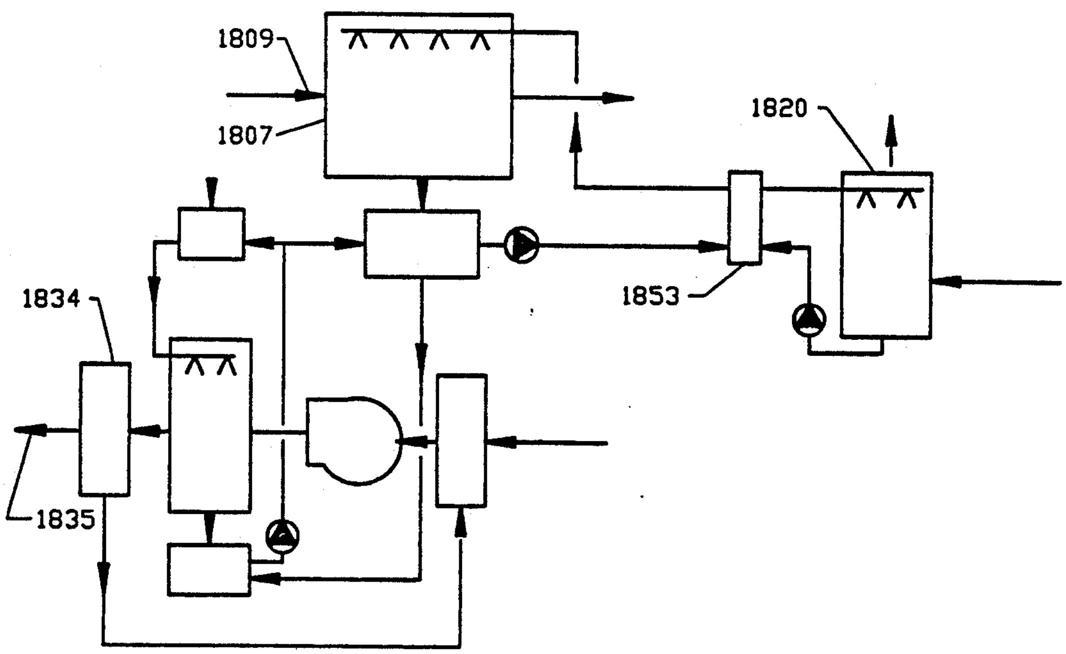

FIG. 82 is a schematic diagram showing liquid desiccant dehumidification apparatus which includes an evaporative fluid cooler in which building exhaust air is used to remove heat from heat pipes which, in turn, are used to cool the liquid desiccant.

Figure 83:
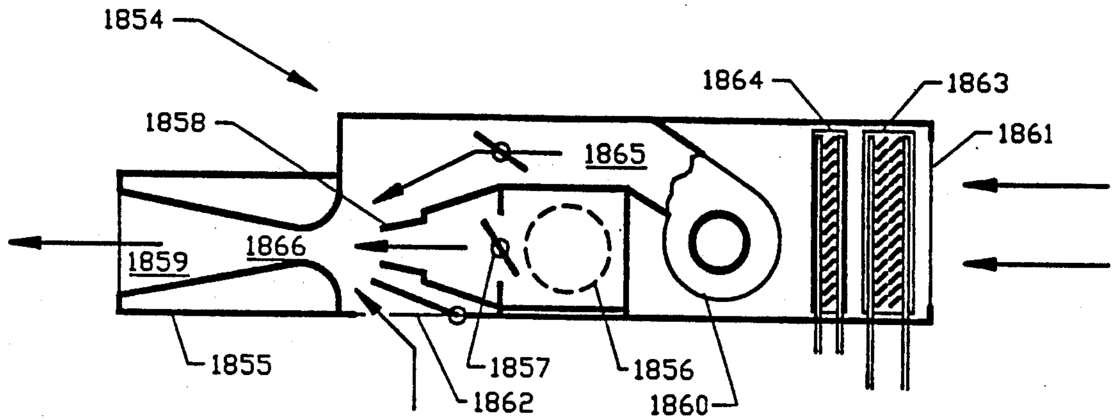

FIG. 83 is a schematic diagram showing a terminal unit in which conditioned air induces a flow of secondary air by passing through induction nozzles, and which also includes a blower to induce a flow of secondary air over a chilled water coil and over a refrigerant coil which is a part of a unitary heat pump.

Figure 84:
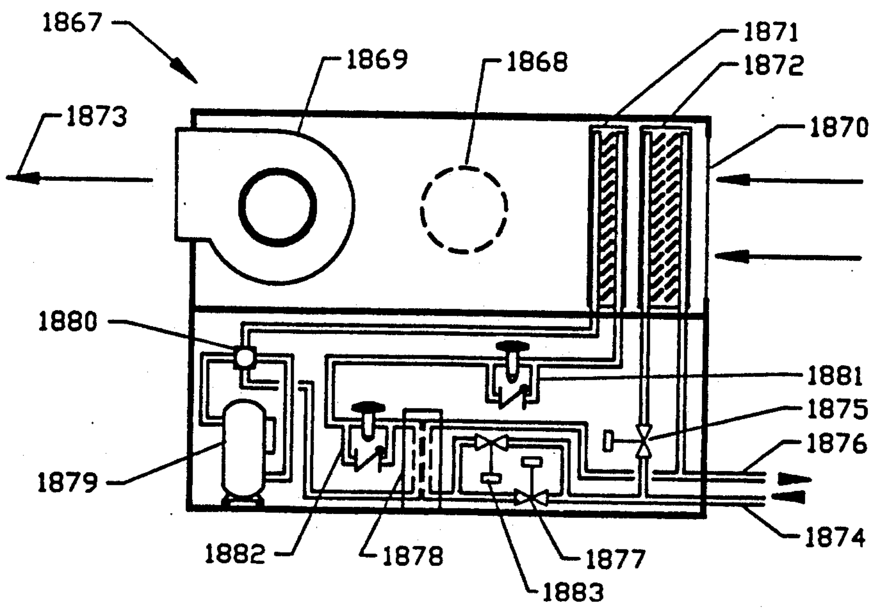

FIG. 84 is a schematic diagram showing details of a terminal unit which includes a cold water coil and a refrigerant coil, and a heat pump to pump heat to or from the refrigerant coil.

FIGS. 85-97 are psychrometric charts which depict, psychrometrically, the operation of the apparatus of FIGS. 67-79, respectively.

Figure 98:
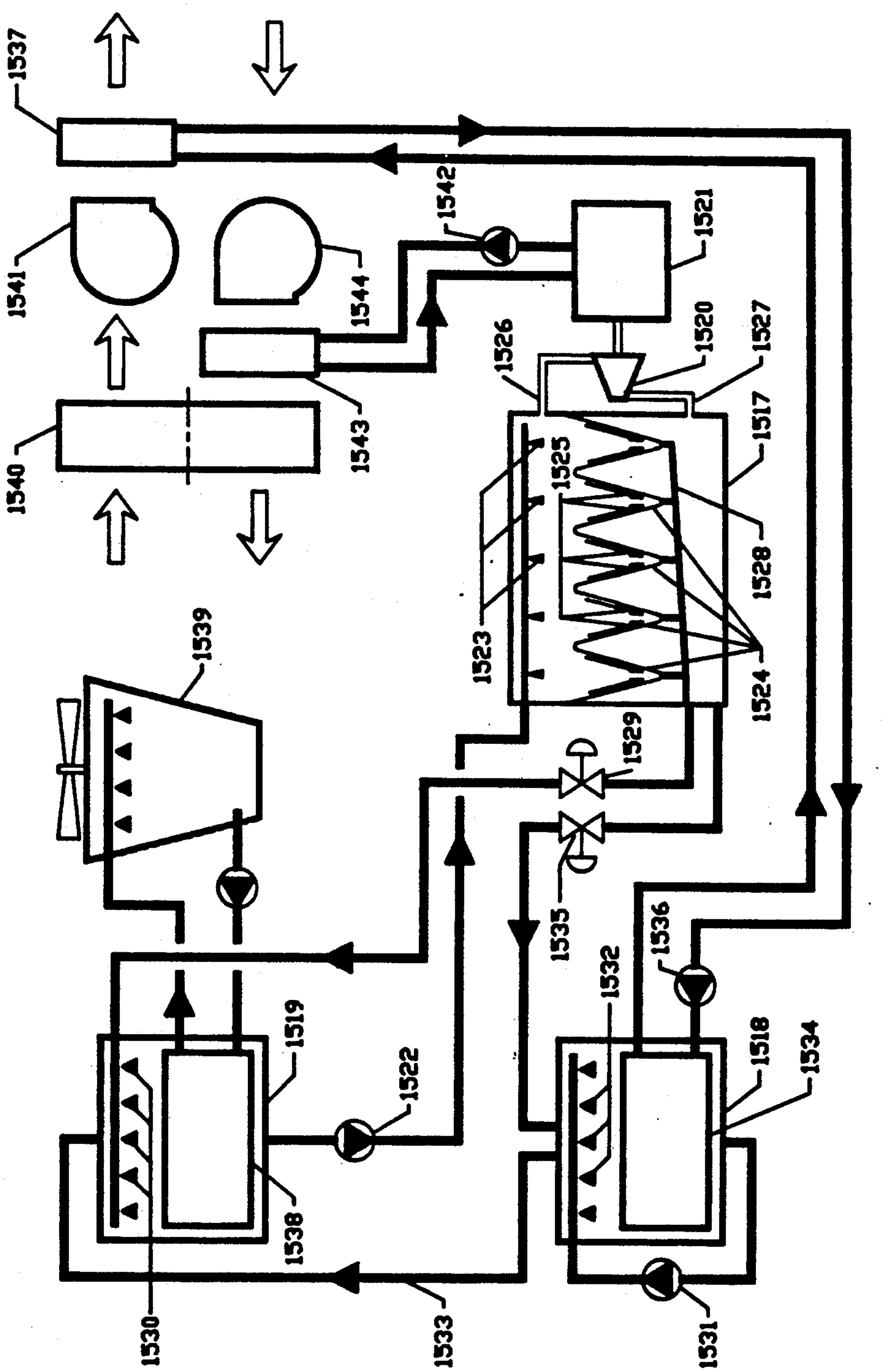

FIG. 98 is a schematic diagram showing refrigeration apparatus which is particularly advantageous for use in the various systems of the instant invention.

Figure 99:
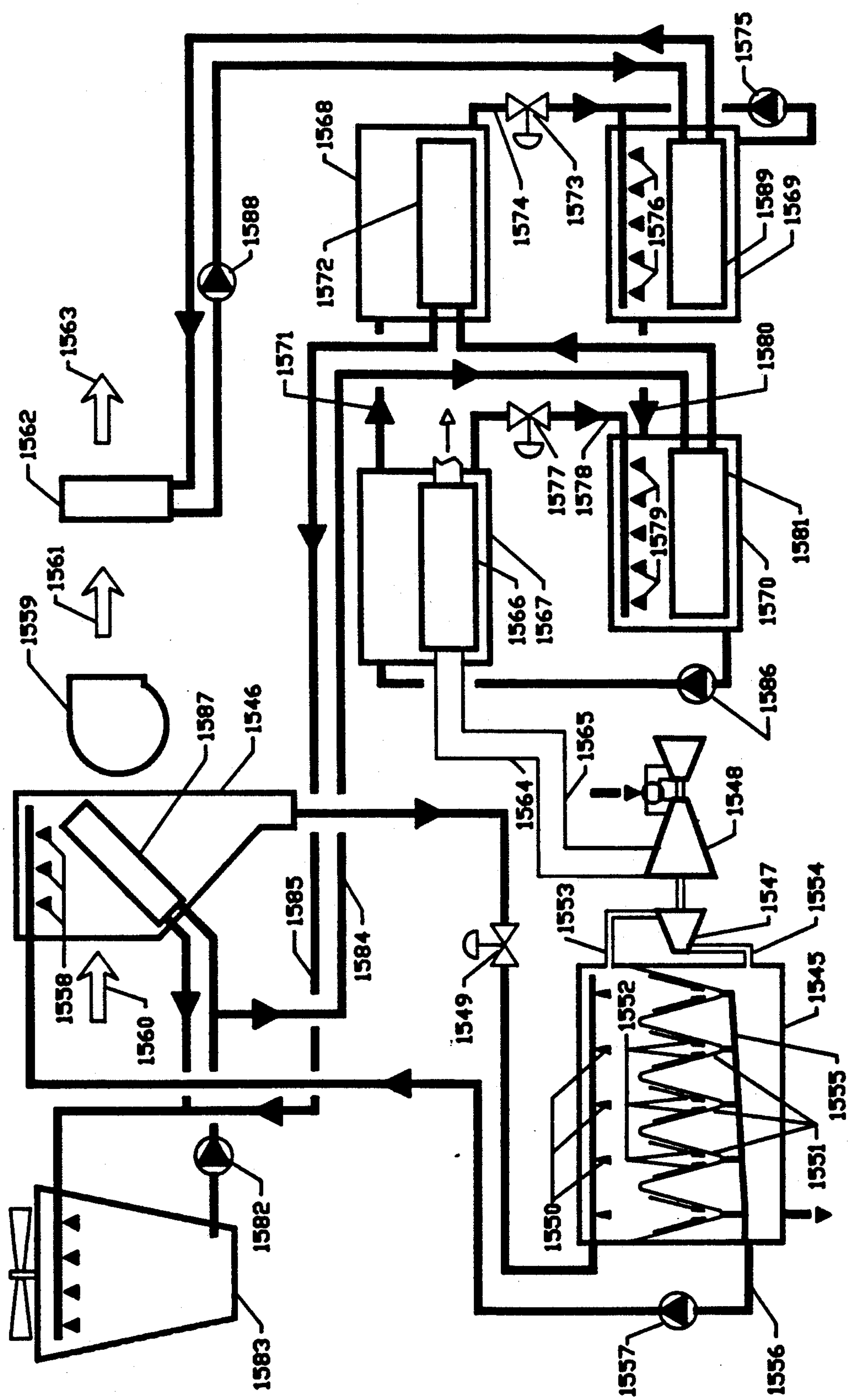

FIG. 99 is a schematic diagram showing refrigeration and dehumidification apparatus which is particularly advantageous for use in the various systems of the instant invention.

Figure 100:
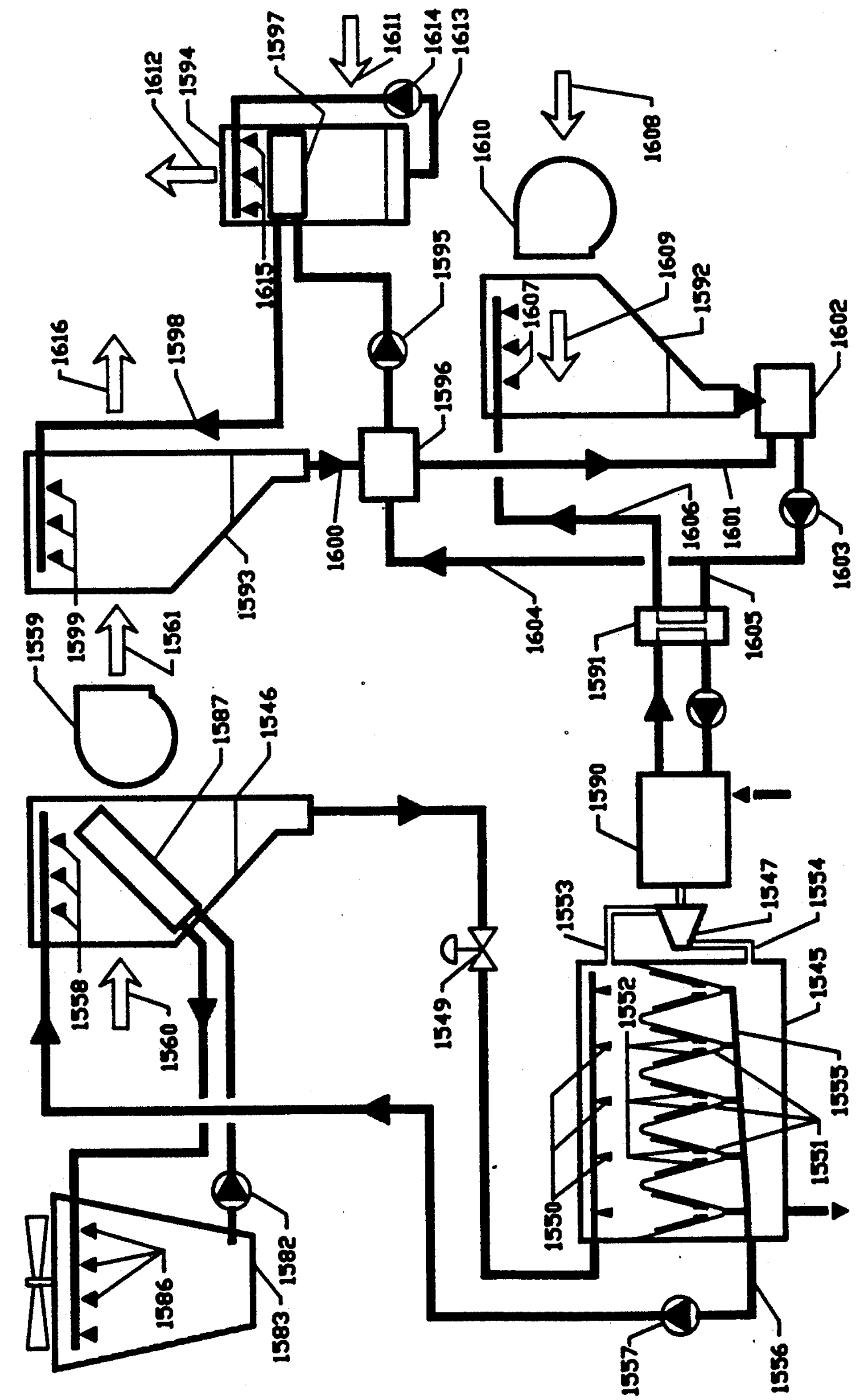

FIG. 100 is a schematic diagram showing dehumidification apparatus which is particularly advantageous for use in the various systems of the instant invention.

Figure 101:
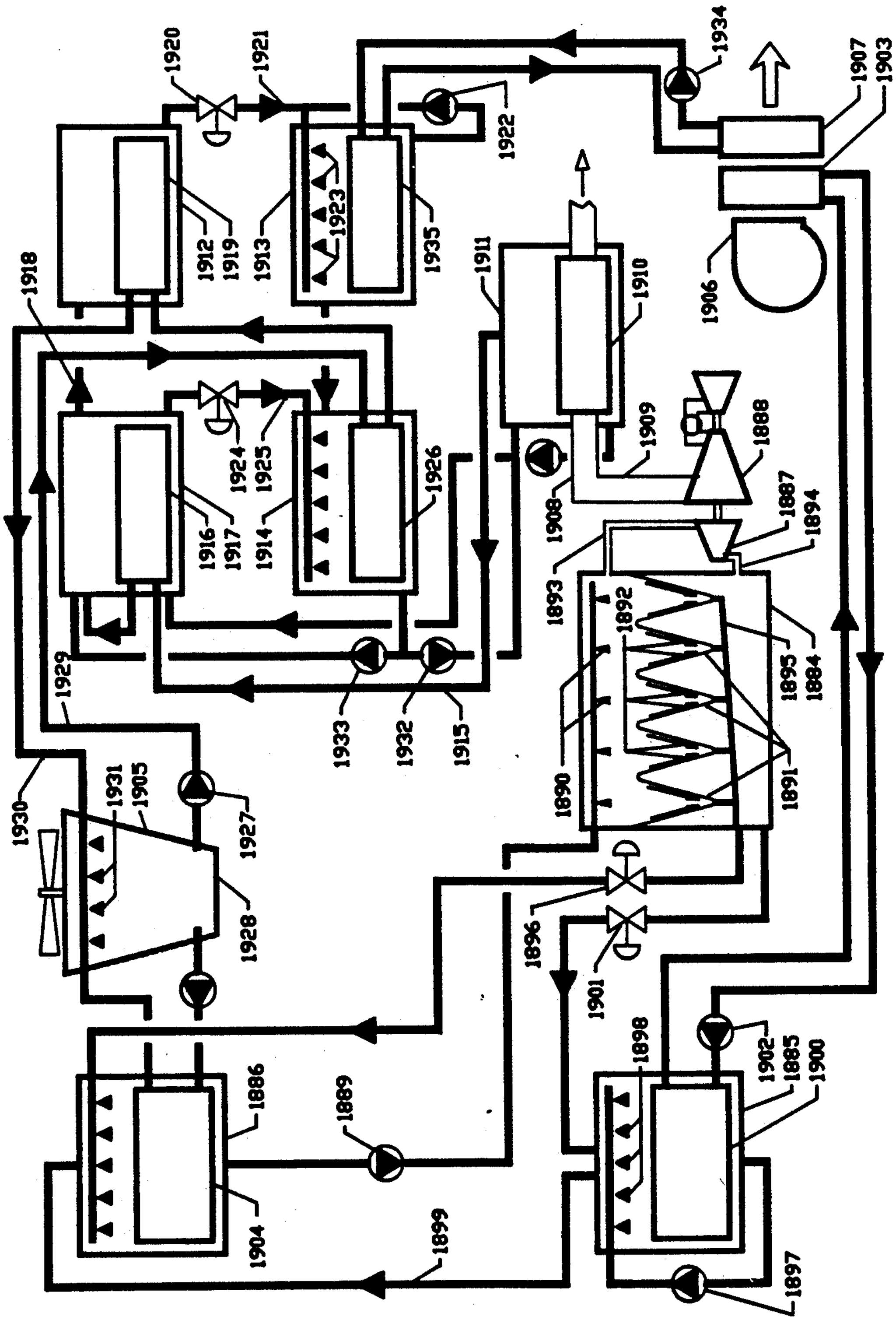

FIG. 101 is a schematic diagram showing refrigeration apparatus which is particularly advantageous for use in the various systems of the instant invention.

Figure 102:
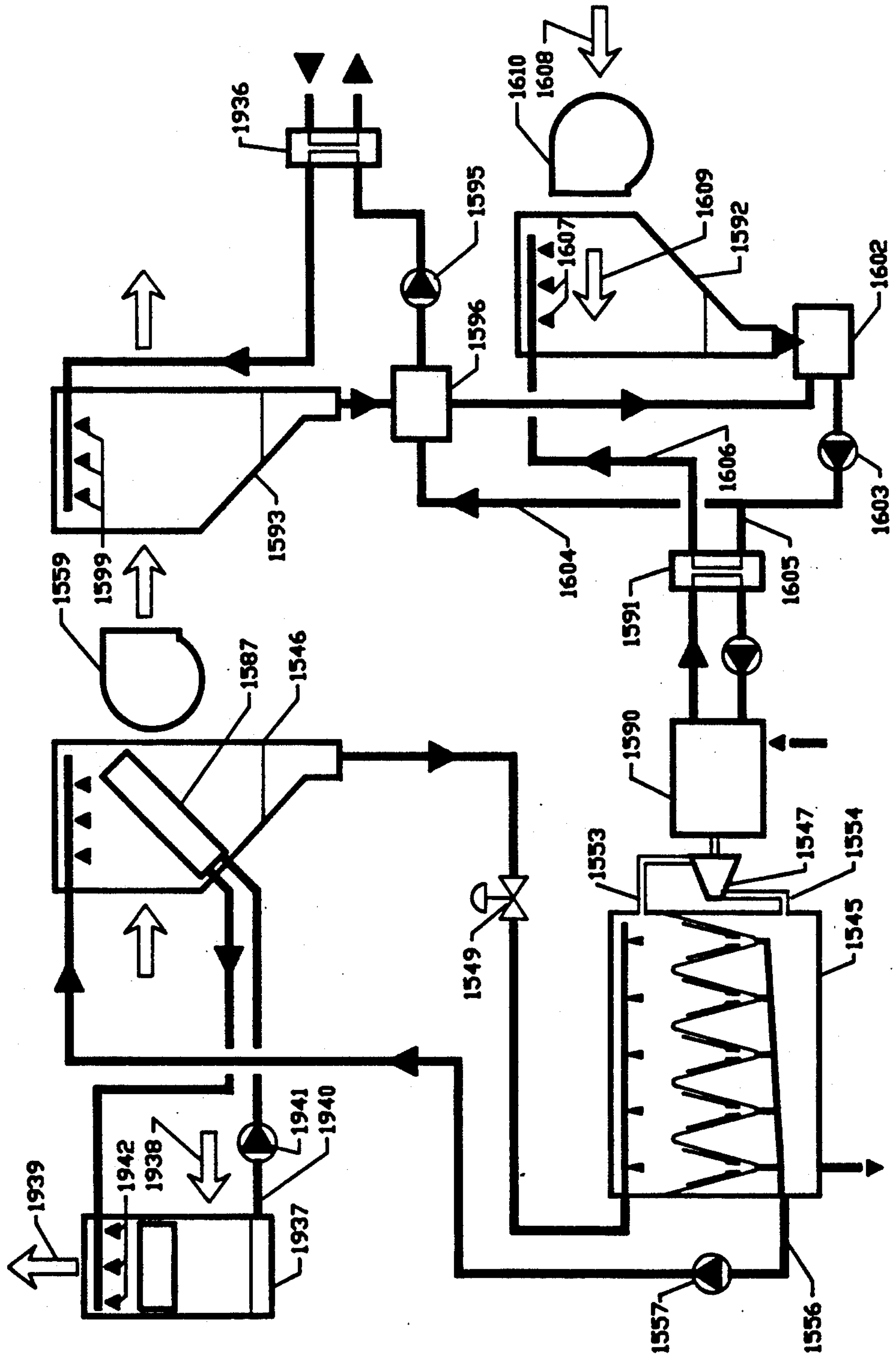

FIG. 102 is a schematic diagram showing dehumidification apparatus which is particularly advantageous for use in the various systems of the instant invention.

Figure 103:
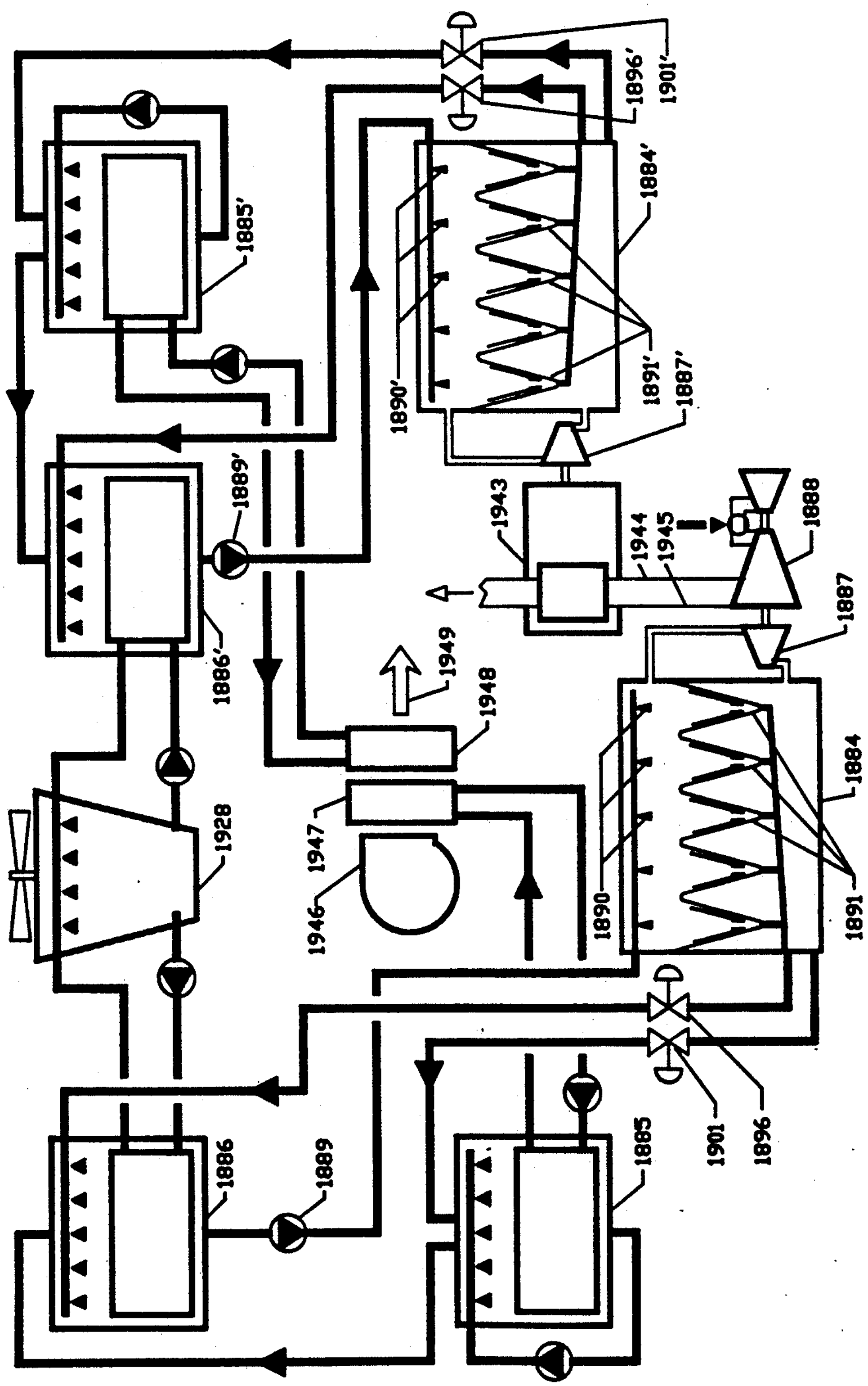

FIG. 103 is a schematic diagram showing refrigeration apparatus which is particularly advantageous for use in the various systems of the instant invention.

Figure 104:
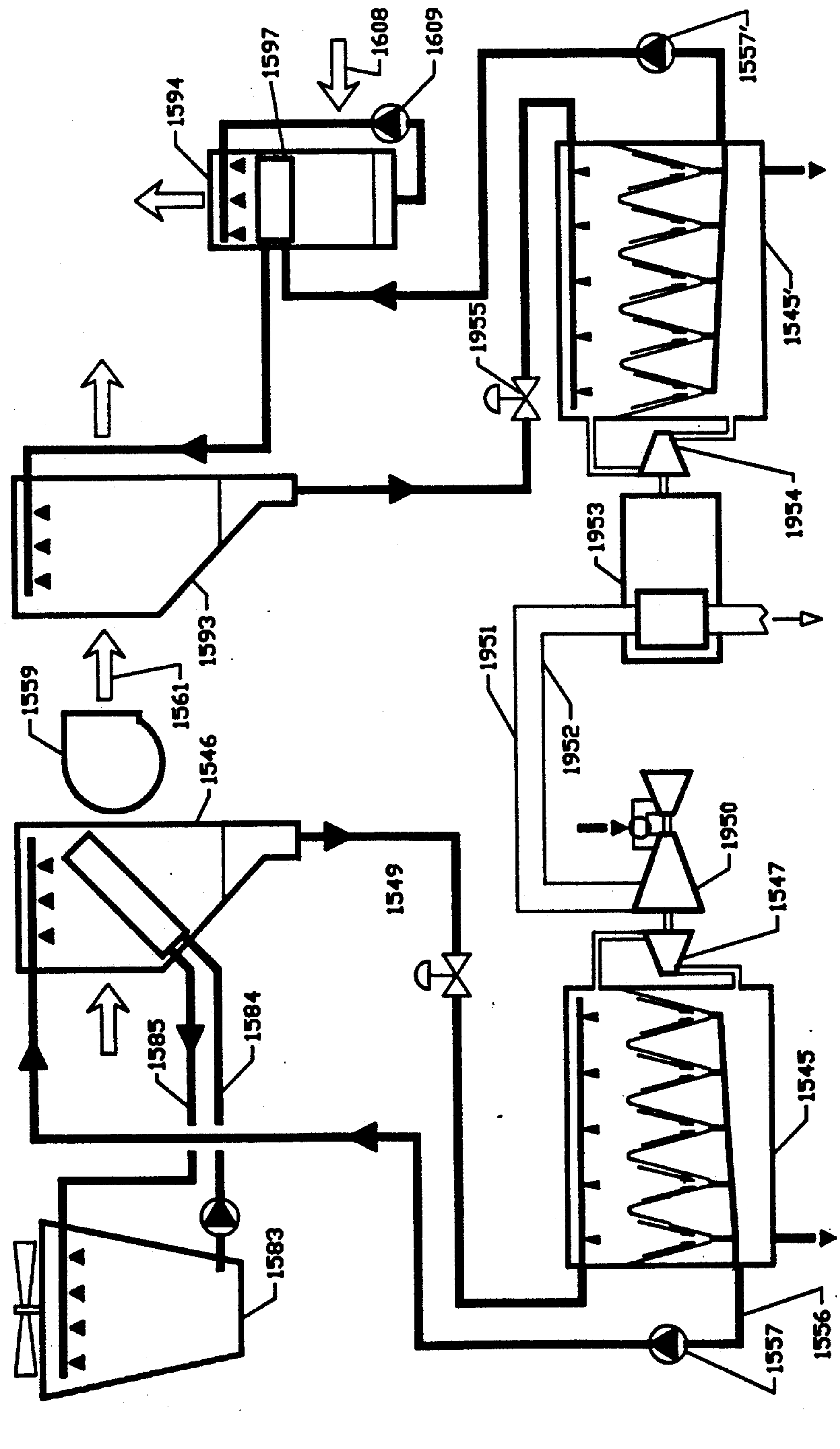

FIG. 104 is a schematic diagram showing dehumidification apparatus which is particularly advantageous for use in the various systems of the instant invention.

Figure 105:
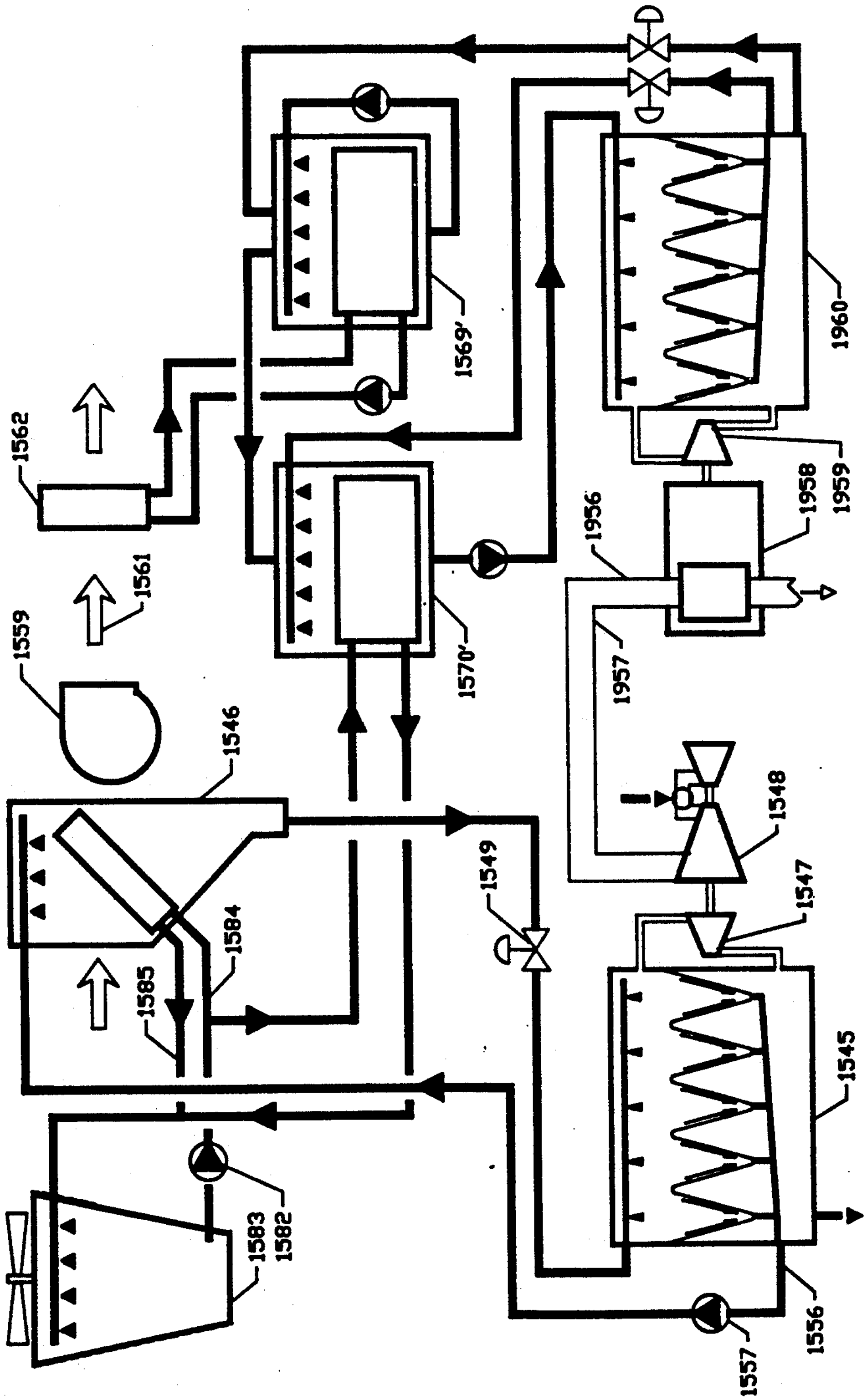

FIG. 105 is a schematic diagram showing dehumidification and refrigeration apparatus which is particularly advantageous for use in the various systems of the instant invention.

Figure 106:
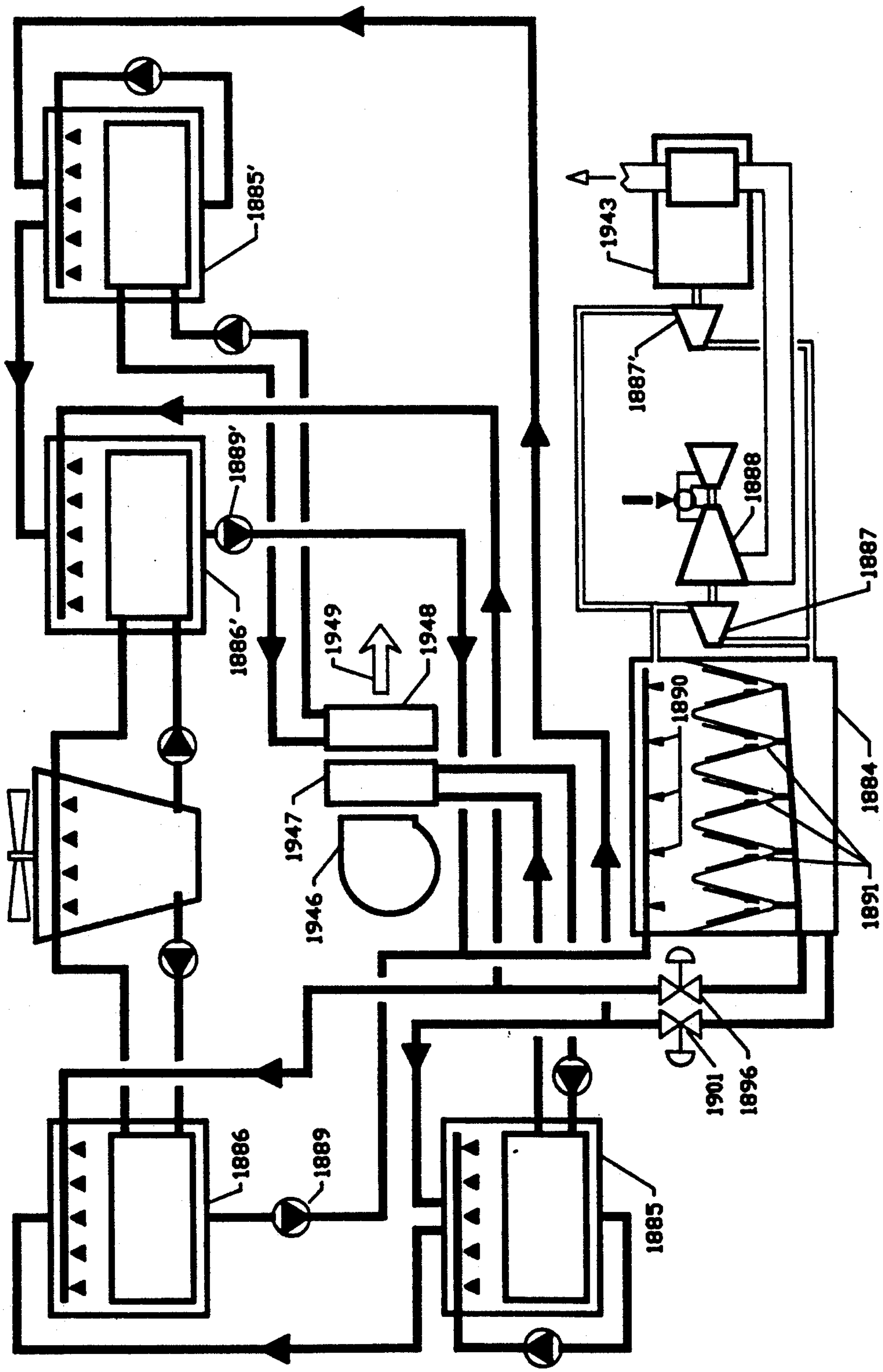

FIG. 106 is a schematic diagram showing refrigeration apparatus which is particularly advantageous for use in the various systems of the instant invention.

Figure 107:
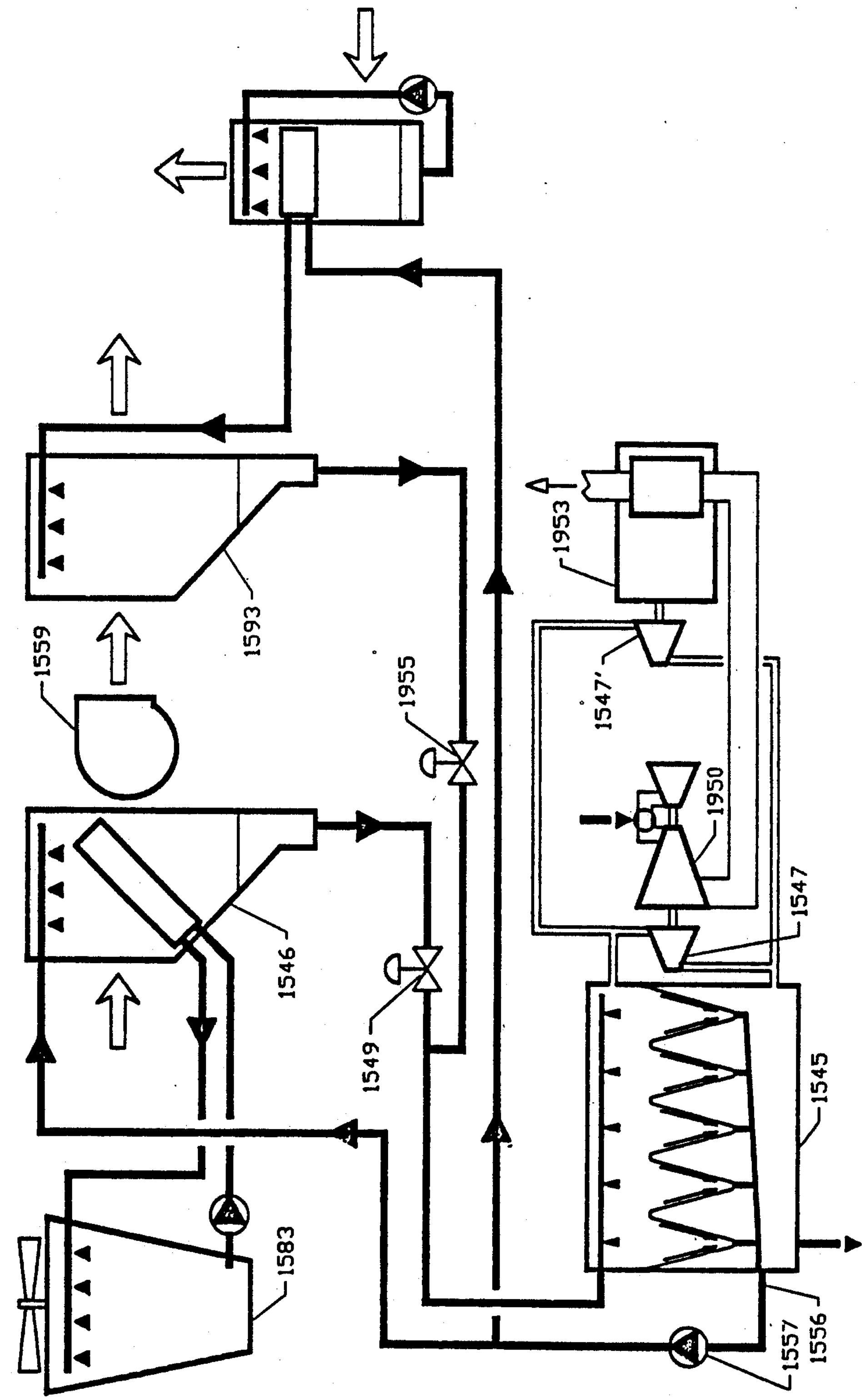

FIG. 107 is a schematic diagram showing dehumidification apparatus which is particularly advantageous for use in the various systems of the instant invention.

Figure 108:
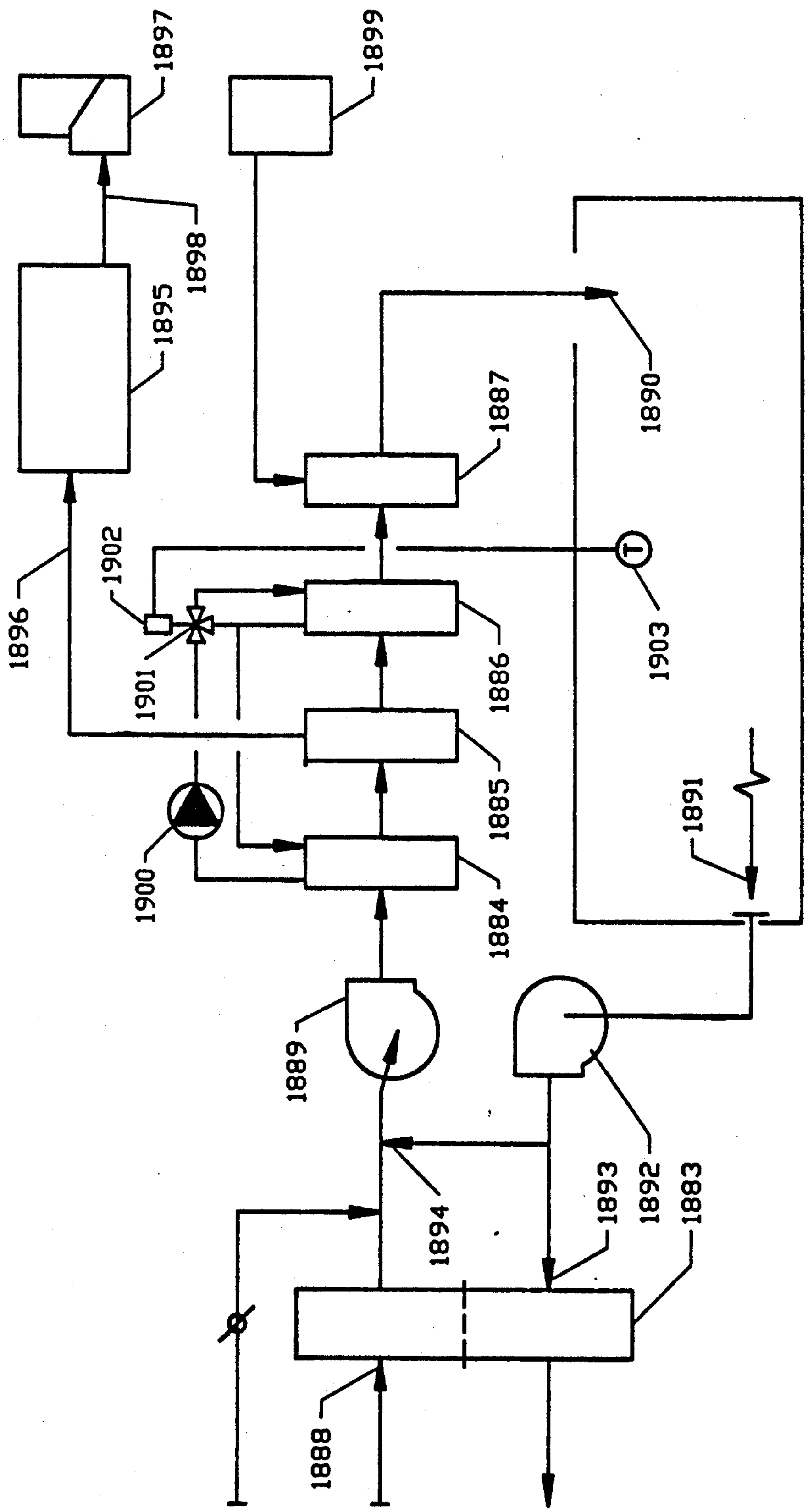

FIG. 108 is a schematic diagram showing air conditioning apparatus according to the invention which comprises an enthalpy exchanger, a coil served by an ice thermal storage subsystem, a coil served by a boiler or a source for recovered heat, and heat exchange means for controlling temperature of spaces served.

Figure 109:
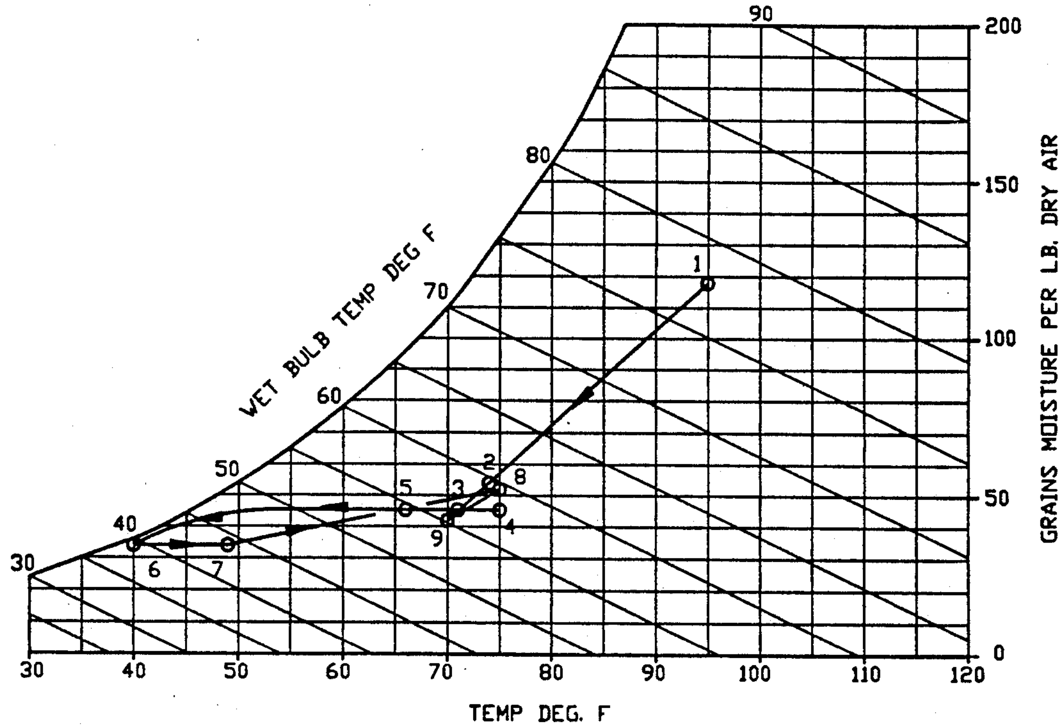

FIG. 109 is a psychrometric chart showing the psychrometric course of the operation of the apparatus of FIG. 108 on summer cycle.

Figure 110:
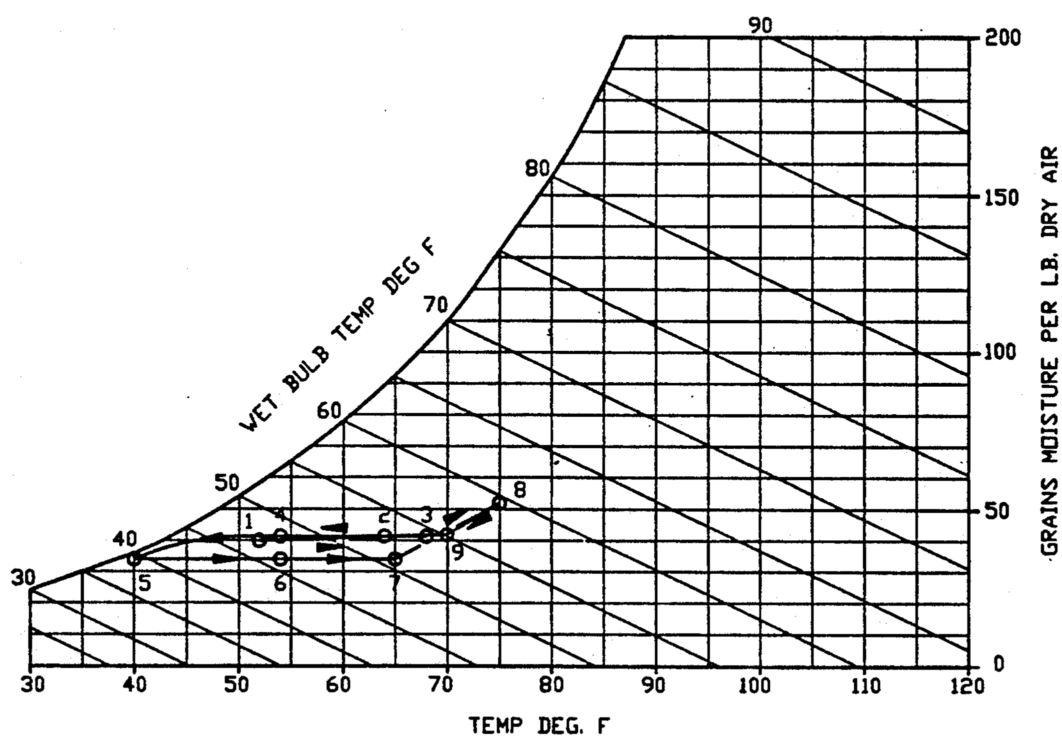

FIG. 110 is a psychrometric chart showing the psychrometric course of the operation of the apparatus of FIG. 108 on winter cycle.

Figure 111:
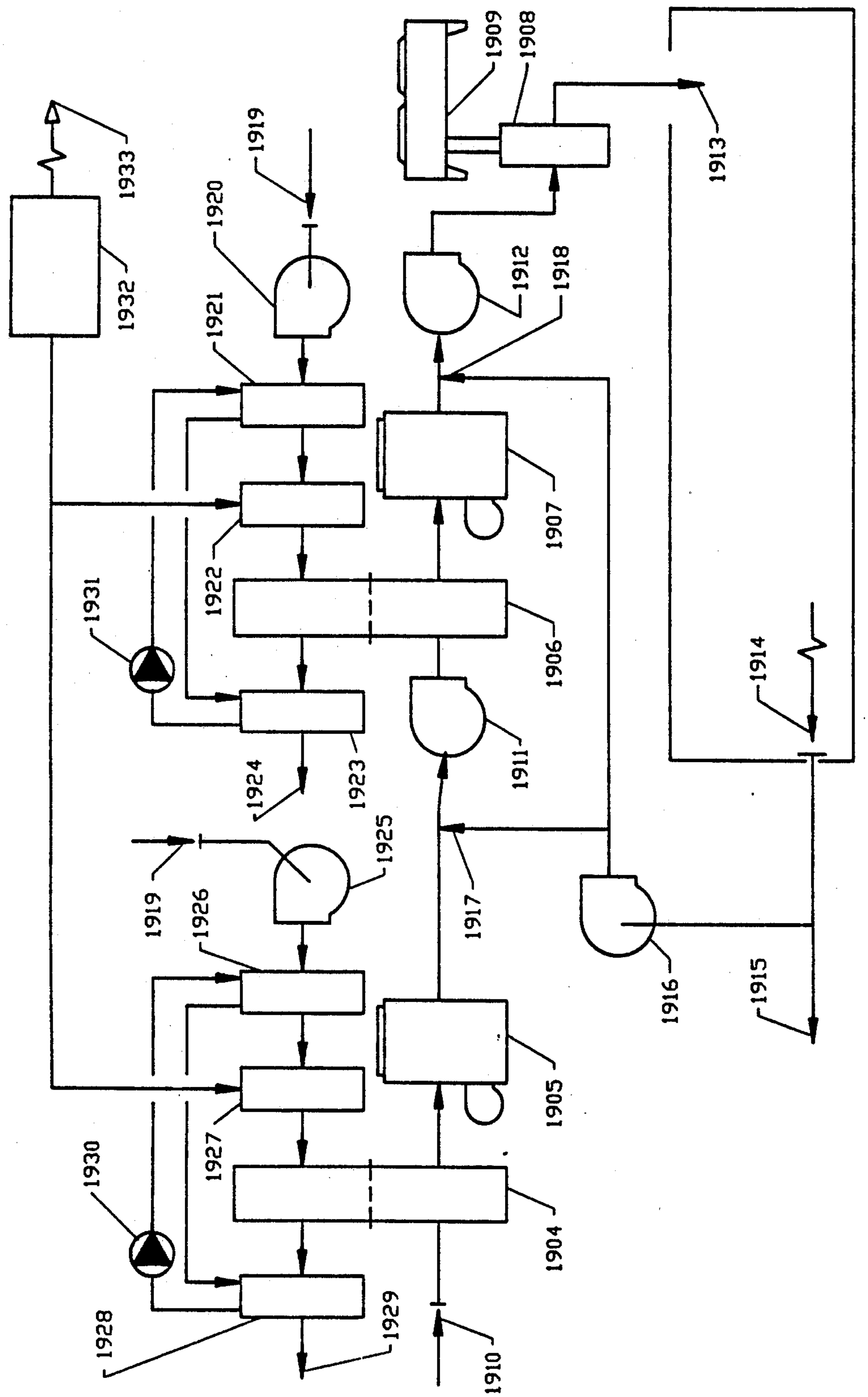

FIG. 111 is a schematic diagram showing air conditioning apparatus according to the invention which comprises first and second desiccant dehumidifiers, first and second indirect evaporative coolers, and a DX coil served by a condensing unit for conditioning air and a cogenerator to provide electricity for a building served by the apparatus and heat for regeneration of the desiccant dehumidifiers.

Figure 112:
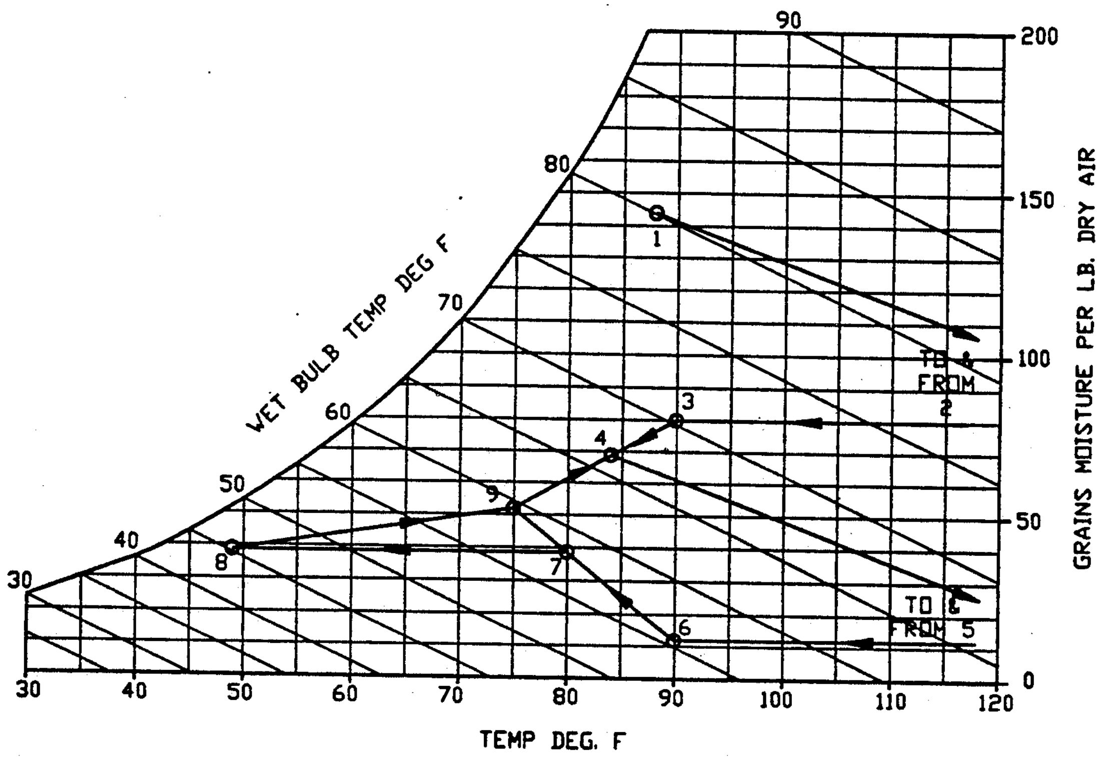

FIG. 112 is a psychrometric chart showing the psychrometric course of the operation of the apparatus of FIG. 111 on summer cycle.

Figure 113:
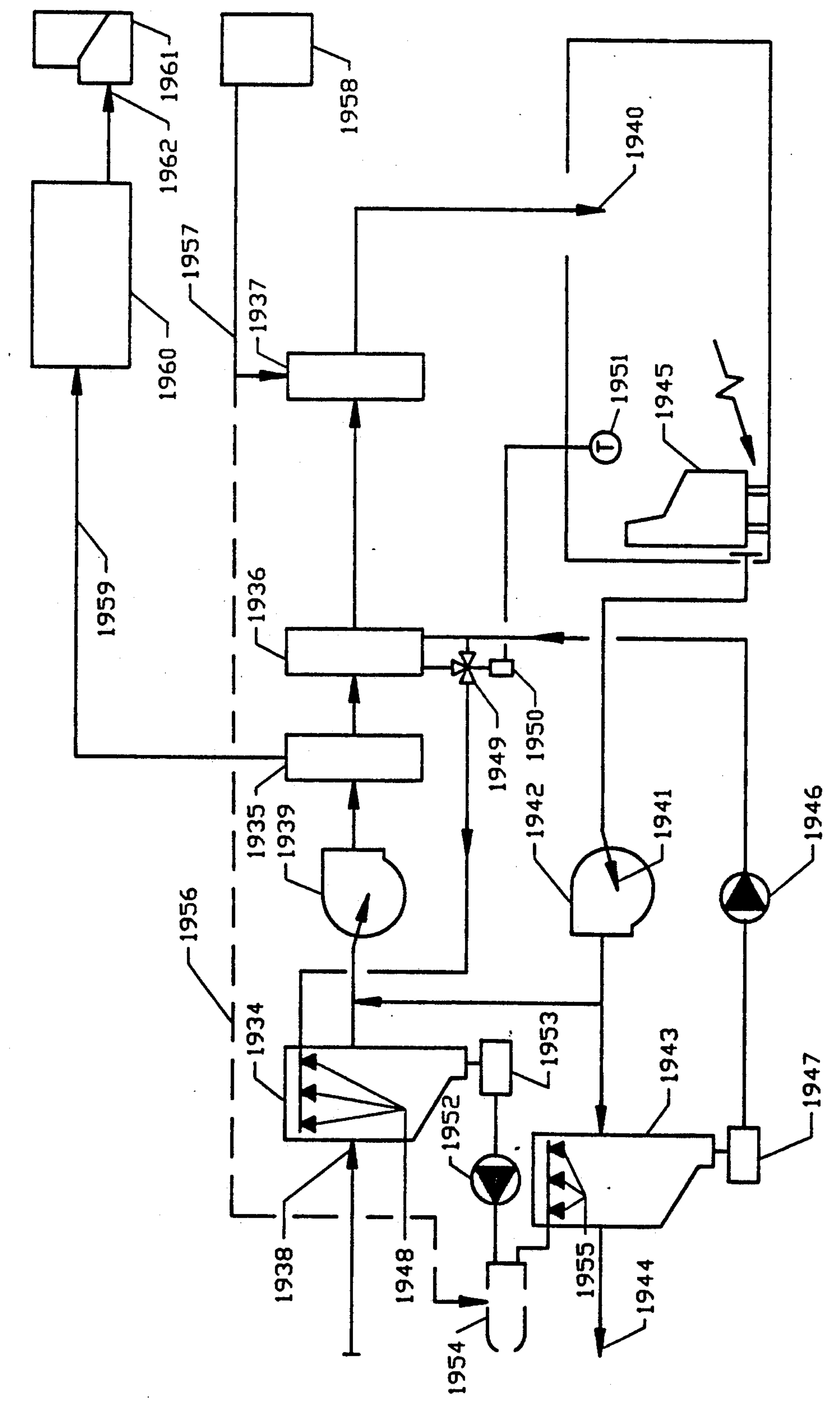

FIG. 113 is a schematic diagram showing air conditioning apparatus according to the invention which is particularly suited for use in a supermarket and comprises a liquid desiccant dehumidifier, a cooling coil served by apparatus for making and storing ice, and a heating coil for conditioning air.

Figure 114:
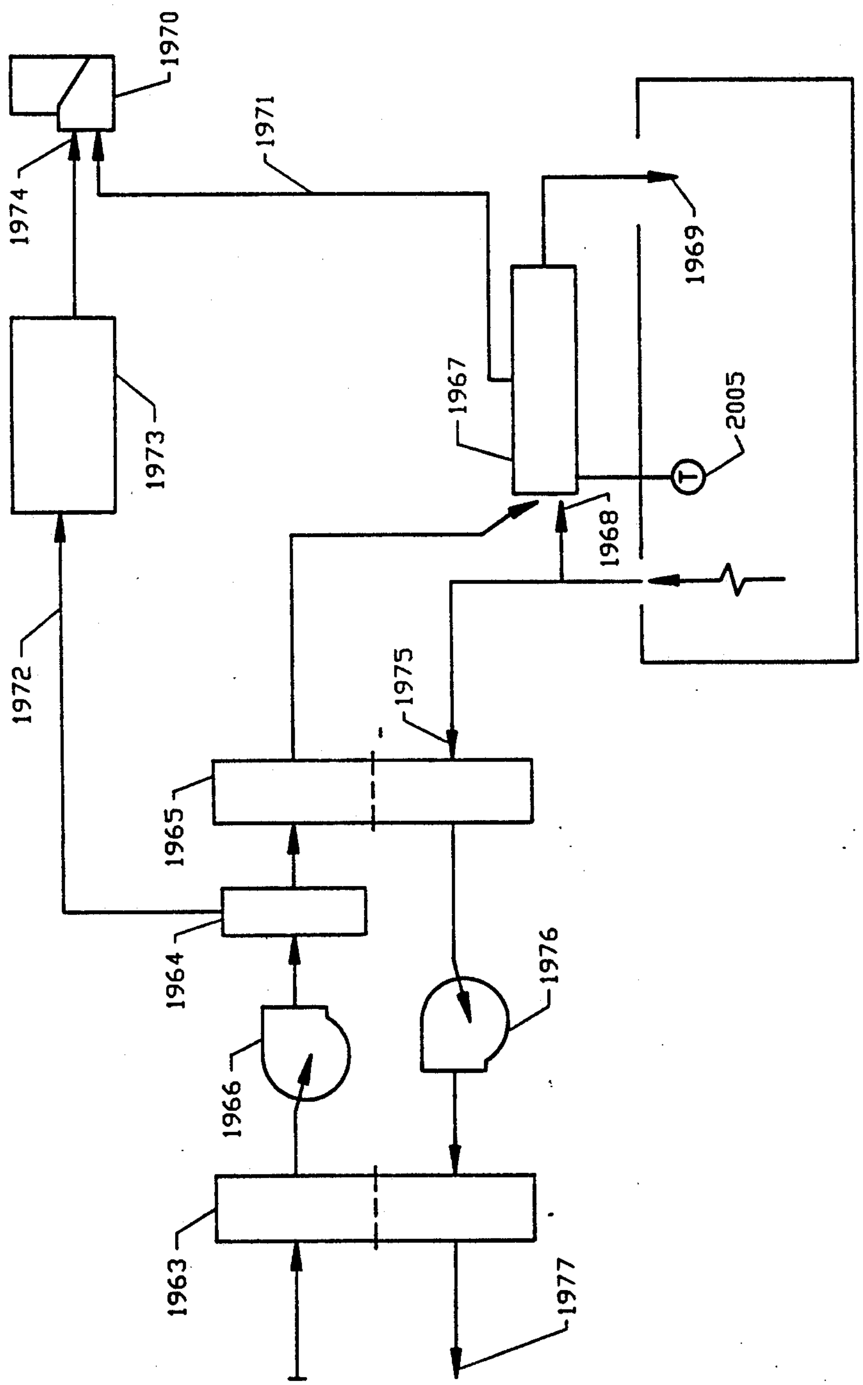

FIG. 114 is a schematic diagram showing air conditioning apparatus according to the invention which comprises a solid desiccant dehumidifier, a cooling coil served by apparatus for making and storing ice and a heat exchanger for conditioning air, and an induction mixing unit served by a unitary heat pump for controlling the temperature of a space served by the apparatus.

Figure 115:
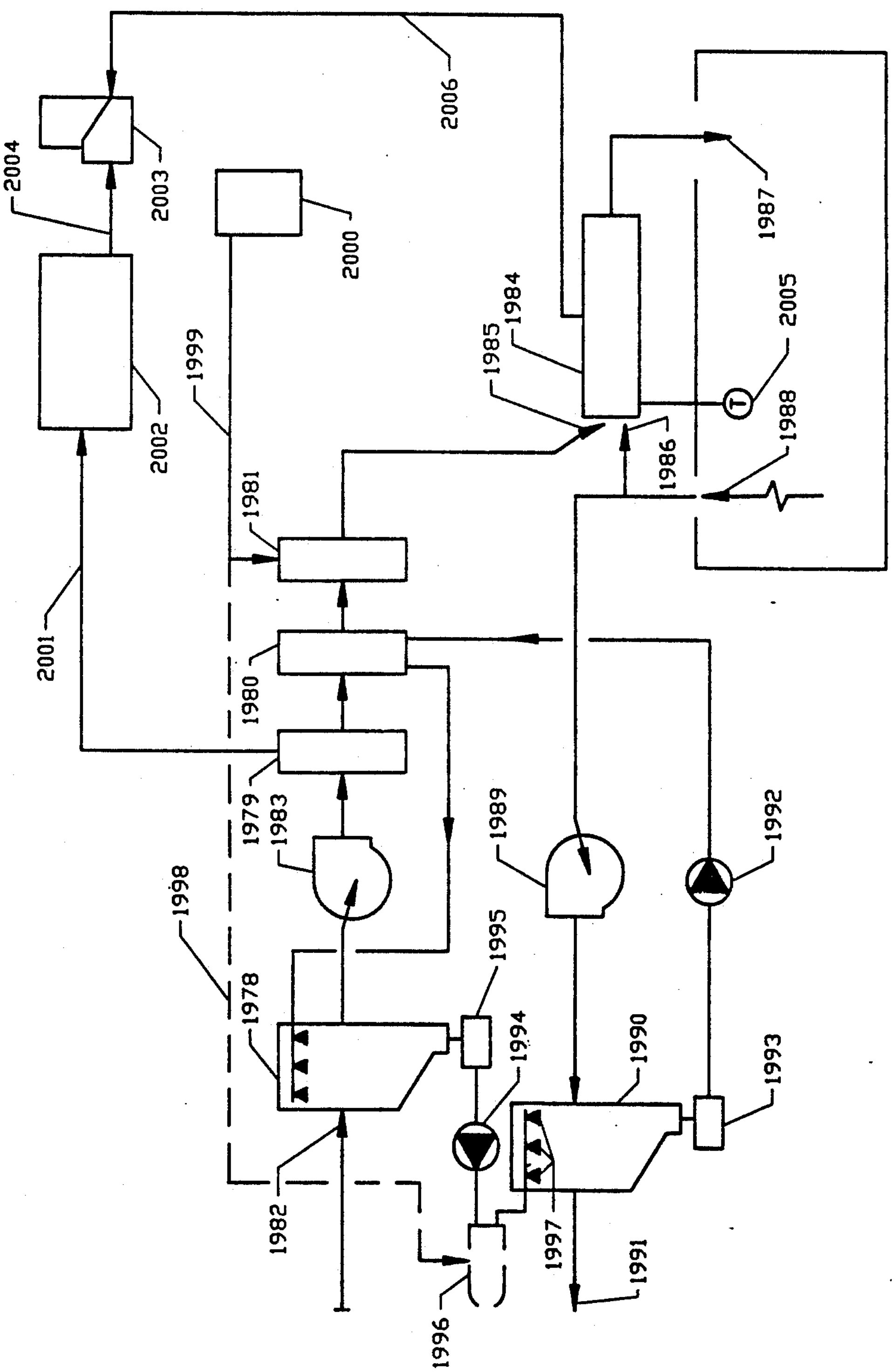

FIG. 115 is a schematic diagram showing air conditioning apparatus according to the invention which comprises a liquid desiccant dehumidifier, a cooling coil served by apparatus for making and storing ice, a heat transfer coil for transferring heat to conditioned air from the desiccant of the desiccant dehumidifier, and a heating coil for conditioning air, and an induction mixing unit served by a unitary heat pump for controlling the temperature of a space served by the apparatus.

Figure 116:
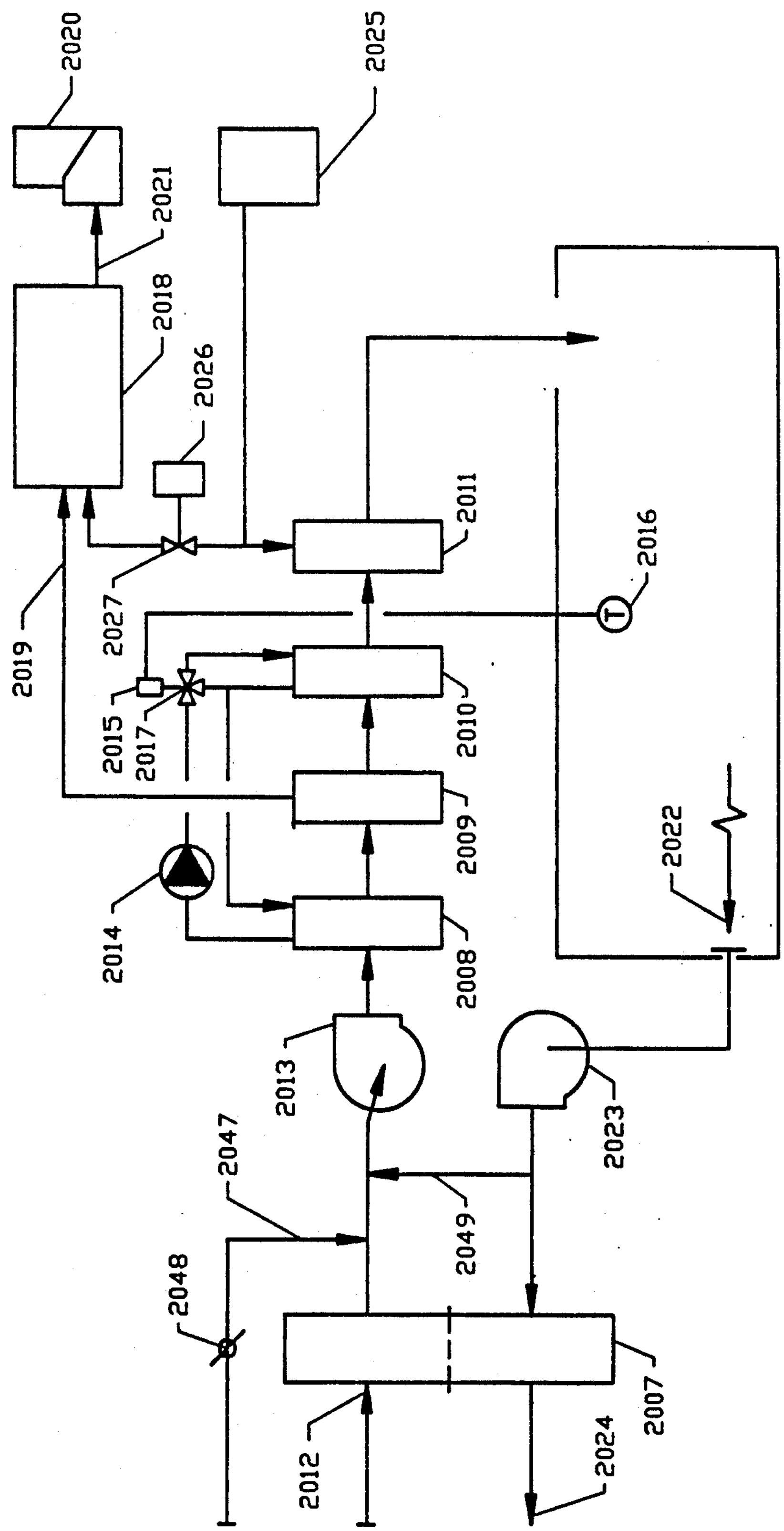

FIG. 116 is a schematic diagram showing air conditioning apparatus according to the invention which comprises a solid desiccant dehumidifier, a heat exchanger, a cooling coil served by apparatus for making and storing ice, a heat exchanger and a second cooling coil served by the apparatus for making and storing ice for conditioning air.

Figure 117:
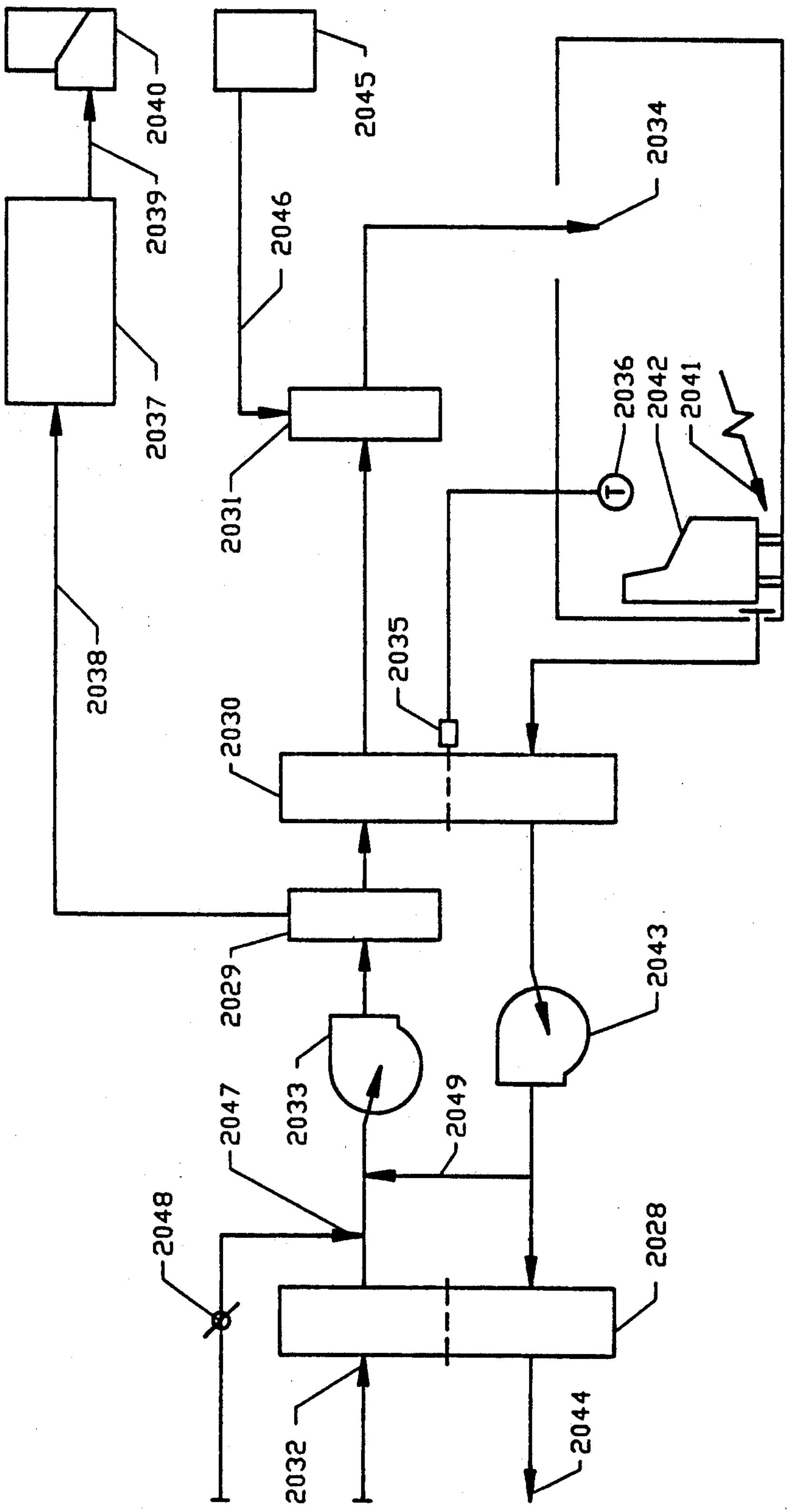

FIG. 117 is a schematic diagram showing air conditioning apparatus according to the invention which comprises a solid desiccant dehumidifier, a cooling coil served by apparatus for making and storing ice, a heat exchanger and a heating coil for conditioning air.

Figure 118:
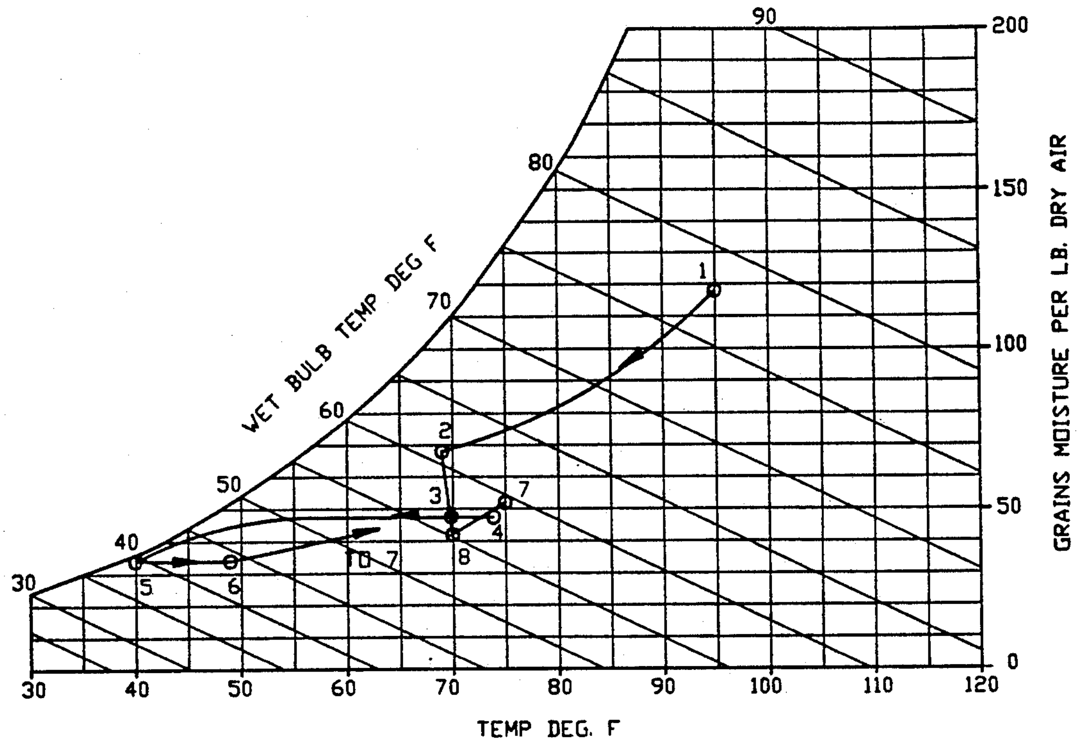

FIG. 118 is a psychrometric chart showing the psychrometric course of the operation of the apparatus of FIG. 113 on summer cycle.

Figure 119:
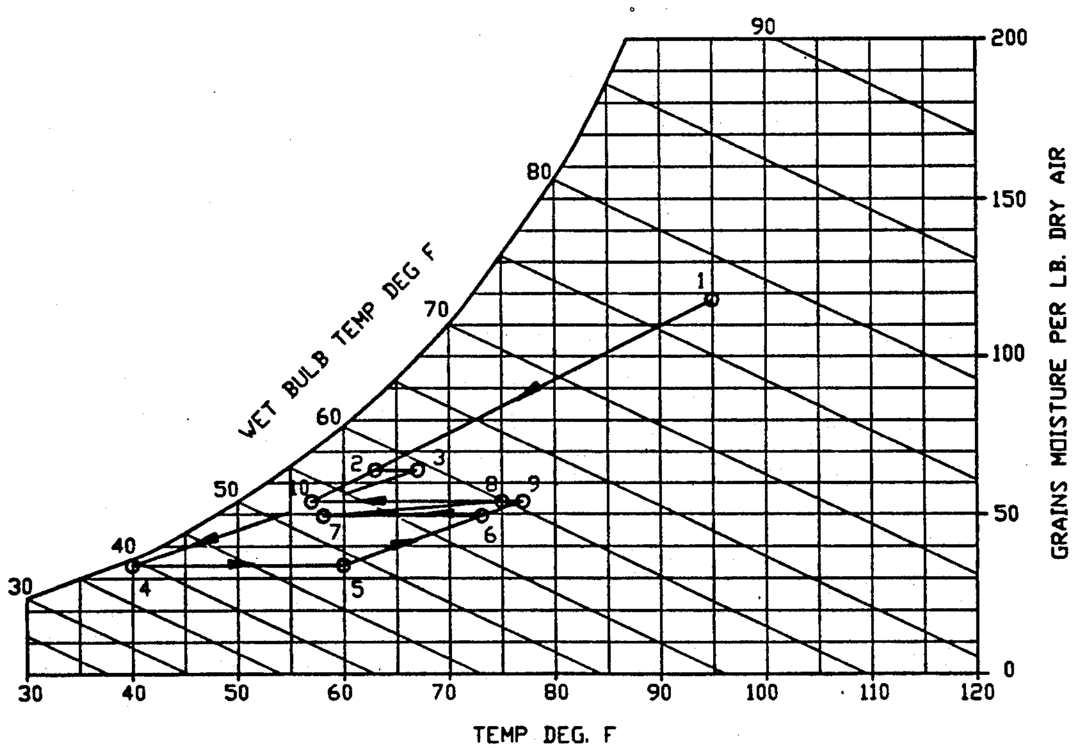

FIG. 119 is a psychrometric chart showing the psychrometric course of the operation of the apparatus of FIG. 114 on summer cycle.

Figure 120:
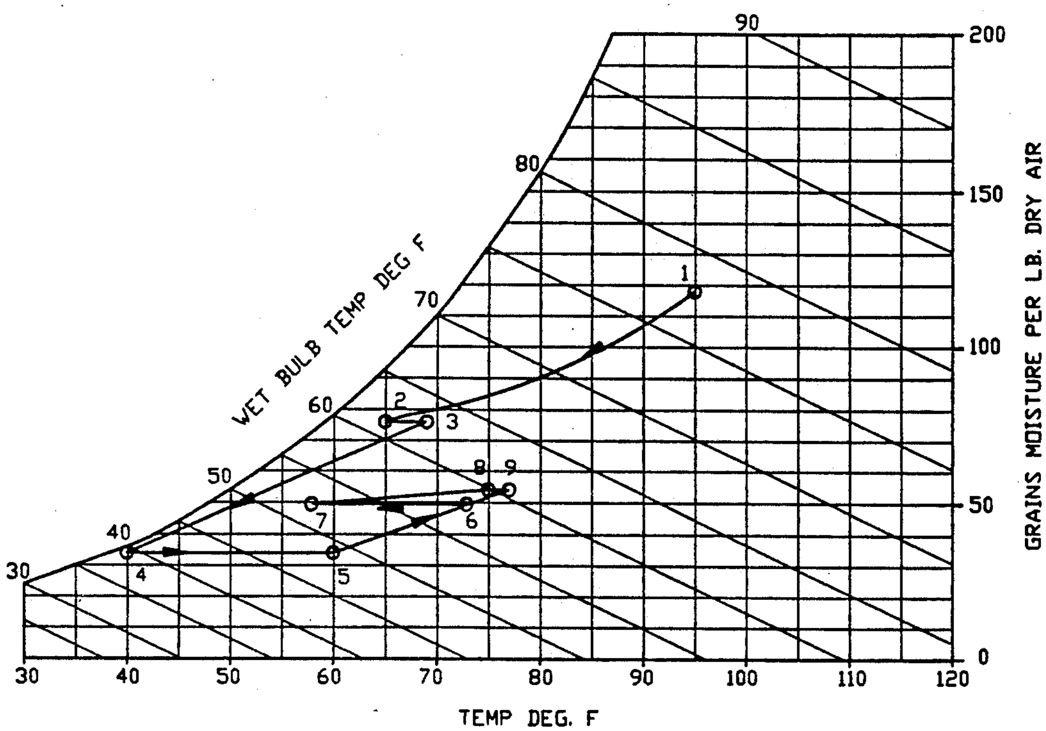

FIG. 120 is a psychrometric chart showing the psychrometric course of the operation of the apparatus of FIG. 115 on summer cycle.

Figure 121:
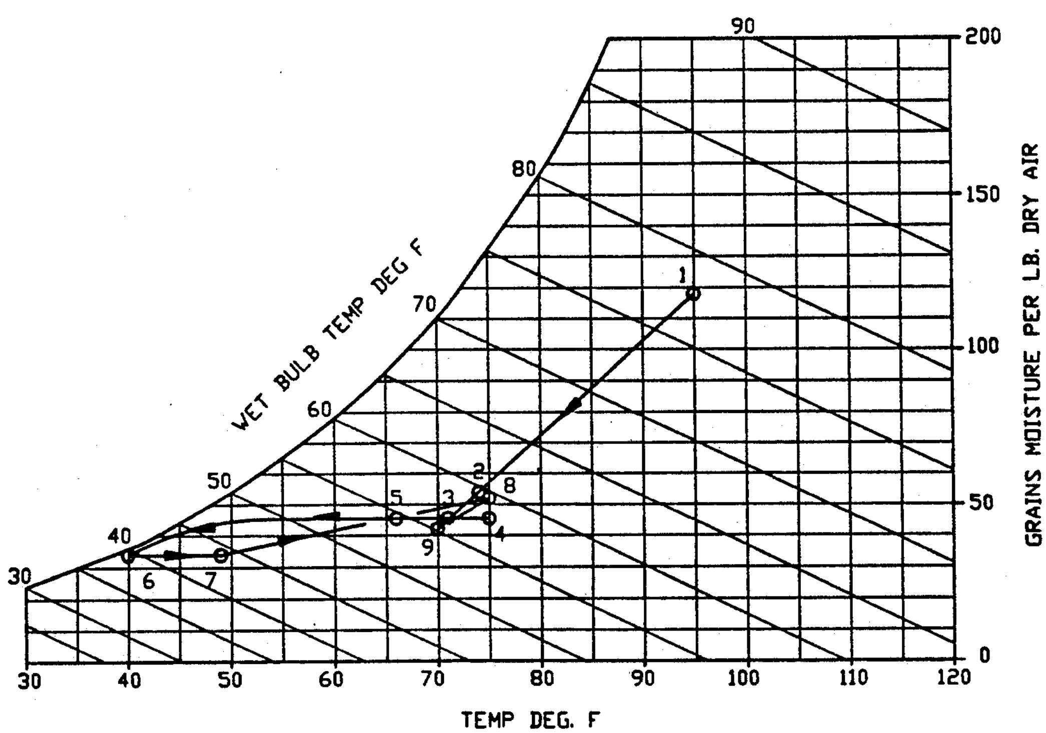

FIG. 121 is a psychrometric chart showing the psychrometric course of the operation of the apparatus of FIG. 116 on summer cycle.

Figure 122:
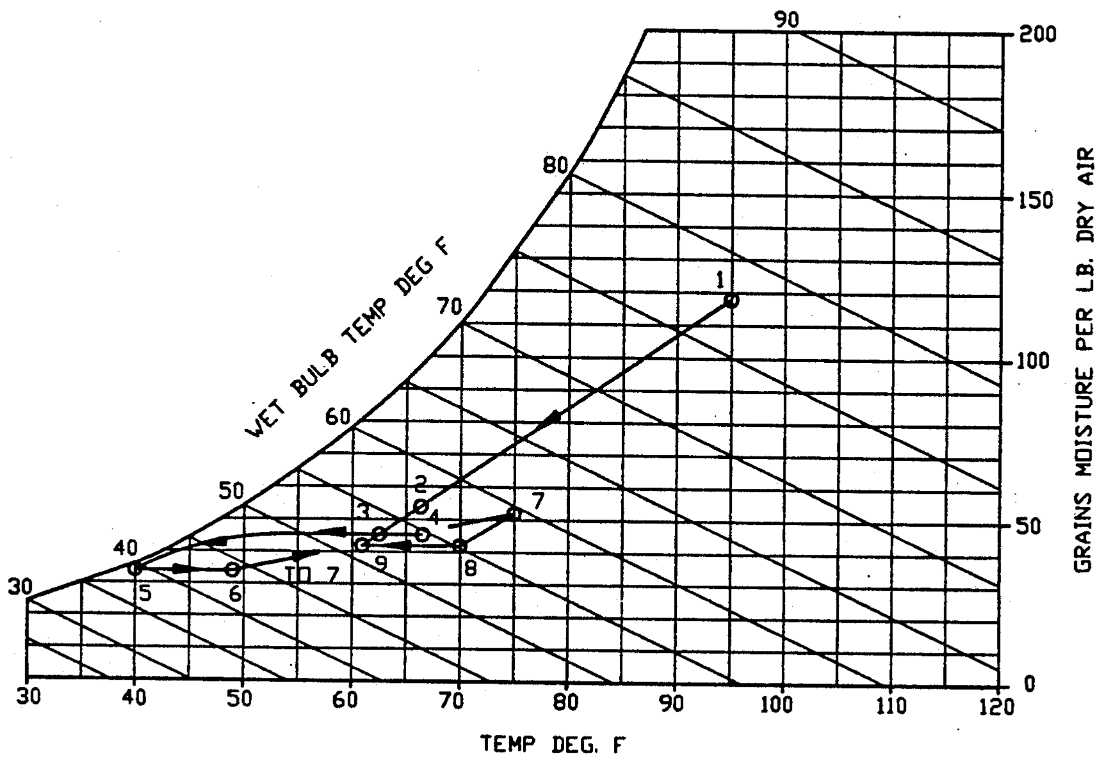

FIG. 122 is a psychrometric chart showing the psychrometric course of the operation of the apparatus of FIG. 117 on summer cycle.

DESCRIPTION OF THE PREFERRED EMBODIMENTS

Preferred apparatus according to the invention is shown in FIG. 1 connected for operation on summer cycle and in FIG. 2 connected for operation on winter cycle.

The apparatus of FIGS. 1 and 2 comprises an air conditioner 10, an air handler 11 served by compression and absorption refrigeration apparatus indicated generally at 12 and 13, respectively, a plurality of induction mixing units (one is indicated at 14) for perimeter zones, and a plurality of induction mixing units (two are indicated at 15) for interior zones.

The conditioner 10 is a dehumidifier in summer operation and a humidifier in winter operation. It is associated with a regenerator 16, a storage tank 17 and heat exchangers, pumps and sumps as subsequently described in more detail.

The compression refrigeration apparatus 12 comprises a compressor 18, an evaporative condenser 19, evaporators 20 and 21 and expanders 22 and 23.

The absorption refrigeration apparatus 13 comprises a generator 24, a condenser 25, an expander 26, an evaporator 27, an absorber 28 and a heat exchanger 29.

The apparatus also comprises a solar collector 30 and a cogenerator indicated generally at 31, and comprising a diesel engine 32 and an operatively associated electric generator 33.

SUMMER OPERATION OF THE APPARATUS OF FIGS. 1 AND 2—DAY CYCLE

Referring to FIG. 1, on summer operation, day cycle, ambient air enters the apparatus through a preheater 34 as indicated by an arrow 35, and is discharged by a blower 36, flowing therefrom through a line 37 and into the conditioner 10 where it is dehumidified by contact with a lithium chloride solution which is discharged from sprays 38 over a contactor 39. Heat of sorption is removed from the contactor 39 by cooling tower water circulated therethrough as subsequently described in more detail.

Dehumidified air flows from the conditioner 10 through a line 40 to the air handler 11 where it is cooled and dehumidified by contact with coils 41, 42 and 43, to which chilled water is circulated as subsequently explained in more detail. A blower 44 receives dehumidified air from the line 40, discharging into the air handler 11 from which cooled and dehumidified air flows into a duct 45 and ultimately is delivered to the induction mixing units 14 and 15 at a rate which depends upon the instantaneous setting of dampers 46 and 47 in the induction mixing units 14 and 15, respectively.

Each of the induction mixing units 14 includes a constant speed fan 48 and a unitary heat pump having an element 49 which acts as a condenser on cooling cycle and as an evaporator on heating cycle, and a heat exchange coil 50. The fan 48 delivers air at a constant rate through a diffuser 51, as indicated by an arrow 52, the constant rate being substantially greater than the maximum at which conditioned air from the duct 45 enters the induction mixing unit 14. As a consequence, the blower 48 induces a substantial flow of recirculated air from the space being conditioned, as indicated by an arrow 53, so that it is a mixture of recirculated air and conditioned air which is returned to the space from the diffuser 51.

The induction mixing units 15 are similar to the induction mixing units 14, including blowers 54 which induce a flow of recirculated air, as indicated by arrows 55, for mixture with conditioned air from the duct 45 and delivery therewith from diffusers 56 as indicated by arrows 57.

When the load on the space served by any one of the induction mixing units 14 is moderate, the heat pump in that induction mixing unit is not energized, and a control temperature is maintained by adjusting the position of the damper 46 to cause the flow of primary conditioned air to vary between the minimum required for ventilation, say, 0.12 cubic foot of air per minute per square foot of floor space served by the induction mixing unit 14, and a maximum when the damper 46 is in its fully opened position. Whenever the maximum flow of conditioned air from the duct 45 is insufficient to compensate for heat gains to the space served by one of the induction mixing units 14, the heat pump thereof is energized to pump heat from the coil 50 to the element 49. The coil 50 is positioned so that recirculated air from the space flows, as indicated by the arrow 53, in heat transfer relation therewith; as a consequence, the recirculated air is cooled to, say, 64° F. (18° C.). The temperature of the mixture of recirculated and primary conditioned air delivered to the space from the diffuser 51 is lowered correspondingly; the heat pump is operated as necessary to maintain the set temperature. The recirculated air from the space has a dew point of about 57° F. (14° C.); accordingly, cooling that air to 64° F. (18° C.) does not cause dehumidification. Heat is removed from the element 49 by water circulated through lines 58 and 59, as subsequently explained in more detail. When the minimum ventilation air from the duct 45 causes excessive cooling of the space served by one of the induction mixing units 14, the heat pump is energized to pump heat to the coil 50 from the element 49 and water circulated through the lines 58 and 59.

The induction mixing units 15 deliver a mixture of conditioned air and recirculated air to maintain space temperature, the proportions in which conditioned air and recirculated air are combined to produce the mixture that is so-delivered depending upon the settings of the dampers 47.

A hygroscopic solution, preferably aqueous lithium chloride, is circulated from a sump 60 by a pump 61 through a line 62 to the sprays 38 and through a line 63 to a heat exchanger 64. The hygroscopic liquid from the sprays 38 flows over the contactor 39, dehumidifying air circulated through the conditioner 10 as previously described, and then flows from the bottom of the conditioner 10 through a line 65 back to the sump 60. Hygroscopic liquid from the line 63 flows through one side of the heat exchanger 64 and a line 66 to the storage tank 17, while a pump 67 circulates hygroscopic liquid from the storage tank 17 through a line 68, the other side of the heat exchanger 64 and a line 69 to the sump 60. The rates of flow to and from the sump 60 are correlated to maintain a constant liquid level therein. Heat of sorption is transferred to water circulated from a cooling tower 70 by a pump 71 through a line 72, a line 73, the contactor 39 and lines 74 and 75 back to the cooling tower 70.

As is subsequently explained in more detail, the storage tank 17, at the beginning of summer-day cycle operation, can contain an aqueous 42 to 44 percent by weight solution of lithium chloride. As operation proceeds during the course of the day the solution in the tank 17 is gradually diluted by moisture removed from air in the conditioner 10. The lithium chloride concentration may be as low as 37 to 39 percent by weight at the end of a day of operation.

The solar collector 30 is operatively connected so that it can be used, whenever there is enough solar energy available, as a heat source for the regeneration of lithium chloride solution in the tank 17. This is done by operating a pump 76 to circulate water through a line 77, the solar collector 30, a line 78, a heat exchanger 79 and a line 80 back to the pump 76, while also circulating lithium chloride solution to be regenerated through the heat exchanger 79 and then to sprays 81 in the regenerator 16. When the solar collector 30 is being used to supply heat for lithium chloride solution regeneration, a pump 82 causes the lithium chloride solution to flow from the tank 17 through a line 83, one side of a heat exchanger 84 and a line 85 to a sump 86. A pump 87 causes lithium chloride solution to flow from the sump 86 through a line 88 to the heat exchanger 79 and from thence through a line 89, a heat exchanger 90 and a line 91 to the sprays 81. Lithium chloride solution discharged from the sprays 81 flows over a contactor 92 and from the bottom of the regenerator 16 through a line 93 to the sump 86. A portion of the lithium chloride solution flowing through the line 88 is diverted to a line 94 from which it flows through the heat exchanger 84 and a line 95 back to the storage tank 17.

Lithium chloride solution flowing over the contactor 92 in the regenerator 16 is in contact with air which flows through a line 96, a heat exchanger 97 and a line 98 into the regenerator 16, from which it is withdrawn by a blower 99; air discharged from the blower 99 flows through a line 100 and the heat exchanger 97 into a line 101 from which it is vented.

The conditions of air entering the air handler 11 from the line 40 depend upon the temperature that water circulated through the contactor 39 of the conditioner 10 is able to maintain and the concentration of the lithium chloride solution in the sump 60. For example, if the contactor 39 is able to remove enough heat of sorption that air leaves the conditioner 10 at 95° F. (35° C.), that air will contain 50 to 55 grains of water per pound of dry air when the solution in the sump 60 contains 44 percent by weight of lithium chloride, 65 to 70 grains of moisture per pound of dry air when the solution contains 37 percent by weight of lithium chloride.

In the air handler 11, dehumidified air from the line 40 is cooled by contact with the coil 41, cooled or cooled and dehumidified by contact with the coil 42 and cooled and dehumidified by contact with the coil 43. Heat is removed from the coil 42 by chilled water at, say, 58° F. (14° C.) circulated from the evaporator 20 of the compression refrigeration apparatus 12 by a pump 102 through a line 103, the coil 42 and, through a line 104, back to the evaporator 20. Refrigerant in the apparatus 12 is circulated from the compressor 18 through a line 105, the evaporative condenser 19, a line 106, a line 107, the expansion device 23, a line 108, the evaporator 20 and a line 109 back to the compressor 18. Air from which heat is removed by the coil 42 has previously given up heat to the coil 41, from which heat is removed by chilled water at, say, 58° F. (14° C.) circulated from the evaporator 27 of the absorption refrigeration apparatus 13 by a pump 110 through a line 111, the coil 41 and a line 112 back to the evaporator 27. The coils 41 and 42 supplement one another. For example, the coils 41 and 42 can be designed, at maximum design load, to cool air circulated thereover from 95° F. (35° C.) to 72° F. (22° C.) and from 72° F. (22° C.) to 58° F. (14° C.), respectively. When the load is below the maximum, air from the line 40 and air leaving the coil 41 will be at lower temperatures; therefore, the compression refrigeration apparatus will operate less, and require less electrical energy to maintain an exit temperature of 58° F. (14° C.) from the coil 42.

The diesel engine 32 is operated to drive the generator 33, electricity from the latter being delivered to the building electrical grid (not illustrated) and heat from the former being used to supply energy to the generator 24 of the absorption refrigeration apparatus 13. Heat is transferred from the diesel engine 32 to the generator 24 by a circulating system which includes a pump 113, a portion of the flow being through a line 114, through the water jacket of the diesel engine 32, and through a line 115 and, the remaining portion of the flow being through a line 116, a heat exchanger 118 through which exhaust gases from the diesel engine 32 are circulated and through a line 117; the flow from both of the lines 115 and 117 is through lines 119 and 120, the generator 24 and lines 121 and 122 back to the pump 113. Valves 123 and 124 prevent the flow of water through lines 125 and 126 to and from the heat exchanger 90.

Heat is removed from the condenser 25 and the absorber 28 of the refrigeration apparatus 13 by water circulated thereto from the cooling tower 70 or another cooling tower (not illustrated) through lines 127 and 128, respectively, and then back to the cooling tower through lines 129 and 130. Heat is removed from the coil 43 of the air handler 11 by water at, say, 34° F. (1° C.). The chilled water is circulated from the evaporator 21, which serves as an ice storage tank, as is subsequently explained in more detail, by a pump 131 flowing through a line 132, the coil 43 and a line 133 back to the evaporator 21. Air circulated in contact with the coil 43 is cooled and dehumidified, leaving the coil 43 at a dry bulb temperature of, say, 43° F. (6° C.) and containing substantially 40 grains of moisture per pound of dry air. This air enters the duct 45 for delivery to the induction mixing units 14 and 15.

Water from the cooling tower 70 is circulated through the line 72 to a heat exchanger 134 in a loop storage tank 135 and then through the line 75 back to the cooling tower 70. Water from the loop storage tank 135 is circulated by a pump 136 through a line 137, through the lines 58, the elements 49, the lines 59 and return lines 138 and 139 back to the loop storage tank 135. The lines 137 and 138 are a part of the building sprinkler system, the latter being connected to a supply header 140 through which sprinkler water can flow to supply lines 141 to serve sprinkler heads 142. The line 137 is connected to a header 143 through which water can be circulated to lines 144 (one being shown in FIG. 1) and additional sprinkler heads 142 or, for air conditioning purposes, to remove heat from condensers of compression refrigeration apparatus (not illustrated) if ever added to the induction mixing units 15 to enable the air conditioning system to accommodate increased interior loads.

—NIGHT CYCLE

On night cycle, still referring to FIG. 1, the building is not being air conditioned; air does not enter the preheater 34; the conditioner 10, the air handler 11, the induction mixing units 14 and 15 and the absorption apparatus 13 are all idle.

The cogenerator 31 is operated to provide electricity for the compression refrigeration apparatus 12 and heat for the regeneration of lithium chloride solution from the storage tank 17. The valves 123 and 124 are set to direct hot water from the diesel engine 32 through the line 125 into the heat exchanger 90 and to return water from the heat exchanger 90 through the line 126, the line 122, the pump 113 and the line 114 to the diesel engine 32.

The pumps 82 and 87 and the blower 99 are operated. As a consequence, air is drawn into the regenerator 16 by the blower 99, and lithium chloride solution is circulated as previously described from the tank 17 through the heat exchanger 84 to the sump 86, from the sump 86 through the heat exchangers 79 and 90 to the sprays 81 in the regenerator 16, from the regenerator 16 to the sump 86, and from the sump 86 through the heat exchanger 84 and back to the storage tank 17. As a consequence of heat transferred thereto in the heat exchanger 90, and of the flow of air through the regenerator 16 caused by operation of the blower 99, the lithium chloride solution discharged from the sprays 81 is regenerated by the removal of water therefrom, and the lithium chloride solution returned to the storage tank 17 is of a higher concentration than that removed therefrom so that, as regeneration progresses, the volume of lithium chloride solution in the storage tank 17 decreases progressively. The apparatus also includes a float controller 145 with operable connections (not illustrated) to deenergize the pump 87 when the float controller 145 reaches a level which indicates that regeneration of the lithium chloride solution to, say, 42 to 44 percent by weight has been completed. After the pump 87 is deenergized, heat from the cogenerator 31 can be used to energize the absorption refrigeration apparatus 13 and the blower 44 can be energized to circulate air through the air handler 11 to be cooled by contact with the coil 41. In this mode of operation, the air circulated by the blower 44 is withdrawn from the space as subsequently explained in detail.

While the cogenerator 31 is operating to regenerate the lithium chloride solution in the storage tank 17, as just described, electricity from the generator 33 is used to energize the compression refrigeration apparatus 12. The compressor 18 operates to compress refrigerant and to circulate the compressed refrigerant through the line 105 to the evaporative condenser 19 and then to the line 106; from the line 106, however, the refrigerant circulates through a line 146 to the expander 22, through the evaporator 21 and then through a line 147 back to the compressor 18. The evaporator 21 is an ice maker in which water is frozen for use the next day to provide chilled water which is circulated through the coil 43 of the air handler 11, as previously described.

After regeneration of the lithium chloride solution in the storage tank 17 has been completed, as previously described, it is often advantageous to remove heat from the stored, concentrated solution therein. This can be accomplished by operating the cooling tower 70 and the pump 71 to circulate cooling tower water through the line 72 to a line 148, through a heat exchanger 149 in the storage tank 17, and from thence through a line 150 back to the line 75 and the cooling tower 70. The apparatus includes valves 151 and 152 to prevent the circulation of cooling tower water through the contactor 39 of the dehumidifier 10 and through the heat exchanger 134 of the loop storage tank 135 in this mode of operation. The apparatus also includes a valve 153 to prevent the circulation of cooling tower water through the heat exchanger 149 in the storage tank 17 in other modes of operation.

WINTER OPERATION OF THE APPARATUS OF FIGS. 1 AND 2 —DAY CYCLE

Referring to FIG. 2, on winter operation, day cycle, the diesel engine 32 operates, electricity generated being delivered to the building electrical grid, while hot water from the line 119 flows through a line 154, a heat exchanger 155 in the storage tank 17 and a line 156 back to the line 122 and the pump 113. When sufficient solar energy is available, water can be circulated by the pump 76 through the line 77, the solar collector 30, lines 157 and 158, a coil 159 in the preheater 34, and lines 160 and 161 back to the pump 76; this circulation can preheat ambient air entering the system to, say, 90° F. (32° C.). When there is insufficient solar energy, hot water from the line 119 flows through a line 162, the line 158, the coil 159, the line 160 and a line 163 back to the line 122 to preheat the ambient air. When there is excess solar energy, water from the solar collector 30 can be circulated to the coil 159 as described and, in addition, from the line 157 through a line 164, a coil 165 in the storage tank 17, and a line 166 back to the line 161.

Heat is transferred from the storage tank 17 by a circulating system which includes a pump 167, a line 168, a heat exchanger 169 in the storage tank 17, a line 170, a heat exchanger 171, and a line 172. A valve 173 is set to prevent the flow of water from the line 138 to the line 139, forcing a flow through a line 174, the heat exchanger 171, a line 175 and the valve 173 to the line 139. As a consequence, heat is transferred from the storage tank 17 to water which is circulated by the pump 136 through the elements 49 of the induction mixing units 14. The heat pumps of the induction mixing units 14 are energized, as required, to pump heat from the elements 49 to the coils 50 and to recirculated air from the space to maintain the set space temperature.

On summer cycle, as previously described, all of the air leaving the conditioner 10 flows through the air handler 11 because, as shown in FIG. 1, dampers 176 and 177 are set to prevent the flow of air therearound through a by-pass duct 178. On winter cycle, as shown in FIG. 2, the damper 176 is in an intermediate position so that air flows from the line 40 both through the air handler 11 and through the by-pass duct 178. Air from the by-pass duct 178 flows through a line 179 to the induction mixing units 14, while air from the air handler 11 flows through the line 45 and a line 180 to the induction mixing units 15. The damper 177 prevents the flow of air from the line 45 to the line 179. The interior zones served by the induction mixing units 15 require heat removal even on winter cycle. Accordingly, chilled water is circulated to the coil 43 from the evaporator 21 (which is serving as ice storage) to maintain the air delivered to the line 45 at about 43° F. (6° C.); the dampers 47 vary the rate at which this air is delivered to the induction mixing units 15 to maintain space temperature in the interior zones.

Heat can also be added to water circulated in the lines 137 and 138 by a heat exchanger 181 connected therebetween by lines 182 and 183 by circulating heated water from the solar collector 30 to the heat exchanger and back through lines (not illustrated) and inlet and return lines 184 and 185 of the heat exchanger 181.

—NIGHT CYCLE

The cogenerator 31 is operated, generating both electricity and heat. The former is delivered to the building electrical grid to power the fans 48 (which operate on demand), the pumps 113 and 136, the compressor 18 of the refrigeration apparatus 12, and the heat pumps of the induction mixing units 14, if required.

When heating is required by the perimeter space served by any of the induction mixing units 14, the fan 48 and the heat pump of that induction mixing unit 14 are operated so that air is circulated and heat is pumped to the circulated air to maintain a night temperature of, say, 58° F. (14° C.).

Heat from the cogenerator 31 is circulated to the heat exchanger 155 for storage in the tank 17 until the maximum permissible temperature or the maximum temperature required for operation the next day is achieved.

The refrigeration apparatus 12 is operated as it is on summer-night cycle to make ice, which will be used as required the next day to provide chilled water for the coil 43, as described.

The refrigeration apparatus 12 also includes a heat exchanger 186 through which refrigerant flows on its way to the evaporative condenser 19. On winter-night cycle .cooling water is circulated by a pump 187 through the heat exchanger 186 to a line 188 and from thence through lines (not illustrated) to the heat exchanger 181 and back to a line 189 and the pump 187, so that heat is added to the water circulated in the lines 137 and 138. As is subsequently explained in more detail, there may often be more heat available in the heat exchanger 186 (acting as a condenser) than is required to compensate for heat losses on winter-night cycle from the building served by the air conditioning system of the instant invention. If this is the case, the pump 187 can be operated intermittently, as required to maintain a control temperature of, say, 90° F. (32° C.) in the water leaving the heat exchanger 181 in the line 185. The evaporative condenser 19 is then operated, as required, to remove excess heat from the refrigerant circulated to the evaporator 21.

THE INDUCTION MIXING UNITS 14

Figure 4:
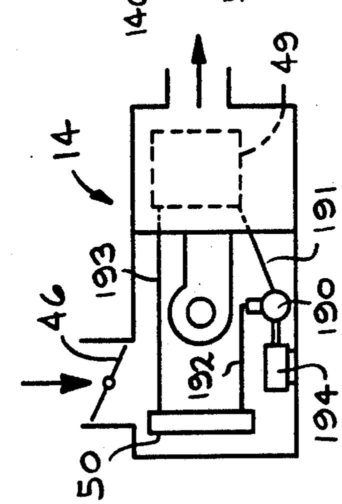
FIG. 4 is an enlarged view of an induction mixing unit which is a part of the apparatus of FIGS. 1 and 2.

The induction mixing units 14 have been described as having unitary heat pumps including an element 49 which acts as a condenser on cooling cycle and as an evaporator on heating cycle, and a heat exchange coil 50. The unitary heat pumps are commercially available, and comprise many components in addition to the elements 49 and the coils 50, including, as shown in FIG. 4, compressors 190, lines 191, 192 and 193, and motors 194 which drive the compressors 190. Refrigerant from the compressors 190 flows in one direction when heat is being pumped to the coils 50, and in the opposite direction when heat is being pumped from the coils 50. The motors 194 are electrically connected to the building electrical grid in a conventional manner (not illustrated), and are energized as required by a temperature sensor and controller (not illustrated) which also actuates the dampers 46. Primary control of temperature in a zone served by one of the induction mixing units 14 is achieved by modulation of the damper 46 between a position where the flow of conditioned air from the duct 45 on summer cycle (FIG. 1) or from the duct 178 on winter cycle (FIG. 2) is the minimum required for ventilation and a fully open position. Whenever the minimum ventilation air more than compensates for heat gains or losses in a zone, at least one of the unitary heat pumps is energized to pump heat to on summer cycle or from on winter cycle the coil or coils 50. Whenever the maximum flow of conditioned air (with the damper or dampers 46 in a full open position) is insufficient to compensate for heat gains or losses, at least one of the unitary heat pumps is energized to pump heat from or to the coil or coils 50 serving that zone.

THE SPRINKLER SYSTEM

As has been indicated above, the circulating system which includes the pump 136 and the lines 137 and 138 (FIGS. 1 and 2) is a part of the sprinkler system of the building in which the apparatus is installed. In ordinary operation, when the circulating system is being used for air conditioning purposes, makeup water is introduced into the line 137 from a line 195 (FIG. 3), flowing through an orifice 196 and a constant pressure regulating valve 197, as required, to maintain a constant pressure at a point 198 in the line 137. In this mode of operation, a valve 199 is open, while valves 200 and 201 in lines 202 and 203, respectively, are closed. However, whenever one of the sprinkler heads 142 opens there is a substantial flow of water therefrom and from the circulating system; as a consequence, a substantial flow of water from the line 195, through the orifice 196 and the constant pressure valve 197, is necessary to maintain the preset pressure at the point 198 and, because of the substantial flow therethrough, there is a relatively large pressure drop across the orifice 196. The circulating system includes means (not illustrated) to sense this pressure drop, to close the valve 199, to open one or both of the valves 200 and 201, to deenergize the pump 136 in the circulating system that is affected, and to sound an alarm. The lines 202 and 203 are connected to a supply (not illustrated) of water for fire purposes so that opening of one or both of the valves 200 and 201 puts the circulating system in "fire mode".

Figure 3:
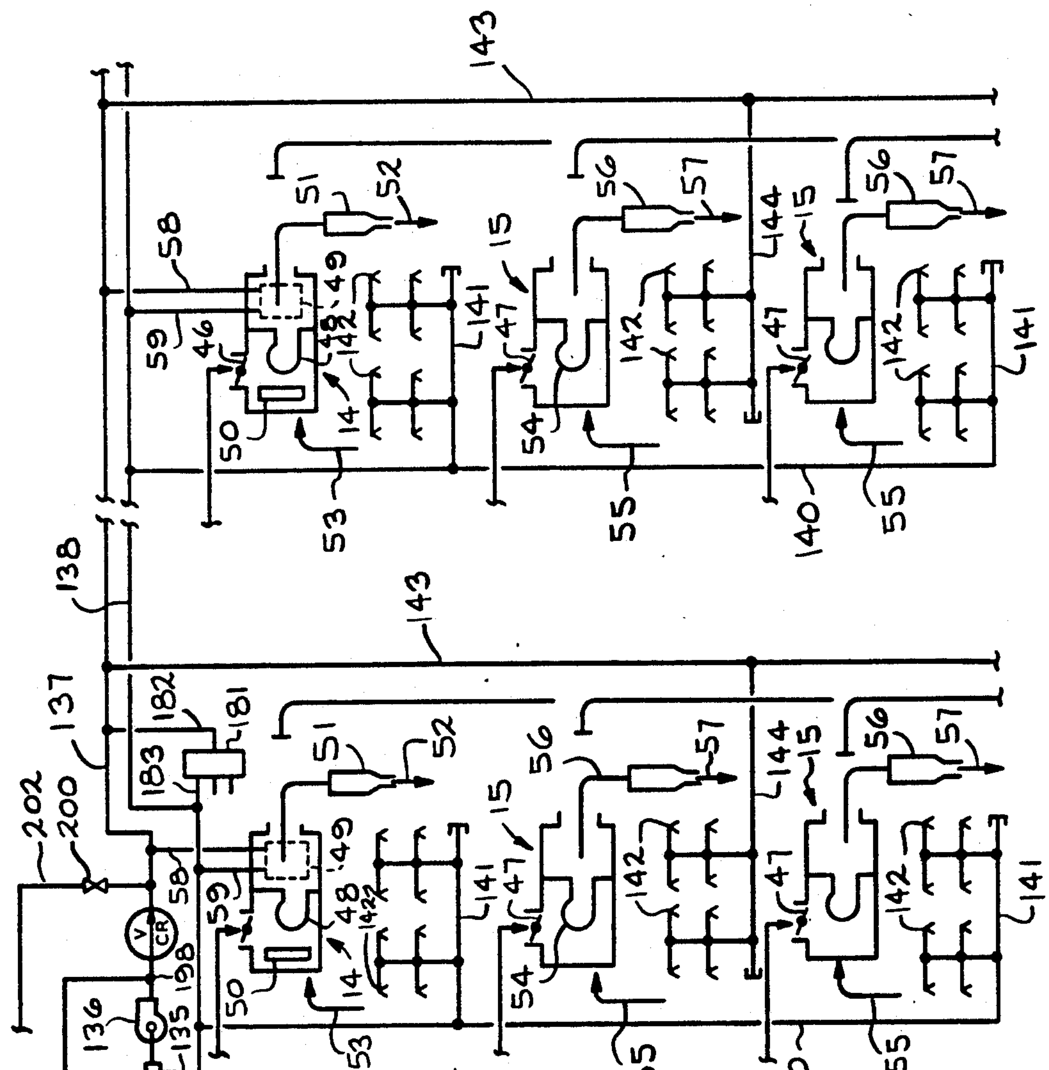
FIG. 3 is a schematic diagram showing a part of the piping of the apparatus of FIGS. 1 and 2 and the connections which enable that part of the piping to operate as a sprinkler system in the event of a fire.

It will be appreciated that a large building will include many circulating systems of the type shown in FIG. 3, and that each such system may include more or fewer than the two induction mixing units 14 and the four induction mixing units 15 shown in FIG. 3.

It is often desired to increase the air conditioning load therein after a building has been in service, for example, because it is decided to increase the amount of electronic equipment used in the building. The apparatus of the instant invention can readily be retrofitted to accommodate such an increased load. For example, compression refrigeration apparatus (not illustrated) can be added to the induction mixing units 15 to pump heat from recirculated air before it is mixed with primary, conditioned air and the condenser of the apparatus can be connected to the circulating system, for example, between the supply header 140 and 144. Similarly, the unitary heat pumps of the induction mixing units 14 can be oversized to accommodate a future increase in load or the induction mixing units 14 can be retrofitted with unitary heat pumps of increased capacity, as required.

As has been indicated above, on winter-night cycle, heat from the heat exchanger 186 (FIG. 2) is transferred to water circulated in the lines 137 and 138. The cogenerator 31 provides about 1 btu of usable heat per btu of electricity; 1 btu of electricity in the compressor 18 of the refrigeration apparatus 12 will make about 2 btu's of heat available in the heat exchanger 186.

On winter-day cycle, about one btu of heat will be required to heat outside air in the preheater 34 per btu of heat that must be introduced, to compensate for skin losses, into the circulating system which includes the pumps 136 and the lines 137 and 138. It has been found to be feasible to store in the tank 17 about one-half of the requirements of the system for heat; as a consequence, the available heat from the cogenerator 31 must equal approximately one-half of the total heat requirements of the apparatus, or must equal either the heat required to compensate for skin losses or the heat required in the preheater 34.

As has been indicated above, fresh air is not introduced into the system on winter-night cycle; as a consequence, the heat requirements at night are approximately one-half those during the day. Accordingly, on winter-night cycle, approximately twice as much heat is available in the heat exchanger 186 as is required to be transferred in the heat exchangers 171 to the circulating system which includes the pumps 136 and the lines 137 and 138. As a consequence, as previously stated, it is usually necessary to operate the evaporative condenser 19 on winter-night cycle.

There are electric resistance heaters 204, 205 and 206 (FIGS. 1 and 2) in the storage tank 17, in the loop storage tank 135 and in the heat exchanger 90, respectively. On winter-night cycle, off peak electricity can be used to energize the heaters 204 and 205 to supplement heat from the cogenerator 31, or electricity from the cogenerator 31, should there be an excess, can be so used. Similarly, on summer-night cycle, off-peak electricity can be used to energize the heater 206 to supplement heat from the cogenerator 31 or in the place thereof, or excess electricity from the cogenerator 31, should there be any, can be so used. Similarly, off-peak electricity can be used to energize the resistance heaters 204, 205 and 206, as described, and the energy so introduced into the system can be supplemented by solar energy from the collector 30, when available. Indeed, when the heaters 204, 205 and 206 are so used, the apparatus of FIGS. 1 and 2 can be modified by elimination of the absorption refrigeration apparatus 13 and of the cogenerator 31. Apparatus shown in FIGS. 6 and 7 is a modification of that of FIGS. 1 and 2 where the absorption apparatus 13 and the cogenerator 31 have been omitted.

Figure 6:
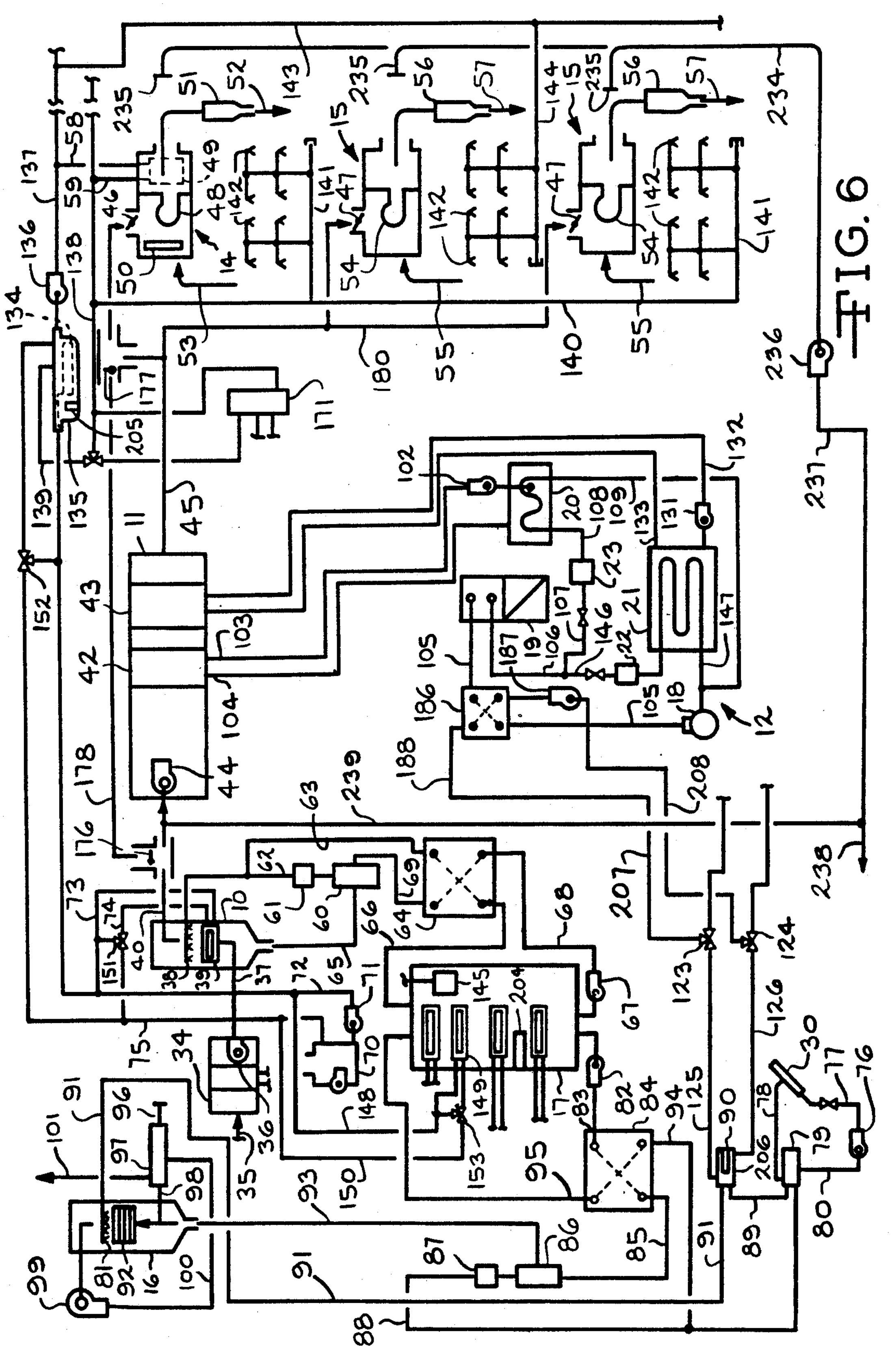
FIG. 6 is a schematic diagram of apparatus according to the instant invention that is similar to the FIG. 1 apparatus, but simplified in the sense that there are fewer components; the connections shown in FIG. 6 are those used on summer cycle.
Figure 7:
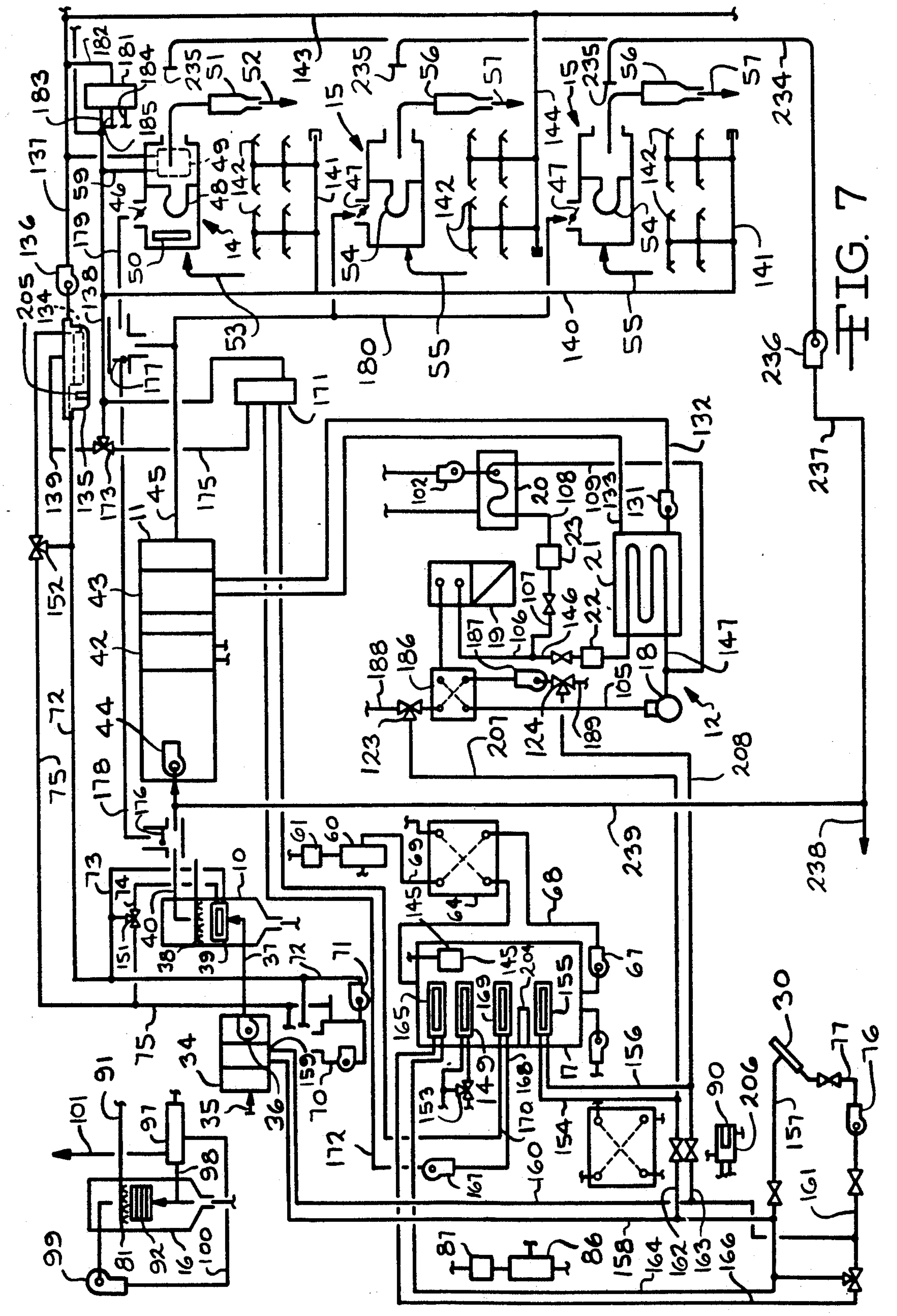
FIG. 7 is a schematic diagram of the apparatus of FIG. 6, but showing the connections among the various components that are used on winter cycle.

On summer-day cycle, referring to FIG. 6, the conditioner 10 operates as previously described, drawing desiccant solution from the storage tank 17, as required, and delivering dehumidified air to the air handler 11. The coils 42 and 43 are used as described above to remove sensible heat and moisture from the air circulated therethrough. Heat from the solar collector 30, when available, can be used as previously described to regenerate desiccant from the storage tank 17.

On summer-night cycle, the refrigeration apparatus 12 is operated as previously described to make ice, using off-peak electricity from a utility for power, while water circulated by the pump 187 through the heat exchanger 186 flows through the pipe 188, a pipe 207, the valve 123 and the pipe 125 to the heat exchanger 90, and from thence through the line 126, the valve 124, a line 208 and the line 189 back to the pump 187. Desiccant is circulated as previously described for regeneration, the necessary heat being transferred thereto in the heat exchanger 90, coming ultimately, from the compressor 18.

On winter-night cycle (see FIG. 7), as previously described, the refrigeration apparatus 12 is operated to make ice, while heat therefrom is transferred to the heat exchanger 181, as required. Off-peak electricity from a utility is used. The excess heat from the compressor 18, however, can be stored in the tank 17, being transferred to hygroscopic solution therein from the heat exchanger 186.

On winter-day cycle heat is transferred from the storage tank 17 to air in the preheater 34 and to water circulated by the pump 136 as previously described, while the heater 204 is used to provide additional heat, if required, in the tank 17.

According to a preferred embodiment, the refrigeration apparatus 12 is operated on winter-day cycle using the expander 23 and the evaporator 20. Heat is transferred from the hygroscopic solution in the storage tank 17 to refrigerant in the apparatus 12, for example in the evaporator 20, and heat is transferred from the heat exchanger 186 to air in the preheater 34 and to water circulated by the pump 136. This mode of operation is preferred because it makes significantly more effective use of electrical energy for heating than does the resistance heater 204.

Many of the advantages of the apparatus of the instant invention can be realized if the unitary heat pumps of the induction mixing units 14 are eliminated and, instead, chilled water from a source (not illustrated) is circulated to the induction mixing units 14 in the system which includes the pump 136 and the lines 137 and 138; if desired, chilled water can be so circulated to heat exchange coils (not illustrated) in the induction mixing units 15. In this mode of operation, when heating is required, separate lines to and from the induction mixing units 14 are required for the circulation of hot water thereto from a source (not illustrated).

Figure 5:
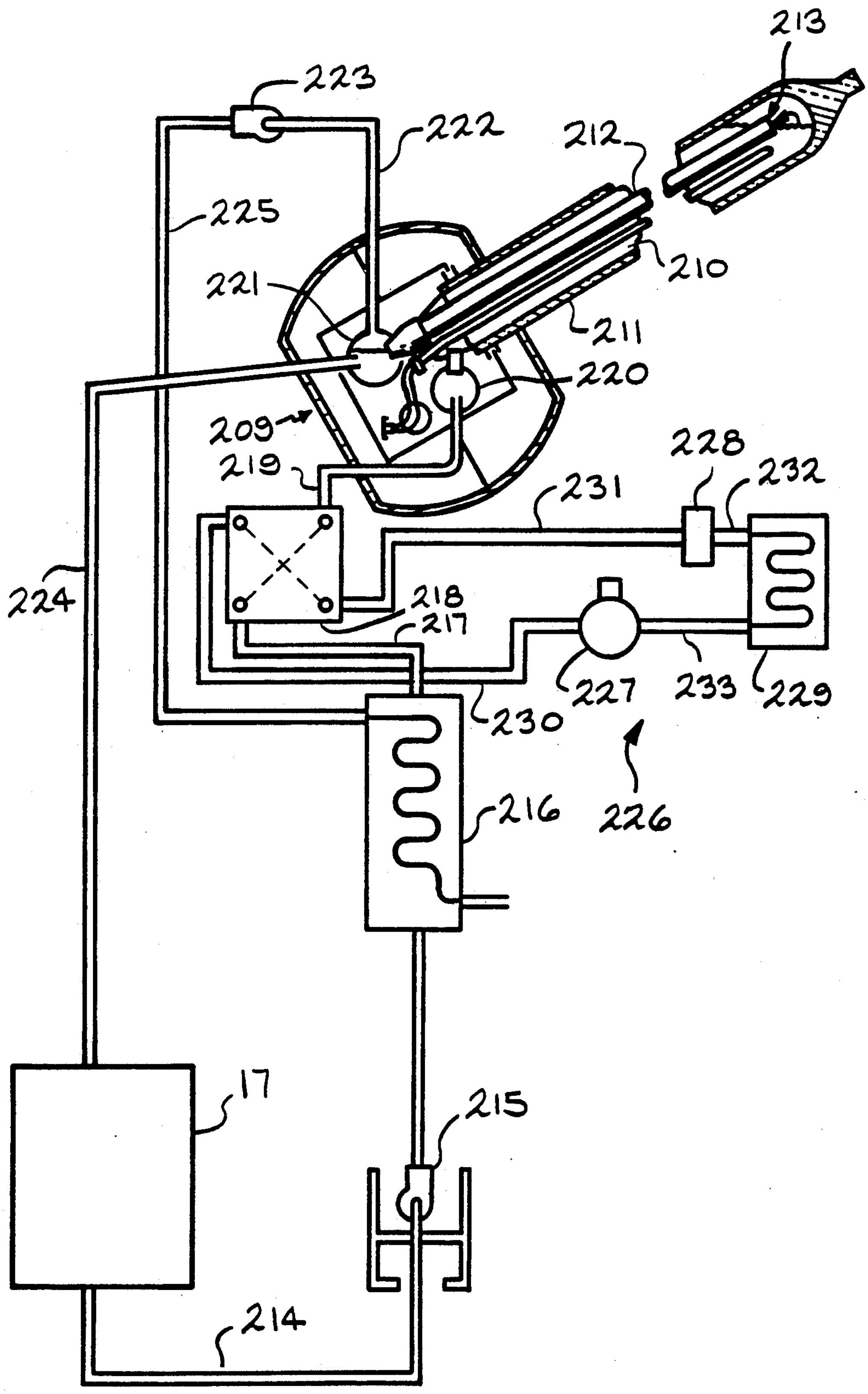
FIG. 5 is a schematic diagram showing apparatus according to the invention which includes a solar collector and is a regenerator for a liquid desiccant.

The solar collector 30 is shown in the drawings as being of the flat-plate type. Such a collector is operable, and can be used as explained above to heat desiccant in the heat exchanger 79. A different kind of solar collector can also be used in a different manner to regenerate a lithium chloride or other desiccant solution. The different type of solar collector, designated generally at 209 in FIG. 5, is one through which a liquid (water as the collector liquid has heretofore been used) flows upwardly in an annular space 210 between two concentric tubes 211 and 212, and then flows downwardly through a restrictor 213, which merely provides a relatively small diameter opening (not illustrated) through which the liquid flows into the interior of the inner tube 212; the outer tube 211 extends slightly above the end of the inner tube 212, and has a closed end so that a liquid under a slight pressure head can be caused to flow into the annular space 210, through the restrictor 213 and then downwardly through the inner tube 212. An evacuated tube collector of this type is commercially available from Sunmaster Corporation, Corning, N.Y. A battery of collectors 209 can be used to concentrate desiccant from the storage tank 17 by pumping the lithium chloride or other aqueous desiccant solution from the tank 17, through a line 214, a pump 215, a heat exchanger 216, a line 217, a heat exchanger 218, a line 219, a receiver 220, and then upwardly through the annular spaces 210 for flow downwardly through the restrictors 213 and the interiors of the central tubes 212 into a closed vessel 221 from the top of which air and vapor are withdrawn through a line 222 by a vacuum pump 223 and from the bottom of which liquid flows through a line 224 to the storage tank 17. The desiccant solution is heated as it flows through the solar collectors 209 and, as a consequence, is concentrated after it flows through the restrictors 213 because some of the water vaporizes at the lower pressure caused by the pump 223. The effluent from the pump 223 passes through a line 225 and the heat exchanger 216 in thermal contact with desiccant solution on its way to the solar collectors 209 so that water vapor therein is condensed at the elevated pressure on the discharge side of the pump 223, and the heat of vaporization is transferred to desiccant solution on its way to the solar collectors 209.

The regenerator of FIG. 5 also includes compression refrigeration apparatus indicated generally at 226. The apparatus 226 includes a compressor 227, an expander 228 and an evaporator 229, which is an ice making device. When the refrigeration apparatus 226 operates, refrigerant is pumped by the compressor 227 through a line 230, the heat exchanger 218, a line 231, the expander 228, a line 232, the evaporator 229 and a line 233 back to the compressor 227. When the apparatus of FIG. 5 is used on summer day cycle to regenerate the desiccant in the storage tank 17, it operates as a solar regenerator whenever sufficient solar energy is available and as a heat pump at other times. On summer-night cycle, the compression refrigeration apparatus 226 of the regenerator of FIG. 5 is operated, acting as a heat pump which provides the heat necessary for regeneration and simultaneously produces ice that is stored for use at some future time, as previously described.

The desiccant in the storage tank 17 (FIGS. 1, 2, 6 and 7) can also be regenerated in a closed vessel divided into two compartments by a semi-permeable membrane. The dilute desiccant is pumped under pressure into the vessel on one side of the membrane while there is a more dilute desiccant solution on the other side of the membrane. Reverse osmosis of water through the membrane concentrates the desiccant from the tank 17, thereby effecting concentration. The concentrated material is then returned to the tank 17.

The apparatus of FIGS. 1, 2, 6 and 7 includes a line 234 into which air from the space being conditioned is drawn through return inlets 235 by a blower 236. Air discharged by the blower 236 enters a line 237 from which a portion is vented as indicated by an arrow 238 (or used as subsequently described with reference to FIGS. 9 and 10), while another portion flows through a line 239 to the duct 40 where it is mixed with air from the conditioner 10 and processed and delivered therewith, as previously described. In a typical installation, outside air may enter the preheater 34 at a rate of 0.13 cubic foot per minute per square foot of floor space in the building served by the apparatus, while air is recirculated through the line 239 at a rate up to 0.12 cubic foot per minute per square foot of floor space and relief air is discharged as indicated by the arrow 238 at a rate of 0.13 cubic foot per minute per square foot of floor space. The fan 44 is controlled to maintain an air flow of from 0.13 to 0.25, depending upon the positions of the dampers 46 and 47 of the induction mixing units 14 and 15. The fan 236 follows the fan 44, returning air at the same rate that it is delivered by the fan 44. Relief air leaves the system, as indicated by the arrow 238, at a rate of 0.13.

Another embodiment of apparatus according to the invention is shown fragmentarily in FIG. 8, comprising the previously described cogenerator 31 and absorption refrigeration apparatus 13 (FIGS. 1, 2, 6 and 7), desiccant storage tanks 240 and 241, a conditioner/desiccant regenerator 242, an air handler 243, and various other components (not illustrated) of the apparatus of said Figs., as subsequently described.

On summer-day operation, the cogenerator 31 is operated to furnish heat to the generator 24 of the absorption refrigeration apparatus 13 and electricity for the electric grid (not illustrated) of the building served by the apparatus. Ambient air enters the apparatus of FIG. 8 as indicated by an arrow 244, flowing through an inlet 245, a damper 246, a filter 247, a heat exchanger 248, and a blower 249, from which it is discharged into the conditioner/regenerator 242, which is functioning as a conditioner. Dampers 250 and 251 are closed, while the damper 246 and a damper 252 in a duct 253 are open. As a consequence, air from the blower 249 which enters the conditioner/regenerator 242, after being dehumidified by cooled, concentrated desiccant from nozzles 254, flows through the duct 253, a bypass damper 255, a duct 256 and a blower 257 in the air handler 243. Heat is removed from the air by coils 258 and 259, being transferred in the former to chilled water from the evaporator 27 and, in the latter, to chilled water from the compression refrigeration apparatus 12 (not illustrated in FIG. 8; see FIG. 1). Chilled water from the evaporator 27 is circulated by a pump 260 through a line 261 to the coil 258 and then back through a line 262 to the evaporator 27. Chilled water from the compression refrigeration apparatus 12 is circulated to the coil 259 through lines 263 and 264, which are operably connected to the evaporator 21. Conditioned air leaves the air handler 243 of FIG. 8 in a duct 265 for delivery through ducts 266 (one of which is shown in FIG. 8) to induction mixing units 267 (one of which is shown in FIG. 8).

At the beginning of a summer day, the storage tank 240 contains a cool, concentrated, desiccant solution, preferably calcium chloride. The desiccant solution is used during the day to dehumidify air, flowing through a line 268, a pump 269, a line 270 and a line 271 to a sump 272. As is subsequently described, desiccant is pumped from the sump 272 to the nozzles 254 in the conditioner 242 to dehumidify air being conditioned; some of the desiccant solution sprayed from the nozzles 254 in the conditioner 242 flows by gravity through a line 273 to the storage tank 241, while the rest of the solution is returned to the sump 272. By the end of a summer day, a substantial proportion of the desiccant solution will have been transferred to the storage tank 241 in this way.

On summer-night cycle, heat from the cogenerator 31 is transferred to a heat exchanger 274 in the storage tank 241, the transfer being from water which flows thereto through lines 275 and 276 and returns through lines 277 and 278 to a surge tank 279.

When the desiccant in the storage tank 241 reaches an adequately high temperature for regeneration, the blower 249 is energized with the dampers 246 and 251 open and the dampers 250 and 252 closed so that there is a flow or air through the inlet 245, the blower 249, the conditioner/desiccant regenerator 242 (which is now operating as a regenerator) into the duct 253 and from thence through a duct 280, a heat exchanger 281, the damper 251 and an air outlet 282. Simultaneously, hot desiccant solution is circulated from the storage tank 241 through a line 283, the pump 269, the line 270, the line 271, a line 284 which bypasses the sump 272, and through the spray nozzles 254, returning by gravity, as previously described, from the conditioner/desiccant regenerator 242 through the line 273 to the storage tank 241. A heat transfer fluid is circulated from the heat exchanger 281 through a line 285 and a pump 286 to the heat exchanger 248 and from thence through a line 287 back to the heat exchanger 281 so that heat is transferred from warm moist air leaving the system to air entering the conditioner/desiccant regenerator 242.

The hot desiccant solution is regenerated in the conditioner/regenerator 242 by removal of water, causing its total volume to decrease. Regeneration is continued until a float 288 reaches a level which indicates completion thereof. A valve 289 is then set to direct heat from the cogenerator 31 to the generator 24 of the absorption refrigeration apparatus 13, and valves, including valves 290, 291 and 292 are set so that hot, concentrated desiccant flowing from the storage tank 241 through the line 283 passes through a heat exchanger 293, the line 270, a line 294 and a line 295 into the storage tank 240. Chilled water from the evaporator 27 of the absorption refrigeration apparatus 13 is circulated by the pump 260 through a valve 296, a line 297, a heat exchanger 298 in the tank 240 and back to the evaporator 27, while water is circulated from a cooling tower (not illustrated) through a line 299, the heat exchanger 293 and a line 300 back to the cooling tower. As a consequence, much of the heat in the desiccant solution in the storage tank 241 is rejected in the cooling tower (not illustrated) and heat is transferred from the concentrated desiccant in the storage tank 240 to the absorption refrigeration apparatus 13 to lower the desiccant temperature to about 58° F. (14° C.).

The storage tank 240 can reasonably be sufficiently large to hold the desiccant solution required for a full day of operation. However, even though the desiccant solution temperature at the start of a day of operation is 58° F. (14° C.), the tank would have to be excessively large for the thermal storage capacity to be sufficient for a full day of operation. Accordingly, the sump 272, from which desiccant solution is circulated for dehumidification, contains a heat exchanger 301 which is connected to the return line 264 from the coil 259 in the air handler 243 to enable the removal of heat from the desiccant solution as operation progresses through the course of a day.

On summer day cycle, desiccant solution flows from the sump 272 through a line 302, a pump 303 and a line 304 to the spray nozzles 254 from which it is sprayed for dehumidification as previously described. A part of the desiccant leaving the conditioner/desiccant regenerator 242 flows through the line 273 to the storage tank 241 as previously described, while the rest flows through a line 305 back to the sump 272. A valve 306 divides the flow of desiccant from the conditioner/desiccant regenerator 242 between the lines 273 and 305. In practice, concentrated desiccant from the storage tank 240 should be delivered to the sump 272 at the rate required to maintain the desired desiccant concentration therein, and desiccant from the conditioner/desiccant regenerator 242 should be delivered through the line 273 to the storage tank 241 at the same rate, to maintain a substantially constant volume of desiccant in the sump 272. Desiccant in the sump 272 is maintained at a substantially constant temperature of, say, 58° F. (14° C.) by controlling a valve 307 to cause return water from the line 264 to flow through the heat exchanger 301 or to divert the flow through a bypass line 308. In either case, the water returns through a line 309 to the evaporator 21 of the compression refrigeration apparatus 12 (not illustrated in FIG. 8; see FIG. 1).

The induction mixing unit 267 (FIG. 8) has a fan 310 which induces air to flow from the space, as indicated by an arrow 311, and in contact with a coil 312, and delivers, as indicated by an arrow 313, a mixture of induced air from the space and primary air from the duct 266. Chilled water from the line 261 is circulated through the coil 312, flowing thereto through a line 314 and returning to the line 262 through a line 315. The flow of chilled water through the coil 312 is controlled to maintain a desired space temperature by modulation of a valve 316 to cause chilled water to flow through a line 317, bypassing the coil 312, as required to avoid excessive cooling of the space.

Figure 8:
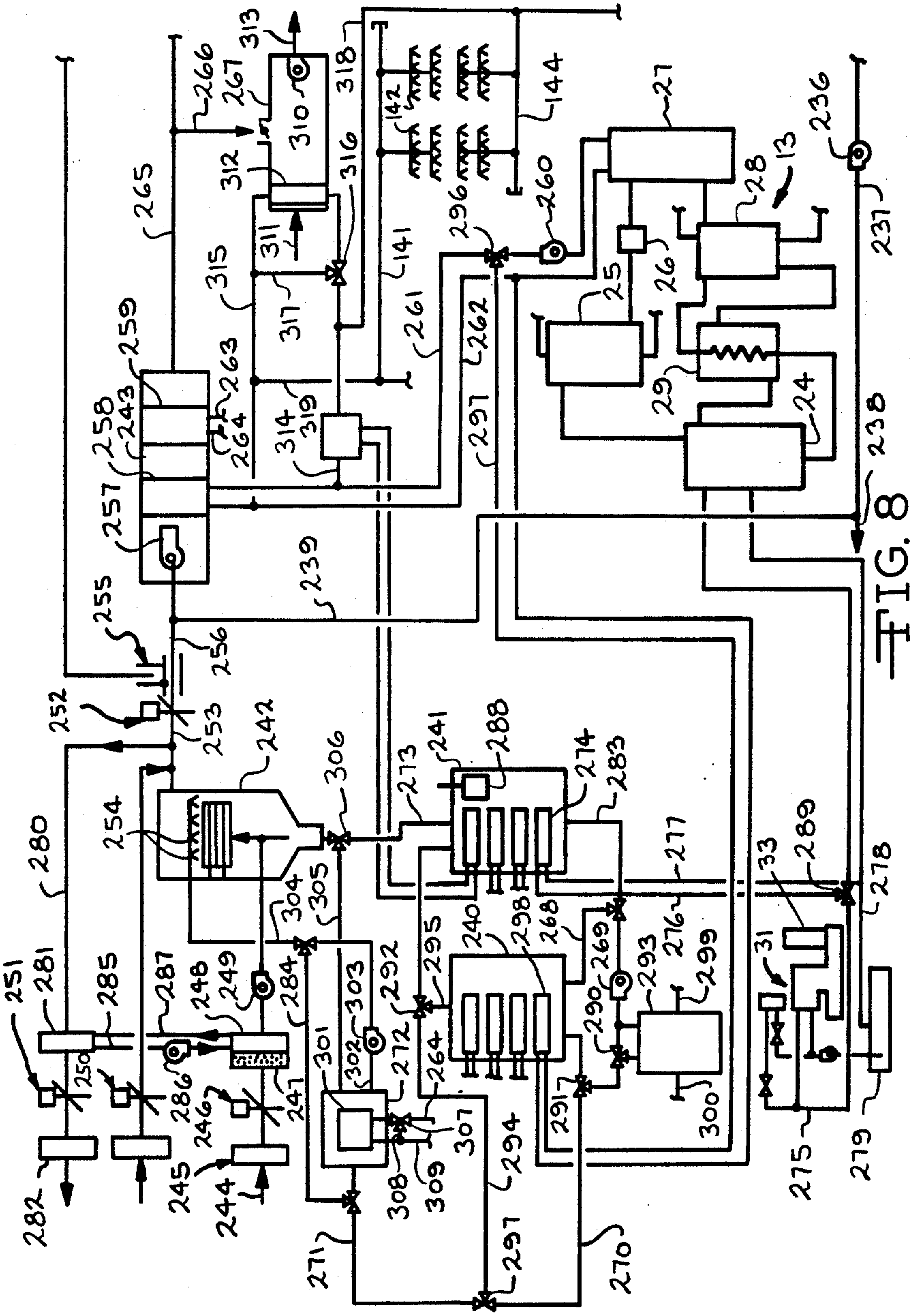
FIG. 8 is a schematic diagram of another embodiment of apparatus according to the instant invention, the embodiment of FIG. 8 being similar to that of FIGS. 1, 2, 6 and 7.

The circulating system which includes the pipes 314 and 315 is a part of the sprinkler system of the building served by the apparatus of FIG. 8, a pipe 318 being connected to the pipe 314 to circulate chilled water to the lines 144 (one of which is shown in FIG. 8) and associated sprinkler heads 142, and a pipe 319 being connected to the pipe 315 to circulate chilled water to the lines 141 (one being shown in FIG. 8) and associated sprinkler heads 142.

The apparatus of FIG. 9 includes a first stage dehumidifier indicated generally at 320 from which partially dehumidified air is delivered to the preheater 34, as indicated by the arrow 35. The dehumidifier 320 comprises a conditioner 321 and a regenerator 322. Ambient air is delivered to the conditioner 321, entering as indicated by an arrow 323, and is dehumidified by lithium chloride or the like desiccant solution sprayed from nozzles 324. Partially dehumidified air flows through a line 325 from the conditioner 321 to the preheater 34. The desiccant solution is circulated from the regenerator 322 to the conditioner 321 and back to the regenerator 322, flowing through a line 326, a pump 327 and a line 328 to the nozzles 324 in the conditioner 321, and flowing by gravity through a line 329 back to the regenerator 322, where it is sprayed from nozzles 330. Relief air leaving the space being conditioned, as indicated by the arrow 238, enters a line 331, from which it is delivered to the regenerator 322 and, after contact with the desiccant solution sprayed from the nozzles 330, is vented as indicated by an arrow 332. The rate at which desiccant solution flows from the regenerator 322 to the conditioner 321 can be controlled by modulating a valve 333 to bypass excess solution delivered by the pump 327 through a line 334 directly to the line 329.

In operation, ambient air at 91° F. (33° C.) and containing 125 grains of water per pound of dry air may enter the conditioner 321 of the first stage dehumidifier 320, and be cooled sensibly to 86.1° F. (30° C.) and dehumidified to a moisture content of 92.4 grains of water vapor per pound of dry air by contact with 32 percent by weight lithium chloride solution at a temperature of 88.5° F. (31° C.). The desiccant solution may be diluted in the conditioner 321 to 30 percent by weight lithium chloride, and heated to 90° F. (32° C.). This diluted desiccant may then be regenerated in the regenerator 322 by relief air at 83° F. (28° C.) and containing 72 grains of water vapor per pound of dry air to provide the desiccant solution containing 32 percent by weight of lithium chloride at a temperature of 88.5° F. (31° C.) for dehumidification.

The apparatus of FIG. 10 comprises a desiccant wheel 335 through which ambient air is directed as indicated by an arrow 336. Cooled and dehumidified air flows through the line 325 to the preheater 34, while relief air leaving the space is directed through the wheel, being vented as indicated by an arrow 337 after it has been heated and humidified in regenerating the wheel 335. Cargocaire Engineering Corporation markets a desiccant wheel which can be used in the FIG. 10 apparatus to achieve a result similar to that described above in connection with FIG. 9.

The apparatus of FIG. 11 comprises an air handler 338, a plurality of induction mixing units 339 (one of which is shown in FIG. 11) and refrigeration apparatus which includes a compressor 340, an evaporative condenser 341, and two different evaporators, one which serves an ice storage tank 342 and one which serves a water chiller 343. The evaporator which serves the ice storage tank 342 operates to produce ice when its operation does not increase the demand charge, for example, on night cycle when the building served by the apparatus is unoccupied, while the evaporator which serves the water chiller 343 operates when it is needed, for example, on day cycle.

Outside air can be directed through or by-passed around an indirect evaporative cooler 344, as indicated by arrows 345 and 346, before it is conditioned in the air handler 338 and distributed through risers (not illustrated) and ducts (one of which is shown in FIG. 11, designated 347) to the building. In the air handler 338, air is conditioned by contact with a coil 348 to a dry bulb temperature of substantially 42° F. (6° C.). Ice water from the ice storage tank 342 at, say, 38° F. (3° C.) is circulated by pumps 349, flowing through a line 350, the pumps 349, a line 351, the coil 348 and a line 352 back to the tank 342. The flow of ice water through the coil 348 is modulated to maintain the 42° F. (6° C.) temperature of the conditioned air leaving the air handler 338. Whenever the ambient air has a low moisture content, it is economically desirable to use the indirect evaporative cooler 344 and, thereby, to reduce the requirement for ice water in the coil 348.

Conditioned air from the duct 347 is delivered to the induction mixing units 339 at a rate which varies, depending upon the settings of individual dampers 353, each of which is actuated by a thermostat controller 354. The induction mixing units 339 are of the "fan/-coil" type, having constant speed fans 355 and coils 356. The fans 355 have a capacity greater than the maximum flow of conditioned air to the induction mixing units 339 when the dampers 353 are in their full open position; as a consequence, air is caused to flow from a space served thereby into each of the induction mixing units, mixing with conditioned air, and returning to the space from the fan discharge mixed with conditioned air. The spaces served by the induction mixing units 339 are below, while the induction mixing units 339 are above, ceilings 357. The air flow described above is indicated in FIG. 11 by an arrow having a head 358 which represents the flow of a mixture of conditioned air and recirculated air from the induction mixing unit 339 and a tail 359 which represents the flow of air from the space into the unit 339.

Chilled water flows through the coils 356, being circulated by pumps 360 through a line 361, the water chiller 343, a line 362, a main header 363, a supply line 364, a header 365 of a first sprinkler grid, one of several sprinkler conduits 366 of the first sprinkler grid, a supply line 367, the coil 356, a return line 368, one of several sprinkler conduits 369 of a second sprinkler grid, a header 370 of the second sprinkler grid, a return line 371, a main return 372 and a line 373 back to the pumps 360. The chilled water circulated through the coils 356 is at a comparatively high temperature, sufficiently high that moisture is not condensed when room air at design conditions flows over the coils 356. In a typical instance, the water in the coils 356 will be at 58° F. (14° C.), and the room air will be at 75° F. (24° C.) and 50% relative humidity. The capacity of each of the fans 355 is such that, when the air conditioning load is at the maximum design load, the associated damper 353 is in its full open position, and chilled water is flowing through the associated coil 356 at its maximum rate (as subsequently discussed in more detail), from 40 to 60% of the air conditioning load is carried by conditioned air and the rest of the load is carried by the coil 356. It has been found that, when the apparatus has these design parameters, significant savings are possible because the sizes of the ducts and blowers required to circulate conditioned air can be minimized. In a typical installation, the savings which can be realized by minimizing duct and blower sizes are nearly sufficient to offset the extra cost of the induction mixing units 339 and of the refrigeration apparatus including the compressor 340 which has the capability of making and storing ice and of providing chilled water when needed.

The operation of the induction mixing units 339 is controlled by the thermostat controllers 354. When the air conditioning load is the maximum design load in a space served by a given one of the units 339, that unit operates as just described, with the associated damper 353 in its full open position, and chilled water flowing through the associated coil 356 at the maximum rate (because a valve 374 is in its full open position). As the load on that space decreases below the maximum design load, the valve 374 is throttled by the thermostat controller 354 to reduce the flow of chilled water through the coil 356 so that less heat is transferred from recirculated air in the induction mixing unit 339. As the air conditioning load varies between the maximum design load and the maximum load that can be handled by conditioned air from the duct 347, the valve 374 is modulated between a fully open position and a fully closed position to maintain the design temperature as the air conditioning load varies. Whenever the load is less than that which can be handled by the maximum flow of conditioned air from the duct 347, the valve 374 remains closed, and the damper 353 is modulated (by the thermostat controller 354) so that the rate at which conditioned air is delivered to the induction mixing unit 339 from the duct 347 varies as required to maintain the design temperature as the air conditioning load varies. Ordinarily, it is necessary to maintain some minimum flow of ventilation air into the space being conditioned; as a consequence, the minimum setting for each of the dampers 353 is that setting which provides the minimum ventilation air, usually 0.10 to 0.15 cubic foot per minute per square foot of space served by a given induction mixing unit. Accordingly, the system is designed for a minimum air conditioning load which can be accommodated by air from the duct 347 being delivered to the space at the minimum rate required for ventilation unless some expedient that is not illustrated in FIG. 11 is used to add heat to the air delivered by at least some of the induction mixing units 339. Heat can be added, for example, by unitary heat pumps (see discussion of the induction mixing units 14 of FIGS. 1 and 2), or by circulating warm water through a second circulating system (not illustrated) to all or some of the coils 356 in the apparatus of FIG. 11.

As has been stated above, the refrigeration apparatus includes the compressor 340, the evaporative condenser 341, and two different evaporators, one which serves the ice storage tank 342 and one which serves the water chiller 343. On day cycle, the ice storage tank 342 contains a supply of ice sufficient to provide all the chilled water required by the coil 348 until the evaporator which serves the ice storage tank 342 is again operated. Only the evaporator which serves the water chiller 343 is operated, the refrigerant flow being from the compressor 340 through a line 375, the evaporative condenser 341, a line 376, a high pressure receiver 377, a line 378, a low pressure receiver 379, a line 380, a line 381, the water chiller 343, lines 382 and 383, the low pressure receiver 379 and a line 384 to the suction side of the compressor 340. The evaporator which serves the water chiller 343 is controlled to maintain the required chilled water temperature in the coils 356 of the induction mixing units 339.

The refrigeration apparatus is also operated when the water chiller 343 is idle, but to produce ice. The refrigerant flow is from the compressor 340 through the line 375, the evaporative condenser 341, the line 376, the high pressure receiver 377, the line 378, the low pressure receiver 379, the line 380, a line 385, the ice storage tank 342, a line 386, the line 383, the low pressure receiver 379 and the line 384 to the suction side of the compressor 340. Enough ice is produced while the water chiller 343 is idle to provide all the chilled water required by the coil 348 during the next period of operation of the water chiller 343.

The apparatus of FIG. 11 is highly advantageous from the standpoint of the cost of energy (electricity) required for operation. It was designed to service an addition to a shopping mall which had an air conditioning system in which a mixture of ambient air and return air was cooled to a dry bulb temperature of 55° F. (13° C.), and the cooled air was circulated as required for air conditioning. It is by comparison with the existing system that, as stated above, the savings which can be realized by minimizing duct and blower sizes are sufficient to offset the extra cost of the induction mixing units 339 and a substantial portion of the cost of the refrigeration apparatus including, the compressor 340, which apparatus has the capability of making and storing ice and of providing chilled water. In the existing mall, the energy costs are divided about equally between the requirements for lighting and the requirements of the HVAC system. A "demand" charge, which is a flat monthly fee based upon the maximum rate of energy usage, is a substantial part of the energy costs for the HVAC system; the demand charge, of course, reflects the high cost of new generating equipment, which makes it highly desirable for a utility, for the country, to keep the maximum rate at which electricity is used as low as possible. The apparatus of FIG. 11 makes ice when there is no demand charge (because the usage of energy by the shopping mall, by the community served by the utility, is low), and then uses that ice during the day to carry about one-half of the peak air conditioning load. While the refrigeration apparatus operates during the time when the electricity it uses contributes to the demand charge, its energy requirements during this time are less than half of the total requirements of the HVAC system. Furthermore, the apparatus includes a gas engine-generator 387 which can be operated to generate electricity to be supplied to the electrical grid of the building (not illustrated) as indicated by an arrow 388, to provide emergency power as indicated by an arrow 389, or both. It has been estimated that one-half of the cost of energy required by the HVAC system can be saved by using the FIG. 11 apparatus instead of duplicating the existing equipment. It is highly advantageous to operate the gas engine-generator 387 whenever such operation prevents an increase in "demand".

The apparatus of FIG. 11 also includes a cooling tower 390 and a pump 391 for circulating tower water from the cooling tower 390 through a line 392, through a plate and frame heat exchanger 393, and through a line 394 back to the cooling tower 390. Whenever the ambient humidity is sufficiently low to make it worth while, the tower 390 can be operated, and cooled water can be circulated therefrom to the heat exchanger 393 as just described for heat transfer with heat transfer fluid discharged from the pumps 360 and diverted by a three-way valve 395 to flow through a line 396, the heat exchanger 393, a line 397, a plate and frame heat exchanger 398 and a line 399 before entering the line 361 for flow to the water chiller 343 and to the coils 356 as previously described. If the water from the tower is sufficiently cold, it is not necessary to operate the water chiller; if not, reduced operation is sufficient. The apparatus also includes a three-way valve 400 which can be used to divert heat transfer fluid in the line 352 (returning to the ice storage tank 342 from the coil 348) for flow through a line 401, through the heat exchanger 398 and through a line 402 back to the line 352 for return to the ice storage tank 342. When heat transfer fluid is diverted to flow through the heat exchanger 398, as just described, the valve 395 and a valve 403 can be used to divert the flow of heat transfer fluid discharged by the pumps 360 directly into the heat exchanger 398 for heat transfer to the fluid diverted from the line 352 and flow through the lines 399 and 361 to the water chiller 343. Such operation may be advantageous whenever the ice in the ice storage tank 342 has excess heat absorbing capacity, beyond that required by the coil 348 to provide air at 42° F. (6° C.) for the rest of the day of operation. Heat exchange between the two fluids, as described, reduces the requirement for refrigeration to provide water at 58° F. (14° C.) to serve the coils 356, and may eliminate that requirement altogether if the ice has sufficient excess capacity.

The apparatus of FIG. 11 also includes a heat recovery unit 404 which can be used on night cycle to provide warm heat transfer fluid, as required, for circulation to the coils 356. This is done by closing a valve 405 at least partially so that warm refrigerant from the compressor 340 flows from the line 375 through a line 406 to the unit 404, leaving the unit 404 through a line 407 and either flowing through a line 408 back into the line 375 or flowing directly into the line 376. In either event, there is warm refrigerant in the unit 404 from which heat can be transferred to the fluid circulated by the pumps 360. This is done by setting a valve 409 to divert heat transfer fluid discharged by the pumps 360 for flow through a line 410 to the unit 404. After heat has been transferred thereto from the refrigerant in the unit 404, the fluid flows through a line 411 to the main header 363 and then through whichever ones of the coils 356 require heat and back to the pumps 360 as previously described.

Further details of the sprinkler system of the apparatus of FIG. 11 are shown in FIG. 12 where the system is indicated generally at 412. The header 365, an opposed header 413 and the sprinkler conduits 366 make up a first sprinkler grid, while the header 370, an opposed header 414 and the sprinkler conduits 369 make up a second sprinkler grid. As previously described, the line 364 is connected to discharge heat transfer fluid into the header 365, while the line 371 is connected to receive heat transfer fluid from the header 370. There are sprinkler heads 415 spaced a given distance, which may be 10 feet (3.05 meters), from one another in the sprinkler conduits 366 and in the sprinkler conduits 369. The sprinkler conduits 366 are spaced a given distance, which may be 20 feet (6.1 meters), from one another, and the sprinkler conduits 369 are spaced the same distance from one another. Each of the sprinkler conduits 366 is spaced ½ the given distance from one of the sprinkler conduits 369 or from two of the conduits 369, depending upon its position in the grid. Accordingly, the two grids jointly constitute a sprinkler system in which conduits are spaced from one another by, say, 10 feet (3.05 meters) and in which sprinkler heads in a given conduit are spaced from one another by, say, 10 feet (3.05 meters). Each grid, however, as is subsequently explained in more detail, is independently connected to a source for water to be used in case of fire, the first grid by a line 416 which is operably connected to introduce water into the header 365, and the second grid by a line 417 which is operably connected to introduce water into the header 370. It will be noted that the two grids are completely independent of one another in the sense that water or heat transfer fluid introduced into one can not flow to the other, except through the induction mixing units 339, one of which is shown in FIG. 12 with a supply line 367 connected to one of the sprinkler conduits 366 of the first grid, and a return line 368 connected to one of the sprinkler conduits 369 of the second grid.

Referring, again, to FIG. 11, the lines 416 and 417 are operably connected to a line 418, which, in turn, is connected to a source (not illustrated) for water to be used in case of fire. When the apparatus of FIG. 11 is in normal operation, an alarm check valve 419 prevents the flow of water from the line 418 to the lines 416 and 417, and a check valve 420 prevents the flow of heat transfer fluid from the header 365 through the line 416 to either of the lines 417 and 418. Since heat transfer fluid is supplied to the first grid, entering the header 365, and returns from the second grid, leaving the header 370, the pressure in the header 365 and in the line 416 exceeds that in the header 370 and in the line 417; this pressure difference prevents a flow of heat transfer fluid through the check valve 420 from the line 417 to the line 416.

The apparatus also includes a make up line 421 for heat transfer fluid which flows from a source (not illustrated) through the line 421, a valve 422 and an orifice 423 to the return line 373. The valve 422 is controlled to maintain a constant pressure at the point where the lines 421 and 373 connect. Whenever there is an excessive loss of heat transfer fluid from the system, for example, because a sprinkler head has opened, there is a pressure drop across the orifice 423. This pressure drop is sensed by any suitable means (not illustrated) and the apparatus is put in fire mode by opening the alarm check valve 419 and closing the valve 422 and a valve 424 in the line 371. Opening the alarm check valve 419 enables water for fire purposes to flow from the line 418 into both of the lines 416 and 417. This water is at a pressure sufficiently high that it flows through the check valve 420 even if there is still a reverse pressure from heat transfer fluid on the valve. As a consequence, the water flows through both of the lines 416 and 417, to the first and second sprinkler grids, and through the grids, as required, to the one or ones of the sprinkler heads 415 from which heat transfer fluid had started to flow. Closing the valves 422 and 424 prevents the flow of heat transfer fluid to the coils 356 by stopping the return to the pumps 360.

Another sprinkler system according to the instant invention is indicated generally at 425 in FIG. 13. This system comprises a first grid made up of a loop 426 and sprinkler conduits 427 and 428, and a second grid made up of a loop 429 and sprinkler conduits 430 and 431. The loop 426 is composed of four conduits, 432, 433, 434 and 435 which are operably connected so that a liquid could flow around the loop 426. The sprinkler conduits 427 are operably connected to the conduit 432 while the sprinkler conduits 428 are operably connected to the conduit 434. The loop 429 is also composed of four conduits, 436, 437, 438 and 439, which are operably connected to one another. The sprinkler conduits 430 are operably connected to the conduit 436, while the sprinkler conduits 431 are operably connected to the conduit 438. There are sprinkler heads 440 in the sprinkler conduits 427, 428, 430 and 431. The heads 440 are spaced from one another a given distance, say 10 feet (3.05 meters) in each of the conduits, and the sprinkler conduits of each grid are spaced from one another a given distance, say 20 feet (6.1 meters). Each of the sprinkler conduits of the first grid is spaced ½ the given distance from one of the sprinkler conduits of the second grid or from two such conduits, depending upon its position in the grid. Accordingly, the two grids jointly constitute a sprinkler system in which conduits are spaced from one another by, say, 10 feet (3.05 meters) and in which sprinkler heads in a given conduit and in an aligned conduit are spaced from one another by, say, 10 feet (3.05 meters). The first grid, however, is connected to the line 416 as a source for water to be used in case of fire, while the second grid is connected to the line 417. Similarly, the line 364 is connected to discharge heat transfer fluid into the first grid, while the line 371 is connected to receive heat transfer fluid from the second grid. The two grids are completely independent of one another in the sense that water or heat transfer fluid introduced into one can not flow to the other, except through the induction mixing units 339, one of which is shown in FIG. 13 with a supply line 367 connected to one of the sprinkler conduits 427 of the first grid, and a return line 368 attached to one of the sprinkler conduits 430 of the second grid.

The apparatus of FIG. 14 includes all of the elements of that of FIG. 11, all designated by the same reference numerals, and, in addition, a waste heat recovery unit 441, absorption refrigeration apparatus indicated generally at 442, pipes 443 and 444, and valves 445, 446, 447 and 448. The unit 441 is operably connected to supply heat to energize the apparatus 442. When the gas engine generator 387 is operating and the apparatus of FIG. 14 is being used on summer cycle to air condition a building, the valves 445 and 446 are open and the valves 447 and 448 are set so that heat transfer fluid discharged from the pumps 360 is directed into the line 444, flows through the absorption refrigeration apparatus 442, and is cooled before flowing through the line 443 to the main header 363 and from thence, as previously described, through the coils 356 and back to the pumps 360. In this mode of operation, there is no need for the compressor 340 to operate, as the chilled water required for the coils 356 is provided by the absorption refrigeration apparatus 442, supplemented, if required, by heat transfer from the heat transfer fluid in the heat exchanger 398 as previously described. Heat from the absorber and condenser (not illustrated) of the apparatus 442 can be transferred to the cooling tower 390.

The apparatus of FIG. 15 includes some of the elements of that of FIG. 11, specifically, the air handler 338, the induction mixing units 339 (one of which is shown in FIG. 15), the sprinkler system comprising the headers 365 and 370 and the sprinkler conduits 366 and 369, the supply and return lines 364 and 371 for circulating chilled water through the sprinkler system to the coils 356 of the induction mixing units 339, and the lines 416 and 417 for supplying water to the sprinkler system when the apparatus is in fire mode. Cooling is provided by compression refrigeration apparatus which includes a compressor 449 and by compression refrigeration apparatus which includes a compressor 450. The compressors 449 and 450 both operate on day cycle; refrigerant from the former flows to a heat exchanger 451, to an evaporator 452, and back to the compressor 449, the flow being through lines 453, 454 and 455. In the heat exchanger 451 heat is transferred from the refrigerant to water that is circulated from a cooling tower 456 through a line 457 to the heat exchanger 451 and, through a line 458, back to the cooling tower 456. The refrigerant is expanded in the evaporator 452 as required to provide chilled water at, say, 58° F. (14° C.) for circulation as previously described from the main header 363 to the coils 356 of the induction mixing units 339 and back to the main return 372 and the evaporator 452. Refrigerant flows from the compressor 450 through a line 459 to the evaporative condenser 341 and from thence through a line 460 to the coil 348, where it is expanded to maintain the air leaving the air handler 338 and entering the duct 347 at a temperature of, say, 42° F. (6° C.), returning to the compressor 450 through a line 461.

It will be appreciated that, on summer day cycle, the apparatus of FIG. 15 is identical with that of FIG. 11, insofar as the operation of the air handler 338 and of the induction mixing units 339 is concerned. However, both the compressor 449 and the compressor 450 operate when the load is at a peak; as a consequence, the peak load and the demand charge associated therewith are nearly as high as with the previously described existing equipment, the only energy saving being that attributable to the lesser quantity of colder air that is required to be circulated. It has been determined, however, that the first cost is less than 75 percent of that of duplicating the existing equipment, the lowered cost being attributable to the savings in ductwork and air moving apparatus (fans and motors) which were possible because of the reduced volume of conditioned air to be circulated. As is subsequently explained in more detail with reference to FIG. 22, the energy efficiency of the apparatus of FIG. 15 can be improved significantly by modifying the air handler 338, specifically, by adding a second coil and transferring heat from a mixture of return air and outside air to 58° F. (14° C.) water circulated through that coil from the evaporator 452. This is true because the energy requirement is about 0.5 kilowatt per ton of refrigeration to produce water at 58° F. (14° C.) but about 0.85 kilowatt per ton to cool air to 42° F. (6° C.). Accordingly, shifting one third of the load in the air handler 338° to 58° F. (14° C.) water effects about a 15% energy savings for refrigeration therein. Apparatus which includes such a modified air handler, but is otherwise substantially identical to the FIG. 15 apparatus, is shown in FIG. 22 and described subsequently with reference thereto.

It is possible, in the apparatus of FIGS. 11, 14 and 15, as well as in that of FIG. 22, to use the sprinkler system to provide a chilled plenum, or to perform localized cooling. All that is necessary is to connect the sprinkler conduits 366 and 369, or some of them, by lines which contain control valves (not illustrated in FIGS. 11, 14, 15 and 22). When the valves are closed, the apparatus delivers chilled water only to the induction mixing units 339, as previously described. However, chilled water flows through each line when the appropriate valve is open and, in addition, through the associated sprinkler conduits 366 and 369. This flow of chilled water is operable to transfer heat from a plenum which contains the sprinkler system, or from selected portions thereof.

Sprinkler apparatus which includes such lines and valves is indicated generally at 462 in FIG. 16. The sprinkler system 462 includes headers 463 and 464 and sprinkler conduits 465 and 466 operatively associated, respectively, with the headers 463 and 464. Conduits 467 connect adjacent ones of the sprinkler conduits 465 and 466. Valves 468 control the flow of heat transfer fluid through the conduits 467. If desired, the valves 468 can be controlled by thermostat controllers, or by a single thermostat controller (not illustrated), so that the flow of heat transfer fluid through the conduits 467 is modulated, as required, to maintain a desired temperature in the associated plenum. For example, the valves 468 can be modulated to maintain the plenum at a temperature of 60° F. (16° C.); heat will then be transferred to the plenum from the adjacent space, thereby reducing the load that must be carried by the coils 356 (FIGS. 11, 14, 15, and 22) in the induction mixing units 339 and by the coil 348 in the air handler 338. Fins (not illustrated) can be added to the sprinkler conduits 465 and 466 (FIG. 16) and to the conduits 467 to increase heat transfer from the plenum, if desired. Heat transfer fluid is delivered to the apparatus 462 from a supply line 469 and leaves through a return 470, while water for fire purposes can be supplied to both of the headers 463 and 464 through conduits 471.

Apparatus indicated generally at 472 in FIG. 17 is also a sprinkler system, comprising headers 473 and 474 and operatively associated sprinkler conduits 475 and 476, an induction mixing unit 339 operatively connected between one of the conduits 475 and one of the conduits 476 and, in addition, simplified induction mixing units 477 and cooled lights 478, both of which are served with chilled water from adjacent ones of the sprinkler conduits 475 and 476. The chilled water flows from the sprinkler conduits 475 through conduits 479 to the induction mixing units 477 and to the lights 478 and then through conduits 480 to the sprinkler conduits 476, under the control of valves 481. The apparatus 472 also includes a supply line 482 and a return 483 for a heat transfer fluid, and conduits 484 through which water for fire purposes can be supplied to the headers 473 and 474.

One of the induction mixing units 477 is shown in more detail in FIG. 18, mounted so that its bottom is flush with a ceiling 485 of a space it serves and a housing 486 in which a two speed electric motor 487 is mounted extends above the ceiling in a plenum 488. One of the conduits 480 which carries fins 489, extends through a collar 490 which is a part of the housing 486. When the motor 487 is energized, a fan 491 discharges air downwardly from the housing 486 and induces a flow of air into the housing 486. The induced air can flow (1) directly from the space through an opening 492 in the ceiling 485 and an opening 493 in the wall of the housing 486, (2) directly from the plenum through the collar 490 which extends upwardly from the top of the housing 486, or (3) partially from the space through an opening 494 in the ceiling 485 and partially from the plenum into one or both of two openings 495 and 496 in the housing 486, depending on the positions of dampers 497 and 498.

In operation, the induction mixing unit 477 discharges air into the space it serves at a rate which depends upon the speed of the motor 487. Some of this air is induced to flow from the space through the openings 492 and 493; some is induced to flow from the plenum through the collar 490; and some may be induced to flow through one or both of the openings 495 and 496, depending on the positions of the dampers 497 and 498. The induction mixing unit 339 (FIG. 17) is used as previously described to introduce conditioned 42° F. (6° C.) air into a zone served by the induction mixing unit 339 and a plurality of the induction mixing units 477, the rate of delivery of the conditioned air being sufficient to provide humidity control for the entire zone. Each of the motors 487 (FIG. 18) of the induction mixing units 477 can operate at high speed or at low speed, or can be de-energized, depending on the air conditioning load in the zone and whether or not the zone or a portion thereof is occupied. For example, if the apparatus of FIG. 17 serves a multi-story department store, the induction mixing units 339 can be energized at the start of a business day, and operated to deliver a mixture of 42° F. (6° C.) primary air and recirculated air as previously described, and motors 487 (FIG. 18) of the induction mixing units 477 can remain de-energized until a motion sensor (not illustrated) indicates that the zone they serve is occupied. The motion sensor, which can be, for example, of the type disclosed in U.S. Pat. No. 4,485,864, can be operably connected to energize the motors 487 of the induction mixing units 477 which serve the space in which motion has been sensed, and to maintain them in an energized condition so long as motion continues to be sensed. While the motors 487 are energized, the operation of the induction mixing units 477 and of the valves 481 (FIG. 17) can be controlled by a thermostatically operated controller (not illustrated). If a temperature substantially higher than the control temperature is sensed in an occupied zone, some or all of the valves 481 which serve that zone can be opened to enable a flow of heat transfer fluid at 58° F. (14° C.) through the conduits 479 and 480 which serve the relevant ones of the induction mixing units 477 or which serve the relevant portion of the entire sprinkler system. If all of the valves 481 in the relevant portion of the sprinkler system are opened, that portion of the plenum will be cooled, and then, maximum cooling from the induction mixing units 477 can be achieved by inducing a maximum flow of air into the induction mixing units 477 from the plenum. If only the valves 481 which control the flow of heat transfer fluid through those of the conduits 479 and 480 which serve the relevant units 477 are opened, maximum cooling can be achieved by inducing a maximum flow of air into the induction mixing units 477 in heat transfer relationship with the ones of the conduits 479, 480, or both through which the heat transfer fluid is flowing. As the sensed temperature approaches the control temperature, all of the relevant ones of the valves 481 which were opened, can be modulated or closed, the dampers 497 and 498 (FIG. 18) can be controlled to reduce heat transfer to the circulated fluid, or both. In general, the maximum flow of induced air from the plenum 488 occurs when the damper 497 is open and the damper 498 is closed, while the maximum flow of induced air through the collar 490 occurs when both of the dampers 497 and 498 are closed. The temperature of the plenum 488 will be a function of heat gains attributable to the lights 478, to other lights and electronic equipment (not illustrated) in the space, and the like and of heat losses to fluid circulated through the sprinkler system 472 (FIG. 17). Accordingly, the apparatus 472 can be controlled so that heat is transferred to the space therefrom, or so that heat is transferred thereto from the space, and the amount of heat so transferred can be controlled in a simple manner to maintain a desired space temperature. The amount of heat so transferred can also be changed by changing the speed of the motors 487, the maximum transfer being accomplished at the high speed, and a lesser transfer at the low speed.

In general, the flow of heat transfer fluid through the sprinkler apparatus 472 can be controlled to maintain the entire plenum 488 (FIG. 18) or the portion thereof in the vicinity of any one or any desired group of the induction mixing units 477 at a desired temperature, which can range from 60° F. (16° C.) to 80° F. (27° C.). The flow of conditioned air from the induction mixing units 339, as is subsequently explained in detail, can be controlled by a humidistat/controller (not illustrated in FIG. 17) to effect humidity control in the space and, because there is a flow of air thereinto from the space, in the plenum. Humidity control is necessary in the plenum to prevent condensation on the heat transfer devices which are used as described above to control temperature, including the headers, sprinkler conduits and other conduits through which a heat transfer fluid at, say, 58° F. (14° C.) may be circulated. The induction mixing units 477 which serve a given zone of the space can be controlled together, in response to signals from a single thermostat, or can be so controlled individually to provide several different temperature zones in the zone for which a single induction mixing unit 339 provides humidity control.

The light 478 (FIG. 17) is shown in more detail in FIG. 19, comprising a high intensity bulb 499 received in a socket 500 which is mounted in a housing 501. A sheet 502 of metal fabric is draped over the conduit 480 and extends downwardly on both sides of the bulb 499 where it is heated by thermal energy it intercepts and also by radiant energy. Because the sheet 502 is a fair conductor of heat and is in thermal contact with the conduit 480, heat is transferred therefrom to the conduit 480 and to heat transfer fluid circulated through the conduit 480, thus minimizing the storage of heat from the bulb 499 in the building structure and ultimate release of the stored heat at times of maximum air conditioning load.

Lighting fixtures which are disclosed in U.S. Pat. No. 3,828,180 and other water-cooled lighting fixtures can also be connected between the conduits 475 and 476, and the flow of heat transfer fluid therethrough can be controlled so that lighting heat is either used for reheat or transferred to a major extent to the heat transfer fluid. For example, whenever the air conditioning load on a space served by one or a plurality of the induction mixing units 339 is such that heating is required, the flow of heat transfer fluid to the lighting fixtures that serve that zone can be modulated so that as much of the lighting heat as is required is available to the space. Specifically, the lighting fixtures of the '180 patent have dampers which can be opened when lighting heat is required in the space; when the dampers are open, air can flow from the space into the lighting fixtures and through openings in the fixtures into a plenum from which the induction mixing units 339 induce a flow of air. Such flow through the fixtures is prevented when the dampers are closed. Lighting fixtures of this type can also be used in conjunction with the apparatus of FIGS. 25–27 which is subsequently described in detail.

A particularly advantageous control device for the induction mixing unit 339 (FIGS. 11, 14, 15 and 22) is shown, somewhat schematically, in FIG. 20. The device comprises a controller 503 for the damper 353 and for the valve 374. Signals from a humidistat or thermostat 504, from a humidistat 505 and from a thermostat 506 are input to the controller 503 which then controls the damper 353 and the valve 374. The humidistat 505 and the thermostat 506 sense conditions in a space 507 served by the induction mixing unit 339, while the humidistat or thermostat 504 senses conditions inside the induction mixing unit 339, specifically of air that has been induced to flow from the space 507 into the induction mixing unit 339 and has been cooled by heat exchange with the coil 356. This combination of sensors with the controller 503 is well suited for use when different spaces served by different ones of the induction mixing units 339 are to be maintained at different humidities or have substantially different humidity loads. It is important to prevent condensation, which occurs whenever air is cooled to a relative humidity of 70% or higher, on the coils 356. The controller 503 prevents such condensation; when the induction mixing unit 339 is first energized, the controller 503 closes the valve 374, keeps it closed until a signal received from the thermostat or humidistat 504 indicates a relative humidity below 70% and thereafter controls the valve 374, if necessary, to keep the relative humidity below 70%, its function in this mode being in the nature of a limit switch. The controller 503 also opens or closes the damper 353, initially, when the induction mixing unit 339 is first energized, as required to establish and maintain the control temperature as sensed by the thermostat 506 or the control humidity as sensed by the humidistat 505, and thereafter as required to maintain or to establish and maintain, as the case may be, the control humidity as sensed by the humidistat 505. The controller 503, when it is in the latter mode, controlling the damper 353 to maintain the control humidity as sensed by the humidistat 505, also controls the valve 374 to maintain the control temperature as sensed by the thermostat 506, the limit on opening of the valve being that position at which the signal from the humidistat or thermostat indicates a relative humidity of 70%, as described above.

The signal from the humidistat or thermostat 504 is a direct indication of relative humidity only when the instrument is a humidistat; the signal must be compared with the signal from the humidistat 505 for the required indication of relative humidity when the instrument is a thermostat.

The controller 503 can also operate in another manner, modulating the damper 353, when the air conditioning load in the space is comparatively light, to maintain the absolute humidity sensed by the humidistat 505 at a set point, say, 64 grains of water vapor per pound of dry air, and (1) if the humidistat 504 senses a relative humidity not greater than, say, 70 percent, modulating the valve 374 to maintain the space temperature sensed by the thermostat 506 at a set point, say, 78° F. (26° C.), or (2) if the humidistat 504 senses a relative humidity greater than, say, 70 percent, closing the valve 374, if open, or keeping the valve 374 closed, if it is already closed, to reduce the relative humidity. This mode of operation also prevents condensation on the coil 356. However, whenever the valve 374 is closed because the humidistat 504 senses a humidity greater than, say 70 percent, the controller 503 modulates the damper 353 to control both the temperature and the humidity of the space. Ordinarily, increasing the flow of primary conditioned air to lower space temperature will soon lower the humidity to such an extent that the valve 374 can be opened to shift a part of the sensible load to the coil 356.

In general, dehumidified air is a relatively expensive utility. It is, therefore, desirable to use only as much as is needed for humidity control and to transfer as much of the sensible load as possible to chilled water. This can be accomplished as just described by using the damper 353 under the control of the humidistat/thermostat controller 503 to maintain the desired humidity, or by analogous control, i.e., modulation to control humidity, of the corresponding dampers of the apparatus of other FIGS. hereof, and transferring as much of the sensible load as possible, without risking condensation, to the coil 356 or to the analogous coil of the apparatus of other FIGS. hereof. Specifically, the dampers 46 of the apparatus of FIGS. 1 and 2 and of FIGS. 6 and 7, and the dampers which control the admission of conditioned air from the ducts 266 to the induction mixing units 267 of the apparatus of FIG. 8 can be so controlled by analogous humidistat/thermostat controllers. Similarly, preferably under the control of thermostat controllers, the valves 316 of the apparatus of FIG. 8 can be modulated, as required, to control temperature, as can the pumping of heat to or from the coils 50 of the apparatus of FIGS. 1 and 2 and of the apparatus of FIGS. 6 and 7. However, if humidistat control is not available, it is desirable to avoid the risk of condensation by transfering heat to the coil 356 only after the apparatus has been operating sufficiently long to establish humidity control, and only when primary air is being delivered to the space at a rate higher than some predetermined minimum, sufficiently high to indicate a low humidity.

When the apparatus of FIG. 20 is operated in either of the modes described above and the air conditioning load is sufficiently high that the valve 374 is in its fully open position and the temperature sensed by the thermostat 506 is above the current set point, the set point for the humidistat 505 can be lowered and the set point for the thermostat 506 can be raised. If the valve 374 again reaches a full open position, the set points can be reset again. Other suitable set points, where the entries under the heading "Humidistat 505", are moisture contents, grains of water vapor per pound of dry air, are:

| Humidistat 505 | Thermostat 506 |
|---|---|
| 60 | 80° F. (27° C.) |
| 56 | 82° F. (28° C.) |
| 52 | 84° F. (29° C.) |

Ordinarily, it is desirable for apparatus according to the instant invention to be designed so that changing the set point for the humidistat 505 is necessary only when the air conditioning load is heavy. This is true because the use of primary conditioned air at 42° F. (6° C.) is a considerably more expensive way to counteract sensible heat gains than is the use of 58° F. (14° C.) water in the coil 356. Consequently, the controller 503 reverts to the next higher humidity set point for the humidistat 505 and the corresponding set point for the thermostat 506 after it has operated for, say, thirty minutes at any given reduced humidity set point. If the thermostat 506 senses too high a temperature with the valve 374 in its full open position, the lowered humidity and increased temperature set points will be reinstated, as described above, and will remain in effect for another short period of time, say, thirty minutes, unless, in the meantime, the thermostat 506 senses too high a temperature with the valve 374 in its full open position. When the load decreases again, the original set points will be reinstated in the manner just described.

It is also possible for the controller 503 to revert to the next lower humidity set point for the humidistat 504 whenever the valve 374 is throttled to its closed position or to any desired position between full open and closed, but reversion on the basis of elapsed time is preferred. A humidistat/thermostat controller which can be programmed to operate in any of the ways the controller 503 is described herein as operating can be purchased from VAISALA, Inc., Woburn, Me.

In installations where substantially the same relative humidity, say 50%, is to be maintained in all of the spaces served by air conditioning apparatus according to the instant invention, simpler control apparatus than that shown in FIG. 20 can be used for summer operation. Specifically, the humidistat or thermostat 504 and the humidistat 505 can be eliminated, and the signal from a humidistat 508 (FIGS. 11, 14, 15 and 22) can be used to control each of the induction mixing units 339 as described below. The humidistat 508 senses the absolute humidity of return air from all of the spaces served as that air flows through a duct 509. On start-up of the apparatus, a signal from the humidistat 508 is input to a controller 510 for the pumps 360, which are energized only when that signal indicates that the absolute humidity of the return air in the duct 509 is at or below a set point, say 64 grains of water vapor per pound of dry air. A signal from the humidistat 508 is also input to each of the controllers 503 (FIG. 20), as is a signal from the thermostat 506 associated therewith. Each of the controllers 503 operates the damper 353 associated with it to maintain a set temperature, say 78° F. (26° C.), in the space it serves and opens the valve 374 associated with it whenever the relative humidity of recirculated room air in the induction mixing unit 339, at the lowest temperature to which the coil 356 is capable of cooling it and at the absolute humidity sensed by the controller 508 (FIGS. 11, 14, 15 and 22), is less than 70%. When the apparatus is controlled as just described, only air from the duct 347 is available to lower the temperature of the space served by each of the induction mixing units 339 during the first part of morning start-up. Since this air has a low humidity, being saturated at 42° F. (6° C.), each of the spaces is also dehumidified even though the dampers 353 are controlled only on the basis of dry bulb temperature. However, as soon as the humidistat 508 senses a humidity sufficiently low to indicate that humidity control has been established, the pumps 360 are energized to circulate chilled water from the water chiller 343, and the valves 374 are opened to make that chilled water available to remove heat from the space served by each of the induction mixing units 339. As soon as a signal from one of the thermostats 506 (FIG. 20) indicates that the space served by the associated one of the induction mixing units 339 has reached the set temperature, the controller 503 throttles and then modulates the damper 353 (FIGS. 11, 14, 15 and 22) to maintain the set temperature. The air handler 338 is operated to maintain a predetermined static pressure at a point in the duct 347; accordingly, when the dampers 353 are throttled, as just described, the rate at which conditioned air is delivered to the duct 347 and the rate at which ice is used to produce the conditioned air are both reduced. The valves 374 remain in their fully open positions unless the temperature in a space served by one of them is below the set point with the relevant damper closed to the point where only the minimum ventilation air is being supplied; that one of the valves 374 is then modulated by the controller 503 for temperature control and, if necessary, a resistance heater 511 (FIG. 20) is energized. A heat pump (not illustrated) can also be added to the induction mixing units 339 to pump heat from the heat transfer fluid circulated through the sprinkler system (see FIGS. 11, 14, 15 and 22) to a coil (not illustrated) in the induction mixing unit 339 in heat transfer relationship with air circulated therethrough; preferably, the coil (not illustrated) is in heat transfer relationship with the mixture of recirculated air and conditioned air so that, when the air conditioning load is high, heat can be pumped from the air to the heat transfer fluid with only a minimal risk of condensation because the mixture has a low humidity.

The induction mixing unit 339, equipped with the controller 503 of FIG. 20, is shown in FIG. 21 with a heat exchanger 512 added. Primary air from the duct 347 (at 42° F., 6° C.) enters one side of the heat exchanger 512, leaving through a duct 513 from which it enters the induction mixing unit 339 where it is mixed with recirculated air from the space. The mixture of recirculated air from the space and of primary air from the duct 513 flows in thermal contact with the coil 356 and then through a second side of the heat exchanger 512. Heat is transferred, in the heat exchanger 512, from the mixture of primary air and recirculated air to incoming primary air, and the air which flows in heat transfer relationship with the coil 356 is cooler and drier, other factors being equal, than in the induction mixing units 339 of FIGS. 11, 14, 15, 20 and 22; as a consequence, the likelihood of condensation on the coil 356 is reduced.

The apparatus of FIG. 22 includes all of the elements of that of FIG. 15, as indicated by the use of the same reference numerals, except that the air handler 338 has been replaced by an air handler 514 in the FIG. 22 apparatus. The air handler 514 has the coil 348 which cools air circulated thereover to 42° F. (6° C.) and, in addition, has a coil 515 to which water at, say, 58° F. (14° C.) is circulated through lines 516 and 517. The load that must be carried by the coil 348 is reduced as a consequence of heat transfer to the coil 515; as is explained above, shifting load from the coil 348 to the coil 515 saves energy because only about 0.5 kilowatt per ton of refrigeration is required to produce 58° F. (14° C.) water instead of about 0.85 kilowatt per ton of refrigeration to cool air to 42° F. (6° C.).

Another sprinkler system according to the invention is indicated generally at 518 in FIG. 23. The sprinkler system 518 comprises a water chiller 519, a water heater 520, fan coil induction mixing units 521, sprinkler conduits 522, sprinkler heads 523, make-up apparatus indicated generally at 524 to maintain a constant heat transfer fluid pressure in the system in normal operation, means indicated generally at 525 for introducing water for fire purposes into the apparatus, a pump 526 and piping, valves, orifices and the like for circulating a heat transfer fluid to the induction mixing units 521 in normal operation and water for fire purposes to the affected ones of the sprinkler heads 523 in fire mode.

The apparatus 518 serves a multi-story building; enough of the portion thereof for one floor to explain the operation is shown, enclosed within a broken line, together with fragments thereof for other floors. In normal operation, which is the same for all floors, the pump 526 causes a heat transfer fluid to flow through a supply line 527, valves 528, orifices 529, headers 530, conduits 531, supply pipes 532, the induction mixing units 521, return pipes 533, orifices 534, conduits 535, return headers 536, pipes 537 with check valves 538 therein, a return line 539, a pipe 540 and the heater 520 or the chiller 519 back to the pump 526. Check valves 541 prevent the flow of heat transfer fluid from the headers 530 through lines 542 to the return headers 536, forcing the flow, instead, through the induction mixing units 521, as described.

The make-up apparatus 524 comprises a pressurized tank 543 which is connected by a pipe 544 to the return line 539. In normal operation, the pressure of the tank 543 is imposed on the heat transfer fluid in the return line 539 and there will be a minor flow of fluid from the tank 543 to the return line 539 or vice versa to accommodate minor losses of heat transfer fluid from the apparatus, expansion and contraction of the heat transfer fluid in the apparatus, and the like. If one of the sprinkler heads 523 is fused by a fire, heat transfer fluid flows from that head 523 at a comparatively rapid rate and, as make-up, from the tank 543 through the pipe 544 and through a restricting orifice 545 therein. A pressure drop across the orifice 545 is sensed by a sensor-controller (not illustrated), which then puts the apparatus 518 in fire mode by closing the valves 528, de-energizing the pump 526, energizing a fire pump 546 and setting valves in the means 525 so that fire water from a main 547 is delivered to the return line 539 from which it flows through one of the return headers 536, through a check valve 548 therein, and to the fused head or heads 523. The check valves 541 do not interfere with the flow of fire water from the side of the return line 539 through the lines 542. Water for fire purposes can also be introduced into the apparatus 518 through a siamese 549 or through a siamese 550.

FIG. 24 is a schematic diagram of the apparatus of FIG. 14 showing features which were omitted from FIG. 14, and from which certain features have been omitted to facilitate the showing of the new features.

Referring to FIG. 24, heat from both the exhaust gases and the jacket water from the engine-generator 387 can be transferred to the absorption refrigeration apparatus 442. The exhaust gases are discharged from the engine generator 387 through a stack 551, and are either vented through a discharge 552 or directed through a branch line 553 into heat exchange relationship with the absorption refrigeration apparatus 442, depending upon the setting of dampers 554. Exhaust gases which are directed through the branch line 553, after having furnished heat to energize the apparatus 442, flow into and are vented from a stack 555. Jacket water leaves the engine-generator 387 through a line 556, and is directed into a line 557 or into a line 558, depending on the setting of a valve 559. On summer cycle when chilled water from the absorption apparatus 442 is required, the jacket water is circulated through the line 558, a heat exchanger 560, a line 561, a heat exchange jacket 562 of the apparatus 442, a line 563, the heat exchanger 560 and a line 564 back to the engine-generator 387, providing energy for the apparatus 442. Whenever heat is required in the air handler 338, the valve 559 is set so that jacket water from the engine-generator 387 is circulated through the line 557, a sheet and tube heat exchanger 565, and a line 566 to the line 558, and then, as previously described, through the heat exchanger 560, the heat exchange jacket 562, the heat exchanger 560 and back to the engine-generator 387. A valve 567 is modulated, as required, to maintain a desired temperature; in one position, the valve 567 causes circulated jacket water to flow through the heat exchanger 565 while, in the other, it causes water to flow through a line 568, bypassing the exchanger 565. Jacket water flowing through the exchanger 565 heats a heat transfer fluid, for example ethylene glycol, which is circulated from the heat exchanger 565 through a line 569, a coil 570 in the air handler 338, and a line 571 back to the exchanger 565.

Apparatus shown in FIG. 25 is similar to that of FIG. 11, the main differences being that: the air handler 338 is not included in the FIG. 25 apparatus; dehumidifiers 572 and 573 have been added to perform the function of dehumidifying air; and, on day cycle, ice from the ice storage tank 342 can be used to provide chilled water for induction mixing units 574, one of which is shown in FIG. 25. The following elements of the FIG. 11 apparatus are included: the compressor 340, the evaporative condenser 341, the ice storage tank 342, the water chiller 343, the high pressure receiver 377, the low pressure receiver 379 and the heat recovery unit 404, all of which perform substantially the same as in the FIG. 11 apparatus, except as described below.

Ambient air is introduced into the apparatus of FIG. 25 by a blower 575, flowing through a filter 576, a duct 577 and the dehumidifier 572 and then into the blower 575, which discharges into a duct 578 from which the air flows through the dehumidifier 573, and then through a duct 579 to the induction mixing units 574.

The apparatus also includes a cooling tower 580 from which evaporatively cooled water is circulated through a line 581 to a heat exchanger 582 and then through a line 583 back to the cooling tower 580. Chilled water from the water chiller 343 is circulated through lines 584, 585 and 586 to a heat exchanger 587 and then through line 588, 589 and 590 back to the water chiller 343.

In operation, a desiccant, e.g., an aqueous lithium chloride solution, is circulated from a sump 591, through a line 592, the heat exchanger 582 and a line 593 from which it is sprayed in the dehumidifier 572 in contact with air flowing therethrough, returning by gravity through a line 594 to the sump 591. Similarly, the desiccant is circulated from the sump 591 through a line 595, the heat exchanger 587 and a line 596 from which it is sprayed in the dehumidifier 573 in contact with air flowing therethrough, returning by gravity through a line 597 to the line 595.

Desiccant in the sump 591 is maintained at a predetermined concentration, say 40 to 42 weight percent lithium chloride, by a regenerator 598 to which desiccant flows from the sump 591 through a line 599, a heat exchanger 600, and a line 601, and from which concentrated desiccant is returned to the sump 591, flowing through a line 602, the heat exchanger 600 and a line 603.

Typically, the dehumidifiers 572 and 573 can operate to condition ambient air, which may have a dry bulb temperature of 91° F. (33° C.) and a moisture content of 124 grains of water vapor per pound of dry air so that the air in the duct 577 has a dry bulb temperature of 94° F. (34° C.) and a moisture content of 42 grains of water vapor per pound of dry air, while the air in the duct 579 has a dry bulb temperature of 75° F. (24° C.) and a moisture content of 31 grains of water vapor per pound of dry air. A space condition of, say, 76° F. (24° C.) dry bulb temperature, 50 percent relative humidity (67 grains of water vapor per pound of dry air), is maintained by controlling the rate at which air from the duct 579 is delivered to each of the spaces served by the apparatus (one space, designated 604, is shown in FIG. 25) to maintain humidity, and by controlling the temperature, as subsequently explained, at which a mixture of air from the duct 579 and recirculated air is delivered to the space. A thermostat-humidistat controller 605 controls a damper 606 to vary the rate at which air from the duct 579 is delivered to each of the spaces 604. The rate may vary between 0.1 and 0.2, or even 0.3 cubic foot per minute per square foot of floor space in a given zone; the controller 605 opens the damper 606 incrementally whenever the humidity is too high and closes it incrementally whenever the rate is above the minimum required for ventilation and the humidity is too low.

Each of the induction mixing units 574 includes a blower 607 which induces a flow of air from a plenum, as indicated by an arrow 608, and delivers to the space 604 it serves a mixture of that induced air and conditioned air from the duct 579. The flow of induced air from the plenum into the induction mixing unit 574 causes a flow of air from the space 604 into the plenum; two arrows 609 indicate the delivery to the space 604 of a mixture of induced air and conditioned air and the flow of air from the space 604 into the plenum. Inside the induction mixing unit 574, the mixture of conditioned air and induced air flows in heat exchange relationship with a coil 610. When the apparatus is in cooling mode, chilled water is circulated, as subsequently described in detail, to a sprinkler conduit 611. This water flows through a line 612, a control valve 613, the coil 610 and a line 614 back to a sprinkler conduit 615. The controller 605 also modulates the valve 613, closing it incrementally whenever the space temperature is below the control temperature, and opening it incrementally whenever the temperature is above.

A sprinkler main 616 is connected to the line 585 and to the sprinkler conduit 611, while a sprinkler main 617 is connected to the line 589 and to the sprinkler conduit 615. As a consequence, chilled water at, say, 58° F. (14° C.) from the water chiller 343 is delivered to the coils 610 for temperature control. Water in the line 589 returning from the coils 610 and from the heat exchanger 587 can be diverted by a valve 618 so that it flows through a line 619 to a heat exchanger 620, returning through a line 621 to a heat exchanger 622, and through a line 623 and the valve 618 to the line 590. Heat can be transferred in the heat exchanger 620, when conditions are appropriate, to evaporatively cooled water from the cooling tower 580, and more heat can be transferred in the heat exchanger 622 to ice in the ice storage tank 342. Accordingly, the compressor 340 can be operated on summer night cycle to produce ice that is used on summer day cycle to carry all or any part of the sensible load on the coils 610 and all or any part of the load on the heat exchanger 587.

The apparatus of FIG. 25 also includes an engine generator 624 which furnishes electricity as indicated at 625 to the pumps, blowers and the like of the apparatus, to the electrical service of the building it serves, or both. Heat from a cooling jacket (not illustrated) of the engine-generator 624 is transferred to water circulated by a pump 626 through a line 627, a heat exchanger 628, lines 629 and 630, a heat exchanger 631 and a line 632 back to the cooling jacket of the engine-generator 624. In the heat exchanger 628, heat is transferred from exhaust gases from the engine-generator 624 to water circulated therethrough. In the heat exchanger 631, heat is transferred from the water circulated by the pump 626 to a heat transfer fluid that is circulated to a heat exchanger 633 and, on winter cycle, to a heat exchanger 634, and to a heating coil 635.

On summer day cycle, a part of the desiccant solution flowing in the line 602 is diverted, flowing through a line 636, the heat exchanger 633 and a line 637 to spray nozzles 638 from which it is sprayed in the regenerator 598 to remove water from desiccant therein, so that highly concentrated desiccant solution flows from the bottom of the regenerator 598 through a line 639 to a sump 640. It is to the sump 640 that dilute desiccant flows through the line 601, and from the sump 640 that a pump 641 delivers relatively concentrated desiccant solution to the line 602, as described. Relief air from the building served by the apparatus is delivered through a duct 642 to a blower 643, from which it is discharged through a heat exchanger 644 into the regenerator 598, leaving through a duct 645 and a heat exchanger 646. A heat transfer fluid is pumped from the heat exchanger 646 through a line 647 to the heat exchanger 644 and through a line 648 back to the heat exchanger 646 to recover heat from air leaving the regenerator 598 and to transfer that heat to air entering the regenerator 598.

The concentrated desiccant returned through the line 602 to the sump 591 may have a concentration of 42 percent by weight of lithium chloride, and may maintain a concentration of 40 percent by weight in the sump 591. A pump 649 delivers desiccant from the sump 591 directly to the line 592, so the concentration of the desiccant sprayed in the dehumidifier 572 is also 40 percent by weight. A pump 650 receives desiccant from the line 595, but this desiccant is a mixture of desiccant from the sump 591 and more dilute desiccant from the dehumidifier 573. As a consequence, the desiccant delivered to the line 596 may contain 38 percent by weight of lithium chloride; a part of this desiccant is sprayed in the dehumidifier 573, as previously described, while the rest is returned to the sump 591, flowing through a line 651 and the line 594.

Any excess heat from the engine generator 624, beyond that used by the apparatus of FIG. 25, as described above, can be rejected through a roof-mounted fan radiator 652 to which water circulated by the pump 626 can flow through a line 653, returning through a line 654. The rejection of heat in this manner can be controlled by a valve 655 which is modulated, as required, to prevent the temperature of the water from becoming excessively high.

It will be appreciated that the conditioned air delivered to the induction mixing units 574 when the FIG. 25 apparatus is operated as described above is essentially neutral air, so far as temperature control is concerned. That is, the air temperature is about the same as that to be maintained in the spaces it serves. Accordingly, when the rate at which conditioned air is delivered to any given one of the spaces is varied because of changes in the humidity load, the variations do not increase or decrease the sensible load that must be transferred to heat transfer fluid from circulated air in the coil or coils 610. The reason for this is that all of the air that enters the induction mixing units 574 is neutral so far as temperature control is concerned; when the rate at which conditioned air is delivered to any given one of the induction mixing units 574 increases, the rate at which plenum air is delivered thereto decreases correspondingly, so that the total flow of air into the induction mixing unit 574 remains constant. The apparatus of FIG. 25 is significantly different, in this respect, from that of FIGS. 11, 14, 15 and 24, where the conditioned air is both cold and dry, so that a change in the rate at which it is delivered to a given space changes the sensible load that must be carried by heat exchange from circulated air (which is recirculated air in those embodiments of the invention). However, as is subsequently explained in more detail, the apparatus of FIG. 25, as well as that of FIG. 27, can be operated so that the temperature of the dehumidified air which is circulated through the duct 579 to the induction mixing units 574 is above the temperature maintained in the spaces 604, for example, from the temperature maintained up to about 90° F. (32° C.).

Because the conditioned air delivered by the apparatus of FIG. 25 is relatively warm, insulated ducts are not required for the circulation thereof; the air is not capable of causing condensation. Indeed, the conditioned air can be delivered from a riser of a multistory building to a header on each floor, and can then be circulated as required for a given floor through a cellular dect, for example of the type shown in U.S. Pat. Nos. 3,013,397 and 3,148,727.

The induction mixing unit 574 of the FIG. 25 apparatus also includes a unitary heat pump 656 which has a heat exchange coil (not separately illustrated) between the coil 610 and the blower 607, a compressor (not separately illustrated) and a condenser or evaporator (not separately illustrated). Two lines 657 operably connect the condenser or evaporator of the heat pump 656 to the lines 612 and 614; when a valve 658 is opened by the controller 605, water flowing through the lines 657 constitutes a heat source or a heat sink for the condenser or evaporator of the heat pump 656, returning to the line 614 after it has served its purpose in the heat pump 656. There are times when the cooling tower 580 provides all of the cooling that is required by most zones of the building served by the apparatus of FIG.

25, but is not quite adequate for a few of the zones. At these times, water from which heat has been transferred by the cooling tower 580 can be circulated to the induction mixing units 574, and, under the control of the thermostat-humidistat controller 605, the heat pumps 656 can be energized to pump heat from the heat exchange coils of the heat pumps 656 which serve the zones where additional cooling is required. When such additional cooling is required, it is important to prevent condensation on the evaporator of the heat pump 656. To that end, it is desirable that the thermostat-humidistat controller 605 include a humidistat (not illustrated) which senses the humidity of the air between the heat pump 656 and the blower 607, and de-energizes the heat pump 656, opens the damper 606, or both, whenever that relative humidity exceeds 70 percent.

When the compressor 340 is operating to produce ice in the storage tank 342 and heat is required by the building served by the apparatus of FIG. 25, water that has been heated by heat from the heat recovery unit 404 can be circulated through a line 659 to the line 585 and then, as described above, to the coils 610, returning to the heat recovery unit 404 from the line 589 through a line 660. In this mode of operation, a valve 661 is positioned so that all of the fluid returning in the line 589 is directed into the line 660; as a consequence, there is no fluid flow in the line 619 or in the line 590, and there is no heat transfer from the circulating system to the water chiller 343, to the storage tank 342 or to the cooling tower 580. The heat pumps 656, in this mode of operation, can be operated to pump heat from the fluid circulated thereto through the line 657 if additional heating is required in the zones served by some of the induction mixing units 574.

The apparatus of FIG. 26 is identical in most respects with that of FIG. 25, the principal difference being that the FIG. 25 dehumidifier 572 has been replaced, in the FIG. 26 apparatus, by a solid desiccant dehumidifier indicated generally at 662. The dehumidifier 662 comprises two desiccant wheels 663 and 664, two blowers 665 and 666, and heat exchangers 667, 668, 669 and 670. In operation, the desiccant wheels 663 and 664 rotate slowly, while air to be dehumidified enters a conduit 671, flows through a segment of the desiccant wheel 663, through a conduit 672, through a segment of the desiccant wheel 664, through a conduit 673 into the blower 665 and into the conduit 578. The air is dehumidified when it flows through each of the wheels 663 and 664, as just described, by contact with a solid desiccant, e.g., activated alumina, silica gel or lithium chloride on a paper carrier. For example, ambient air may enter the conduit 671 at a dry bulb temperature of 93° F. (34° C.) and a moisture content of 105 grains of water vapor per pound of dry air, leave the desiccant wheel 664 at a dry bulb temperature of 104° F. (40° C.) and a moisture content of 56 grains of water vapor per pound of dry air, be cooled by the heat exchanger 667 to a dry bulb temperature of 91° F. (33° C.) with no change in moisture content, and leave the dehumidifier 662 at a dry bulb temperature of 75° F. (24° C.) and a moisture content of 31 grains of water vapor per pound of dry air. In the heat exchanger 667 heat is transferred from the dehumidified air to evaporatively cooled water which is circulated from the cooling tower 580 through the line 581 to the heat exchanger 667 and through the line 583 back to the cooling tower 580.

Relief air from the building served by the dehumidifier 662 is used for regeneration, entering the blower 666 from a conduit 674, flowing through a segment of the desiccant wheel 663, through a conduit 675, through a segment of the desiccant wheel 664, and through a conduit 676 from which it is vented to the atmosphere. A heat transfer fluid is circulated by a pump 677 from the heat exchanger 670 to the heat exchanger 668 and back, the flow being through lines 678 and 679; as a consequence, heat is transferred from air leaving the regeneration side of the dehumidifier to air that is about to flow in regenerating relationship with the desiccant of the wheel 664. In addition, heat transfer fluid is circulated through the heat exchanger 669, flowing thereto from the heat exchanger 631 through line 680 and 681, and returning to the heat exchanger 631 through lines 682 and 683. In this way, heated water circulated by the pump 626 furnishes the heat required for the regeneration of the wheel 664.

The apparatus of FIG. 27 is similar to that of FIG. 25, differing in that the compressor 340, the evaporative condenser 341, the ice storage tank 342, the water chiller 343, the high pressure receiver 377, the low pressure receiver 379 and the heat recovery unit 404 of the FIG. 25 apparatus have all been omitted from that of FIG. 27, while absorption refrigeration apparatus indicated generally at 684 has been added. Exhaust gases from the engine-generator 624 are either vented from a stack 685 or circulated through the absorption apparatus 684 to furnish energizing heat, depending on the positions of dampers 686 and 687. On summer cycle heat from the absorption apparatus 684 is rejected in the cooling tower 580, being transferred thereto by water circulated to the apparatus 684 through lines 688 and 689, while chilled water from the apparatus 684 is delivered to the line 584, used as previously described, and returned to the apparatus 684 through the line 590.

When the ambient conditions are such that the cooling tower 580 is capable of providing water at a temperature of 64° F. (18° C.) or lower, the dehumidifier 572 of FIGS. 25, 26 and 27 is capable of producing air having a dry bulb temperature of about 90° F. (32° C.) and a moisture content of 31 grains of water vapor per pound of dry air; as a consequence, it is not then necessary for air discharged from the dehumidifier 572 to be conditioned in the dehumidifier 573. To take advantage of this situation, the apparatus includes a duct 690 which connects the duct 578 and the duct 579, by-passing the dehumidifier 573. Dampers 691 and 692 in the ducts 690 and 578 can be set to direct all or any part of the air leaving the dehumidifier 572 into the duct 690. Since the heat associated with dehumidification is transferred to cooling tower water from the dehumidifier 572 and is transferred to chilled water from the dehumidifier 573, it is usually economically advantageous to use the dehumidifier 572 to perform as much dehumidification as possible, and to minimize the use of the dehumidifier 573.

Sensible cooling of the dehumidified air of the apparatus of FIGS. 25 and 27 is also possible, and is frequently advantageous. This can be done by a cooling coil (not illustrated) positioned in heat transfer relationship with air in at least one of the ducts 577, 578, 579, and 690. Heat can be transferred from the cooling coil to water flowing in the lines 583 and 581 to and from the cooling tower 580 or to chilled water flowing in the lines 586 and 588. Relatively high temperature dehumidified air, however, is desirable, as discussed above, because insulated ducts are not required to prevent condensation. Accordingly, it is usually preferred that the temperature of the air in the duct 579 be from about 58° F. (14° C.) to about 90° F. (32° C.).

It will be appreciated that the apparatus of FIGS. 25-27 has an advantage which the apparatus of FIGS. 11, 14, 15 and 24 lacks, namely, that the primary air is dehumidified, but relatively warm, so that its distribution does not necessitate the use of insulated ducts. Conversely, the apparatus of FIGS. 11, 14, 15 and 24 has an advantage which the apparatus of FIGS. 25-27 lacks; that advantage is minimum first cost in the case of the apparatus of FIG. 15, and, in the case of the apparatus of FIGS. 11, 14 and 24, the ability to produce ice at night with low cost energy and to use the ice during the day to carry a substantial portion of the air conditioning load. An air handler indicated generally at 693 in FIG. 28 enables the use of ice or direct expansion refrigeration apparatus to produce extremely dry air at a sufficiently high temperature that it can be distributed in uninsulated ducts.

Return air from apparatus served by the air handler 693 flows through a return duct 694 and a return blower 695, while ambient air flows through a duct 696 and a louver 697 into the air handler 693. Some of the air from the blower 695 can be vented as relief air, leaving through an outlet 698, while the rest flows through vanes 699 and is mixed with ambient air. The mixture flows through the air handler in heat exchange relationship with coils 700 and 701, through a supply blower 702, in heat exchange relationship with a coil 703, and then exits in a duct 704. A pump 705 causes a heat transfer fluid to flow through a line 706, the coil 700, a line 707 and the coil 703 and back to the pump 705. The coil 701 is cooled to a low temperature, say 36° F. (2° C.); as a consequence, heat transfer fluid circulated by the pump 705 is cooled in the coil 703, transferring heat to conditioned air which enters the duct 704, and is warmed in the coil 700, heat being transferred thereto from the mixture of return air and ambient air. The air in the duct 704 should be at a temperature of at least about 58° F. (14° C.) so that insulation is not required on risers, headers, ducts and the like in which it is distributed. A safe temperature can be achieved by sizing the apparatus so that the temperature of the air in the duct 704 is about half way between the temperature, say 86° F. (30° C.), of the mixture of ambient air and return air, and the temperature, say 45° F. (7° C.), of the air leaving the blower 702. The coil 701 is served by lines 708 and 709 through which a heat transfer fluid that has been cooled by heat transfer to stored ice as in the apparatus of FIGS. 11 and 14 is circulated, or through which a refrigerant can be so circulated, in which case the coil 701 is a direct expansion coil as in the FIG. 15 apparatus.

Three way valves 710 and 711 in the lines 706 and 707 can be used to divert coolant so that, instead of flowing through the coil 700, it flows through a line 712 to other apparatus (not illustrated in FIG. 28), returning, after heat transfer thereto in the other apparatus, through a line 713 and the valve 711 to the line 707 and the coil 703. For example, the lines 712 and 713 can be connected so that heat is transferred to the heat transfer fluid circulated therethrough from the water which flows through the coils 356 of the apparatus of FIGS. 11, 14 and 24.

On winter cycle, heated fluid in the lines 680 and 683 is not required in the heat exchanger 633 of the apparatus of FIGS. 25-27, because there is no need to regenerate desiccant. Accordingly, a valve 714 can be closed, and the heat transfer fluid can flow through lines 715 and 716 to serve the heat exchanger 634 and through lines 717 and 718 to serve the heating coil 635. Heated fluid from the heat exchanger 634 flows through lines 719 and 720 to and from the lines 589 and 585 to serve the heat exchange coils 610, the unitary heat pumps 656, or both, in the induction mixing units 574, the flow being as previously described.

It will be observed that there is a valve 721 in the line 589. This valve can be kept closed to prevent any possibility of condensation on the sprinkler headers 616 and 617, on the conduits 611 and 612, on the coils 610, and the like, except when a signal from a humidistat (not illustrated in FIGS. 25-27) indicates that the humidity is sufficiently low that there is no chance of condensation. A single humidistat can be used for an entire building, or for each humidity zone of the building.

The apparatus of FIGS. 25 and 27 can be modified by elimination of the chemical dehumidifiers 572 and 573, and of the duct 579, and substitution therefor of the direct expansion compression refrigeration apparatus of FIG. 15 which includes the compressor 450, and the associated equipment, including the line 459, the evaporative condenser 341, the line 460, the coil 348, the air handler 338, the line 461 and the duct 347. The modified apparatus supplies cold dehumidified air to the duct 347.

As has been indicated above, in the apparatus of FIGS. 25-27, return air from the duct 642 enters the blower 643 from which regenerating air is discharged into the regenerator 598. While only one space 604 is shown, it will be appreciated that the return air in the duct 642 is from all of the spaces served by the air conditioning apparatus. Similarly, only a part of the return air ordinarily flows through the regenerator 598 as relief air, while recirculation air flows through a duct 722 into the duct 577 on the suction side of the blower 575. The rate of flow of recirculation air through the duct 722 is controlled by a damper. Typically, a mixture of partially dehumidified outside air and recirculation air may enter the blower 575 at rates, respectively, of up to 0.13 and up to 0.12 cubic foot per minute per square foot of floor space. Relief air at a rate of up to 0.13 cubic foot per minute per square foot of floor space (the same rate at which partially dehumidified outside air enters the blower 575) is discharged through the regenerator 598 or, in the case of the apparatus of FIG. 26, through the regenerator 598, through the duct 676, and through a duct 723 which provides a by-pass around the dehumidification apparatus 662.

The apparatus of FIG. 29 includes most of the elements of the apparatus of FIG. 11, as is indicated by the use of the same reference numerals, including the air handler 338 and the refrigeration apparatus which comprises the compressor 340, the evaporative condenser 341 and the evaporator which serves the ice storage tank 342; this evaporator operates to produce ice, usually on night cycle when the building served by the apparatus is unoccupied, while a second evaporator, as subsequently explained in detail, operates on day cycle at times when the electric utility does not impose a demand charge.

Outside air can be directed through or by-passed around the indirect evaporative cooler 344, as indicated by the arrows 345 and 346, before it is conditioned in the air handler 338 and distributed through risers (not illustrated) and ducts 347 (one of which is shown in FIG. 29) to the building. In the air handler 338, in one mode of operation, air is conditioned by contact with the coil 348 to a dry bulb temperature of substantially 42° F. (6° C.). Ice water from the ice storage tank 342 at, say 38° F. (3° C.) is circulated by the pumps 349, flowing through the line 350, the pumps, 349 line 351 the coil 348 and the line 352 back to the tank 342. The flow of ice water through the coil 348 is modulated to maintain the 42° F. (6° C.) temperature of the conditioned air leaving the air handler 338. Whenever the ambient air has a low moisture content, it is economically desirable to use the indirect evaporative cooler 344 and, thereby, to reduce the requirement for ice water in the coil 348.

Conditioned air from the ducts 347 is delivered to induction mixing units 724 which serve perimeter zones and induction mixing units 725 which serve interior zones at a rate which is caused to vary as required by the air conditioning load in the spaces served by the induction mixing units 724 and 725. The induction mixing units 724 are of the "fan/coil" type, having constant speed fans 726 and coils 727; they are also of the unitary heat pump type, having coils 728 to which heat can be pumped from condensers 729 of first heat pumps and coils 730 from which heat can be pumped to evaporators 731 of second heat pumps. Lines 732 connect the condensers 729 and the evaporators 731 to the lines 367 and 368. The induction mixing units 725 have a plurality of induction nozzles 733, one of which is shown in FIG. 29, through which conditioned air from the ducts 347 flows, inducing a flow of recirculated air from the space or from a plenum, as indicated by an arrow, through induced air inlets 734. The recirculated air mixes with the conditioned air in mixing portions 735 of the induction mixing units 725, so that it is a mixture of conditioned air from the ducts 347 and recirculated air that is delivered to the space from discharge ends 736 of the units 725.

The fans 726 of the induction mixing units 724 have a capacity greater than the maximum flow of conditioned air to the boxes 724; as a consequence, air is caused to flow from a space served thereby into each of the induction mixing units 724, where it is mixed with conditioned air. The mixture of air from the space and conditioned air is returned to the space from the fan discharge. The spaces served by the induction mixing units 724 are below, while the induction mixing units 724 are above, ceilings 737. The air flow described above is indicated in FIG. 29 by arrows 738 and 739, the latter representing the flow of a mixture of conditioned air and recirculated air from one of the induction mixing units 724 and the former representing the flow of air from the space into the induction mixing unit 724.

Either chilled heat transfer fluid or evaporatively cooled heat transfer fluid is delivered to the boxes 724, being circulated by the pumps 360 through the line 362, the main header 363, the supply line 364, the header 365 of the first sprinkler grid, one of the several sprinkler conduits 366 of the first sprinkler grid, and the supply line 367, to the induction mixing units 724 and returning through the return line 368, one of the several sprinkler conduits 369 of the second sprinkler grid, the header 370 of the second sprinkler grid, the return line 371, the main return 372 and the line 373 back to the pumps 360. The heat transfer fluid circulated as just described is either chilled in the heat exchanger 398 by heat transfer therefrom to fluid flowing in the line 352 from the coil 348 to the ice storage tank 342 or is cooled by heat transfer therefrom in the heat exchanger 393 to water that has been cooled in the cooling tower 390. When chilled water is delivered to the induction mixing units 724 it is circulated through the coils 727, and is at a comparatively high temperature, sufficiently high that moisture is not condensed when room air at design conditions flows over the coils 727. In a typical instance, the water in the coils 727 will be at 58° F. (14° C.), and the room air will be at 75° F. (24° C.) and 50% relative humidity. In this mode of operation, dampers 740 can be modulated as desired to control the flow of conditioned air from the ducts 347 into each of the induction mixing units 724, and valves 741 can be modulated by controllers 742 to maintain the temperature sensed by thermostats 743 within control limits. While the induction mixing units 724 are operating as just described, cooling will often be required in some perimeter zones of a building while heating is required in others. This can occur because of a solar load that is imposed on different perimeter zones at different times of the day, because of differences in occupancy, or because of differences in the use of lights or of heat generating electronic apparatus, to mention a few of the possibilities. The boxes 724 are well suited to handle this situation because heat pumps associated with the condensers 729 can be energized where heat is required, and the valves 741 can be set so that the 58° F. (14° C.) water by-passes the associated coils 727; a heat transfer fluid is then circulated from the condensers 729 through lines 744, through the coils 728 and through lines 745 back to the condensers 729 so that heat is pumped from the circulated heat transfer fluid to the recirculated air where required. The induction mixing units 724 can be operated in the same way when ambient conditions are such that evaporatively cooled heat transfer fluid is available at 58° F. (14° C.).

It is sometimes desirable to circulate evaporatively cooled heat transfer fluid to the induction mixing units 724 even when ambient conditions are such that the temperature thereof is higher than 58° F. (14° C.). For example, if the building served by the apparatus of FIG. 29 is occupied during a part of the time when the electric utility imposes no demand charge, it is less costly to use electricity during that time to carry the air conditioning load than it is to use stored ice. This can be done by circulating an evaporatively cooled heat transfer fluid to the induction mixing units 724 and using the heat pumps associated with the condensers 729 or those associated with the evaporators 731 to pump heat to or from the recirculated air. Whenever the building is occupied at a time when the electric utility imposes no demand charge, it is also more energy efficient, by comparison with the use of ice for the purpose, to circulate refrigerant from the low pressure receiver 379 through a line 746 to a DX coil 747 in the air handler 348 and through a line 748 back to the low pressure receiver 379; in this mode of operation, the 42° F. (6° C.) air that is delivered through the duct 347 is produced by contact with the DX coil 747. During the time that there is a demand charge, then, ice produced during night cycle is used to provide a heat transfer fluid at 38° F. (3° C.) that is circualted from the ice storage tank 342 through the line 351 to the coil 348 in the air handler 338, returning through the line 352 and the heat exchanger 398 to the ice storage tank 342; heat is transferred in the exchanger 398 from fluid circulated by the pumps 360 to maintain its temperature at substantially 58° F. (14° C.). The extra friction introduced into the system by the DX coil 747 must be taken into account in determining whether or not there is a net saving in energy as a consequence of its use; it will often be preferable to save the energy necessary to overcome the friction rather than to save energy by using the DX coil.

A temperature sensor and controller 749 controls a damper 750 to vary the rate at which conditioned air from the ducts 347 enters each of the induction mixing units 725 as required to maintain a desired temperature within each of the interior spaces, the minimum damper position being one which provides the minimum ventilation air. As long as the rate of flow of conditioned air into and through the induction mixing units 725 is sufficiently high, an adequate flow of recirculated air is induced to flow without the need for a blower 751 to be energized. Whenever the flow of conditioned air is inadequate to cause the required induction in any one of the induction mixing units 725, the blower 751 is energized to provide an adequate circulation of air at a temperature sufficiently high that it does not cause discomfort. As is subsequently explained in more detail, air from the blowers 751 by-passes the induction nozzles 733 in the units 725 but, in other functionally equivalent induction mixing units, blowers can discharge through induction nozzles; back draft dampers (not illustrated in FIG. 29) prevent the flow of air except as described.

The apparatus of FIG. 30 includes some of the elements of the apparatus of FIG. 11, as is indicated by the use of the same reference numerals, including the air handler 338, and the refrigeration apparatus which comprises the compressor 340, the evaporative condenser 341 and the evaporator which serves the ice storage tank 342; this evaporator operates to produce ice on night cycle or whenever the electric utility does not impose a demand charge.

Outside air can be directed through or by-passed around the indirect evaporative cooler 344, as indicated by the arrows 345 and 346, before it is conditioned in the air handler 338 and distributed through risers (not illustrated) and ducts (one of which is shown in FIG. 30, designated 347) to the building. In the air handler 338, air is conditioned by contact with the coil 348 to a dry bulb temperature of substantially 42° F. (6° C.), as described with reference to FIG. 11.

The FIG. 30 apparatus comprises a plurality of induction units 752, each of which is substantially identical with the previously described induction mixing units 339 of FIGS. 11, 14, 15, 22 and 24–27, but receives no conditioned air, and is sized to serve a plurality of zones of the building, often an entire floor. Each of the induction units 752 has a blower 753 which discharges air, as indicated by a head 754 of an arrow, which it induces to flow, as indicated by a tail 755 of an arrow, from an adjacent space. The discharge of air from the induction units 752 is into an associated duct 756, from which it is available through ducts 757 to each of a plurality of mixing boxes 758, which are of the dual duct type. Conditioned air from the ducts 347 is delivered through a duct 759 and ducts 760 to the mixing boxes 758. The proportions in which conditioned air from the ducts 347 and air from the ducts 756 enter the mixing boxes 758 are controlled, respectively, by dampers 761 in the ducts 760 and dampers 762 in the ducts 757. The dampers 761 and 762 serving each of the mixing boxes 758 work in opposition under the control of thermostat-controllers 763 so that a substantially constant volume, variable temperature flow of air is delivered through air inlets 764 to the building zone served by each.

The apparatus of FIG. 30, operated as described in the preceding paragraph, requires more dehumidified air for temperature control than is necessary for humidity control, so that there is an operating cost penalty by comparison with the same apparatus operated so that only the amount of dehumidified air required for humidity control is used. However, there are both first cost and operating cost advantages by comparison with the conventional system described above where air cooled to about 55° F. (13° C.) is distributed as required for temperature control.

There are coils 765 in the induction units 752. On winter cycle, a warm heat transfer fluid can be circulated through the coils 765 so that warm air is available to the mixing boxes 758 as required for heating. The warm heat transfer fluid can be circulated from a heat exchanger (not illustrated) served, as required, by a boiler (not illustrated) through the building sprinkler system to each of the coils 765 and back to the heat exchanger.

As has been stated above, the dampers 740 of the apparatus of FIG. 29 can be controlled in any suitable manner. A particularly desirable way to control these dampers is by means of controllers 742 which modulate the dampers 740 to keep the humidity sensed by humidistats 766 within control limits; when the dampers 740 are so controlled, the temperature in the space served by each of the induction mixing units 724 can be controlled as previously described, i.e., by modulating the flow of cooled water through the coils 727, by pumping heat to the coils 728 or by pumping heat from the coils 730, as required.

The air handler 338 of FIG. 30 includes a coil 767 to which a relatively high temperature, say 58° F. (14° C.), heat transfer fluid can be circulated through lines 768 and 769 from a heat exchanger 770. The heat exchanger 770 is served by heat transfer fluid which flows through lines 771 and 772 from the sprinkler grid. Use of the coil 767 is advantageous, other factors being equal, because the relatively high temperature coolant is less expensive, per ton of refrigeration, than the low temperature coolant that is circulated through the coil 348.

FIGS. 29 and 30 show two modifications of the apparatus of FIG. 11. Analogous modifications of the apparatus of FIGS. 14, 15, 22, and 24–27 can also be made, and the control device of FIG. 20 can be used in the apparatus of FIGS. 29–45, as can the humidistat 508 where humidity conditions are suitable.

The apparatus of FIGS. 15 and 22 can be modified by substituting other apparatus for the refrigeration apparatus which includes the compressor 449. An example of apparatus where such substitution has been made is shown in FIGS. 31 and 32. In the FIG. 31 apparatus, cooled or warmed water for circulation through the main header 363, the sprinkler grids, the cooling coils 356, the main return 372 and back to the header 363 is provided by an absorption chiller/heater indicated generally at 773 and comprising a heater 774 and absorption refrigeration apparatus which includes an evaporator 775. Gas enters the absorption chiller/heater 773 as indicated by an arrow 776 and is burned, providing heat, which is either transferred to water delivered through a line 777 to the chiller/heater 773 from the line 372 and returned through a line 778 to the line 363 or used to energize absorption refrigeration apparatus which includes the evaporator 775 to which heat is transferred from water which is delivered thereto from the line 372 through a line 779 and returned through a line 780 to the main header 363. When the absorption refrigeration apparatus of the chiller/heater 773 is used, heat from the absorber and from the condenser thereof is transferred to a cooling tower 781.

In the FIG. 32 apparatus, water from a closed circuit evaporative cooler 782 is the sole means for removing heat from the water circulated through the line 363, the sprinkler grids and the line 372 back to the line 363. This water is supplied, however, to the cooling coils 727, to the condensers 729 or to the evaporators 731 of the induction mixing units 724, and heat is pumped to the coils 728 or from the coils 730 where heating or additional cooling of the recirculated air is required, all as previously discussed in connection with FIG. 29.

Apparatus otherwise similar to that of FIG. 11, but which includes the air handler 693 of FIG. 28 and induction mixing units 783 is shown in FIG. 33. The induction mixing units 783 are of the "fan/coil" type, having constant speed fans 784 and coils 785; they are also of the unitary heat pump type, having coils 786 to which heat can be pumped from condensers 787 of first heat pumps and coils 788 from which heat can be pumped to evaporators 789 of second heat pumps.

The fans 784 of the induction mixing units 783 have a capacity greater than the maximum flow of conditioned air to the units 783; as a consequence, air is caused to flow from a space served thereby into each of the induction mixing units 783, where it is mixed with conditioned air. The mixture of air from the space and conditioned air is returned to the space from the fan discharge. The spaces served by the induction mixing units 783 are below, while the induction mixing units 783 are above, ceilings 790. The air flow described above is indicated in FIG. 33 by arrows 791 and 792, the latter representing the flow of a mixture of conditioned air and recirculated air from one of the induction mixing units 783 and the former representing the flow of air from the space into the induction mixing units 783.

Either chilled heat transfer fluid or evaporatively cooled heat transfer fluid is delivered to the induction mixing units 783, being circulated by the pumps 360 through the line 362, the main header 363, the supply line 364, the header 365 of the first sprinkler grid, one of the several sprinkler conduits 366 of the first sprinkler grid, the supply line 367, to the induction mixing units 783 and returning through the return line 368, one of the several sprinkler conduits 369 of the second sprinkler grid, the header 370 of the second sprinkler grid, the return line 371, the main return 372 and the line 373 back to the pumps 360. The heat transfer fluid circulated as just described is either chilled in the heat exchanger 398 by heat transfer therefrom to fluid flowing in the line 352 from the coil 701 to the ice storage tank 342 or is cooled by heat transfer therefrom in the heat exchanger 393 to water that has been cooled in the cooling tower 390. When chilled water is delivered to the induction mixing units 783 it is circulated through the coils 785, and is at a comparatively high temperature, sufficiently high that moisture is not condensed when room air at design conditions flows over the coils 785. In a typical instance, the water in the coils 785 will be at 58° F. (14° C.), and the room air will be at 75° F. (24° C.) and 50% relative humidity. In this mode of operation, dampers 793 can be modulated as desired to control the flow of conditioned air from the ducts 347 into each of the induction mixing units 783, and valves 794 can be modulated by controllers 795 to maintain the temperature sensed by thermostats 796 within control limits. While the induction mixing units 783 are operating as just described, cooling will often be required in some perimeter zones of a building while heating is required in others. This can occur because of a solar load that is imposed on different perimeter zones at different times of the day, because of differences in occupancy, or because of differences in the use of lights or of heat geenerating electronic apparatus, to mention a few of the possibilities. The induction mixing units 783 are well suited to handle this situation because heat pumps associated with the condensers 787 can be energized where heat is required, and the valves 794 can be set so that the 58° F. (14° C.) water by-passes the associated coils 785; a heat transfer fluid is then circulated from the condensers 787 through lines 797, through the coils 786 and through lines 798 back to the condensers 787 so that heat is pumped from the circulated heat transfer fluid to the recirculated air where required. The induction mixing units 783 can be operated in the same way when ambient conditions are such that evaporatively cooled heat transfer fluid is available at 58° F. (14° C.).

The induction mixing units 783 also have induction nozzles 799, one of which is shown in FIG. 33, through which conditioned air from the ducts 347 or a mixture of such air with air discharged by the fans 784 flows, inducing a flow of recirculated air from the space or from a plenum, as indicated by an arrow, through induced air inlets 800. It is advantageous for controllers 801 to modulate the dampers 793 to maintain the humidity sensed by humidistats 802 within control limits. The humidistats 802 are positioned in the induced air inlets 800 where they detect the humidity of air induced to flow from the spaces they serve. Since space air is induced to flow into the inlets 800 whether or not the fans 784 are energized, humidity control can be maintained whenever the apparatus is operating while the fans 784 are energized only when they are needed to provide task cooling or heating. For example, a motion sensor (not illustrated) can be used in conjunction with the induction mixing units 783; whenever there is no motion in the space served by a given one of the induction mixing units 783, the fan 784 and the heat pumps which serve the condensers 787 and the evaporators 789 therein can be de-energized and the valve 794 can be set so that there is no flow of water through the coil 785. The controller 801 continues to modulate the damper 793 to maintain a desired humidity even when the space served by a given one of the units 783 is not occupied. As a consequence, as soon as motion is sensed in a previously unoccupied space, the fan 784 in the induction mixing unit 783 which serves that space can be energized and chilled water can be used as previously described in connection with FIG. 29 with respect to the operation of the induction mixing units 724 to provide task heating or cooling.

Some spaces in a building are frequently occupied when the air conditioning system which serves the building is not in operation. The apparatus of FIG. 33 is well suited to provide air conditioning for the spaces that are occupied at such times. The air handler 693 can be operated to dehumidify air which is circulated on demand for ventilation and humidity control of the spaces that are occupied, and a heat transfer fluid can be circulated between the coils 700 and 703 of the air handler 693 so that the dehumidified air is essentially neutral in temperature, say 70° F. (21° C.). The fans 784 can then be energized in the induction mixing units 783 which serve the occupied spaces, and heat can be pumped from the coils 788 of those units for temperature control, as required. The heat transfer fluid can be circulated through the sprinkler system in this mode of operation, acting as a heat sink for condenser heat.

It will be appreciated that, in some instances, it will not be necessary to operate both of the heat pumps which serve the coils 786 and 788 of the induction mixing units 783. For example, it is often possible to design the apparatus so that, when it is in cooling mode, modulating the flow of chilled water through the coils 785 will enable the induction mixing units 783 to maintain a desired temperature as heat gains in the spaces served vary from maximum to minimum. In other cases, modulating the flow of chilled water through the coils 785 and either pumping heat to the coils 786 or pumping heat from the coils 788 will enable the units 783 to maintain a desired temperature. Accordingly, one or both of the coils 786 and 788, and the associated heat pumps, can sometimes be omitted from the induction mixing units 783.

Apparatus otherwise similar to that of FIG. 31, but in which the compression refrigeration apparatus which includes the compressor 450 has been replaced by a chemical dehumidifier 803, compression refrigeration apparatus which includes a compressor 804 and associated equipment is shown in FIG. 34. Refrigerant flows from the compressor 804, which is driven by a gas engine 805, to an evaporative condenser 806, to a DX coil 807, a DX coil 808, and back to the compressor 804, the flow being through lines 809, 810, 811 and 812. The DX coils 807 and 808 are a part of the air handling portion of the apparatus, the former being in a first air handler 813 and the latter being in a second air handler 814. Return air enters the first air handler 813 from the duct 509, some being vented through an outlet 815, and the rest flowing through an inlet 816 and being mixed with outside air which has been either directed through or by-passed around the indirect evaporative cooler 344, as indicated by the arrows 345 and 346. The mixture of outside air and recirculated air then flows in heat exchange relationship with the DX coil 807, through a duct 817, through the dehumidifier 803, through a duct 818, through the second air handler 814, a duct 819, and a washer 820 and into the ducts 347. In the second air handler 814 the air is in heat exchange relationship first with a coil 821 and then with the DX coil 808. The air is dehumidified in the dehumidifier 803 by contact with a concentrated hygroscopic liquid, e.g., alumina, silica or paper impregnated with lithium chloride, and is cooled by heat exchange first with the coil 821 and then with the coil 808. Evaporatively cooled water from a cooler 822 is circulated through the coil 821. The dehumidifier 803 is a wheel which rotates as indicated by an arrow 823 so that the air being dehumidified passes through successive segments of the wheel as they are advanced by rotation while regenerating air passes, as subsequently described, through different successive segments as they are advanced.

As an example of the operation of the apparatus of FIG. 34, outside air having a dry bulb temperature of 95° F. (35° C.) and containing 99 grains of water vapor per pound of dry air can be mixed with return air to produce a mixture having a dry bulb temperature of 90° F. (32° C.) and containing 90 grains of water vapor per pound of dry air. This mixture can then be cooled to a dry bulb temperature of 51° F. (11° C.) by contact with the coil 807 and dehumidified to a moisture content of 51 grains of water vapor per pound of dry air. In the dehumidifier 803 the air can be dehumidified to a moisture content of 10 grains of water vapor per pound of dry air and heated to a dry bulb temperature of 100° F. (38° C.). This air can then be cooled sensibly by contact with the coil 821 to a dry bulb temperature of 95° F. (35° C.) and by contact with the coil 808 to a dry bulb temperature of 57° F. (14° C.) without, in either case, affecting its moisture content. Finally, the air can be washed adiabatically in the washer 820 so that it enters the ducts 347 at a dry bulb temperature of 40° F. (4° C.) and containing about 37 grains of water vapor per pound of dry air.

It will be appreciated from the foregoing example of its operation that the apparatus of FIG. 34 can be used to produce the low temperature, dry air that can be circulated in a small quantity as described above to achieve substantial savings in the original construction cost of air conditioning apparatus according to the instant invention. The FIG. 34 apparatus differs from that previously described because it accomplishes this result using gas as an energy source, and without requiring electricity from a utility or either ice or desiccant storage. As is indicated by an arrow, gas enters the engine 805 as a fuel; the gas is converted by the engine 805 to shaft work which drives the compressor 804 and heat in the form of hot gases. The hot gases flow through a segment of a heat exchanger 824 and are vented while a blower 825 directs air through the other side of the heat exchanger 824 and through a segment of the dehumidifier 803 to effect regeneration of that segment. Rotation of the dehumidifier 803 causes successive segments thereof to present themselves for regeneration. It will be appreciated that a diesel or other combustion engine could be used in place of the gas engine 805, and that a gas turbine, diesel or other engine could also be use to drive an electric generator to power an electric motor to drive the compressor 804. Where a combustion engine which has a cooling jacket is used, heat from the jacket is available in addition to heat from the combustion products. Further, the gas turbine or other engine could be sized to provide the heat required by the absorption chiller heater 773.

Apparatus similar to that of FIG. 14, except that the induction mixing units 339 have been replaced by induction mixing units 826, is shown in FIG. 35. Conditioned air from the ducts 347 is delivered to the induction mixing units 826 at a rate which varies, depending upon the settings of individual dampers 827, each of which is actuated by a thermostat/humidistat controller 828. The induction mixing units 826 are of the "fan/coil" type, having constant speed fans 829, coils 830 and coils 831. The fans 829 have a capacity greater than the maximum flow of conditioned air to the units 826 when the dampers 827 are in their full open positions; as a consequence, there is a flow of recirculated air therethrough as previously described and as indicated by an arrow having the head 358 and the tail 359.

The thermostat/humidistat controllers 828 actuate the dampers 827 to establish and maintain a desired humidity in the space served by each of the induction mixing units 826, opening the dampers 827 when the humidity is too high, and closing them when the humidity is too low. The minimum damper settings are those at which each of the induction mixing units 826 furnishes the minimum ventilation air. When humidity control has been established and the flow of conditioned air at the rate required to maintain the desired humidity is insufficient to counteract heat gains in the space served by one of the induction mixing units 826, a three-way valve 832 is set by the thermostat/humidistat controller 828 to cause chilled water circulated by the pumps 360 as previously described to flow through the coil 830 in that box, and the rate of flow is modulated by the valve 374 which is set as required by the thermostat/humidistat controller 828 to maintain the desired temperature. When the flow of conditioned air at the rate required for humidity control is more than sufficient to counteract heat gains in the space served by one of the induction mixing units 826, the thermostat/humidistat controller 828 sets the three-way valve 832 to cause chilled water to flow through the coil 831 in that box, and actuates the valve 374 in that box to modulate the flow of chilled water through the coil 831 to maintain the set temperature, increasing the flow when the temperature is too low and vice versa. The chilled water is used to counteract heat gains when it is circulated through the coils 830, and for reheat when it is circulated through the coils 831. This is possible because the water is at about 58° F. (14° C.) while the room air which flows in heat exchange relationship with the coils 830 is at about 75° F. (24° C.) and the conditioned air which flows in heat exchange relationship with the coils 831 is at about 40° F. (4° C.)

The induction mixing units 826 also include electric heaters 833 positioned for heat exchange with air from the space that is caused to flow therethrough. The heaters 833 can be used in place of or to supplement the coils 831 when reheat is required. Similarly, the induction mixing units 826 can include electric heaters (not illustrated) positioned for heat exchange with conditioned air or with a mixture of conditioned air and recirculated air, and any of the heaters, or any combination of the heaters, can be used in place of or to supplement the coils 831 for reheat. It is also possible to circulate warm water to the coils 830 of the induction mixing units 826 or to the coils 356 of the induction mixing units 339 (see, for example, FIG. 11) as required for reheat, but this requires a second circulating system and, therefore, usually is economically undesirable.

Apparatus which is the same as that of FIG. 35 except that the induction mixing units 826 having been replaced by induction mixing units 834 is shown in FIG. 36. The induction mixing units 834 are of the "fan/coil" type, having the fans 829 and the coils 831, but they are controlled by thermostat controllers 835 which modulate the dampers 827 for temperature control between settings that provide the minimum ventilation air and full open positions; whenever the setting that provides the minimum ventilation air more than counteracts heat gains in a given space, the controller 835 for the induction mixing unit 834 which serves that space modulates the valve 374 of that unit as required to provide the requisite reheat.

Apparatus which is the same as that of FIG. 35 except that the induction mixing units 826 have been replaced by induction mixing units 836 is shown in FIG. 37. The induction mixing units 836, which are controlled, as is subsequently explained in more detail, by thermostat/humidistat-controllers 837, have heat pipes indicated generally at 838 and 839. The heat pipe 838 has a condensing section 840, an evaporating section 841, a vapor pipe 842, a liquid return line 843 and a pump 844 in the liquid return line 843. The pump 844 is operable to pump condensate from the condensing section 840 to the evaporating section 841. A valve 845 controls the operation of the heat pipe 838. The heat pipe 839 has a condensing section 846, an evaporating section 847, a vapor pipe 848, a liquid return line 850 and a pump 851 in the liquid return line 850. The pump 851 is operable to pump condensate from the condensing section 846 to the evaporating section 847. A valve 852 controls the operation of the heat pipe 839.

When the induction mixing units 836 are operating, the dampers 827 are modulated by the thermostat/humidistat-controllers 837 as required for humidity control. When cold primary air at the rate of flow required to control humidity is insufficient to counteract heat gains in the space served by one of the units 836, the relevant thermostat/humidistat-controller 837 senses a temperature above the set point and, in response, activates the associated heat pipe 838 by energizing the pump 844 and opening the valve 845 thereof. The liquid of the heat pipe 838 is then pumped into the evaporating section 841, where it is vaporized by heat transferred thereto from air flowing through the induction mixing unit 836 from the space. The vapor which results flows through the vapor pipe 842 to the condensing section 840 where it is condensed by heat transfer therefrom to air in the plenum with which it is in heat transfer relationship. It will be appreciated that the heat pipe 838 must be in a cooled plenum to be capable of transferring heat from recirculated air as just described; as previously described, the sprinkler systems of FIGS. 16 and 17 can be used to cool the plenum to enable the heat pipe 838 to operate. When one of the heat pipes 838 is not energized, the associated thermostat/humidistat-controller 837, in response to a sensed temperature below the set point, activates the relevant one of the heat pipes 839 by energizing the pump 851 and opening the valve 852. The liquid of the heat pipe 839 is then pumped into the evaporating section 847, where it is vaporized by heat transferred thereto from air in the plenum. The vapor which results flows through the vapor pipe 848 to the condensing section 846 where it is condensed by heat transfer therefrom to cold primary air flowing in heat transfer relationship therewith. The heat pipe 839 is capable of operating either in a cooled plenum or in a plenum that is heated to a temperature several degrees above the space temperature because it is transferring heat to cold primary air.

The apparatus of FIG. 38 is the same as that of FIG. 37 except that the induction mixing units 836 have been replaced by induction mixing units 853 which have heat pipes indicated generally at 854. The heat pipes 854 have a condensing section 855, an evaporating section 856, a vapor pipe 857, a liquid return line 858 and a pump 859 in the liquid return line 858. The pump 859 is operable to pump condensate from the condensing section 855 to the evaporating section 856. A valve 860 controls the operation of the heat pipe 854.

The air handlers 338 of the apparatus of FIGS. 35-38 have coils 861 connected by lines 862 and 863 to the headers 365 and 370. Relatively high temperature water in the coils 861 can carry a substantial proportion of the air conditioning load at a lower cost per ton of refrigeration, by comparison with the cost when lower temperature water from the ice storage tank 342 is used, provided that any electricity used to produce the high temperature water does not contribute to a demand charge, for example, because the absorption apparatus 442 is used to cool the water, because electricity from the engine generator 387 is used, or because electricity from a utility is used at a time when its use does not contribute to a demand charge. The apparatus of FIGS. 37 and 38 does not use relatively high temperature water to remove heat from air circulated through the induction mixing units 836 and 853; as a consequence, the only use for high temperature water in the apparatus of these Figures is in the coils 861.

One of the induction mixing units 725 of the apparatus of FIG. 29 is shown in more detail in FIGS. 39 and 40. Conditioned air enters the induction mixing unit 725 through an inlet 864 at a rate which depends upon the setting of the damper 750 and is discharged through the nozzles 733. When the rate of flow of conditioned air through the nozzles 733 is sufficiently high, recirculated air is induced to flow at a substantial rate through the induced air inlet 734, mixing with the conditioned air in the mixing portion 735. In this mode of operation, a back-draft damper 865 prevents a flow of air from the nozzles 733 to the right in FIG. 39 through an air inlet 866, while the flow of air through the induced air inlet 734 opens a back-draft damper 867. When the flow of conditioned air to the induction mixing unit 725 is throttled to such an extent that its flow through the nozzles 733 is not capable of inducing an adequate flow of recirculated air through the inlet 734, the blower 751 is energized, inducing air to flow through the inlet 866 to the suction side of the blower 751; this air is discharged into a passage 868 which bypasses the nozzles 733, forces the back-draft damper 867 to move to a "closed" position, and mixes with the conditioned air in the mixing portion 735. Accordingly, whether or not the blower 751 is energized, it is a mixture of conditioned air and recirculated air that is discharged from the induction mixing unit 725 into the space it serves.

An induction mixing unit that is functionally equivalent to the induction mixing unit 725 is designated 869 in FIGS. 41 and 42. The induction mixing unit 869 has a conditioned air inlet 870, induction nozzles 871, a mixing portion 872, an air inlet 873, a blower 874, a back-draft damper 875, a conditioned air damper 876 (FIG. 42) and an induced air inlet 877 (FIG. 41). Conditioned air enters the unit 869 through the inlet 870 at a rate which depends upon the setting of the damper 876 and is discharged through the nozzles 871. When the rate of flow of conditioned air through the nozzles 871 is sufficiently high, this flow induces recirculated air to flow at a substantial rate through the induced air inlet 877, mixing with the conditioned air in the mixing portion 872. In this mode of operation, the back-draft damper 875 prevents a flow of air from the nozzles 871 to the right in FIG. 41 through the air inlet 873. When the flow of conditioned air to the induction mixing unit 869 is throttled to such an extent that its flow through the nozzles 871 is not capable of inducing an adequate flow of recirculated air through the inlet 877, the blower 874 is energized, inducing air to flow through the inlet 873 to the suction side of the blower 874; this air is discharged into a chamber at the discharge end of the blower 874 where it mixes with conditioned air which enters through the primary air inlet 870, and from which, mixed with primary air, it flows through the nozzles 871, forcing the back-draft damper 875 to move to an "open" position. Air which flows through the nozzles 871 mixes, in the mixing portion 872, with air induced to flow through the inlet 877. Accordingly, whether or not the blower 874 is energized, air is induced to flow through the inlet 877 and it is a mixture of conditioned air and recirculated air that is discharged from the box 869 into the space it serves.

Apparatus similar to that of FIG. 31, but wherein the induction mixing units 724 have been replaced by induction mixing units 878, is shown in FIG. 43. The induction mixing units 878 are of the "fan/coil" type, having constant speed fans 879 and coils 880; they are also of the unitary heat pump type, having coils 881 to which heat can be pumped from condensers 882 of first heat pumps and coils 883 from which heat can be pumped to evaporators 884 of second heat pumps; finally, they are of the induction type, having a plurality of induction nozzles 885, one of which is shown in FIG. 43, through which conditioned air from the ducts 347 flows, inducing a flow of recirculated air from the space or from a plenum, as indicated by an arrow, through induced air inlets 886. Air which enters the induction mixing units 878 through the one or both of the induced air inlets 886 mixes with air discharged from the induction nozzles 885 in mixing portions 887 of the induction mixing units 878, so that it is a mixture of these streams that is delivered to the spaces from discharge ends 888 of the induction mixing units 878.

The fans 879 of the induction mixing units 878 have a capacity greater than the maximum flow of conditioned air to the induction mixing units 878; as a consequence, when the fans 879 are operating, air is caused to flow through an air inlet 889 from a space served thereby into each of the induction mixing units 878, where it is mixed with conditioned air. The mixture of air from the space and conditioned air flows through the induction nozzles 885, inducing a further flow of recirculated air through one or both of the induced air inlets 886; the air delivered to the spaces is a mixture of the air which flows through the nozzles 885 and the air that its flow induces. An arrow 890 indicates the flow of air through the air inlets 889, while an arrow 891 indicates the flow of an air mixture from the induction mixing units 878 to the spaces they serve.

Evaporatively cooled heat transfer fluid is delivered to the induction mixing units 878, being circulated thereto as previously described from the closed circuit evaporative cooler 782. This water is supplied to the coils 880, to the condensers 882 or the evaporators 884, as required, so that the required cooling can be done by the coils 880 or by the coils 883 or the required heating can be done by the coils 881. The apparatus also includes a coil 892 positioned for heat transfer with conditioned air before it flows through the nozzles 885. Heat transfer from this coil will often provide all the reheat that is necessary, in which case the coils 881, the condensers 882 and the first heat pumps can be omitted. Similarly, chilled water can be circulated to the coils 880 and used as previously described, and will often provide all of the supplemental cooling that is required, beyond that done by the conditioned air from the ducts 347.

The induction mixing unit 878 is admirably suited for task cooling when a damper 893 is controlled by a humidistat-controller 894 to maintain the humidity in a space it serves at a predetermined level while the operation of the fan 879, of the coils 880 and 892 and of the first and second heat pumps, if they are present, is controlled by a thermostat-controller 895 in cooperation with a signal indicating that the space served is occupied. The signal can be from a motion sensor (not illustrated) or can be one which an occupant of the space served actuates, e.g., by turning on the lights or by turning a separate switch to the on position. When there is no signal indicating that the space is occupied, the fan 879 is not energized and the first and second heat pumps, if they are present, are not energized; as a consequence, the coils 880, 881 and 883 are essentially ineffective to counteract heat gains or losses in the space. The coil 892, however, is operated by the controller 895 as previously described for reheat if the space temperature is below the set point. Whenever there is a signal which indicates that the space served is occupied, the fan 879 is operated and chilled or evaporatively cooled water is made available to the coil 880 and to the condenser 882 and the evaporator 884 if the first and second heat pumps are used.

The induction mixing unit 725 (FIGS. 39 and 40) has a coil 896 and the induction mixing unit 869 (FIGS. 41 and 42) has a coil 897; either of these induction mixing units can be substituted for the induction mixing unit 878 (FIG. 43) and operated as just described in the preceding paragraph when its coil (896 or 897) is connected between the lines 367 and 368, and chilled 58° F. (14° C.) heat transfer fluid is supplied to the sprinkler system as previously described.

Apparatus which includes many of the elements of that of FIG. 11 (but not the water chiller 343 and associated apparatus), and which additionally includes an induction unit 898 and mixing boxes 899 is shown in FIG. 44. The induction unit 898 has an inlet 900 for recirculated air and a blower 901 which induces air from the zone served by the induction unit 898 to flow through the inlet 900 and discharges that air into a duct 902 from which it is delivered to the mixing boxes 899, flowing through ducts 903 at a rate which is determined by the settings of dampers 904. Conditioned air from one of the ducts 347 is also delivered to the mixing boxes 899, flowing thereto through ducts 905 at rates which depend upon the settings of dampers 906.

The mixing boxes 899 have coils 907 positioned for heat exchange with cold primary air entering from the ducts 905 and coils 908 positioned for heat exchange with recirculated air air entering from the ducts 905 and coils 908 positioned for heat exchange with recirculated air from the ducts 903. The flow of heat transfer fluid to the coils 907 and 908 is determined by the positions of valves 909 and of valves 910, respectively.

The dampers 904 and 906 and the valves 909 and 910 are controlled by humidistat controllers 911 and thermostat controllers 912. In operation, the dampers 906 are modulated as required to maintain a set humidity in the space served by each of the mixing boxes 899, and the dampers 904 are modulated in opposition to maintain a substantially constant flow of total air to the space served by each of the mixing boxes 899. When one of the thermostat controllers 912 senses a space temperature above the set point, it opens the associated one of the valves 910 to enable a heat transfer fluid at about 58° F. (14° C.) to flow through the associated coil 908, and modulates that valve as required to maintain the set temperature. Should the space temperature remain above the set point with the associated valve 904 in a full open position, the thermostat controller 912 overrides the associated humidistat controller 911 and modulates the dampers 904 and 906 in opposition to maintain the set temperature; during this time, the valve 910 is kept in its full open position. When one of the thermostat controllers senses a space temperature below the set point, it opens the associated one of the valves 909 and modulates that valve as required to maintain the set temperature. The valve 910 is closed while the associated valve 909 is being modulated for reheat.

The apparatus of FIG. 44 is also admirably suited for task cooling. Whenever there is no signal indicating that the space served is occupied, the damper 904 serving that space is closed, and the associated damper 906 is modulated by the humidistat controller 911 as required for humidity control. If the thermostat controller 912 senses a temperature below the set point, it modulates the valve as required for reheat. As soon as there is a signal indicating that the space is occupied, operation as described above is resumed.

Apparatus which is the same as that of FIG. 35 except that the humidistat 508 and the controller 510 have been omitted and the thermostat controller 828 has been replaced by a humidistat/thermostat controller 913 is shown in FIG. 45. Each of the humidistat/thermostat controllers 913 controls the associated damper 353 as previously discussed to maintain the humidity of the space it serves within control limits, controls the coil 833 as required to maintain temperature when the amount of conditioned air required for humidity control is too little to overcome heat gains, and controls the coil 831 as required to maintain temperature when the amount of conditioned air required for humidity control more than overcomes heat gains. Because the apparatus of FIG. 45 has no humidistat measuring the overall or average humidity of the building in which the induction mixing units 826 are situated, the option of using a single humidity reading to control the apparatus is not available.

Apparatus similar to that of FIG. 35, except that the induction mixing units 826, instead of delivering a mixture of primary conditioned air and recirculated air to a single zone at a constant rate, serve a plurality of variable air volume diffusers 914 is shown in FIG. 46. The diffusers 914 deliver air to the spaces they serve, as indicated by arrows 915, at a rate which depends upon the positions of dampers 916, as set by temperature sensor/controllers 917. Each of the sensor/controllers 917 modulates the one of the dampers 916 associated therewith to maintain a set temperature in the space it serves. The induction mixing units 826 are controlled by sensor/controllers 918:

(1) to maintain a constant pressure in a duct 919, and
(2) to maintain an instantaneously set temperature in the duct 919.

When the apparatus is first energized, the dampers 827 are all in their full open positions, and there is no flow of chilled water through the coils 830. This mode of operation continues until the humidistat 508 senses a moisture content which indicates that humidity control has been established. The apparatus then enables each of the sensor/controllers 918 to control the associated one of the dampers 827 and the associated one of the valves 374. Initially, each of the dampers 827 is set in its minimum position, i.e., the one which provides the minimum ventilation air or the minimum setting which provides humidity control, depending upon the design of the apparatus, and each of the valves 374 is set in its full open position; this mode of operation continues until one of the sensor/controllers 917 senses a temperature (1) above its set point with the associated damper 916 in the full open position, or
(2) below its set point with the associated damper 916 in its minimum position.

In case (1), the sensor/controller 918 is activated to control the associated one of the dampers 827 to maintain the sensed temperature about 2° F. (1° C.) below that sensed at the time of activation; thereafter, the set point for the sensor controller is lowered whenever there is a reoccurrence of case (1) or raised when there is an occurrence of case (2), until such time as the damper 827 is in its minimum position again. In case (2), the sensor/controller 918 is activated to control the associated one of the valves 374 to maintain the sensed temperature about 2° F. (1° C.) above that sensed at the time of activation; thereafter, the set point for the sensor controller is raised whenever there is a reoccurrence of case (2) or lowered when there is an occurrence of case (1) until such time as the valve 374 is again in its full open position.

The apparatus of FIG. 46 is also capable of doing task cooling. In response to a signal indicating that none of the spaces served by one of the induction mixing units 826 is occupied, for example, when all of the lights in those spaces are de-energized, the associated sensor/-controller 918 sets the relevant one of the dampers 827 in its minimum position, de-energizes the relevant one of the fans 829 and closes the relevant one of the valves 374. A back-draft damper (not illustrated) prevents the flow of conditioned air to the right in FIG. 46 out of the mixing unit 826 so that the flow is, instead, through the duct 919 and into the spaces served by the diffusers 914. The sensor/controller 918 also has another manual setting in which, in response to the signal indicating that none of the spaces served by one of the induction mixing units 826 is occupied, it closes the relevant one of the valves 374, but does not de-energize the associated fan 829.

Apparatus comprising absorption refrigeration apparatus indicated generally at 920, compression refrigeration apparatus indicated generally at 921, an air handler 922, a circulating system which includes a plurality of sprinkler branches, one of which is designated generally at 923, and a plurality of induction mixing units, one of which is designated generally at 924, is shown in FIG. 47. The absorption refrigeration apparatus 920 is a direct fired unit to which a gas fuel is supplied as indicated by an arrow 925, and from which exhaust gases are discharged as indicated by an arrow 926 and vented to a chimney (not illustrated). The compression refrigeration apparatus 921 comprises a compressor 927, a condenser 928 and a direct expansion coil 929.

In operation, a supply air fan 930 causes a mixture of outside air, as indicated by an arrow 931, and return air from a return fan 932 to flow over a cooling coil 933 and the direct expansion coil 929 and then through a duct 934 to the induction mixing unit 924. A blower 935 causes air to flow, as indicated by a tail 936 of an arrow from a space 937 served by the induction mixing unit 924 through an opening 938 into a plenum 939 and from thence into the induction mixing unit 924 where it is mixed with air from the duct 935; the resulting mixture enters the suction side of the blower 935 and is delivered to the space 937 as indicated by a head 940 of an arrow. A pump 941 circulates chilled water from the absorption apparatus 920 to the coil 933 and back to the absorption apparatus 920; the water can be at a temperature of 48° F. (9° C.) when it leaves the absorption apparatus 920 and at a temperature of 56° F. (13° C.) when it returns, while the compression apparatus can operate to maintain the direct expansion coil 929 at 38° F. (3° C.) so that the mixture of outside air and return air is cooled to 58° F. (14° C.) by the coil 933 and to 42° F. (6° C.) by the direct expansion coil 929. Air at 42° F. (6° C.), then, is delivered to the induction mixing unit 924 at a rate which is determined by a damper 942 under the control of a thermostat/controller 943. The damper 942 is modulated, as required for temperature control, by the thermostat/controller 943 between a position that provides the minimum ventilation air and a full open position. Whenever the minimum ventilation air cools the space 937 excessively, the thermostat/controller 943 modulates a valve 944 so that warm water circulated by a pump 945 from the absorption apparatus 920 through the sprinkler branch 923, a coil 946 and the sprinkler branch 923 back to the absorption apparatus 920 heats air entering the induction mixing unit 924 from the plenum 939 to the extent required to maintain a desired temperature.

Heat is rejected, as required, from the absorption apparatus 920 and from the condenser 928 of the compression apparatus 921 to a cooling tower 947.

It will be appreciated that the compressor 927 of the apparatus of FIG. 47 operates during times of peak usage of electricity when a demand charge is imposed. However, its operation can be constant, because the absorption apparatus 920 can be operated to account for all variations in load, producing, for example, air at 50° F. (10° C.) saturated with water vapor whatever the entering conditions of the air to the coil 933. This minimizes the demand component of the total cost of electricity per kilowatt hour.

Apparatus comprising absorption refrigeration apparatus indicated generally at 948, compression refrigeration apparatus indicated generally at 949, an air handler 950, a circulating system which includes a plurality of sprinkler branches, one of which is designated generally at 951, and a plurality of induction mixing units, one of which is designated generally at 952, is shown in FIG. 48. The absorption refrigeration apparatus 948 is a direct fired unit to which a gas fuel is supplied as indicated by an arrow 953, and from which exhaust gases are discharged as indicated by an arrow 954 and vented to a chimney (not illustrated). The compression refrigeration apparatus 949 comprises a compressor 955, a condenser 956 and an evaporator 957 which is operably associated with an ice storage tank 958. Water is circulated from the storage tank 958 by a pump 959, flowing through a heat exchanger 960, to the evaporator 957 and returning from the evaporator 957 to the tank 958. The apparatus 949 can be operated while water is circulated as described, either to produce ice or merely to remove sensible heat from the water before it is returned to the tank 958, or the apparatus can be idle, in which case the heated water is merely returned to the tank 958.

In operation, a supply air fan 961 causes a mixture of outside air, as indicated by an arrow 962, and return air from a return fan 963 to flow over a cooling coil 964, and then through a duct 965 to the induction mixing unit 952. A blower 966 causes air to flow, as indicated by a tail 967 of an arrow from a space 968 served by the unit 952 through an opening 969 into a plenum 970 and from thence into the unit 952 where it is mixed with air from the duct 965; the resulting mixture enters the suction side of the blower 966 and is delivered to the space 968 as indicated by a head 971 of an arrow. A pump 972 circulates chilled water from the heat exchanger 960 to the coil 964 and back to the heat exchanger, while the pump 959 circulates water from the tank 958 to the heat exchanger 960 and, as previously described, back to the tank 958. A valve 973 is modulated to maintain the water delivered to the coil 964 at a temperature of 36° F. (2°0 C.) so that the mixture of outside air and return air is cooled to 40° F. (4° C.) by the coil 964, and is delivered to the unit 952 at a rate which is determined by a damper 974 under the control of a thermostat-humidistat/controller 975. The damper 974 is modulated, as required for humidity control, by the humidistat-thermostat/controller 975 between a position that provides the minimum ventilation air and a full open position.

Whenever the thermostat-humidistat/controller 975 senses a suitable humidity, chilled water from the absorption apparatus 948 is circulated by a pump 976 from the absorption apparatus 948 through the sprinkler branch 951 to a coil 977 in the induction mixing unit 952 and from thence through the sprinkler branch 951 and back to the absorption apparatus 948. The controller 975 opens and closes a valve 978 so that the chilled water which flows through the coil 977 maintains the temperature of the space 968 within control limits. When the valve 978 is in its full open position and the temperature is still above the control temperature, the controller 975 opens the damper 974 so that there is a flow of air from the duct 965 in excess of that required for humidity control to control space temperature.

The apparatus also includes a valve 979 which can be set so that the pump 976 circulates warm water from the absorption apparatus 948 through the sprinkler branch 951, the coil 977 and the sprinkler branch 951 back to the absorption apparatus 948 to heat air entering the induction mixing unit 952 from the plenum 970.

Heat is rejected, as required, from the absorption apparatus 948 to a cooling tower 980 and in any suitable way (not illustrated) from the compression apparatus 949.

The compressor 955 of the apparatus of FIG. 48 can operate only during off-peak times when the usage of electricity does not contribute to a demand charge, or it can operate substantially 24 hours per day. The operation can be constant whenever it contributes to a demand charge because the rate at which ice is melted can change as required when there are variations in the load on the coil 964. The apparatus must be larger if the compressor 955 operates only during off peak times so which mode of operation is optimum depends upon whether the demand component or the increased equipment component of the total cost of electricity per kilowatt hour is greater.

Apparatus shown in FIG. 49 is identical to that of FIG. 48 and, in addition, includes a cogenerator 981. Exhaust heat from the cogenerator 981, as indicated by an arrow 982, energizes the absorption apparatus 948, while, as indicated by a line 983, electricity from the cogenerator 981 energizes the compressor 955, the blowers 961, 963 and 966, and the pumps 959, 972 and 976. The operation of the apparatus of FIG. 49 is identical to the operation of the apparatus of FIG. 48, as described above, but it does not contribute to a demand charge.

Apparatus comprising absorption refrigeration apparatus indicated generally at 984, compression refrigeration apparatus indicated generally at 985, an air handler 986, a circulating system which includes a pump 987, a circulating system which includes a pump 988, and a plurality of induction mixing units, one of which is designated generally at 1004, is shown in FIG. 50. The absorption refrigeration apparatus 984 is a direct fired unit to which a gas fuel is supplied as indicated by an arrow 990, and from which exhaust gases are discharged as indicated by an arrow 991 and vented to a chimney (not illustrated). The compression refrigeration apparatus 985 comprises a compressor 992, a condenser 993 and an evaporator 994 which is operably associated with an ice water storage tank 995. Water is circulated from the storage tank 995 by a pump 996, flowing through a heat exchanger 997, to the evaporator 994 and returning from the evaporator 994 to the tank 995. The apparatus 985 can be operated while water is circulated as described, either to produce ice or merely to remove sensible heat from the water before it is returned to the tank 995, or the apparatus can be idle, in which case the water is merely returned to the tank 995 at the temperature to which it is warmed in the heat exchanger 997.

In operation, a supply air fan 998 causes outside air, as indicated by an arrow 999, to flow into the air handler 986, over a heating coil 1000, over a pre-cooling coil 1001, over a cooling coil 1002 and then through a duct 1003 to an induction mixing unit 1004. A relief air blower 1005 withdraws air from the space served by the induction mixing unit 1004, returning a part of the withdrawn air through a duct 1006 to the induction mixing unit 1004, and venting the rest as relief air through a duct 1007. A blower 1008 discharges from the induction mixing unit 1004 a mixture of return air from the duct 1006 and conditioned air from the duct 1003. The blower 1008 is controlled to maintain constant the static pressure measured by a sensor 1009 in a duct 1010, while the blower 1005 is controlled to deliver air at the same rate as the blower 1008, air being vented through the duct 1007 at the same rate that conditioned air enters the induction mixing unit 1004. Air from the duct 1010 is delivered to a plurality of diffusers 1011 and from thence to the spaces they serve. The rate at which air is delivered by each of the diffusers 1011 is determined by the position of a damper 1012, each of which is controlled by a thermostat controller 1013 to maintain a predetermined space temperature.

The pump 987 circulates water at a temperature of about 48° F. (9° C.) from the absorption refrigeration apparatus 984 to the pre-cooling coil 1001 and back to the apparatus 984. A pump 1014 circulates chilled water from the heat exchanger 997 to the coil 1002 and back to the heat exchanger, while the pump 996 circulates water from the compression refrigeration apparatus 985 to the heat exchanger 997 and back to the compression refrigeration apparatus 985. A valve 1015 is modulated to maintain the water delivered to the coil 1002 at a temperature of 36° F. (2° C.) so that the outside air is cooled in the air handler, first to 60° F. (16° C.) by the coil 1001 and then to 40° F. (4° C.) by the coil 1002. This air is delivered to the duct 1003 and the induction mixing unit 1004 at a constant rate which is at least sufficient to provide the minimum ventilation air and humidity control.

The pump 987 also circulates water from the absorption apparatus 984 to a cooling coil 1016 in the induction mixing unit 1004. A temperature sensor/controller 1017 controls a valve 1018 to maintain a predetermined temperature on the downstream side of the coil 1016. This temperature can be raised or lowered to accommodate variations in the air conditioning load on the spaces served by the diffusers 1011.

The pump 988 of the apparatus of FIG. 50, when heating is required, circulates heated water from the absorption refrigeration apparatus 984 to a heat exchanger 1019 and back to the apparatus 984, while a pump 1020 circulates another stream of water from the heat exchanger 1019 to the pre-heat coil 1000 and back to the heat exchanger 1019. The temperature of the coil 1000 is determined by a temperature sensor/controller 1021, which modulates a valve 1022 to maintain the temperature it senses within control limits. Plenum unit heaters 1023 and baseboard heaters 1024 are also operably connected to the circulating system served by the pump 988 for use, as required, to introduce heat into a plenum above the spaces served or into the spaces themselves. The apparatus also includes valves 1025 and 1026 to control the flow of heated water to the plenum heaters 1023 and to the baseboard heaters 1024, respectively.

Apparatus comprising absorption refrigeration apparatus indicated generally at 1025, compression refrigeration apparatus indicated generally at 1026, an air handler 1027, a circulating system which includes a pump 1028, a circulating system which includes a pump 1029, and a plurality of induction mixing units, one of which is designated generally at 1045, is shown in FIG. 51. The absorption refrigeration apparatus 1025 is a direct fired unit to which a gas fuel is supplied as indicated by an arrow 1031, and from which exhaust gases are discharged as indicated by an arrow 1032 and vented to a chimney (not illustrated). The compression refrigeration apparatus 1026 comprises a compressor 1033, a condenser 1034 and an evaporator 1035 which is operably associated with an ice water storage tank 1036. Water is circulated from the storage tank 1036 by a pump 1037, flowing through a heat exchanger 1038, to the evaporator 1035 and returning from the evaporator 1035 to the tank 1036. The apparatus 1026 can be operated while water is circulated as described, either to produce ice or merely to remove sensible heat from the water before it is returned to the tank 1036, or the apparatus can be idle, in which case the water is merely returned to the tank 1036 at the temperature to which it is warmed in the heat exchanger 1038.

In operation, a supply air fan 1039 causes outside air, as indicated by an arrow 1040, to flow into the air handler 1027, over a heating coil 1041, over a pre-cooling coil 1042, over a cooling coil 1043 and then through a duct 1044 to an induction mixing unit 1045. A blower 1046 causes air to flow, as indicated by a tail 1047 of an arrow from a space 1048 served by the induction mixing unit 1045 through an opening 1049 into a plenum 1050 and from thence into the induction mixing unit 1045 where it is mixed with air from the duct 1044; the resulting mixture enters the suction side of the blower 1046 and is delivered to the space 1048 as indicated by a head 1051 of an arrow.

The pump 1028 circulates water at a temperature of about 48° F. (9° C.) from the absorption refrigeration apparatus 1025 to the pre-cooling coil 1042 and back to the apparatus 1025. A pump 1052 circulates chilled water from the heat exchanger 1038 to the coil 1043 and back to the heat exchanger 1038, while the pump 1037 circulates water from the compression refrigeration apparatus 1026 to the heat exchanger 1038 and back to the compression apparatus 1026. A valve 1053 is modulated to maintain the water delivered to the coil 1043 at a temperature of 36° F. (2° C.) so that the outside air is cooled in the air handler, first to 60° F. (16° C.) by the coil 1042 and then to 40° F. (4° C.) by the coil 1043. This air is delivered to the duct 1044 and the induction mixing unit 1045 at a constant rate which is at least sufficient to provide the minimum ventilation air and humidity control.

The pump 1028 also circulates water from the absorption apparatus 1025 to a cooling coil 1054 in the induction mixing unit 1045. A humidity-temperature sensor/-controller 1055 controls a valve 1056, keeping it closed until it senses a humidity at which water from the absorption apparatus 1025 in the coil 1054 will not cause condensation, and then modulating the valve 1056 as required to maintain a set temperature in the space 1048.

The pump 1029 of the apparatus of FIG. 51, when heating is required, circulates heated water from the absorption refrigeration apparatus 1025 to a heat exchanger 1057 and back to the apparatus 1025, while a pump 1058 circulates another stream of water from the heat exchanger 1057 to the pre-heat coil 1041 and back to the heat exchanger 1057. The temperature of the coil 1041 is determined by a temperature sensor/controller 1030, which modulates a valve 1059 to maintain the temperature it senses within control limits. Plenum unit heaters 1060 and baseboard heaters 1061 are also operably connected to the circulating system served by the pump 1029 for use, as required, to introduce heat into a plenum above the spaces served or into the spaces themselves. The apparatus also includes valves 1062 and 1063 to control the flow of heated water to the plenum heaters 1060 and to the baseboard heaters 1061, respectively.

As is stated above, the blower 1008 of FIG. 50 is controlled to maintain constant the static pressure measured by the sensor 1009 in the duct 1010. This can be done by controlling either the speed of the blower 1008 or by controlling a vortex damper (not illustrated) in the blower 1008. Apparatus shown in FIG. 52 accomplishes the result in a different way. The apparatus is identical with that of FIG. 51 except that the discharge of the blower 1046 is ducted to a plurality of diffusers 1064, each of which serves a space to be air conditioned. Each of the diffusers is served by a thermostat controller 1065 which modulates the rate at which conditioned air is delivered by each of the diffusers 1064 to the space it serves to maintain a predetermined temperature. A static pressure sensor/controller 1066 in a duct 1067 which receives the discharge from the blower 1046 controls a damper 1068 in a by-pass duct 1069. The damper 1068 is modulated as required to maintain the static pressure in the duct 1067 constant, the conditioned air that is by-passed to accomplish this result being returned through the duct 1069 to the induction mixing unit 1045 on the suction side of the blower 1046. When the induction mixing unit 1045 is positioned in a plenum, duct 1069 can discharge into the plenum, from which it will ultimately be returned to the space served by one of the induction mixing units 1045. The arrangement shown in FIG. 52 is somewhat more energy efficient, but the pressure in the duct 1067 can be kept constant by modulating the damper 1068 whether the duct 1069 discharges into the plenum or into one of the induction mixing units 1045.

Apparatus similar to that of FIG. 47 in that it comprises the absorption refrigeration apparatus 920 with an added heat exchanger 1070, the compression refrigeration apparatus 921, the air handler 922, the circulating system which includes a plurality of sprinkler branches, one of which is designated generally at 923, and the plurality of induction mixing units, one of which is designated generally at 924, and which additionally comprises a cogenerator 1071 and a dehumidifying wheel 1072 is shown in FIG. 53. Outside air enters the apparatus as indicated by an arrow 1073, and passes through the dehumidifying wheel 1072, where it is dehumidified by contact with, for example, paper impregnated with lithium chloride and then enters the air handler 922. The air can be dehumidified to a moisture content of 45 grains of water vapor per pound of dry air in the wheel 1072, so that it will be cooled sensibly, but not dehumidified, by the coil 933. The direct expansion coil 929 will then cool and dehumidify the air, so that it leaves the air handler 922 saturated with water vapor at a dry bulb temperature of 40° F. (4° C.).

The cogenerator 1071, which can be a gas turbine, a Sterling engine, a diesel or other combustion engine or a fuel cell generates electricity which, as indicated by a line 1074, is distributed to the compressor 927, to the pumps 941 and 945, and to a pump 1075 which serves the cooling tower 947. Exhaust heat from the cogenerator 1071, as indicated by a line 1076, regenerates the desiccant wheel 1072 and provides a part of the energizing heat for the absorption refrigeration apparatus 920 through the heat exchanger 1070.

The coil 946 in the induction mixing unit 924 is connected through the sprinkler branch 923 to receive either chilled water or heated water from the absorption apparatus 920, depending on the setting of a valve 1077. Accordingly, on cooling cycle, a humidistat-thermostat controller 1078 keeps the valve 944 closed and opens the damper 942 when the sensed humidity is above a control point and, when humidity control is established, modulates the damper 942 to maintain the set humidity and modulates the valve 1077 to maintain a set temperature. The damper 942 is modulated by the humidistat-thermostat controller 1078 to maintain temperature whenever the valve 1077 is in a fully open position and the temperature sensed is above the set temperature.

It will be appreciated that the apparatus of FIG. 53 does not use electricity as an energy source and is, therefore, the ultimate so far as elimination of the problems associated with demand charges for electricity. The apparatus, however, has many components, each of which contributes to the initial cost.

New electric generating apparatus has become extremely costly in recent years. As a consequence, it is highly desirable to minimize the peak usage of electricity and thereby to avoid the necessity for new generating capacity. Traditionally, air conditioning apparatus has been of the compression type with compressors driven by electric motors. Such apparatus has a peak demand for electricity at the time when use for other purposes is also at a peak, and has little or no demand at times when use for other purposes is comparatively low. The apparatus of FIGS. 47 through 53 transfers heat at a comparatively high temperature to absorption refrigeration apparatus and transfers heat at a comparatively low temperature to compression refrigeration apparatus or to stored ice made with compression refrigeration apparatus. By comparison with traditional apparatus, the peak demand for electricity is reduced by shifting a part of the load to absorption apparatus; it is also reduced by shifting a part of the load to ice made with compression refrigeration apparatus, provided that the ice is made during periods when there is excess generating capacity. This is an important feature of the apparatus of FIGS. 47 through 52 of the instant invention.

Apparatus similar to that of FIG. 46, except that the induction mixing units 826 and the absorption refrigeration apparatus 442 have been replaced by the induction mixing units 878 and the closed circuit evaporative cooler 782, respectively, is shown in FIG. 54. The induction mixing units 878 serve the diffusers 914 and conditioned air is delivered to the space it serves by each of the diffusers 914 as previously described. Similarly, the induction mixing units 878 are controlled by the sensor/controllers 918:

(1) to maintain a constant pressure in the duct 919, and
(2) to maintain an instantaneously set temperature in the duct 919.

When the apparatus is first energized, the dampers 893 are all in their full open positions, and there is no flow of water from the evaporative coolers 782. This mode of operation continues until the humidistat 508 senses a moisture content which indicates that humidity control has been established. The apparatus then enables each of the sensor/controllers 918 to control the damper 893 of the associated one of the induction mixing units 878. Initially, each of the dampers is set in its minimum position, i.e., the one which provides the minimum ventilation air or the minimum setting which provides humidity control, depending upon the design of the apparatus, and, unless this setting maintains the set pressure sensed by the sensor 918, each of the blowers 879 is energized, and each of the units is set to cause the maximum flow of evaporatively cooled water through the coil 880. This mode of operation continues until one of the sensor/controllers 917 senses a temperature (1) above its set point with the associated damper 916 in the full open position, or
(2) below its set point with the associated damper 916 in its minimum position.

In case (1), the sensor/controller 918 is activated to control the associated one of the heat pumps to pump heat from the coils 883 to maintain the sensed temperature about 2° F. (1° C.) below that sensed at the time of activation; thereafter, the set point for the sensor/controller 918 is lowered whenever there is a reoccurrence of case (1) or raised when there is an occurrence of case (2), until such time as the heat pump is no longer being operated. In case (2), the sensor/controller 918 is activated to control the associated one of the heat pumps to pump heat to the coil 881 to maintain the temperature about 2° F. (1° C.) above that sensed at the time of activation; thereafter, the set point for the sensor/controller 918 is raised whenever there is a reoccurrence of case (2) or lowered when there is an occurrence of case (1) until such time as the heat pump is no longer being operated.

Apparatus comprising a conditioner 1079, a regenerator 1080, an induction mixing unit 1081, a sprinkler branch 1082, absorption refrigeration apparatus indicated generally at 1083, a cogenerator 1084, a hot water storage tank 1085 and a cooling tower 1086 is shown in FIG. 55. In operation, air to be dehumidified, usually a mixture of outside air and return air, flows through a filter 1087, through the conditioner 1079 where it is dehumidified by a desiccant solution, lithium chloride, for example, which is sprayed from nozzles 1088, through a blower 1089 and to the induction mixing unit 1081. A fan 1090 causes air to flow from a space 1091 through a ceiling opening 1092 as indicated by a tail 1093 of an arrow and a plenum 1094 into the induction mixing unit 1081 where it is mixed with dehumidified air and delivered to the space 1091 as indicated by a head 1095 of an arrow. The mixture of air from the space and dehumidified air flows over a coil 1096 inside the induction mixing unit 1081, and heat is transferred therefrom to cool water circulated by a pump 1097 from the absorption refrigeration apparatus 1083 through the sprinkler branch 1082 to the coil 1096, and back through the sprinkler branch 1082 to the apparatus 1083. A humidistat-thermostat/controller 1098 modulates a damper 1099 to cause the rate at which dehumidified air enters the space 1091 to vary between the minimum ventilation rate and the maximum rate, as required for humidity control, and modulates a valve 1100 to vary the rate at which cool water is circulated to the coil 1096, as required for temperature control.

Electricity from the cogenerator 1084 is circulated to the pumps and blowers of the apparatus as indicated by an arrow 1101; combustion products therefrom are circulated to the absorption refrigeration apparatus 1083 as indicated by an arrow 1102 to provide energizing heat, and are discharged as indicated by an arrow 1103 and vented to a chimney (not illustrated); while hot jacket water from the cogenerator 1084 is circulated through a heat exchanger 1104 where heat is transferred therefrom to a heat transfer fluid circulated by a pump 1105 from the storage tank 1085 to the heat exchanger 1104 and back to the tank 1085. Heat from the absorption apparatus 1083, which can be heat incidental to the operation of the apparatus, excess energizing heat, or both, depending on the position of valves 1106, 1107, 1108 and 1109, is transferred to a heat transfer fluid circulated by a pump 1110 and rejected in the cooling tower 1086 or is transferred to a heat transfer fluid circulated by a pump 1111 and stored in the tank 1085.

The desiccant solution that is sprayed from the nozzles 1088 of the conditioner 1079, as previously described, flows from a pump 1112 through a heat exchanger 1113 and to the nozzles 1088, flowing by gravity back to the pump. Another stream of the desiccant solution flows through a heat exchanger 1114 and then to a pump 1115 from which a part of it is returned through the heat exchanger 1114 to the pump 1112 while the rest flows through a heat exchanger 1116 and is sprayed from nozzles 1117 in the regenerator, returning by gravity to the pump 1115 and then through the heat exchanger 1114, the pump 1112 and the heat exchanger 1113 to the nozzles 1088. Relief air from the space 1091 flows through an air to air heat exchanger 1118, a blower 1119, the regenerator 1080 and the air to air heat exchanger 1118 and is vented as indicated by an arrow indicating discharge from the heat exchanger 1118. The pump 1110 circulates a stream of the heat transfer fluid from the cooling tower 1086 to the heat exchanger 1113 so that heat is transferred from the desiccant solution which flows through the exchanger 1113 on its way to the conditioner 1079. A pump 1120 circulates a hot heat transfer fluid from the storage tank 1085 to the heat exchanger 1116 so that heat is transferred to the desiccant solution which flows through the exchanger 1116 on its way to the regenerator 1080.

The apparatus also includes a heat exchanger 1121 to which the pump 1120 circulates hot heat transfer fluid from the storage tank 1085. When heating is desired in the coil 1096 of the induction mixing unit 1081, a valve 1122 is set so that the circulation of heat transfer fluid from the coil 1096 is through the sprinkler branch 1082, the heat exchanger 1121 and the sprinkler branch 1082 back to the coil 1096. Ordinarily, heat from the absorption refrigeration apparatus 1083 and from the cogenerator 1084 is adequate for the needs of the apparatus. However, an electric heating element 1123 is provided to add heat to the storage tank 1085, if desired.

Apparatus similar to that of FIG. 46, but differing in that the gas engine-generator 387 and the absorption refrigeration apparatus 442 have been replaced by the absorption chiller/heater 773 (FIG. 31) and a circulating unit 1124 has been added, is shown in FIG. 56. The circulating unit 1124 comprises a blower 1125, an electric heater 1126, and a coil 1127 in a housing 1128. The coil 1127 is operably connected to lines 1129 and 1130 through which, depending on the positions of valves 1131, 1132, 1133 and 1134, warm water from the heater 774 can be circulated thereto, flowing through lines 1135 and 1136, chilled water from the evaporator 775 can be circulated thereto, or ice water from the ice storage tank 342 can be circulated thereto.

In operation, the blower 1125 is energized, causing air from a plenum 1137 to flow into the housing 1128. After flowing in heat transfer relationship with the coil 1127 and with the heater 1126, the air is returned to the plenum 1137 as indicated by an arrow 1138. The circulating unit 1124 can be used to counteract heat gains to or heat losses from the plenum 1137, or it can even be used to cool or heat the plenum 1137 to a temperature sufficiently low or high that plenum air entering the induction mixing units 826 does a substantial portion or even all of the cooling or heating that is required. It is then possible to eliminate the air handler and the ducts. The air inlets to the induction mixing units 826 can be left open to the plenum and the dampers 827 can modulate the flow of plenum air for temperature or humidity control; desirably, room air flows directly into the induction mixing units 826 without mixing with the conditioned plenum air.

Apparatus similar to that of FIG. 56 except that the air handler 338, and the duct 347 have been omitted, the induction mixing units 826 have been replaced by induction mixing units 1139, and ducts 1140 and 1141, the latter being insulated to prevent condensation, have been added to serve the circulation unit 1124, as subsequently described, is shown in FIG. 57. Conditioned air from the plenum 1137 can enter the induction mixing units 1139 at a rate which depends upon the settings of individual dampers 1142, each of which is actuated by one of the sensor/controllers 918. The induction mixing units 1139 are of the "fan/coil" type, having fans 1143 and coils 1144. The fans 1143 are of the constant speed type, delivering a mixture of plenum air and room air to the duct 919 at a constant rate. The plenum air enters the induction mixing units 1139 through a collar 1145 at a rate which depends upon the setting of the damper 1142, while air from a space 1146 enters through a duct 1147 at a rate which equals that at which air enters the suction side of the fan 1143 minus the rate at which air enters through the collar 1145. The sensor/controller 918 modulates a damper 1148 in a duct 1149 to maintain a constant pressure in the duct 919. Air that flows through the duct 1149 is discharged into the plenum 1137, while air which remains in the duct 919 serves the variable air volume diffusers 914, as previously described.

In summer daytime operation, ventilation air enters the circulating unit 1124 through the duct 1140, and is cooled and dehumidified by contact with the coil 1127, while cold dehumidified air is delivered to the duct 1141. Water at 36° F. (2° C.) is circulated from the ice storage tank 342 to the coil 1127 and back to the tank 342, so that outside air is cooled to 40° F. (2° C.) and then delivered through the duct 1141 and induction outlets 1150 into various regions of the plenum 1137. The outlets 1150 are positioned as required so that substantially uniform conditions of temperature and humidity are maintained throughout the plenum 1137. The induction outlets 1150 induce a flow of plenum air which mixes with the cold air from the duct 1141 to prevent condensation; preferably, the induction ratio is at least one volume of plenum air per volume of cold air. The circulating unit 1124 is operated to introduce air into the plenum 1137 at the minimum rate required for ventilation or for humidity control, whichever is greater, by the conditioned space or spaces served. It is often adequate for air to be introduced at a rate of 0.15 to 0.20 cubic foot per minute per square foot of space served. Air at this rate will usually maintain the plenum 1137 at a temperature in the range of 65° F. (18° C.) to 70° F. (21° C.).

It will be appreciated that each floor of a multi-story building will require a circulating unit 1124 sized to serve the space on its floor. Ordinarily, it is preferred that these units be vertically above and below one another so that a single pair of pipes 351 and 352 can serve all of the units. In the apparatus of FIG. 57, heated water from the absorption heater/chiller 773 is also available to the units 1124, but through a separate piping system, while chilled water from the absorption heater/chiller 773 or from the water chiller 343, is circulated through the sprinkler system as previously explained.

Apparatus similar to that of FIG. 57, except that the circulating unit 1124 has been replaced by a circulating unit 1151 is shown in FIG. 58. The circulating unit 1151 comprises a blower 1152, and three coil, designated 1153, 1154 and 1155 in a housing 1156. The coil 1155 is operably connected to the lines 1129 and 1130 through which ice water from the ice storage tank 342 is usually circulated thereto, or through which chilled water or warm water can be so circulated, as previously described. A pump 1157 circulates water from the coil 1153 to the coil 1154 and back to the coil 1153, the flow being from the pump 1157 through a line 1158 to the coil 1154 and through a line 1159 back to the coil 1153.

The operation of the apparatus of FIGS. 57 and 58 is substantially identical, the difference being that, in the apparatus of FIG. 58, heat is transferred from the coil 1153 to air that has been cooled by contact with the coil 1155, while heat is transferred to the coil 1154 by outside air entering the circulating unit 1151. This transfer is accomplished merely by circulating water or another heat transfer fluid as previously described from the coil 1153 to the coil 1154 and back. As a consequence of this heat transfer, air enters the duct 1141 at a temperature higher than 40° F. (2° C.) by an amount that depends upon the extent of the heat transfer between the coils 1153 and 1154. For example, the air entering the duct 1141 can be at 70° F. (2° C.) and can maintain a plenum temperature of 75° F. (24° C.).

Apparatus similar to that of FIGS. 57 and 58, differing in that the circulating units 1124 and 1151 have been eliminated, while chemical dehumidification apparatus indicated generally at 1160 has been added, is shown in FIG. 59. The dehumidification apparatus 1160 comprises a desiccant wheel 1161 through which a blower 1162 causes ambient air to flow. The air is dehumidified in flowing through the wheel 1161 by contact, for example, with paper impregnated with lithium chloride, and then flows through a duct 1163, in heat exchange relationship with coils 1164 and 1165 and into the blower 1162, from which it is discharged into the duct 1141. A blower 1166 withdraws air from the plenum 1137 at the same rate at which dehumidified air is introduced thereinto from the duct 1141, discharging into a duct 1167 from which it flows through the desiccant wheel 1161 and is vented outside the apparatus. Air in the duct 1167 is heated by heat transfer thereto from coils 1168 and 1169 and, as a consequence, regenerates the lithium chloride or other desiccant in the sector of the wheel 1161 through which it flows. The wheel 1161 rotates, as indicated by an arrow 1170, so that one sector is always being regenerated while the apparatus is in operation while ambient air always flows through a regenerated sector and is dehumidified.

Dehumidification in the wheel 1161 is exothermic, so that the air entering the duct 1163 is above ambient temperature. Water or another heat transfer fluid is circulated from the coil 1164 to the coil 1169 and back to the coil 1164, the flow being through pipes 1171 and 1172, so that heat is transferred from the dehumidified air to the regenerating air. In addition, the lines 1135 and 1136 are connected to the coil 1168, so that heat from the absorption chiller/heater 773 can be used as required to heat the regenerating air. Finally, the coil 1165 is connected by lines 1173 and 1174 so that chilled water from the absorption chiller/heater 773 or from the water chiller 343 can be circulated therethrough. A valve 1175 can be modulated as required to maintain a desired temperature in the plenum 1137, usually substantially the same as that being maintained in the space below the plenum. When more cooling is required, the valve 1175 can be controlled to maintain a lower plenum temperature.

Although, in the apparatus of FIGS. 57, 58 and 59, the induction mixing units 1139 all serve diffusers 914 it will be appreciated that units which discharge directly into the spaces they serve, but receive conditioned air from a plenum and space air, could also be used.

Apparatus shown in FIG. 60 comprises absorption refrigeration apparatus 1176, compression refrigeration apparatus 1177, a desiccant wheel 1178, a precooling coil 1179, a post cooling coil 1180, a washer 1181, a plurality of sprinkler grids 1182 (one of which is shown) and a plurality of induction mixing units 1183 (one of which is shown).

In operation, a blower 1184 causes a mixture of outside air from a duct 1185 and return air from a duct 1186 to flow through a filter 1187, the precooling coil 1179, the desiccant wheel 1178, the post cooling coil 1180 and the washer 1181, and to each of the induction mixing units 1183. The apparatus will usually be operated so that the air leaving the precooling coil 1179 is at a temperature of about 51° F. (11° C.); under many conditions of operation, the air will also be saturated, containing about 51 grains of water vapor per pound of dry air, because the mixture entering the precooling coil 1179 has a higher moisture content. The air can be dehumidified and heated in the desiccant wheel 1178 so that it enters the post cooling coil at a moisture content of about 10 grains of water vapor per pound of dry air at a temperature of about 100° F. (38° C.), can be cooled by the coil 1180 to about 51° F. (11° C.), and can be cooled and humidified in the washer 1181 so that it leaves at a dry bulb temperature of about 40° F. (4° C.) and containing about 38 grains of water vapor per pound of dry air. It is desirable, under some conditions of operation, for air flow through a duct 1188 or through a duct 1189, bypassing the desiccant wheel 1178 in the former case, and bypassing the desiccant wheel 1178, the post cooling coil 1180 and the washer 1181 in the latter, but it is usually desirable, on summer cycle, to operate the apparatus as described above.

The compression refrigeration apparatus 1177 produces chilled water at about 45° F. (7° C.), and is driven directly by a gas engine 1190, although the same result can be achieved if the gas engine 1190 drives a generator (not illustrated) which supplies electricity for an electric motor (not illustrated) which, in turn, drives the apparatus 1177. Chilled water from the compression refrigeration apparatus 1177 is circulated to the coils 1179 and 1180, where it performs the cooling functions described above and to a heat exchanger 1191 which is used under some conditions of operation, as explained below.

Exhaust gases from the engine 1190 flow through a heat exchanger 1192, and are discharged as indicated by an arrow 1193. A pump 1194 causes water from the cooling jacket of the engine 1190 to flow through the heat exchanger 1192 and a heat exchanger 1195 and back to the cooling jacket of the engine 1190.

The desiccant wheel 1178 rotates, as indicated by an arrow 1196, so that air which a blower 1197 causes to flow through a heat exchanger 1198, the heat exchanger 1195, the desiccant wheel 1178 and a heat exchanger 1199, flows through a constantly changing segment of the wheel 1178 and, because it is heated by the heat exchanger 1195, keeps the desiccant of the wheel 1196 in a regenerated condition. A heat exchange fluid flows from the heat exchanger 1198 to the heat exchanger 1199, so that a part of the heat that would otherwise be discharged from the apparatus with the regenerating air is recovered. An air to air heat exchanger can be used in place of the heat exchangers 1198 and 1199 to keep heat in the system by transferring heat from air that has left the wheel 1178 to air that is about to enter.

The absorption refrigeration apparatus 1176 is of the direct fired type to which gas is supplied as required, as indicated by an arrow 1200, and from which flue gases are discharged as indicated by an arrow 1201. Heat is transferred therefrom, as required, to a cooling tower 1202, while chilled water is circulated therefrom to a heat exchanger 1203, as required.

A pump 1204 circulates water to the heat exchanger 1203, to the heat exchanger 1191, or to both, then to the sprinkler grids 1182 and back to one or both of the heat exchangers 1203 and 1191. Valves 1205, which are controlled by temperature/humidity sensors and controllers 1206, are modulated, as required, to maintain a desired temperature in the space served by each of the induction mixing units 1183 by controlling the flow of heat transfer fluid through coils 1207 in the induction mixing units 1183 while blowers 1208 cause recirculated room air that is ultimately mixed with primary conditioned air and returned to the rooms to flow over the coils 1207. The temperature/humidity sensors and controllers 1206 also modulate dampers 1209 in the induction mixing units 1183 as required so that primary, conditioned air delivered thereto maintains a desired humidity in the space served by each of the units 1183. It will be appreciated that the cold primary air does sensible cooling, but it is controlled to provide humidity control, while the flow of chilled water through the coils 1207 is controlled to provide temperature control.

Chilled heat transfer fluid from the compression refrigeration apparatus 1177 is circulated to each of the heat exchangers 1179 and 1180 and, when the load on those heat exchangers is insufficient, to the heat exchanger 1191. The engine 1190 is the sole source for heat, in the apparatus of FIG. 60, for regeneration of the desiccant of the wheel 1178. When the load on the heat exchangers 1179 and 1180 is sufficiently high, the engine 1190 provides all of the heat that is needed for regeneration when only these heat exchangers are served by the apparatus 1177; when the load is less, chilled heat transfer fluid from the compression apparatus 1177 is circulated to the heat exchanger 1191 to increase the load, as required, so that the engine 1190 provides all of the heat required for regeneration. The absorption refrigeration apparatus 1176 is operated to carry all of the load that is not carried by the compression apparatus 1177.

In the apparatus of FIG. 60 a heat transfer fluid for secondary cooling is circulated through a plurality of the sprinkler grids 1182 to the coils 1207 of a plurality of the induction mixing units 1183. Similar arrangements are shown in much of the other apparatus disclosed herein. It should be understood that this is usually a preferred arrangement because of the first cost savings that are associated with the dual use of the sprinkler piping, which most building codes require, but that many of the advantages of the apparatus, for example, the first cost and energy savings associated with apparatus which produces extra dry air and circulates small quantities of that extra dry air for humidity control and uses secondary cooling of recirculated air for temperature control, can be achieved even if a separate circulating system that is independent of the sprinkler system is installed to serve the secondary cooling coils 1207. Furthermore, the apparatus can include numerous induction mixing units 1183 per floor, or a single unit 1183 can serve an entire floor, or even a plurality of floors.

Apparatus shown in FIG. 61 comprises compression refrigeration apparatus 1210 which serves an ice builder 1211, a chemical dehumidifier 1212, a precooling coil 1213, a washer 1214, a plurality of sprinkler grids 1215 (one of which is shown) and a plurality of induction mixing units 1216 (one of which is shown).

In operation, a blower 1217 causes a mixture of ambient air from a duct 1218 and return air from a duct 1219 to flow through a filter 1220, the precooling coil 1213, the chemical dehumidifier 1212, and the washer 1214, and to each of the induction mixing units 1216. The apparatus will usually be operated so that the air leaving the precooling coil 1213 is at a temperature of about 51° F. (11° C.); under many conditions of operation, the air will also be saturated, containing about 51 grains of water vapor per pound of dry air, because the mixture entering the precooling coil 1213 has a higher moisture content. The air can be dehumidified isothermally so that it leaves the dehumidifier 1212 at a moisture content of about 20 grains of water vapor per pound of dry air and a dry bulb temperature of about 51° F. (11° C.), and then cooled and humidified in the washer 1214 so that it leaves at a dry bulb temperature of about 40° F. (4° C.) and containing about 38 grains of water vapor per pound of dry air. It is noteworthy that, as just described, the apparatus uses chilled water at 45° F. (7° C.) to produce conditioned air at 40° F. (4° C.). Under some conditions of operation, it is desirable for air to flow through a duct 1221, bypassing the dehumidifier 1212 and the washer 1214, but it is usually preferable, on summer cycle, to operate the apparatus as described above.

The compression refrigeration apparatus 1210 serves the ice builder 1211 and a heat exchanger 1222, and is driven directly by a gas engine 1223, although the same result can be achieved if the gas engine 1223 drives a generator (not illustrated) which supplies electricity for an electric motor (not illustrated), and the electric motor, in turn, drives the apparatus 1210. Either refrigerant from the compression refrigeration apparatus 1210 or a glycol solution chilled therein is circulated to the ice builder 1211, where it removes heat as required to make ice and to the heat exchanger 1222. A heat transfer fluid is circulated from the heat exchanger 1222 to the heat exchanger 1213 as required to condition air as previously described, and to a heat exchanger 1224 in which heat is transferred from liquid desiccant circulated therethrough.

Exhaust gases from the engine 1223 flow through a heat exchanger 1225, and are discharged as indicated by an arrow 1226. A pump 1227 causes water from the cooling jacket of the engine 1223 to flow through the heat exchanger 1225, to a storage tank 1228, and back to the cooling jacket of the engine 1223. A heat transfer fluid is also circulated from the storage tank 1228 through a heat exchanger 1229, and back to the storage tank 1228.

A pump 1230 causes desiccant to flow upwardly in two streams from the dehumidifier 1212. One stream flows through the heat exchanger 1224, where it is cooled, and then to nozzles 1231 from which it is sprayed inside the dehumidifier 1212 to dehumidify air being conditioned as previously described. The liquid desiccant can be a solution of a lithium salt such as lithium chloride or can be a glycol solution, the latter being suitable because the desiccant solution is cooled in the heat exchanger 1224 so that volatilization of the glycol would not be a problem. The second stream of desiccant from the pump 1230 flows through a heat exchanger 1232, the heat exchanger 1229 and then to nozzles 1233 from which it is sprayed inside a regenerator 1234. A blower 1235 causes regenerating air to flow through a heat exchanger 1236, the regenerator 1234 and a heat exchanger 1237, ultimately being vented as indicated by an arrow 1238. A heat transfer fluid is circulated from the heat exchanger 1237 to the heat exchanger 1236 and back to the heat exchanger 1237. Desiccant is also caused to flow from the regenerator 1234 through the heat exchanger 1232 and to the pump 1230. The desiccant, before being sprayed from the nozzles 1233 of the regenerator 1234, is heated both in the heat exchanger 1232 and in the heat exchanger 1229 and, as a consequence, water is vaporized in the regenerator and removed by the regenerating air, effecting regeneration of the desiccant. Because the effluent from the regenerator 1234 which enters the heat exchanger 1237 is hot, heat is transferred therefrom to the heat transfer fluid which flows through the heat exchanger 1237 and, in turn, to regenerating air which flows through the heat exchanger 1236.

As is stated above, either refrigerant from the compression refrigeration apparatus 1210 or glycol solution cooled therein is circulated to the ice builder 1211, as required. The operation of the ice builder can be either continuous or intermittent, while there is a need to circulate refrigerant or glycol solution to the heat exchanger 1222 only while the space served by the apparatus is being conditioned. If the operation of the ice builder 1211 is continuous, the operation of the compression refrigeration apparatus is also continuous, at a given load when only the ice builder 1211 is operating, and at a higher load when all of the apparatus is operating. If the operation of the ice builder is intermittent, for example, only when the rest of the apparatus is not operating, the compression refrigeration apparatus can operate continuously, serving the ice builder 1211 whenever the rest of the apparatus is not operating and the heat exchanger 1222 the rest of the time, or intermittent, serving the ice builder a part of the time that the rest of the apparatus is not operating and the heat exchanger 1222 whenever required. Many factors are involved in determining what type of operation is optimum. In any event, heat of compression from the apparatus 1210 is transferred to a heat transfer fluid and rejected from the apparatus in an evaporative cooler 1239.

A pump 1240 circulates chilled water from the ice builder 1211 to a heat exchanger 1241, and back to the ice builder, while a pump 1242 circulates water at, say, 58° F. (14° C.). from the heat exchanger 1241 to the sprinkler grids 1215 and back to the heat exchanger 1241. Valves 1243, which are controlled by temperature/humidity sensors and controllers 1244, are modulated, as required, to maintain a desired temperature in the space served by each of the induction mixing units 1216 by controlling the flow of heat transfer fluid through coils 1245 in the induction mixing units 1216 while blowers 1246 cause recirculated room air to flow over the coils 1245. The recirculated room air is ultimately mixed with primary conditioned air and returned to the rooms. The temperature/humidity sensors and controllers 1244 also modulate dampers 1247 in the induction mixing units 1216 so that primary, conditioned air delivered thereto maintains a desired humidity in the space served by each of the units 1216.

The engine 1223 is the main source for heat, in the apparatus of FIG. 61, for regeneration of desiccant in the regenerator 1234. When the load on the compression refrigeration apparatus 1210 is not sufficiently high that the engine provides all of the heat required, a supplemental heater 1248, which can burn gas or another fuel, can be operated, as required, to transfer heat, for example, through a heat exchanger 1249 to the storage tank 1228 so that the heat needed for regeneration is available. In the alternative, electric resistance heaters (not illustrated), or an electrically powered heat pump which pumps heat from any suitable source, e.g., ambient air, can be used at times when there is no demand charge to supplement or to take the place of heat from the engine 1223 for regeneration, producing hot water that is stored in the tank 1228 and used as required. A heat pump powered by a combustion engine can also be used to supplement or take the place of heat from the engine 1223. As a further alternative, any of the foregoing sources for heat can be used, off peak, to regenerate desiccant which can then be stored in a concentrated condition in the tank 1228 and used as required, in which case direct connections (not shown) should be provided from the tank 1228 to the regenerator 1234 and to the dehumidifier 1212.

Apparatus shown in FIG. 62 is similar to that of FIG. 60 in that it comprises absorption refrigeration apparatus 1250 that is similar to the apparatus 1176, the plurality of sprinkler grids 1182 (one of which is shown) and the plurality of induction mixing units 1183 (one of which is shown), but differs in that the portion of the apparatus that conditions air for delivery to the induction mixing units is composed of a desiccant wheel 1251, a desiccant wheel 1252, and associated apparatus.

A blower 1253 causes ambient air to enter the apparatus as indicated by an arrow 1254. The air flows through a filter 1255, the blower 1253, the desiccant wheel 1251, a heat exchanger 1256, the desiccant wheel 1252, a heat exchanger 1257, and then to the induction mixing units 1183. The heat exchanger 1256 can sometimes be omitted, in which case it is usually preferred that the heat exchanger 1257 be operably connected to transfer heat to the evaporative cooler 1202. When both heat exchangers 1256 and 1257 are used, it is usually preferred that both be operably connected to transfer heat to the absorption apparatus 1250. The operation of the induction mixing units 1183 is a previously described in the discussion of FIG. 60.

The desiccant wheels 1251 and 1252 are regenerated by relief air from the spaces served by the apparatus. An arrow 1258 represents relief air leaving the space served by one of the induction mixing units 1183, while an arrow 1259 represents relief air from all of the spaces entering a blower 1260. Air discharged from the blower 1260 enters a duct 1261, a duct 1262, or both, depending upon the positions of dampers 1263 1264 and 1265. Air that enters the duct 1261 flows through a filter 1266, and a segment of the desiccant wheel 1251 to an orifice plate 1267. The orifice in the plate 1267 is so sized that a portion of the air which flows through the duct 1261, the filter 1266 and the desiccant wheel 1251 is forced to flow through a duct 1268 while the rest flows through the orifice and is discharged as indicated by an arrow 1269. Air which is forced to flow through the duct 1268 is heated in heat exchangers 1270 and 1271, flows through a segment of the desiccant wheel 1252, is cooled in a heat exchanger 1272, and is then discharged. Heat is transferred to the heat exchanger 1271 from a heat transfer fluid that is circulated through the cooling jacket of a gas engine 1273 through a heat exchanger 1274, through the heat exchanger 1271 and back to the cooling jacket. The engine 1273 drives an electric generator 1275 which introduces electricity into the electric grid (not illustrated) of the building served by the apparatus.

The desiccant wheel 1251, because relief air from the building served by the apparatus flows through a segment thereof, is capable of lowering both the enthalpy and the moisture content of ambient air whose humidity is high without requiring either heat for regeneration or the transfer of heat from the air being conditioned. For example, if relief air at a dry bulb temperature of 81° F. (27° C.), specific humidity 70 grains of water vapor per pound of dry air is introduced into the blower 1260 while outside air at a dry bulb temperature of 93° F. (34° C.), specific humidity 105 grains of water vapor per pound of dry air, is introduced into the blower 1253 at about the same rate, air entering the heat exchanger 1256, after having passed through the desiccant wheel 1251, has a dry bulb temperature of 84° F. (29° C.) and a specific humidity of 78 grains of water vapor per pound of dry air, while air which enters the duct 1268 or flows through the orifice plate 1267 has a dry bulb temperature of 90° F. (32° C.) and a specific humidity od 97 grains of water vapor per pound of dry air. By reference to a psychrometric chart it can be ascertained that the foregoing relief air had an enthalpy of 30.4 Btu per pound of dry air, that the outside air had an enthalpy of 39.3 Btu per pound of dry air, that the air entering the duct 1268 had an enthalpy of 37.2 Btu per pound of dry air, and that the air entering the heat exchanger 1256 had an enthalpy of 32.5 Btu per pound of dry air. Thus, the enthalpy of the regenerating air increased by 7.2 Btu per pound of dry air, while that of the air that was dehumidified decreased by only 6.8 Btu per pound of dry air. This difference occurs because heat that is released in the desiccant wheel 1251 as an incident of dehumidification therein is transferred to the desiccant, is retained while the wheel makes a half revolution, and then is released to the regenerating air. The heat that is released includes the heat of sorption and additional heat of the exothermic dehumidification by the desiccant of the dehumidifier. The use of the wheel 1251, as described, to lower the enthalpy of outside air is possible only when the enthalpy of the outside air is higher than the enthalpy of the relief air. Accordingly, if the relief air enthalpy is higher, the desiccant wheel 1251 should not be used.

When the apparatus of FIG. 62 includes, as shown, both the heat exchanger 1256 and the heat exchanger 1257, heat should be transferred from the former as required so that the temperature of the entering air is low enough, say 50° F. (10° C.), to increase the effectiveness of the desiccant wheel 1252. This can be done by transferring heat from the exchanger 1256 to the absorption refrigeration apparatus 1250. Heat, in that event, would also be transferred from the exchanger 1257, for example to the absorption apparatus 1250, so that the air entering the induction mixing units 1183 would also be at about 50° F. (10° C.) Alternatively, the heat exchanger 1257 could be omitted, the conditioned air could be mixed with recirculated air ahead of the coils 1207, and the mixture of conditioned air and recirculated could be cooled by the coils 1207. If the exchanger 1256 is not used, air entering the exchanger 1257 will be at a sufficiently high temperature that heat can be transferred therefrom to the evaporative cooler 1202, thus effecting a saving in refrigeration; in this event, the conditioned air is at a sufficiently high temperature that it should be mixed with the recirculated air ahead of the coils 1207, as just described.

The absorption apparatus 1250 is directly fired, receiving gas fuel and discharging combustion products as indicated by arrows 1276. It can also be used as a heater, furnishing warm water to the sprinkler grids 1182 when a valve 1277 is in one position and chilled water when the valve 1277 is in the other position.

Apparatus similar to that of FIG. 61 in that it includes the chemical dehumidifier 1212, the precooling coil 1213, the washer 1214, the plurality of sprinkler grids 1215 (one of which is shown), the plurality of induction mixing units 1216 (one of which is shown), and associated apparatus, and differing mainly in that the gas engine 1223, the compression refrigeration apparatus 1210 and the ice builder 1211 have been replaced by direct fired absorption refrigeration apparatus 1278, is shown in FIG. 63. The absorption apparatus 1278, which is fired by gas or other fuel, as indicated by an arrow 1279, and discharges combustion products as indicated by an arrow 1280, chills water for circulation to the precooling coil 1213 and to heat exchangers 1281 and 1282, and heats water for circulation to a heat exchanger 1283 and, under winter operation, for circulation to a heat exchanger 1284. Desiccant is cooled in the heat exchanger 1281 before it is sprayed in the dehumidifier 1212. Heat transfer fluid circulated through the sprinkler grids 1215 and the coils 1245 is cooled in the heat exchanger 1282, under most conditions of operation. The heat exchanger 1283 serves the regenerator 1234 by providing heat, as previously described, for regeneration of the desiccant therein. The heat exchanger 1284 provides the heat required for humidification on winter cycle. Water that is sprayed in the washer 1214 is circulated through the heat exchanger 1284 where it is heated, as required, for humidification. Dampers 1285, 1286 and 1287 are modulated, as required, so that, at the temperature at which water is sprayed in the washer 1214, the amount of moisture required for humidity control is added to air which flows therethrough, while the rest of the air that is required for comfort conditioning is bypassed through the duct 1221.

A cooling tower 1288 serves the absorption apparatus 1278 by rejecting heat therefrom, as required, and also serves heat exchangers 1289 and 1290. The heat exchanger 1289 is used instead of the heat exchanger 1281 whenever outside conditions are such that it is possible, by rejecting heat therefrom, to maintain the required temperature in the desiccant sprayed in the dehumidifier 1212. The heat exchanger 1290 is used to reject heat from the sprinkler grids 1215 whenever outside conditions are such that it is capable of performing the task.

It will be appreciated that, in the apparatus of FIGS. 60, 61 and 63, air at 40° F. (4° C.) which is used for humidity control will also do a substantial amount of sensible cooling. In fact, the sensible cooling can sometimes be more than is required for temperature control, with the result that over cooling occurs. It is possible to compensate for this throughout all of the zones served thereby, by bypassing air around the washer 1181 (in FIG. 60) or 1214 (in FIGS. 61 and 63), so that the air circulated for humidity control is both warmer and drier. This change is viable if the warmer, drier air will accommodate all of the zones that are involved, for example, in intermediate seasons. If not, in the apparatus of FIG. 63, the heated water which is circulated from the absorption refrigeration apparatus 1178 to the heat exchanger 1283 can also be circulated to the coils 1245, under the control of the temperature/humidity sensors and controllers 1244, of the induction mixing units which serve the spaces where excessive cooling occurs; the flow of chilled water from the heat exchanger 1282 to those coils should be prevented by suitable valves while heated water is being used. In this mode of operation, cool air is being used for dehumidification while heated water is being used, as required, for heating, which is necessary to maintain the proper temperature and humidity in the spaces involved.

Apparatus similar to that of FIG. 63 in that it includes the chemical dehumidifier 1212, the precooling coil 1213, the washer 1214, the plurality of sprinkler grids 1215 (one of which is shown), the absorption refrigeration apparatus 1278, and the cooling tower 1288, but differing in that the induction mixing units 1216 are replaced by heat pump induction mixing units 1291 which serve perimeter zones and by powered induction terminals 1292 which serve interior zones is shown in FIG. 64. Heat can be removed from the fluid circulated through the sprinkler grids 1215 by the heat exchanger 1290, being rejected by the cooling tower 1288, or can be added to the fluid by the heat exchanger 1282 which, in the apparatus of FIG. 64, is operably connected to receive hot water from the absorption apparatus 1278.

The heat pump induction units 1291 have coils 1293 and 1294 and air inlets 1295; under the control of temperature/humidity sensors and controllers 1296 heat is pumped between the coils 1294 and a heat transfer fluid which is circulated through the sprinkler grids 1215 and the coils 1293. Blowers 1297 withdraw air from the spaces served by the units 1291, and ultimately return a mixture of the withdrawn air and primary air to the spaces. The withdrawn air enters the heat pump induction units 1291 through the inlets 1295, flows over the coils 1294, and into the blowers 1297, from which it is returned to the spaces served. The coils 1294 remove heat from the circulated air when cooling is required, and add heat to the air when heating is needed. The heat removed is pumped to and the heat added is pumped from the heat transfer fluid in the coils 1293; the amount of cooling or heating is controlled by the temperature/-humidity sensors and controllers 1296 to maintain a desired temperature. The temperature/humidity sensors and controllers 1296 also modulate dampers 1298 as required to maintain the humidity in the spaces served within predetermined limits.

The powered induction terminals 1292 have blowers 1299 which withdraw air from the spaces served by the terminals, and ultimately return a mixture of primary air and withdrawn air to the spaces. Temperature sensors and controllers 1300 modulate dampers 1301 to maintain the temperature in the spaces served within predetermined limits, their operation contrasting with that of the temperature/humidity sensors and controllers 1296, which also modulate dampers, but to control humidity, rather than temperature.

The apparatus of FIG. 64 can be modified by eliminating the powered induction terminals 1292 in the interior zones, and by substituting heat pump induction units 1291 therefor. When it is so modified, the apparatus can be operated without using the washer 1214 and, so long as the evaporative cooler 1288 is able to provide sufficient cooling to enable the dehumidifier 1212 to accomplish the requisite amount of dehumidification, operating the absorption refrigeration apparatus 1278 only to produce hot water for regeneration of desiccant in the regenerator 1234. For example, when the outside wet bulb temperature is 64° F. (18° C.), the evaporative cooler 1288 and the heat exchanger 1289 will remove sufficient heat to enable the dehumidifier 1212, without any heat removal in the exchanger 1213, to produce air having a dry bulb temperature of 75° F. (24° C.) and containing 32 grains of water vapor per pound of dry air. Such air can be supplied to the heat pump induction units 1291, preferably to the inlets 1295 thereof, and, under the control of the temperature/humidity sensors and controllers 1296, the rate at which it is supplied can be modulated as required for humidity control, and heat can be pumped to or from the air as required for temperature control.

A heat exchanger 1302 is operably connected, in the apparatus of FIG. 64, to receive hot water from the absorption refrigeration apparatus 1278. When a valve 1303 is closed and a valve 1304 is set appropriately, liquid desiccant can be pumped from the dehumidifier 1212 to the heat exchanger 1302 and heated desiccant solution can be returned from the heat exchanger 1302 to the nozzles 1231, from which it can be sprayed to humidify air flowing through the "dehumidifier" 1212.

All or a part of the return air from a blower 1304, in the apparatus of FIGS. 61, 63 and 64, can be discharged from a duct 1305, and the rest, if any, can flow through the duct 1219 for mixture, as previously described, with air entering the duct 1218. The proportions in which outside air and return air enter the blower 1217 depend upon the settings of dampers 1306, 1307 and 1308.

Apparatus similar to that of FIG. 62, differing mainly in that the desiccant wheel 1251 has been omitted and a washer 1309 has been added is shown in FIG. 65. On summer cycle, outside air enters the apparatus, as indicated by an arrow 1310, and may, depending upon the positions of dampers 1311, 1312 and 1313, be mixed with return air from a duct 1314, flowing through the filter 1255, the heat exchanger 1256, the supply fan 1253, the desiccant wheel 1252, the heat exchanger 1257, the washer 1309 and to the induction mixing units 1183 from which, as previously described, it is delivered to the spaces being air conditioned, as required for humidity control.

A heat transfer fluid at about 44° F. (7° C.) flows from the absorption apparatus 1250 to a heat exchanger 1315 and to the heat exchangers 1256 and 1257, and back to the apparatus 1250. A higher temperature heat exchange fluid flows from the heat exchanger 1315 or from a heat exchanger 1316 through the sprinkler grids 1182 to the coils 1207 of the induction mixing units 1183, and back to the heat exchanger. Whenever outside conditions are such that it is possible, it is preferable to use the heat exchanger 1316 and to reject heat in the evaporative cooler 1202, but it is necessary to use the heat exchanger 1315 and the absorption refrigeration apparatus 1250 whenever the evaporative cooler is not capable of providing a heat exchange fluid at a sufficiently low temperature, e.g., 55° F. (13° C.).

The apparatus will usually be operated so that the air leaving the heat exchanger 1256 is at a temperature of about 51° F. (11° C.); under many conditions of operation, the air will also be saturated, containing about 51 grains of water vapor per pound of dry air, because the mixture entering the heat exchanger 1256 has a higher moisture content. The air can be dehumidified and heated in the desiccant wheel 1252 so that it enters the heat exchanger 1257 at a moisture content of about 10 grains of water vapor per pound of dry air and at a dry bulb temperature of about 100° F. (38° C.), can be cooled by the heat exchanger 1257 to about 51° F. (11° C.), and can be cooled and humidified in the washer 1309 so that it leaves at a dry bulb temperature of about 40° F. (4° C.) and containing about 38 grains of water vapor per pound of dry air.

A hot heat transfer fluid is circulated from the absorption refrigeration apparatus 1250 to the heat exchanger 1271 and back, and the absorption apparatus is controlled as required to provide the heat necessary for regeneration of the desiccant of the wheel 1252. As previously stated, the combustion of gas in the apparatus 1250 makes both chilled water and heated water available; further, the apparatus can be controlled to vary the proportions of heated water and chilled water it makes available, and even to reduce the proportion of chilled water to zero. The absorption apparatus is capable, therefore, of providing the heat necessary for regeneration of the desiccant of the wheel 1252 even when the outside conditions are such that it is not necessary to remove heat from the exchanger 1315.

The by pass ducts 1188 and 1189 of the apparatus of FIG. 60 are also included in the apparatus of FIG. 65, and for the same purpose. In addition, a heat exchanger 1317 is operably connected to receive heat from the absorption refrigeration apparatus and to transfer heat to water that is flowing to nozzles 1318 to be sprayed in the washer 1309. This enables the washer 1309 to function as a humidifier on winter cycle.

Apparatus substantially identical with that of FIG. 65, except that the induction mixing units 1183 have been replaced by the heat pump induction mixing units 1291 shown in FIG. 64, and which additionally includes powered induction terminals 1319 (one of which is shown) to serve interior zones is shown in FIG. 66. The powered induction terminals 1319 have blowers 1320 which withdraw air from the spaces served by the terminals, and ultimately return a mixture of primary air and withdrawn air to the spaces. Temperature sensors and controllers 1321 modulate dampers 1322 to maintain the temperature in the spaces served within predetermined limits. The heat pump induction mixing units 1291 serve perimeter zones of the apparatus, where there are large changes in load during the course of a typical day, and where there are, from time to time, zones which require heating while other zones require cooling.

The heat transfer fluid that is circulated through the sprinkler grids 1182 to the coils 1293 is sometimes heated in the heat exchanger 1315, and is sometimes cooled in the heat exchanger 1316, the former being operably connected, in the FIG. 66 apparatus, to receive heated water from the absorption refrigeration apparatus 1250, and the latter being connected to receive water from the evaporative cooler 1202. Whether heated water or cooled water is required depends upon the over all operation of the heat pump induction mixing units 1291; heated water is required if they pump more heat from the water than they pump to it, and vice versa.

Like the apparatus of FIG. 64, that of FIG. 66 can be modified by eliminating the powered induction terminals 1319 in the interior zones, and by substituting heat pump induction units 1291 therefor. When it is so modified and operable connections are made between the evaporative cooler 1202 and the heat exchangers 1256 and 1257, the apparatus can be operated without using the washer 1214 and, so long as the evaporative cooler 1202 is able to provide sufficient cooling to enable the desiccant wheel 1252 to accomplish the requisite amount of dehumidification, operating the absorption refrigeration apparatus 1250 only to produce hot water for regeneration of the desiccant wheel 1252. Warm dry air can be supplied to the heat pump induction units 1291, preferably to the inlets 1295 thereof, and, under the control of the temperature/humidity sensors and controllers 1296, the rate at which it is supplied can be modulated as required for humidity control, and heat can be pumped to or from the air as required for temperature control.

In the apparatus of FIGS. 60 and 62 through 66, the main source for heat for regeneration of desiccant is:

FIG. 60, the engine 1190;

FIG. 62, the engine 1278;

FIGS. 63 and 64, absorption refrigeration apparatus 1278; and

FIGS. 65 and 66, absorption refrigeration apparatus 1250.

In all cases, the storage tank 1228 of FIG. 61 can be added, and heated fluid from the source can be circulated to the tank while heated fluid is circulated from the tank as required for regeneration; then, should any of the foregoing heat sources fail to provide all of the heat required for regeneration, the supplemental heater 1248 (FIG. 61), can burn gas or another fuel, as required, to transfer heat, for example, through the heat exchanger 1249 to the storage tank 1228 so that the heat needed for regeneration is available. In the alternative, electric resistance heaters (not illustrated), or an electrically powered heat pump which pumps heat from any suitable source, e.g., ambient air, can be used at times when there is no demand charge to supplement or to take the place of heat from the other sources for regeneration, producing hot water that is stored in the tank 1228 and used as required. A heat pump powered by a combustion engine can also be used to supplement or take the place of heat from the engine 1223. As a further alternative, any of the foregoing sources for heat can be used, off peak, to regenerate the liquid desiccant of the apparatus of FIGS. 63 and 64, which can then be stored in a concentrated condition in the tank 1228 and used as required, in which case direct connections (not shown) should be provided from the tank 1228 to the regenerator 1234 and to the dehumidifiers 1212.

Desiccant dehumidification apparatus shown in FIG. 67 comprises first and second dehumidifiers 1323 and 1324 and first and second heat exchangers 1325 and 1326. Air to be dehumidified, usually outside air, enters the apparatus as indicated by an arrow 1327, passes through the dehumidifier 1323 and the heat exchanger 1325, a blower 1328, the dehumidifier 1324, the heat exchanger 1326, and an evaporative cooler 1329, from which it is directed into an air duct 1330 for delivery to a space to be conditioned (indicated by legend). Outside air for regeneration, as indicated by an arrow 1331, flows into a direct evaporative cooler 1332, and then passes through the heat exchanger 1326, a heat exchanger 1333, a heater 1334, the dehumidifier 1324 and a heat exchanger 1335 before being vented as indicated by an arrow 1336. Outside air for regeneration, as indicated by an arrow 1337, also flows into a direct evaporative cooler 1338, and then passes through the heat exchanger 1325, a heat exchanger 1339, a heater 1340, the dehumidifier 1323, and a heat exchanger 1341 before being vented as indicated by an arrow 1342. The heaters 1334 and 1340 can be direct fired gas heaters, or coils through which heated heat transfer fluid from a separate boiler, from storage, from a cogenerator or from a solar collector is circulated.

On summer cycle, air to be dehumidified is both dehumidified and heated in the dehumidifier 1323, and is then cooled in the heat exchanger 1325 before being dehumidified and heated in the dehumidifier 1324, cooled in the heat exchanger 1326, and cooled and humidified in the evaporative cooler 1329. The apparatus can also include a heater (not illustrated in FIG. 67, through which the air passes, but, on summer cycle, is not heated because there is no fire in the heater. It has been determined that the apparatus can produce air at a dry bulb temperature of 55° F. (13° C.) saturated with water vapor, the typical conditions for conditioned air produced for air conditioning. Regenerating air is cooled in the evaporative cooler 1332, is heated in the heat exchanger 1326 by heat transfer thereto from dehumidified air, and is then heated again in the heater 1334 before passing in regenerating relationship with desiccant thereof through the dehumidifier 1324 and being vented as indicated by the arrow 1336. The heat exchangers 1333 and 1335 can be used to recover heat that would otherwise be discharged from the system, for example, by transferring heat from the exchanger 1335 to the exchanger 1333. This can be done by circulating a heat transfer fluid between the two exchangers or by connecting them with heat pipes.

Regenerating air is also cooled in the evaporative cooler 1338, is heated in the heat exchanger 1325 by heat transfer thereto from dehumidified air, and is then heated again in the heater 1340 before passing in regenerating relationship with desiccant thereof through the dehumidifier 1323, through the heat exchanger 1341 and being vented as indicated by the arrow 1342. The apparatus of FIG. 67 is well suited to condition air for a building which houses a light commercial operation. Outside air can supply all of the regenerating air, and usually will when exhaust hoods and fans discharge substantial quantities of air from the building served. Otherwise, relief air, if available in sufficient proportions, can be used in either of the regenerating air circuits, preferably that which includes the evaporative cooler 1332 because its low humidity enables a low air discharge temperature from the cooler 1332 and a correspondingly lower conditioned air discharge temperature from the heat exchanger 1326.

It will be appreciated that, in the heat exchangers 1325 and 1326, which can be heat exchange wheels, heat pipes, or coils through which a heat transfer fluid is circulated, heat of sorption is transferred from air being conditioned to regenerating air that has been cooled evaporatively. The evaporative cooling makes it possible to achieve lowered conditioned air temperatures than would otherwise be possible. Also, the heat of sorption is transferred to the regenerating air, thus aiding in regeneration.

On winter cycle gas is not supplied to the heaters 1334 and 1340, but is supplied to a heater (not illustrated in FIG. 67) which serves air delivered by the duct 1330 as required to maintain a desired comfort condition in the space served by the apparatus.

Most of the elements of the apparatus of FIG. 67 are present in that shown in FIG. 68, and are identified by the same reference numerals. The apparatus differs, however in that the effluent from the evaporative cooler 1329 discharges into induction units which are not shown in detail, but are represented by the fan of one, designated 1343, which is shown in FIG. 68. The fan 1343 discharges, as indicated by an arrow 1344, into a space to be conditioned (designated by legend), while return air from the space flows through a line 1345 as indicated by an arrow 1346 to a line 1347, through which a part of the recirculated air flows, as indicated by an arrow 1348 to a line 1349 which is connected to the suction side of the fan 1343 and to a line 1350 through which effluent from the evaporative cooler 1329 flows to the line 1349. The fans 1343 are constant speed fans which have capacities sufficiently large that they discharge both recirculated air and conditioned air into the space being conditioned, and in proportions which depend upon the setting of a damper 1351 in the line 1350. As is subsequently explained, the seemingly minor differences between the apparatus of FIG. 67 and that of FIG. 68 cause comparatively large differences in performance.

The fans used to cause air to flow through the dehumidifier wheels 1323 and 1324 of the apparatus of FIGS. 67 and 68, and of the dehumidifier wheels of the apparatus of other FIGS. hereof are preferably of the type known as "plug fans". Such fans are available from Barry Blower under the trade designation "VERSA PLUG". Plug fans cause the air to be conditioned and the regenerating air to flow through the wheel dehumidifiers by maintaining a positive pressure of air inside reasonably tight plenums from which the air flows smoothly through the dehumidifying and regenerating sides of the dehumidifiers, causing uniform flow.

Apparatus shown in FIG. 69 comprises a first desiccant wheel 1352, a second desiccant wheel 1353 and an indirect evaporative cooler 1354 for conditioning outside air. The first desiccant wheel is an enthalpy wheel because relief air, as indicated by an arrow 1355, from a building (not illustrated) served by the apparatus is directed by a blower 1356 through a segment thereof, as indicated by an arrow 1357, being discharged from the wheel 1352 and from the apparatus as indicated by an arrow 1358. The second desiccant wheel 1353 is regenerated by outside air, which is directed by a blower 1359 in heat exchange relationship first with a heat exchanger 1360 and then with a heating coil 1361 before it flows through a segment of the second wheel 1353; regenerating air leaving the wheel 1353 flows in heat exchange relationship with a heat exchanger 1362 before being discharged from the wheel and the apparatus, as indicated by an arrow 1363. Outside air to be dehumidified enters the apparatus as indicated by an arrow 1364, passing through a segment of the wheel 1352, a blower 1365, a segment of the wheel 1353 and the indirect evaporative cooler 1354 before being circulated to induction mixing units (one of which, designated 1366, is shown in FIG. 69) for delivery to spaces served by the apparatus, as indicated by an arrow 1367, which represents the delivery of conditioned air to the space served from the one induction mixing unit 1366 shown in FIG. 69. The outside air is dehumidified and cooled slightly in the first desiccant wheel 1352, is heated and dehumidified to about 36 grains of water vapor per pound of dry air in the second desiccant wheel 1353, and is cooled sensibly to within about 5° F. (3° C.) of the ambient wet bulb temperature in the indirect evaporative cooler 1354. Thus, it is a mixture of return air and relatively warm dehumidified air that is delivered to the induction mixing units 1366, as indicated by arrows 1368 and 1369, respectively. This mixture is cooled, as required for temperature control, by coils (not illustrated in FIG. 69) served by unitary heat pumps (not illustrated in FIG. 69) in the induction mixing units 1366. As is indicated by a line 1370, heat is transferred as required from the heat pumps in the induction mixing units 1366 to a cooling tower 1371.

As has been explained previously, the low humidity of the relief air enables it to remove moisture from the wheel 1352; in addition, because the wheel 1353 is heated by heat of sorption from outside air dehumidified therein, and because the relief air is comparatively cool, the regenerating relief air also removes heat from the wheel 1352. Specifically, the heat removed from the wheel 1352 by the regenerating relief air is heat of sorption from the dehumidification of outside air by the wheel.

The indirect evaporative cooler 1354 has a series of plates 1372 with relatively small interior passages through which the dehumidified air flows. Water is circulated by a pump 1373 and sprayed inside the evaporative cooler 1354 in contact with ambient air which is caused to flow therethrough, so that the exteriors of the plates 1372 are cooled to about the ambient wet bulb temperature.

The apparatus of FIG. 69 also includes an engine 1374 which burns a fuel to generate shaft work and heat. The shaft of the engine is connected in driving relationship with a generator 1375 which furnishes electricity, as indicated by an arrow 1376, required within the building served by the apparatus. Heat from the engine 1374, as indicated by a line 1377, is transferred to the coil 1361, where it heats regenerating air for the second desiccant wheel 1353. A heat transfer fluid can be circulated between the heat exchangers 1360 and 1362 whenever required to provide enough heat for regeneration. For optimum utilization of available heat from the engine 1374, it is usually desirable to provide a tank (not illustrated in FIG. 69) for storage of a hot heat transfer fluid, a separate boiler or direct fired heater (not illustrated in FIG. 69), or both. When storage is provided, excess heat, when available, can be used to heat the stored heat transfer fluid, and heat can be used, when needed, by transfer into regenerating relationship with the desiccant from the hot fluid. This transfer can be effected in a heat exchanger (not illustrated in FIG. 69), preferably positioned between the heat exchanger 1360 and the heating coil 1361. It is sometimes advantageous to include a heat exchanger (not illustrated in FIG. 69) in heat exchange relationship with regenerating air leaving the second wheel 1353, and to transfer excess heat from the engine 1374 to that heat exchanger so that it is transferred to and rejected from the system with the exhausted regenerating air.

Apparatus shown in FIG. 70 comprises a first desiccant wheel 1378, a second desiccant wheel 1379 and an indirect evaporative cooler 1380 for conditioning outside air. The first desiccant wheel is an enthalpy wheel because relief air from a building (not illustrated) served by the apparatus is directed by a blower 1381 through a segment thereof, as indicated by an arrow 1382, being discharged from the wheel 1378 and from the apparatus as indicated by an arrow 1383. The second desiccant wheel 1379 is regenerated by outside air, which is directed by a blower 1384 in heat exchange relationship first with a coil 1385, then with a heat exchanger 1386 and finally with a heating coil 1387 before it flows through a segment of the second wheel 1379; regenerating air leaving the wheel 1379 flows in heat exchange relationship with a heat exchanger 1388 before being discharged from the wheel and the apparatus, as indicated by an arrow 1389. Outside air to be dehumidified enters the apparatus as indicated by an arrow 1390, passing through a segment of the wheel 1378, a blower 1391, a segment of the wheel 1379 and the indirect evaporative cooler 1380 before being circulated to induction mixing units (one of which, designated 1392, is shown in FIG. 70) for delivery to spaces served by the apparatus, as indicated by an arrow 1393, which represents the delivery of conditioned air to the space served from the one induction mixing unit 1392 shown in FIG. 70. The outside air is dehumidified and cooled slightly in the first desiccant wheel 1378, is heated and dehumidified to about 36 grains of water vapor per pound of dry air in the second desiccant wheel 1379, and is cooled sensibly to within about 5° F. (3° C.) of the ambient wet bulb temperature in the indirect evaporative cooler 1380. Thus, it is a mixture of return air and relatively warm dehumidified air that is delivered to the induction mixing units 1392, as indicated by arrows 1394 and 1395, respectively. This mixture is cooled, as required for temperature control, by coils (not illustrated in FIG. 70) to which a relatively high temperature heat transfer fluid is circulated as is indicated by a line 1396 from compression refrigeration apparatus 1397 which has an evaporator 1398, a compressor 1399 and a condenser 1400. The circulation of a heat transfer fluid, as indicated by the line 1396, is from the evaporator 1398, where it is cooled, to the coils (not illustrated) in the mixing units 1392, where its flow is modulated as required for temperature control in the spaces served by the induction mixing units 1392.

As has been explained previously, the low humidity of the relief air enables it to remove moisture from the wheel 1378; in addition, because the wheel 1378 is heated by heat of sorption from outside air dehumidified therein, and because the relief air is comparatively cool, the regenerating relief air also removes heat from the wheel 1378. Specifically, the heat removed from the wheel 1378 by the regenerating relief air is heat of sorption from the dehumidification of outside air by the wheel.

The indirect evaporative cooler 1380 has a series of plates 1401 with relatively small interior passages through which the dehumidified air flows. Water is circulated by a pump 1402 and sprayed inside the evaporative cooler 1380 in contact with ambient air which is caused to flow therethrough, so that the exteriors of the plates 1401 are cooled to about the ambient wet bulb temperature.

The apparatus of FIG. 70 also includes an engine 1403 which burns a fuel to generate shaft work and heat. The shaft of the engine is connected in driving relationship with the compressor 1399 of the refrigeration apparatus 1397. Heat from the engine 1403, as indicated by a line 1404, is transferred to the coil 1387, where it heats regenerating air for the second desiccant wheel 1379. A heat transfer fluid can be circulated between the heat exchangers 1387 and 1388 whenever required to provide enough heat for regeneration. Heat from the compressor 1400 of the refrigeration apparatus 1397, as indicated by a line 1405 is transferred to the coil 1385, where it also heats regenerating air for the second desiccant wheel 1379. Excess heat from the condenser 1400, as indicated by a line 1406, can be rejected from the system in a cooling tower 1407. For optimum utilization of available heat from the engine 1403 and from the condenser 1400, it is usually desirable to provide a tank (not illustrated in FIG. 70) for storage of a hot heat transfer fluid, a separate boiler or direct fired heater (not illustrated in FIG. 70), or both. When storage is provided, excess heat, when available, can be used to heat the stored heat transfer fluid, and heat can be used, when needed, by transfer into regenerating relationship with the desiccant from the hot fluid. This transfer can be effected in a heat exchanger (not illustrated in FIG. 70), preferably positioned between the coil 1385 and the heat exchanger 1386. It is sometimes advantageous to include a heat exchanger (not illustrated in FIG. 70) in heat exchange relationship with regenerating air leaving the second wheel 1379, and to transfer excess heat from the engine 1403 to that heat exchanger so that it is transferred to and rejected from the system with the exhausted regenerating air.

Apparatus shown in FIG. 71 comprises a first desiccant wheel 1408, a second desiccant wheel 1409, a heat exchanger 1410, an indirect evaporative cooler 1411, a heat exchanger 1412 and a direct evaporative cooler 1413 for conditioning outside air. The first desiccant wheel is an enthalpy wheel because relief air from a building (not illustrated) served by the apparatus is directed by a blower 1414 through a segment thereof, as indicated by an arrow 1415, being discharged from the wheel 1408 and from the apparatus as indicated by an arrow 1416. The second desiccant wheel 1409 is regenerated by outside air, which is directed by a blower 1417 in heat exchange relationship first with a heating coil 1418 then with a heat exchanger 1419 and finally with a heating coil 1420 before it flows through a segment of the second wheel 1409; regenerating air leaving the wheel 1409 flows in heat exchange relationship with a heat exchanger 1421 before being discharged from the wheel and the apparatus, as indicated by an arrow 1422. Outside air to be dehumidified enters the apparatus as indicated by an arrow 1423, passing through a segment of the wheel 1408, a blower 1424, in heat transfer relationship with the heat exchanger 1410, through a segment of the wheel 1409, the indirect evaporative cooler 1411, in heat transfer relationship with the heat exchanger 1412 and through the direct evaporative cooler 1413 before being circulated to fan induction coil units (one of which, designated 1425, is shown in FIG. 71) for delivery to spaces served by the apparatus, as indicated by an arrow 1426, which represents the delivery of conditioned air to the space served from the one fan induction coil unit 1425 shown in FIG. 71. The outside air is dehumidified and cooled slightly in the first desiccant wheel 1408, is cooled by the heat exchanger 1410, is heated and dehumidified in the second desiccant wheel 1409, is cooled by the indirect evaporative cooler 1411 and by the heat exchanger 1412, and is cooled sensibly and humidified in the direct evaporative cooler 1413. As will be explained in more detail later, the effluent from the direct evaporative cooler 1413 can be at 40° F. (5° C.), saturated with water vapor. Thus, it is a mixture of return air and cold, low humidity air that is delivered to the induction mixing units 1425, as indicated by arrows 1427 and 1428, respectively. The recirculated air is cooled, as required for temperature control, by coils (not illustrated in FIG. 71) to which a relatively high temperature heat transfer fluid is circulated as is indicated by a line 1429 from compression refrigeration apparatus 1430 which has an evaporator 1431, a compressor 1432 and a condenser 1433. The circulation of a heat transfer fluid, as indicated by the line 1429, is from the evaporator 1431, where it is cooled, to the coils (not illustrated) in the mixing units 1425, where its flow is modulated as required for temperature control in the spaces served by the induction mixing units 1425.

As has been explained previously, the low humidity of the relief air enables it to remove moisture from the wheel 1408; in addition, because the wheel 1408 is heated by heat of sorption from outside air dehumidified therein, and because the relief air is comparatively cool, the regenerating relief air also removes heat from the wheel 1408. Specifically, the heat removed from the wheel 1408 by the regenerating relief air is heat of sorption from the dehumidification of outside air by the wheel.

The indirect evaporative cooler 1411 has a series of plates 1434 with relatively small interior passages through which the dehumidified air flows. Water is circulated by a pump 1435 and sprayed inside the evaporative cooler 1411 in contact with ambient air which is caused to flow therethrough, so that the exteriors of the plates 1434 are cooled to about the ambient wet bulb temperature.

The apparatus of FIG. 71 also includes an engine 1436 which burns a fuel to generate shaft work and heat. The shaft of the engine is connected in driving relationship with the compressor 1432 of the refrigeration apparatus 1430. Heat from the engine 1436, as indicated by a line 1437, is transferred to the coil 1420, where it heats regenerating air for the second desiccant wheel 1409. A heat transfer fluid can be circulated between the heat exchangers 1419 and 1421 whenever required to provide enough heat for regeneration. Heat from the condenser 1433 of the refrigeration apparatus 1430, as indicated by a line 1438 is transferred to the coil 1418, where it also heats regenerating air for the second desiccant wheel 1409. For optimum utilization of available heat from the engine 1436 and from the condenser 1433, it is usually desirable to provide a tank (not illustrated in FIG. 71) for storage of a hot heat transfer fluid, a separate boiler or direct fired heater (not illustrated in FIG. 71), or both. When storage is provided, excess heat, when available, can be used to heat the stored heat transfer fluid, and heat can be used, when needed, by transfer into regenerating relationship with the desiccant from the hot fluid. This transfer can be effected in a heat exchanger (not illustrated in FIG. 71), preferably positioned between the coil 1418 and the heat It is sometimes advantageous to include a heat exchanger (not illustrated in FIG. 71) in heat exchange relationship with regenerating air leaving the second wheel 1409, and to transfer excess heat from the engine 1436 to that heat exchanger so that it is transferred to and rejected from the system with the exhausted regenerating air.

Apparatus shown in FIG. 72 uses a dehumidifier 1439 to condition ventilation air. Outside air enters the apparatus as indicated by an arrow 1440, flows through a fan 1441, a preheat coil 1442 and the dehumidifier 1439. Dehumidified air flows from the dehumidifier 1439 as indicated by a line 1443, and is discharged in the vicinity of fan coil mixing units 1444 in a plenum above ceilings 1445 of spaces to be conditioned (indicated by legend). The fan coil mixing units induce air to flow from the plenum into the units, from which it is discharged into the spaces as indicated by arrows 1446, and, in turn, induce air to flow from the spaces into the plenum as indicated by arrows 1447.

The dehumidifier 1439 uses a liquid desiccant, e.g., lithium chloride or calcium chloride, which is circulated from a sump 1448 by a pump 1449 through a line 1450, a heat exchanger 1451 and a line 1452 from which is sprayed in the dehumidifier in contact with air flowing through the dehumidifier as previously described, and flows from the dehumidifier 1439 into the sump 1448. The heat exchanger 1451 is positioned in a fluid cooler 1453 where water pumped from the bottom of the cooler is sprayed in contact with return air which is introduced into the cooler by a return fan 1454. The water sprayed in the cooler 1453 is evaporated, removing sensible heat from both and from the heat exchanger 1451; as a consequence, the liquid desiccant is cooled to such an extent that, when its concentration is maintained within suitable limits, which the apparatus of FIG. 72 does in a manner that is explained below, the dehumidifier 1439 is capable of conditioning outside air to a dry bulb temperature of 80° F. (27° C.).

The spaces conditioned by the apparatus of FIG. 72 may be maintained at a dry bulb temperature of 75° F. (24° C.). As is explained above, the dehumidifier 1439 can deliver air having a dry bulb temperature of 80° F. (27° C.). It will be appreciated that the rate at which the dehumidified air is delivered to the spaces should be modulated in any suitable way (not illustrated in FIG. 72) to maintain humidity. Temperature, then, can be maintained in the spaces by causing chilled water from a line 1455 to flow through coils (not illustrated in FIG. 72) in the fan coil mixing units 1444, and modulating the flow, as required.

A refrigeration apparatus 1456 which has an evaporator 1457, a compressor 1458 driven by an engine 1459 and a condenser 1460 provides chilled water for the line 1455. A pump 1461 causes water or another heat transfer fluid to circulate in a line 1462 to the evaporator 1457, through the line 1455 and a line 1463 back to the pump 1461. The water or other heat transfer fluid is cooled by heat transfer to the evaporator 1457 to the extent required to enable it, by flowing through the coils (not illustrated) in the fan coil mixing unit 1444, to transfer heat from conditioned air as required for temperature control.

The engine 1459, in one mode of operation, is a source for heat for regeneration of the desiccant of the dehumidifier 1439. When the engine 1459 is supplying heat for regeneration, a pump 1464 circulates a suitable heat transfer fluid through a line 1465 to a line 1466, through a heat exchanger 1467, a three-way valve 1468, a line 1469 and lines 1470 and 1471 back to the pump 1464. A suitable heat transfer fluid, e.g., a glycol solution, to serve as a coolant is circulated by a pump from the heat exchanger 1467 through the cooling jacket (not separately illustrated) of the engine 1459, and through a three-way valve 1472 and a line 1473 back to the heat exchanger 1467. Hot heat transfer fluid in the line, depending upon the settings of three-way valves 1474, 1475 and 1476 can supply heat to a heat exchanger 1477, to a heat exchanger 1478, to a heat exchanger 1479, or to two or more of the heat exchangers 1477, 1478 and 1479.

When the apparatus is being used on summer cycle, and the dehumidifier 1439 is operating, the three-way valve 1474 directs hot water flowing in the line 1469 through the heat exchanger 1477, as required for regeneration of desiccant for the dehumidifier 1439. A pump 1480 causes desiccant to flow from a sump 1481 through a line 1482. A part of the desiccant flowing in the line 1482 flows through a line 1483 back to the sump 1448 of the dehumidifier 1439, and the rest flows through a line 1484, a heat exchanger 1485, the heat exchanger 1477, where it is heated by heat transfer from the heat transfer fluid flowing in the line 1469, and then through a line 1486 from which it is sprayed in a regenerator 1487, ultimately flowing back into the sump 1481.

Regenerating air also flows through the regenerator, being drawn by a fan 1488 through a heat exchanger 1489 and directed from the fan through a line 1590 into the regenerator 1487. Regenerating air, laden with moisture from regeneration of the desiccant, leaves the regenerator 1487 in a line 1491, flows through the heat exchanger 1489 where heat is transferred from the exiting air to the entering air, and leaves the regenerator and the apparatus as indicated by an arrow 1492.

Some of the fan coil mixing units 1444 have heating coils (not illustrated in FIG. 72) which are operably connected to lines 1493 and 1494 so that a pump 1495 can cause a heat transfer fluid to circulate through the heat exchanger 1479 to be heated, through the heating coils (not illustrated), and back to the pump 1495 whenever there is a need to supply heat to the spaces.

The apparatus also includes a boiler 1496 which can be used, as required, to supplement the flow of hot heat transfer fluid in the line 1469 and the heat exchanger 1478 can be used to reject excess heat from the jacket of the engine 1459. The three-way valves 1475 and 1476 can be modulated, as required, to cause hot heat transfer fluid flowing in the line 1469 to flow through the heat exchanger 1479, through the heat exchanger 1478, which serves as a dump coil, or directly back to the line 1469, by-passing the heat exchangers 1478 and 1479. When the hot fluid flows through the heat exchanger 1478, heat is transferred therefrom to cold moist air leaving the fluid cooler 1453, and is rejected from the system as indicated by an arrow 1497.

The apparatus also includes a pump 1498 which causes a heat transfer fluid to circulate through a line 1499, a heat exchanger 1500, a line 1501, in heat transfer relationship with the condenser 1460, through a line 1502 to a three-way valve 1503 from which it is directed either through a line 1504 to a line 1505 and back to the pump 1498 or through a cooling tower 1506, where excess heat is rejected, to the line 1505 and back to the pump 1498.

A three-way valve 1507 can be set so that the heat exchanger 1500 transfers heat to the coils (not illustrated) in the fan coil mixing units 1444 which are operably connected to the lines 1455 and 1463. When this is done, heat from the condenser 1460 can be transferred to the spaces served instead of, in the other mode of operation, heat being transferred from the spaces to the evaporator 1457. When it is desired to use the heat exchanger 1500 as just described to transfer heat to the spaces, this can be done in only certain zones of a building while chilled water from the evaporator 1457 is delivered to others, or chilled water from the evaporator can be used to transfer heat from a storage vessel (not illustrated).

The apparatus of FIG. 72 also includes a high temperature storage tank 1508 which can be used, under the control of the three-way valve 1472, to remove heat from the engine 1459, and to store that heat for subsequent use by setting a three-way valve 1509 to divert water flowing through the line 1471 to be heated in the storage tank 1508 before it returns to the pump 1464.

Further, the apparatus includes a solar collector 1510, a heat exchanger 1511, and a pump 1512 for circulating a heat transfer fluid to the solar collector 1510, to the heat exchanger 1511 and back to the pump 1512. A pump 1513 can circulate a heat transfer fluid from the heat exchanger 1511 to a low temperature storage tank 1514 and back to the pump 1513 to enable the storage of heat from the solar collector 1510 in the tank 1514. Heated fluid can be circulated from the tank 1514 by a pump 1515 to the heat exchanger 1485, which then serves to preheat fluid flowing to the heat exchanger 1479, aiding in the regeneration of desiccant, and back to the tank 1514. Whenever the temperature in the low temperature storage tank 1514 is appropriate, a three-way valve to the right thereof (not identified by reference numeral) can be used to direct heat transfer fluid flowing through the line 1471 through the low temperature storage tank 1514 to be heated by heat transfer thereto from fluid therein.

Apparatus shown in FIG. 98 comprises a generator-compressor 1517, an evaporator 1518 and an absorber 1519 which, together, constitute refrigeration apparatus. A vapor compressor 1520 driven by an engine 1521 powers the generator-compressor 1517. A pump 1522 directs a dilute liquid desiccant, e.g., a lithium chloride solution, from the absorber 1519 to sprays 1523 in the generator-condenser 1517, where it is sprayed onto a separator surface 1524 on which it flows downwardly, as indicated by arrows 1525. The vapor-compressor 1520, driven by the engine 1521, pumps fluid from the side of the separator surface 1524 which faces the sprays 1523 to the opposite side, the flow being through an inlet 1526 to the vapor compressor 1520, and from the vapor compressor 1520 through an outlet 1527 to the opposite side of the separator surface 1524. This flow of fluid establishes a vacuum on the side of the separator surface 1524 which faces the sprays 1523, and a super atmospheric pressure on the opposite side of the surface 1524. The vacuum causes evaporation of the hygroscopic liquid, and the absorption of heat from the surface 1524, while the super atmospheric pressure on the other side of the surface 1524 causes condensation, which, because of the lowered temperature, occurs preferentially on the surface 1524. Hygroscopic liquid which is not evaporated is concentrated by evaporation of water vapor therefrom, and flows down the surface 1524 and into a conduit 1528, from which it flows as indicated by an arrow through an expansion valve 1529, and is sprayed from nozzles 1530 in the absorber 1519. Spraying of the concentrated hygroscopic liquid in the absorber 1519 establishes a low water vapor pressure therein, causing water that is circulated by a pump 1531 and sprayed from nozzles 1532 in the evaporator 1518 to vaporize, and flow through a line 1533 into the absorber 1519. Evaporation of water in the evaporator 1518 reduces the temperature therein, and removes heat from a heat exchanger 1534 therein. Condensate flows from the bottom of the generator-condenser through an expansion valve 1535, as indicated by an arrow to the evaporator 1518, while a pump 1536 circulates a heat transfer fluid through the heat exchanger 1534, through a coil 1537, and back to the pump 1536, so that heat is transferred from the coil 1537. In the absorber 1519, water vapor from the evaporator is absorbed in the concentrated hygroscopic liquid, diluting the hygroscopic liquid and releasing its heat of sorption. The heat of sorption is transferred to a heat exchanger 1538, and to a heat transfer fluid circulated therethrough and to a cooling tower 1539, from which it is rejected.

Air to be conditioned, which can be outside air or a mixture of outside air and return air from a building served by the apparatus, flows through a desiccant wheel 1540, a fan 1541 and in heat transfer relationship with the coil 1537, and is then delivered to a building served by the apparatus.

Cooling jacket water from the engine 1521 is circulated by a pump 1542 to a coil 1543 and back to the engine 1521, while a fan 1544 directs regenerating air in heat transfer relationship with the coil 1543 and then through a segment of the desiccant wheel 1540 to cause regeneration of the wheel.

Apparatus shown in FIG. 99 comprises a regenerator 1545 which serves a dehumidifier 1546. A vapor compressor 1547 driven by a gas turbine 1548 powers the regenerator 1545. A dilute liquid desiccant, e.g., a lithium chloride solution, flows through an expansion valve 1549 from the dehumidifier 1546 to sprays 1550 in the regenerator 1545, where it is sprayed onto a separator surface 1551 on which it flows downwardly, as indicated by arrows 1552. The vapor-compressor 1547, driven by the gas turbine 1548, pumps fluid from the side of the separator surface which faces the sprays 1550 to the opposite side, the flow being through an inlet 1553 to the vapor compressor 1547, and from the vapor compressor 1547 through an outlet 1554 to the opposite side of the separator surface 1551. This flow of fluid establishes a vacuum on the side of the separator surface 1551 which faces the sprays 1550, and a super atmospheric pressure on the opposite side of the surface 1550. The vacuum causes evaporation of the hygroscopic liquid, and the absorption of heat from the surface 1551, while the super atmospheric pressure on the other side of the surface 1551 causes condensation, which, because of the lowered temperature, occurs preferentially on the surface 1551. Hygroscopic liquid which is not evaporated is concentrated by evaporation of water vapor therefrom, and flows down the surface 1551 and into a conduit 1555, from which it flows into a line 1556 from which a pump 1557 causes it to flow to nozzles 1558 from which it is sprayed in the dehumidifier 1546. A fan 1559 causes air to be conditioned to flow into the dehumidifier 1546, as indicated by an arrow 1560 where it is dehumidified, and discharges the dehumidified air, as indicated by an arrow 1561 into heat transfer relationship with a coil 1562 from which it flows, as indicated by an arrow 1563 to a building served by the apparatus.

Heat from the gas turbine 1548, as indicated by lines 1564 and 1565 is transferred to a heat exchanger 1566 inside a generator 1567 of refrigeration apparatus which additionally includes a condenser 1568, an evaporator 1569 and an absorber 1570. Heat from the exchanger 1566 causes water to evaporate from a hygroscopic liquid, e.g., a lithium chloride solution, in the generator 1567. The water vapor, as indicated by an arrow 1571, flows into the condenser 1568, where it is condensed by heat transfer to a heat exchanger 1572. Liquid water, then, flows from the condenser 1568 through an expansion valve 1573 in a line 1574, mixing with water recirculated by a pump 1575 before being sprayed in the evaporator 1569 from nozzles 1576.

Concentrated desiccant flows from the generator 1567 through an expansion valve 1577 in a line 1578, and is sprayed from nozzles 1579 in the absorber 1570. the concentrated desiccant liquid causes a low water vapor pressure inside the absorber which, in turn, causes water sprayed in the evaporator 1569 to vaporize and to flow through a line 1580 into the absorber 1570, where it is absorbed in, and dilutes, the concentrated hygroscopic liquid. Heat of sorption is transferred from the absorber 1570 by a heat exchanger 1581, from which heat is transferred to a fluid circulated by a pump 1582, the fluid flow being from a cooling tower 1583 through the pump 1582 and a line 1584 to the heat exchanger 1581, and back through a line 1585 to nozzles from which it is sprayed inside the cooling tower 1583. A pump 1586 causes dilute hygroscopic liquid to flow from the absorber 1570 to the generator 1566. The heat transfer fluid from the cooling tower 1583 is also circulated to the heat exchanger 1572 in the condenser 1572 and to a heat exchanger 1587 in the dehumidifier 1546. A pump 1588 circulates water or another heat transfer fluid from the coil 1562 to a heat exchanger 1589, where is is cooled, and back to the coil 1562.

Much of the apparatus of FIG. 100 is the same as that of FIG. 99, including the regenerator 1545, the dehumidifier 1546, the vapor compressor 1547, expansion valve 1549, the line 1556, the pump 1557, the fan 1559, the cooling tower 1583, and the lines 1584 and 1585. The vapor compressor 1547, however, is driven by an engine 1590 from which heat is transferred to a heat exchanger 1591 from which heat is transfereed to supply regenerating heat for second liquid desiccant dehumidification apparatus which comprises a regenerator 1592, a dehumidifier 1593 and an evaporative cooler 1594. Desiccant is circulated by a pump 1595 from a sump 1596 through a heat exchanger 1597 in the evaporative cooler 1594, and then flows as indicated by an arrow 1598 to the dehumidifier 1593 where it is sprayed from nozzles 1599, and from which it flows back to the sump 1596 as indicated by an arrow 1600. Desiccant also flows from the sump 1596, as indicated by an arrow 1601, to a sump 1602, from which a pump 1603 directs some of the desiccant through a line 1604, and back to the sump 1596 and directs the rest of the desiccant through a line 1605, through the heat exchanger 1591 where it is heated, and then through a line 1606 to nozzles 1607 from which it is sprayed in the regenerator 1592, flowing back into the sump 1602. Regenerating air, as indicated by arrows 1608 and 1609, is directed by a blower 1610 through the regenerator 1592.

Building relief air, as indicated by arrows 1611 and 1612, is directed through the evaporative cooler 1594, in contact with water circulated through a line 1613 by a pump 1614 and sprayed from nozzles 1615. As a consequence, the desiccant that is sprayed in the dehumidifier 1593 is at a comparatively low temperature, and can furnish air to a building served by the apparatus, as indicated by an arrow 1616, having a moisture content as low as 30 grains of water vapor per pound of dry air.

Apparatus shown in FIG. 73 comprises a first desiccant wheel 1617, a second desiccant wheel 1618, an indirect evaporative cooler 1619, a heat exchanger 1620 and a direct evaporative cooler 1621 for conditioning outside air. The first desiccant wheel is an enthalpy wheel because relief air from a building (not illustrated) served by the apparatus is directed by a blower 1622 through a segment thereof, as indicated by an arrow 1623, being discharged from the wheel 1617 and from the apparatus as indicated by an arrow 1624. The second desiccant wheel 1618 is regenerated by outside air, which is directed by a blower 1625 in heat exchange relationship first with a heating coil 1626 then with a heat exchanger 1627 and finally with a heating coil 1628 before it flows through a segment of the second wheel 1618; regenerating air leaving the wheel 1618 flows in heat exchange relationship with a heat exchanger 1629 before being discharged from the wheel and the apparatus, as indicated by an arrow 1630. Outside air to be dehumidified enters the apparatus as indicated by an arrow 1631, passing through a segment of the wheel 1617, a blower 1632, through a segment of the wheel 1618, the indirect evaporative cooler 1619, in heat transfer relationship with the heat exchanger 1620 and through the direct evaporative cooler 1621 before being circulated to fan induction coil units (one of which, designated 1633, is shown in FIG. 73) for delivery to spaces served by the apparatus, as indicated by an arrow, which represents the delivery of conditioned air to the space served from the one fan induction coil unit 1633 shown in FIG. 73. The outside air is dehumidified and cooled slightly in the first desiccant wheel 1617, is heated and dehumidified in the second desiccant wheel 1618, is cooled by the indirect evaporative cooler 1619 and by the heat exchanger 1620, and is cooled sensibly and humidified in the direct evaporative cooler 1621. As will be explained in more detail later, the effluent from the direct evaporative cooler 1621 can be at 40° F. (5° C.), saturated with water vapor. Thus, it is a mixture of return air and cold, low humidity air that is delivered to the induction mixing units 1633, as indicated by arrows 1634 and 1635, respectively. The recirculated air is cooled, as required for temperature control, by coils (not illustrated in FIG. 73) to which a relatively high temperature heat transfer fluid is circulated as is indicated by a line 1636 from compression refrigeration apparatus 1637 which has an evaporator 1638, a compressor 1639 and a condenser 1640. The circulation of a heat transfer fluid, as indicated by the line 1636, is from the evaporator 1638, where it is cooled, to the coils (not illustrated) in the mixing units 1633, where its flow is modulated as required for temperature control in the spaces served by the induction mixing units 1633.

As has been explained previously, the low humidity of the relief air enables it to remove moisture from the wheel 1617; in addition, because the wheel 1617 is heated by heat of sorption from outside air dehumidified therein, and because the relief air is comparatively cool, the regenerating relief air also removes heat from the wheel 1617. Specifically, the heat removed from the wheel 1617 by the regenerating relief air is heat of sorption from the dehumidification of outside air by the wheel.

The indirect evaporative cooler 1619 has a series of plates 1641 with relatively small interior passages through which the dehumidified air flows. Water is circulated by a pump 1642 and sprayed inside the evaporative cooler 1619 in contact with ambient air which is caused to flow therethrough, so that the exteriors of the plates 1641 are cooled to about the ambient wet bulb temperature.

The apparatus of FIG. 73 also includes an engine 1643 which burns a fuel to generate shaft work and heat. The shaft of the engine is connected in driving relationship with the compressor 1639 of the refrigeration apparatus 1637. Heat from the engine 1643, as indicated by a line 1644, is transferred to the coil 1628, where it heats regenerating air for the second desiccant wheel 1618. A heat transfer fluid can be circulated between the heat exchangers 1627 and 1629 whenever required to provide engough heat for regeneration. Heat from the condenser 1640 of the refrigeration apparatus 1637, as indicated by a line 1645 is transferred to the coil 1616, where it also heats regenerating air for the second desiccant wheel 1618. For optimum utilization of available heat from the engine 1643 and from the condenser 1640, it is usually desirable to provide a tank (not illustrated in FIG. 73) for storage of a hot heat transfer fluid, a separate boiler or direct fired heater (not illustrated in FIG. 73), or both. When storage is provided, excess heat, when available, can be used to heat the stored heat transfer fluid, and heat can be used, when needed, by transfer into regenerating relationship with the desiccant from the hot fluid. This transfer can be effected in a heat exchanger (not illustrated in FIG. 73), preferably positioned between the coil 1626 and the heat exchanger 1627. It is sometimes advantageous to include a heat exchanger (not illustrated in FIG. 73) in heat exchange relationship with regenerating air leaving the second wheel 1618, and to transfer excess heat from the engine 1643 to that heat exchanger so that it is transferred to and rejected from the system with the exhausted regenerating air.

Apparatus shown in FIG. 74 comprises a first desiccant wheel 1646, a heat exchanger 1647, a heat exchanger 1648, a second desiccant wheel 1649, an indirect evaporative cooler 1650, a heat exchanger 1651 and a direct evaporative cooler 1652 for conditioning outside air. The first and second desiccant wheels 1646 and 1649 are both regenerated with outside air. Regenerating outside air for the first wheel 1646 is directed by a blower 1653 through an evaporative cooler 1654, through the heat exchanger 1647, through a heat exchanger 1655, in heat transfer relationship with a heating coil 1656, through a segment of the wheel 1646, and through a heat exchanger 1657, being discharged from the heat exchanger 1657 and from the apparatus as indicated by an arrow 1658. The second desiccant wheel 1649 is also regenerated by outside air, which is directed by a blower 1659 in heat exchange relationship first with a heating coil 1660 then with a heat exchanger 1661 and finally with a second heating coil 1662 before it flows through a segment of the second wheel 1649; regenerating air leaving the wheel 1649 flows in heat exchange relationship with a heat exchanger 1663 before being discharged from the apparatus, as indicated by an arrow 1664. Outside air to be dehumidified enters the apparatus as indicated by an arrow, passing through a segment of the wheel 1646, a blower 1665, through the heat exchanger 1647, in heat transfer relationship with the heat exchanger 1648, through a segment of the wheel 1649, the indirect evaporative cooler 1650, in heat transfer relationship with the heat exchanger 1651 and through the direct evaporative cooler 1652 before being circulated to fan induction coil units (one of which, designated 1666, is shown in FIG. 74) for delivery to spaces served by the apparatus, as indicated by an arrow 1667, which represents the delivery of conditioned air to the space served from the one fan induction coil unit 1666 shown in FIG. 74. The outside air is dehumidified and heated in the first desiccant wheel 1664, is cooled in the heat exchangers 1647 and 1648, is heated and dehumidified in the second desiccant wheel 1649, is cooled by the indirect evaporative cooler 1650 and by the heat exchanger 1651, and is cooled sensibly and humidified in the direct evaporative cooler 1652. As will be explained in more detail later, the effluent from the direct evaporative cooler 1652 can be at 40° F. (5° C.), saturated with water vapor. Thus, it is a mixture of return air and cold, low humidity air that is delivered to the induction mixing units 1666, as indicated by arrows 1668 and 1669, respectively. The recirculated air is cooled, as required for temperature control, by coils (not illustrated in FIG. 74) to which a relatively high temperature heat transfer fluid is circulated as is indicated by a line 1670 from compression refrigeration apparatus 1671 which has an evaporator 1672, a compressor 1673 and a condenser 1674. The circulation of a heat transfer fluid, as indicated by the line 1670, is from the evaporator 1672, where it is cooled, to the coils (not illustrated) in the mixing units 1666, where its flow is modulated as required for temperature control in the spaces served by the induction mixing units 1666.

The indirect evaporative cooler 1650 has a series of plates 1675 with relatively small interior passages through which the dehumidified air flows. Water is circulated by a pump 1676 and sprayed inside the evaporative cooler 1650 in contact with ambient air which is caused to flow therethrough, so that the exteriors of the plates 1675 are cooled to about the ambient wet bulb temperature.

The apparatus of FIG. 74 also includes an engine 1677 which burns a fuel to generate shaft work and heat. The shaft of the engine is connected in driving relationship with the compressor 1673 of the refrigeration apparatus 1671. Heat from the engine 1677, as indicated by a line 1678, is transferred to the coils 1662 and 1656, where it heats regenerating air for the second and first desiccant wheels 1649 and 1646. A heat transfer fluid can be circulated between the heat exchangers 1657 and 1655 and between the heat exchangers 1661 and 1663 whenever required to provide enough heat for regeneration. Heat from the condenser 1674 of the refrigeration apparatus 1671, as indicated by a line 1679 is transferred to the coil 1660, where it also heats regenerating air for the second desiccant wheel 1649. For optimum utilization of available heat from the engine 1677 and from the condenser 1674, it is usually desirable to provide a tank (not illustrated in FIG. 74) for storage of a hot heat transfer fluid, a separate boiler or direct fired heater (not illustrated in FIG. 74), or both. When storage is provided, excess heat, when available, can be used to heat the stored heat transfer fluid, and heat can be used, when needed, by transfer into regenerating relationship with the desiccant from the hot fluid. This transfer can be effected in a heat exchanger (not illustrated in FIG. 74), preferably positioned between the coil 1662 and the heat exchanger 1661. It is sometimes advantageous to include a heat exchanger (not illustrated in FIG. 74) in heat exchange relationship with regenerating air leaving the heat exchanger 1663, and to transfer excess heat from the engine 1677 to that heat exchanger so that it is transferred to and rejected from the system with the exhausted regenerating air.

Apparatus shown in FIG. 75 comprises a first desiccant wheel 1680, a heat exchanger 1681, a second desiccant wheel 1682, an indirect evaporative cooler 1683, a heat exchanger 1684 and a direct evaporative cooler 1685 for conditioning outside air. The first and second desiccant wheels 1680 and 1682 are both regenerated with outside air. Regenerating ambient air for the first wheel 1680 is directed by a blower 1686 through an evaporative cooler 1687, through the heat exchanger 1681, through a heat exchanger 1688, in heat transfer relationship with a heating coil 1689, through a segment of the wheel 1680, and through a heat exchanger 1690, being discharged from the heat exchanger 1690 and from the apparatus as indicated by an arrow 1691. The second desiccant wheel 1682 is also regenerated by outside air, which is directed by a blower 1692 in heat exchange relationship with a first heating cojl 1693 then with a heat exchanger 1694 and finally with a second heating coil 1695 before it flows through a segment of the second wheel 1682; regenerating air leaving the wheel 1682 flows in heat exchange relationship with a heat exchanger 1696 before being discharged from the apparatus, as indicated by an arrow 1697. Outside air to be dehumidified enters the apparatus as indicated by an arrow 1698, passing through a segment of the wheel 1680, a blower the apparatus as indicated by an arrow 1698, passing through a segment of the wheel 1682, the indirect evaporative cooler 1683, in heat transfer relationship with the heat exchanger 1684 and through the direct evaporative cooler 1685 before being circulated to fan induction coil units (one of which, designated 1700, is shown in FIG. 75) for delivery to spaces served by the apparatus, as indicated by an arrow 1701, which represents the delivery of conditioned air to the space served from the one fan induction coil unit 1700 shown in FIG. 75. The outside air is dehumidified and heated in the first desiccant wheel 1680, is cooled in the heat exchanger 1681, is heated and dehumidified in the second desiccant wheel 1682, is cooled by the indirect evaporative cooler 1683 and by the heat exchanger 1684, and is cooled sensibly and humidified in the direct evaporative cooler 1685. As will be explained in more detail later, the effluent from the direct evaporative cooler 1685 can be at 40° F. (5° C.), saturated with water vapor. Thus, it is a mixture of return air and cold, low humidity air that is delivered to the induction mixing units 1700, as indicated by arrows 1702 and 1703, respectively. The recirculated air is cooled, as required for temperature control, by coils (not illustrated in FIG. 75) to which a relatively high temperature heat transfer fluid is circulated as is indicated by a line 1704 from compression refrigeration apparatus 1705 which has an evaporator 1706, a compressor 1707 and a condenser 1708. The circulation of a heat transfer fluid, as indicated by the line 1704, is from the evaporated 1706, where it is cooled, to the coils (not illustrated) in the mixing units 1700, where its flow is modulated as required for temperature control in the spaces served by the induction mixing units 1700.

The indirect evaporative cooler 1683 has a series of plates 1709 with relatively small interior passages through which the dehumidified air flows. Water is circulated by a pump 1710 and sprayed inside the evaporative cooler 1683 in contact with ambient air which is caused to flow therethrough, so that the exteriors of the plates 1709 are cooled to about the ambient wet bulb temperature.

The apparatus of FIG. 75 also includes an engine 1711 which burns a fuel to generate shaft work and heat. The shaft of the engine is connected in driving relationship with the compressor 1707 of the refrigeration apparatus 1705. Heat from the engine 1711, as indicated by a line 1712, is transferred to the coils 1689 and 1695, where it heats regenerating air for the second and first desiccant wheels 1682 and 1680. A heat transfer fluid can be circulated between the heat exchangers 1694 and 1696 and between the heat exchangers 1688 and 1690 whenever required to provide enough heat for regeneration. Heat from the condenser 1708 of the refrigeration apparatus 1705, as indicated by a line 1713 is transferred to the coil 1693, where it also heats regenerating air for the second desiccant wheel 1682. For optimum utilization of available heat from the engine 1711 and from the condenser 1708, it is usually desirable to provide a tank (not illustrated in FIG. 75) for storage of a hot heat transfer fluid, a separate boiler or direct fired heater (not illustrated in FIG. 75), or both. When storage is provided, excess heat, when available, can be used to heat the stored heat transfer fluid, and heat can be used, when needed, by transfer into regenerating relationship with the desiccant from the hot fluid. This transfer can be effected in a heat exchanger (not illustrated in FIG. 75), preferably positioned between the coil 1695 and the heat exchanger 1694. It is sometimes advantageous to include a heat exchanger (not illustrated in FIG. 75) in heat exchange relationship with regenerating air leaving the heat exchanger 1696, and to transfer excess heat from the engine 1711 to that heat exchanger so that it is transferred to and rejected from the system with the exhausted regenerating air.

Excess heat from the condenser 1708 can be transferred to a cooling tower 1714 as indicated by an arrow 1715.

Apparatus shown in FIG. 76 comprises a first desiccant wheel 1716, a heat exchanger 1717, a second desiccant wheel 1718, and an indirect evaporative cooler 1719 for conditioning outside air. The first and second desiccant wheels 1716 and 1718 are both regenerated with outside air. Regenerating ambient air for the first wheel 1716 is directed by a blower 1720 through an evaporative cooler 1721, through the heat exchanger 1717, through a heat exchanger 1722, in heat transfer relationship with a coil 1723, through a segment of the wheel 1716, and through a heat exchanger 1724, being discharged from the heat exchanger 1724 and from the apparatus as indicated by an arrow 1725. The second desiccant wheel 1718 is also regenerated by outside air, which is directed by a blower 1726 in heat exchange relationship with a first heating coil 1727 then with a heat exchanger 1728 and finally with a second heating coil 1729 before it flows through a segment of the second wheel 1718; regenerating air leaving the wheel 1718 flows in heat exchange relationship with a heat exchanger 1730 before being discharged from the apparatus, as indicated by an arrow 1731.

Outside air to be dehumidified enters the apparatus as indicated by an arrow 1732, passing through a segment of the wheel 1716, through the heat exchanger 1717, a blower 1733, through a segment of the wheel 1718 and the indirect evaporative cooler 1719 before being circulated to fan induction coil units (one of which, designated 1734, is shown in FIG. 76) for delivery to spaces served by the apparatus, as indicated by an arrow 1735, which represents the delivery of conditioned air to the space served from the one fan induction coil unit 1734 shown in FIG. 76. The outside air is dehumidified and heated in the first desiccant wheel 1716, is cooled in the heat exchanger 1717, is heated and dehumidified in the second desiccant wheel 1718, and is cooled by the indirect evaporative cooler 1719. As will be explained in more detail later, the effluent from the direct evaporative cooler 1719 can be at about the ambient wet blub temperature, but at an extremely low humidity. Thus, it is a mixture of return air and super dry conditioned air that is delivered to the induction mixing units 1734 as indicated by arrows 1736 and 1737, respectively. The recirculated air, the conditioned air, or a mixture of the two is cooled, as required for temperature control, by coils (not illustrated in FIG. 76) to which a relatively high temperature heat transfer fluid is circulated as is indicated by a line 1738 from compression refrigeration apparatus 1739 which has an evaporator 1740, a compressor 1741 and a condenser 1742. The circulation of a heat transfer fluid, as indicated by the line 1738, is from the evaporator 1740, where it is cooled, to the coils (not illustrated) in the mixing units 1734, where its flow is modulated as required for temperature control in the spaces served by the induction mixing units 1734.

The indirect evaporative cooler 1719 has a series of plates 1743 with relatively small interior passages through which the dehumidified air flows. Water is circulated by a pump 1744 and sprayed inside the evaporative cooler 1719 in contact with ambient air which is caused to flow therethrough, so that the exteriors of the plates 1743 are cooled to about the ambient wet bulb temperature.

The apparatus of FIG. 76 also includes an engine 1745 which burns a fuel to generate shaft work and heat. The shaft of the engine is connected in driving relationship with the compressor 1741 of the refrigeration apparatus 1739. Heat from the engine 1741, as indicated by a line 1746, is transferred to the coils 1729 and 1723, where it heats regenerating air for the second and first desiccant wheels 1718 and 1716. A heat transfer fluid can be circulated between the heat exchangers 1728 and 1730 and between the heat exchangers 1722 and 1724 whenever required to provide enough heat for regeneration. Heat from the condenser 1742 of the refrigeration apparatus 1739, as indicated by a line 1747 is transferred to the coil 1727, where it also heats regenerating air for the second desiccant wheel 1716. For optimum utilization of available heat from the engine 1745 and from the condenser 1742, it is usually desirable to provide a tank (not illustrated in FIG. 76) for storage of a hot heat transfer fluid, a separate boiler or direct fired heater (not illustrated in FIG. 76), or both. When storage is provided, excess heat, when available, can be used to heat the stored heat transfer fluid, and heat can be used, when needed, by transfer into regenerating relationship with the desiccant from the hot fluid. This transfer can be effected in a heat exchanger (not illustrated in FIG. 76), preferably positioned between the coil 1727 and the heat exchanger 1728. It is sometimes advantageous to include a heat exchanger (not illustrated in FIG. 76) in heat exchange relationship with regenerating air leaving the heat exchanger 1730, and to transfer excess heat from the engine 1745 to that heat exchanger so that it is transferred to and rejected from the system with the exhaused regenerating air.

Excess heat from the condenser 1742 can be transferred to a cooling tower 1748 as indicated by an arrow 1749.

Apparatus shown in FIG. 77 comprises a first desiccant wheel 1750, a heat exchanger 1751, a second desiccant wheel 1752, and an indirect evaporative cooler 1753 for conditioning outside air. The first and second desiccant wheels 1750 and 1752 are both regenerated with outside air. Regenerating ambient air for the first wheel 1750 is directed by a blower 1754 through an evaporative cooler 1755, through the heat exchanger 1751, through a heat exchanger 1756, in heat transfer relationship with a coil 1757, through a segment of the wheel 1750, and through a heat exchanger 1758, being discharged from the heat exchanger 1758 and from the apparatus as indicated by an arrow 1759. The second desiccant wheel 1752 is also regenerated by outside air, which is directed by a blower 1760 in heat exchange relationship with a heat exchanger 1761 and with a heating coil 1762 before it flows through a segment of the second wheel 1752; regenerating air leaving the wheel 1752 flows in heat exchange relationship with a heat exchanger 1763 before being discharged from the apparatus, as indicated by an arrow 1764.

Outside air to be dehumidified enters the apparatus as indicated by an arrow 1765, passing through a segment of the wheel 1750, through the heat exchanger 1751, a blower 1766, through a segment of the wheel 1752 and the indirect evaporative cooler 1753 before being circulated to fan induction coil units (one of which, designated 1767, is shown in FIG. 77) for delivery to spaces served by the apparatus, as indicated by an arrow which represents the delivery of conditioned air to the space served from the one fan induction coil unit 1767 shown in FIG. 77. The outside air is dehumidified and heated in the first desiccant wheel 1750, is cooled in the heat exchanger 1751, is heated and dehumidified in the second desiccant wheel 1752, and is cooled by the indirect evaporative cooler 1753. As will be explained in more detail later, the effluent from the indirect evaporative cooler 1753 can be at about the ambient wet bulb temperature, but at an extremely low humidity. Thus, it is a mixture of return air and super dry conditioned air that is delivered to the induction mixing units 1767 as indicated by arrows 1768 and 1769, repectively. The recirculated air, the conditioned air, or a mixture of the two is cooled, as required for temperature control, by unitary heat pumps (not illustrated in FIG. 77) to which a heat transfer fluid cooled by a cooling tower 1770 is circulated as is indicated by a line 1771. The unitary heat pumps (not illustrated in FIG. 77) pump heat to or from the heat transfer fluid circulated as indicated by the line 1771 to maintain the temperatures desired in the spaces served.

The indirect evaporative cooler 1753 has a series of plates 1772 with relatively small interior passages through which the dehumidified air flows. Water is circulated by a pump 1773 and sprayed inside the evaporative cooler 1753 in contact with ambient air which is caused to flow therethrough, so that the exteriors of the plates 1772 are cooled to about the ambient wet bulb temperature.

The apparatus of FIG. 77 also includes an engine 1774 which burns a fuel to generate shaft work and heat. The shaft of the engine is connected in driving relationship with an electric generator 1775 which supplies electricity, as indicated by an arrow 1776 to the unitary heat pumps (not illustrated in FIG. 77) in the induction mixing units 1767, to other electric equipment in the building served by the apparatus, or to both. Heat from the engine 1774, as indicated by a line 1777, is transferred to the coils 1757 and 1762, where it heats regenerating air for the first and second desiccant wheels 1750 and 1752. A heat transfer fluid can be circulated between the heat exchangers 1761 and 1763 and between the heat exchangers 1756 and 1758 whenever required to provide enough heat for regeneration. For optimum utilization of available heat from the engine 1774, it is usually desirable to provide a tank (not illustrated in FIG. 77) for storage of a hot heat transfer fluid, a separate boiler or direct fired heater (not illustrated in FIG. 77), or both. When storage is provided, excess heat, when available, can be used to heat the stored heat transfer fluid, and heat can be used, when needed, by transfer into regenerating relationship with the desiccant from the hot fluid. This transfer can be effected in a heat exchanger (not illustrated in FIG. 77), preferably positioned between the coil 1762 and the heat exchanger 1761. It is sometimes advantageous to include a heat exchanger (not illustrated in FIG. 77) in heat exchange relationship with regenerating air leaving the heat exchanger 1763 or in heat exchange relationship with regenerating air leaving the heat exchanger 1758. Two heat exchangers (not illustrated in FIG. 77) can also be used, one in heat exchange relationship with regenerating air leaving the heat exchanger 1763, and the other in heat exchange relationship with regenerating air leaving the heat exchanger 1758. The purpose of the heat exchanger or heat exchangers is to receive excess heat from the engine 1774 so that the excess heat is transferred to and rejected from the system with the exhausted regenerating air.

Apparatus shown in FIG. 78 comprises a first desiccant wheel 1778, a heat exchanger 1779, a second desiccant wheel 1780, and an indirect evaporative cooler 1781 for conditioning outside air. The first and second desiccant wheels 1778 and 1780 are both regenerated with outside air. Regenerating ambient air for the first wheel 1778 is directed by a blower 1782 through an evaporative cooler 1783, through the heat exchanger 1779, through a heat exchanger 1784, in heat transfer relationship with a coil 1785, through a segment of the wheel 1778, and through a heat exchanger 1786, being discharged from the heat exchanger 1786 and from the apparatus as indicated by an arrow 1787. The second desiccant wheel 1780 is also regenerated by outside air, which is directed by a blower 1788 in heat exchange relationship with a heat exchanger 1789 and with a heating coil 1790 before it flows through a segment of the second wheel 1780; regenerating air leaving the wheel 1780 flows in heat exchange relationship with a heat exchanger 1791 before being discharged from the apparatus, as indicated by an arrow 1792.

Outside air to be dehumidified enters the apparatus as indicated by an arrow 1793, passing through a segment of the wheel 1778, through the heat exchanger 1779, a blower 1794, through a segment of the wheel 1780 and the indirect evaporative cooler 1781 before being circulated to an air handling unit 1795 where a blower 1796 directs it over a cooling coil 1797 and then, as indicated by an arrow, to a space or spaces served. The outside air is dehumidified and heated in the first desiccant wheel 1778, is cooled in the heat exchanger 1779, is heated and dehumidified in the second desiccant wheel 1780, and is cooled by the indirect evaporative cooler 1781. As will be explained in more detail later, the effluent from the indirect evaporative cooler 1781 can be at about the ambient wet bulb temperature, but at an extremely low humidity. Thus, it is mixture of return air from a line 1798 and super dry conditioned air from a line 1799 that is delivered to the air handling unit 1795. The mixture of recirculated air and conditioned air is cooled, as required for temperature control, by heat transfer to the coil 1797. A heat transfer fluid cooled by refrigeration apparatus 1800 is circulated as is indicated by a line 1801. The refrigeration apparatus 1800 transfers heat from the heat transfer fluid circulated as indicated by the line 1801 to maintain the temperatures desired in the spaces served.

The indirect evaporative cooler 1781 has a series of plates 1802 with relatively small interior passages through which the dehumidified air flows. Water is circulated by a pump 1803 and sprayed inside the evaporative cooler 1781 in contact with ambient air which is caused to flow therethrough, so that the exteriors of the plates 1802 are cooled to about the ambient wet bulb temperature.

The apparatus of FIG. 78 also includes an engine 1804 which burns a fuel to generate shaft work and heat. The shaft of the engine is connected in driving relationship with an electric generator 1805 which supplies electricity, as indicated by an arrow, to electric equipment in the building served by the apparatus. Heat from the engine 1804, as indicated by a line 1806, is transferred to the coils 1785 and 1790, where it heats regenerating air for the first and second desiccant wheels 1778 and 1780. A heat transfer fluid can be circulated between the heat exchangers 1789 and 1791 and between the heat exchangers 1784 and 1786 whenever required to provide enough heat for regeneration. For optimum utilization of available heat from the engine 1804, it is usually desirable to provide a tank (not illustrated in FIG. 78) for storage of a hot heat transfer fluid, a separate boiler or direct fired heater (not illustrated in FIG. 78), or both. When storage is provided, excess heat, when available, can be used to heat the stored heat transfer fluid, and heat can be used, when needed, by transfer into regenerating relationship with the desiccant from the hot fluid. This transfer can be effected in a heat exchanger (not illustrated in FIG. 78), preferably positioned between the coil 1790 and the heat exchanger 1789. It is sometimes advantageous to include a heat exchanger (not illustrated in FIG. 78) in heat exchange relationship with regenerating air leaving the heat exchanger 1791 or in heat exchange relationship with regenerating air leaving the heat exchanger 1786. Two heat exchangers (not illustrated in FIG. 78) can also be used, one in heat exchange relationship with regenerating air leaving the heat exchanger 1791, and the other in heat exchange relationship with regenerating air leaving the heat exchanger 1786. The purpose of the heat exchanger or heat exchangers is to receive excess heat from the engine 1804 so that the excess heat is transferred to and rejected from the system with the exhausted regenerating air.

Apparatus shown in FIG. 79 uses a liquid desiccant dehumidifier 1807 and a solid desiccant dehumidifier 1808 to condition ventilation air. Outside air enters the apparatus as indicated by an arrow 1809, flows through the dehumidifier 1807, through a segment of the dehumidifier 1808, through an indirect evaporative cooler 1810, in heat exchange relationship with a cooling coil 1811, through a direct evaporative cooler 1812, and to fan induction coil units, one of which is shown in FIG. 79, designated 1813. The delivery of conditioned air to the unit 1813 is indicated by an arrow 1814.

Return air from a space served by the apparatus, as indicated by an arrow 1815, is also delivered to the fan induction coil unit 1813, in addition to the primary air which enters as indicated by the arrow 1814. The unit 1813 has an internal fan and cooling coil (neither of which is illustrated in FIG. 79); the fan delivers a mixture of return air and conditioned air to the space, as indicated by an arrow 1816. The return air flows in heat transfer relationship with the cooling coil inside the unit 1813 and is cooled, as subsequently explained in more detail, as required for temperature control in the space served.

The liquid desiccant for the dehumidifier 1807 flows from a sump 1817, through a pump 1818, through plates 1819 inside an evaporative cooler 1820, and is then sprayed inside the dehumidifier 1807, flowing by gravity back into the sump 1817. A blower 1821 directs relief air from the building served by the apparatus through the evaporative cooler, in contact with water circulated by a pump 1822 and sprayed inside the evaporative cooler. Because of the low moisture content of the relief air, the liquid desiccant is cooled to a comparatively low temperature in flowing through the plates 1819.

Heat is removed from the coil 1811 and from the coil (not illustrated in FIG. 79) inside the induction unit 1813 by circulation of a cold heat transfer fluid to each, as indicated by lines 1823 and 1824 from the evaporator 1825 of refrigeration apparatus 1826. The refrigeration apparatus 1826 also has a compressor 1827, which is operably connected to be driven by the shaft of an engine 1828, and a condenser 1829.

The desiccant of the dehumidifier 1807 is regenerated by outside air, which enters as shown by an arrow 1830, flows through a heat exchanger 1831, through a blower 1832, a regenerator 1833 and a heat exchanger 1834 before being discharged as indicated by an arrow 1835. Desiccant flows from the sump 1817 through a line 1836 to a regenerator sump 1837. A pump 1838 pumps desiccant from the sump 1837 to a heat exchanger 1839, returning a part to the sump 1817. Desiccant which is delivered to the heat exchanger flows through a line 1840 to the regenerator 1833, being sprayed therein for regeneration, regenerated desiccant flowing back into the sump 1837. Heat from the engine 1828, as indicated by a line 1841, is supplied to the heat exchanger 1839 to furnish heat for regeneration. Heat in air leaving the regenerator 1833 can be transferred to air on its way to the regenerator 1833 by circulating a heat transfer fluid between the heat exchangers 1831 and 1834; such circulation is represented by a line 1842.

Outside air is also used to regenerate the solid desiccant dehumidifier 1808, which is shown as a desiccant wheel. Outside air enters a blower 1843 from which it is discharged, flowing in heat exchange relationship with a heating coil 1844, a heat exchanger 1845, and a heating coil 1846, through a segment of the wheel 1808 and in heat transfer relationship with a heat exchanger 1847 before being discharged from the apparatus as indicated by an arrow 1848. Heat from the condenser 1829, as indicated by a line 1849 is supplied to the coil 1844, while heat from the engine 1828, as indicated by the line 1841, is supplied to the coil 1846.

Excess heat from the condenser 1829 can be discharged from the apparatus in a cooling tower 1850 as indicated by an arrow 1851.

In order to make optimum use of the heat available from the engine 1828 and the condenser 1829 it is desirable for the apparatus to include at least one storage tank (not illustrated in FIG. 79) in which a heated heat transfer fluid from the engine, the condenser or both can be stored, or for the apparatus to include an independent heater (not illustrated in FIG. 79), and to use heat from storage or from the independent heater when it is needed for regeneration. It is also advantageous to include a heat exchanger (not illustrated in FIG. 79) in heat exchange relationship with air discharged from the heat exchanger 1847, with air discharged from the heat exchanger 1834, or with air discharged from both, and to transfer heat from the engine 1828, from the condenser 1829 or from both to the heat exchanger or exchangers when there is a need to discharge excess heat from the apparatus.

Apparatus which includes the dehumidifier 1807, the sump 1817, the regenerator 1833 and the evaporative cooler 1820 of the FIG. 79 apparatus is shown in FIGS. 80, 81 and 82, which are presented to demonstrate different ways of utilizing the low humidity of building relief air. In FIG. 80, desiccant leaving the sump 1817 is sprayed in the evaporative cooler 1820 so that it is regenerated and cooled by the low humidity relief air which, in turn is humidified, so that the cooling is the combined effect of the dry bulb temperature of the relief air and the heat of vaporization of water from the liquid desiccant. In FIG. 81, the evaporative cooler 1820 cools heat pipes 1852 which, in turn, cool desiccant and air in the dehumidifier 1807. In FIG. 82, water is cooled in the evaporative cooler 1820 and, in turn, cools desiccant on its way to the dehumidifier 1897 in a heat exchanger 1853.

A terminal unit indicated generally at 1854 is shown in FIG. 83. The terminal unit 1854 has a housing 1855 which contains a primary air inlet 1856, a primary air damper 1857, an induction nozzle 1858, an air outlet 1859, a blower 1860, an induced air inlet 1861 and an induced air inlet 1862. Primary air, when it is delivered to the primary air inlet 1856, flows through that inlet at a rate which is controlled by the primary air damper 1857, and through the induction nozzle 1858 before being discharged from the unit through the outlet 1859. When the primary air flows through the induction nozzle 1858, it induces a flow of recirculated air through the induced air inlet 1862 into the unit 1854 where is mixes and is discharged with the primary air. So long as the blower 1860 is not energized, the operation of the unit 1854 is as just described. Upon energization of the blower 1860, however, air is induced to flow through the induced air inlet 1661, into the unit 1854, in heat exchange relationship with a chilled water coil 1863 and with a refrigerant coil 1864, and into the blower 1860 from which it is discharged into a passage 1865 which bypasses the induction nozzle 1858, flowing from there through a mixing portion 1866 of the unit between the discharge of the induction nozzle 1858 and the outlet 1859, and ultimately being discharged from the outlet 1859 mixed with the primary air and any air it has induced. As is subsequently explained in more detail, the chilled water coil 1661 is capable of cooling the air which the blower 1860 induces to flow, and the refrigerant coil 1864 is capable either of heating or of cooling that air.

Another terminal unit, indicated generally at 1867, is shown in FIG. 84. The terminal unit 1867 has a primary air inlet 1868, a blower 1869, an induced air inlet 1870, a refrigerant coil 1871 and a chilled water coil 1872. In operation, the blower 1869 discharges air from the unit 1867, as indicated by an arrow 1873, while conditioned air is delivered to the unit through the primary air inlet 1869, usually at a rate which varies between a minimum required for ventilation and a higher rate required to maintain a monitored condition of the space, e.g., humidity, within control limits. The blower 1869 has a capacity sufficiently high that it causes air to flow through the induced air inlet into the unit at a rate which varies as an inverse function of the rate at which conditioned air enters through the inlet 1868. Air which the blower 1869 induces to flow into the unit 1867 flows in heat exchange relationship with the coils 1871 and 1872, mixes with the primary air, and is discharged into a zone that is served by the unit. Chilled water at about 58° F. (14° C.) can be delivered to a water inlet pipe 1874 for flow, under the control of a valve 1875, through the chilled water coil 1872 and back to a water outlet pipe 1876. The chilled water can be circulated, as in previously described apparatus, through a system which includes the building sprinkler piping. In this mode of operation, temperature of the space served can be controlled by modulation of the valve 1875. When heat is required in a space served by the unit 1867, the valve 1875 is closed, and a valve 1877 is opened so that chilled water from the supply line 1874 flows through a heat exchanger 1878 and back to the return line 1876, and a compressor 1879 is energized with a reversing valve 1880 set to direct refrigerant leaving the compressor 1879 to flow through the refrigerant coil 1871, through the heat exchanger 1878, and then back to the compressor 1879. Between the refrigerant coil 1871 and the heat exchanger 1878, the refrigerant flows through expansion valves 1881 and 1882; the former valve, in this mode, is essentially "open", while the latter provides an expansion orifice, so that the refrigerant coil acts as a condenser while the heat exchanger 1878 acts as an evaporator, with the result that heat is pumped to the chilled water which enters through the pipe 1874 to the refrigerant coil 1871, and the induced air is warmed.

When additional cooling is required in a space served by the unit 1867, beyond that the heat transfer fluid available to the pipe 1874 can provide, the flow of fluid can be as just described, with the valve 1875 closed, and the reversing valve 1880 set to direct refrigerant from the compressor 1879 through the heat exchanger 1878, through the expansion valve 1882 (which is essentially open in this mode), through the expansion valve 1881 (which now acts as an expansion orifice), through the refrigerant coil 1871, and back to the compressor. Accordingly, the refrigerant coil 1871 now acts as an evaporator, while the heat exchanger 1878 acts as a condenser, and heat is pumped from the former to the latter. A valve 1883 can be modulated as required to control head pressure.

Figure 85:
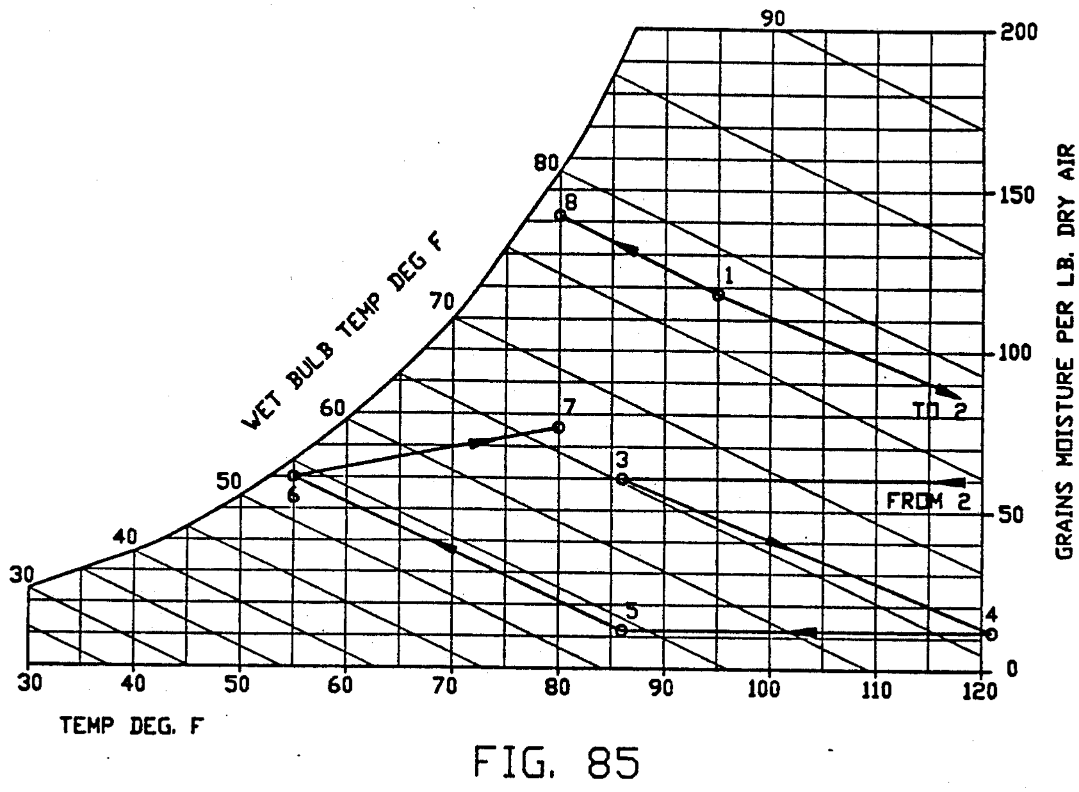

FIG. 85 is a psychrometric chart showing the condition of air at various points in the operation of the apparatus of FIG. 67. The points, the description of each point, the dry bulb temperature ("Temp") in ° F. of the air at each point and the moisture content (in grains of moisture per pound of dry air) of the air at each point are given in the following table.

| Point | Description | Temp | Moisture |
|---|---|---|---|
| 1 | Outside air entering desiccant wheel | 95 | 118 |
| 2 | Air entering sensible wheel | 137 | 60 |
| 3 | Air entering second desiccant wheel | 86 | 60 |
| 4 | Air entering second sensible wheel | 121 | 12 |
| 5 | Air entering evaporative cooler | 86 | 12 |
| 6 | Supply air to space | 55 | 60 |
| 7 | Space conditions (50% relative humidity) | 80 | 77 |
| 8 | Regeneration air leaving evap. cooler | 80 | 142 |

Figure 86:
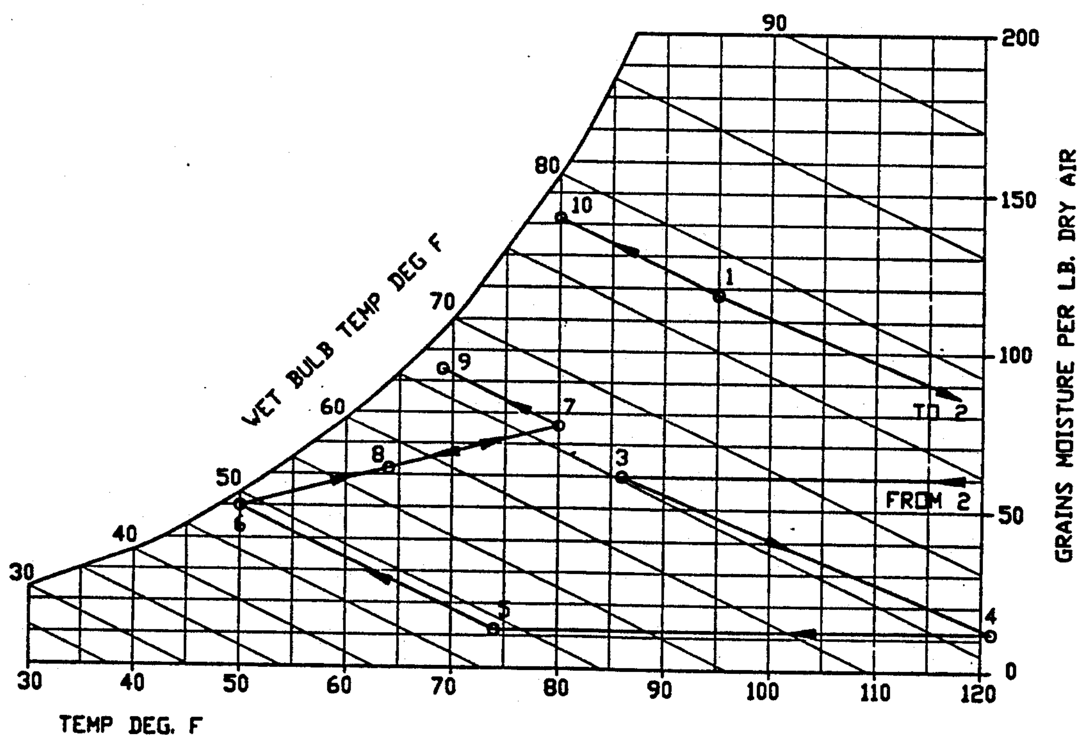

FIG. 86 is a psychrometric chart showing the condition of air at various points in the operation of the apparatus of FIG. 68. The points, the description of each point, the dry bulb temperature ("Temp") in °F. of the air at each point and the moisture content (in grains of moisture per pound of dry air) of the air at each point are given in the following table.

| Point | Description | Temp | Moisture |
|---|---|---|---|
| 1 | Outside air entering desiccant wheel | 95 | 118 |
| 2 | Air entering sensible wheel | 137 | 60 |
| 3 | Air entering second desiccant wheel | 86 | 60 |
| 4 | Air entering second sensible wheel | 121 | 12 |
| 5 | Air entering evaporative cooler | 74 | 12 |
| 6 | Supply air to space | 50 | 50 |
| 7 | Space conditions (50% relative humidity) | 80 | 77 |
| 8 | Air delivered to space | 64 | 63 |
| 9 | Regeneration air leaving evap. cooler | 69 | 94 |
| 10 | Regenerating air leaving evap. cooler | 80 | 142 |

Figure 87:
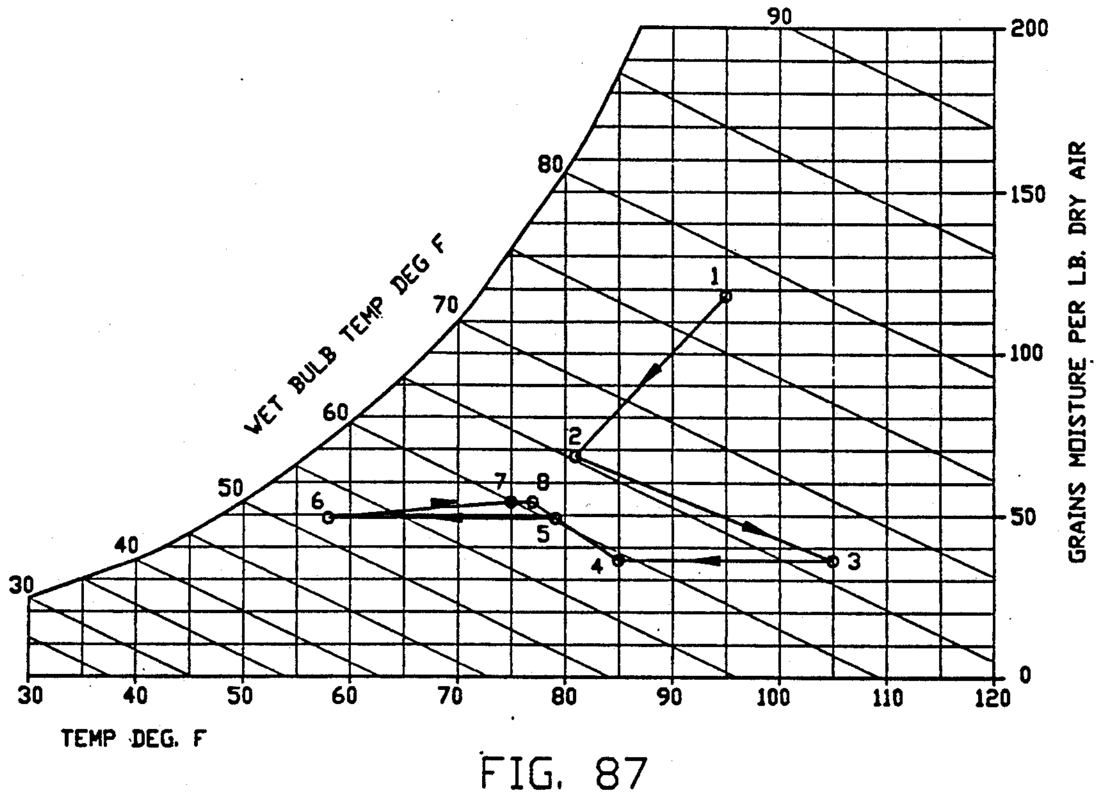

FIG. 87 is a psychrometric chart showing the condition of air at various points in the operation of the apparatus of FIG. 69. The points, the description of each point, the dry bulb temperature ("Temp") in °F. of the air at each point and the moisture content (in grains of moisture per pound of dry air) of the air at each point are given in the following table.

| Point | Description | Temp | Moisture |
|---|---|---|---|
| 1 | Outside air entering desiccant wheel | 95 | 118 |
| 2 | Air entering second desiccant wheel | 81 | 68 |
| 3 | Air entering indirect evaporative cooler | 105 | 36 |
| 4 | Air leaving indirect evaporative cooler | 85 | 36 |
| 5 | Mixture of dry air and plenum air | 79 | 49 |
| 6 | Supply air to space | 58 | 49 |
| 7 | Space conditions (40% relative humidity) | 75 | 54 |
| 8 | Plenum conditions | 80 | 142 |

Figure 88:
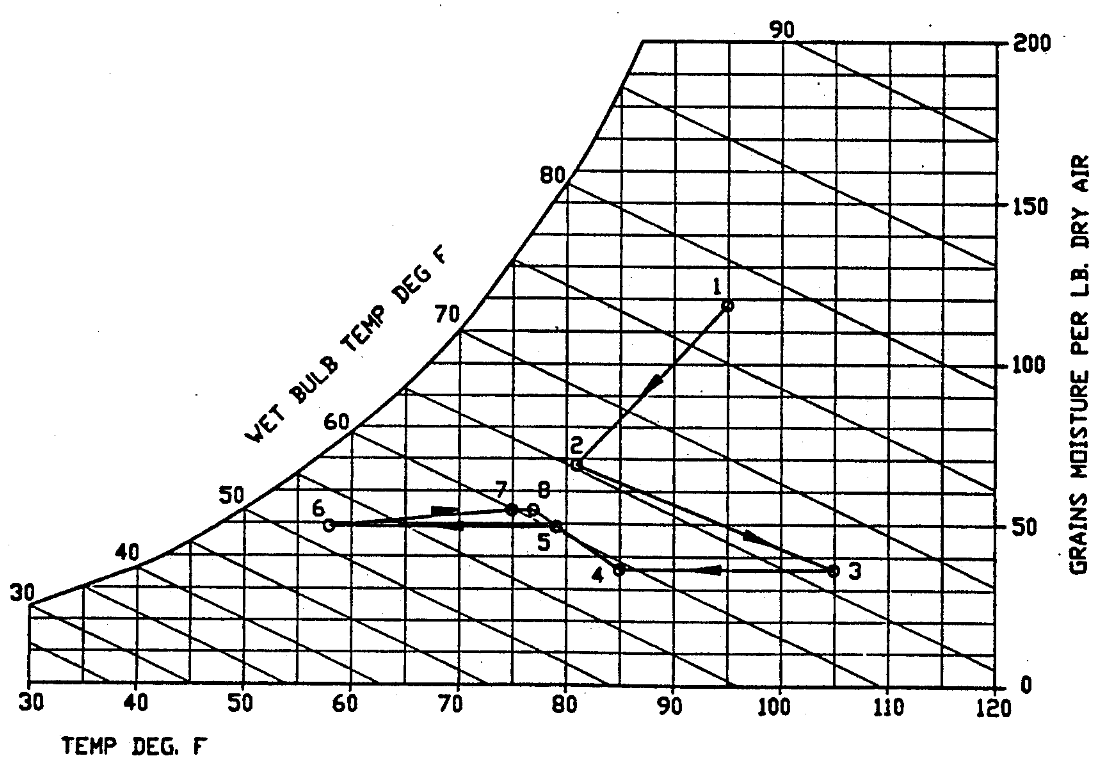

FIG. 88 is a psychrometric chart showing the condition of air at various points in the operation of the apparatus of FIG. 70. The points, the description of each point, the dry bulb temperature ("Temp") in °F.) of the air at each point and the moisture content (in grains of moisture per pound of dry air) of the air at each point are given in the following table.

| Point | Description | Temp | Moisture |
|---|---|---|---|
| 1 | Outside air entering desiccant wheel | 95 | 118 |
| 2 | Air entering second desiccant wheel | 81 | 68 |
| 3 | Air leaving second desiccant wheel | 105 | 36 |
| 4 | Air leaving evaporative cooler | 85 | 36 |
| 5 | Mixture of dry air and plenum air | 79 | 49 |
| 6 | Supply air to space | 58 | 49 |
| 7 | Space conditions (40% relative humidity) | 75 | 54 |
| 8 | Plenum conditions | 77 | 54 |

Figure 89:
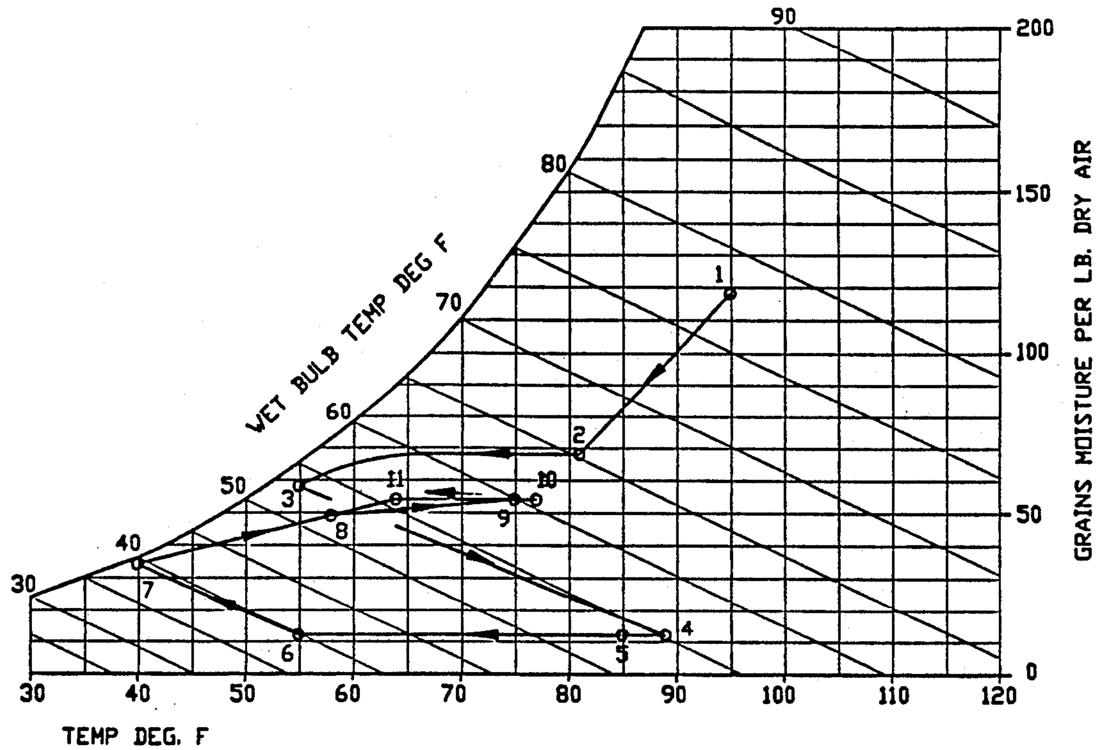

FIG. 89 is a psychrometric chart showing the condition of air at various points in the operation of the apparatus of FIG. 71. The points, the description of each point, the dry bulb temperature ("Temp") in °F. of the air at each point and the moisture content (in grains of moisture per pound of dry air) of the air at each point are given in the following table.

| Point | Description | Temp | Moisture |
|---|---|---|---|
| 1 | Outside air entering desiccant wheel | 95 | 118 |
| 2 | Air entering coil 1410 | 81 | 68 |
| 3 | Air entering second desiccant wheel | 55 | 58 |
| 4 | Air leaving second sensible wheel | 89 | 12 |
| 5 | Air leaving indirect evaporative cooler | 86 | 12 |
| 6 | Air leaving coil 1412 | 55 | 12 |
| 7 | Air leaving evaporative cooler | 40 | 34 |
| 8 | Mixture of plenum air and primary air | 58 | 49 |
| 9 | Space conditions (40% relative humidity) | 75 | 54 |
| 10 | Plenum conditions | 77 | 54 |
| 11 | Air leaving terminal unit cooling coil | 64 | 54 |

Figure 90:
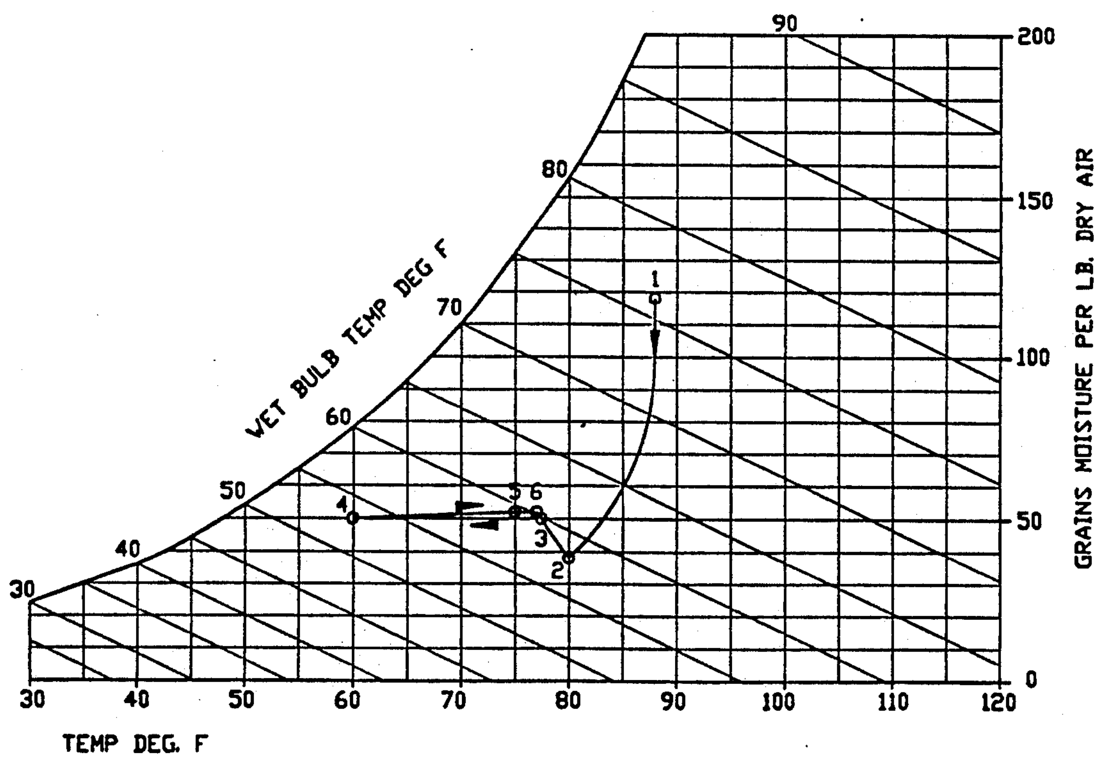

FIG. 90 is a psychrometric chart showing the condition of air at various points in the operation of the apparatus of FIG. 72. The points, the description of each point, the dry bulb temperature ("Temp") in °F. of the air at each point and the moisture content (in grains of moisture per pound of dry air) of the air at each point are given in the following table.

| Point | Description | Temp | Moisture |
|---|---|---|---|
| 1 | Outside air entering dehumidifier | 88 | 118 |
| 2 | Air leaving dehumidifier | 80 | 38 |
| 3 | Mixture of plenum air and primary air | 77½ | 50 |
| 4 | Air delivered to space | 60 | 50 |
| 5 | Space conditions (40% relative humidity) | 75 | 52 |
| 6 | Plenum conditions | 77 | 52 |

Figure 91:
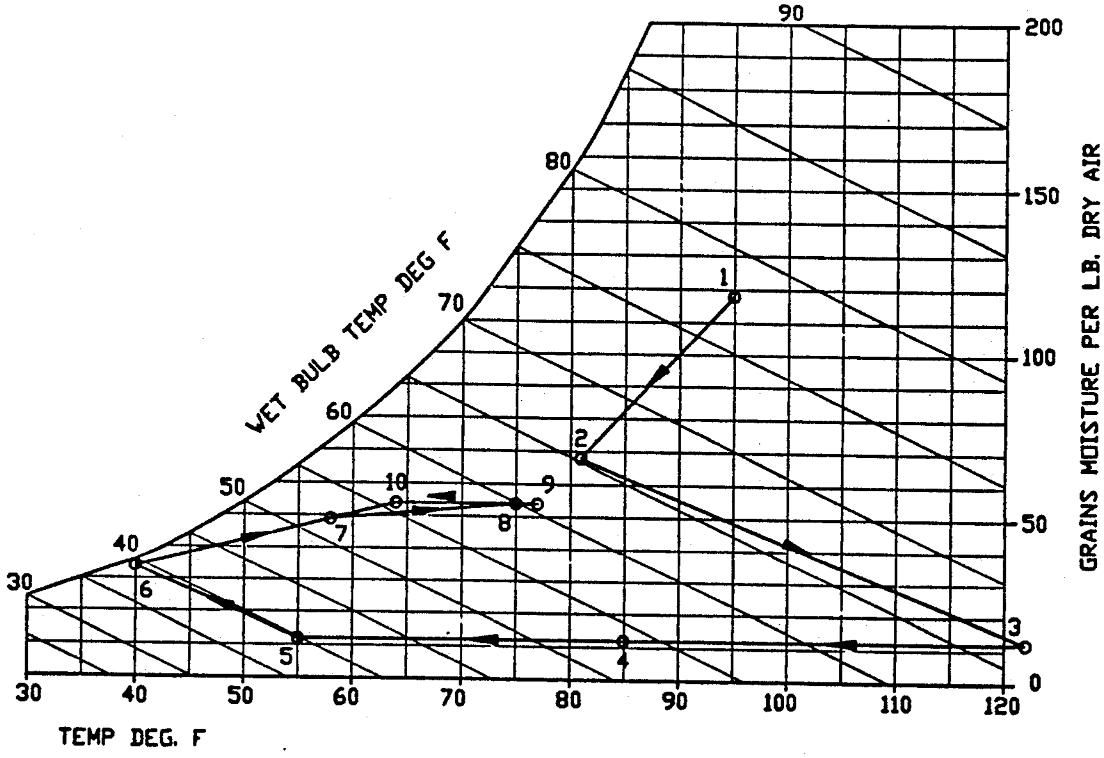

FIG. 91 is a psychrometric chart showing the condition of air at various points in the operation of the apparatus of FIG. 73. The points, the description of each point, the dry bulb temperature ("Temp") in °F. of the air at each point and the moisture content (in grains of moisture per pound of dry air) of the air at each point are given in the following table.

| Point | Description | Temp | Moisture |
|---|---|---|---|
| 1 | Outside air entering desiccant wheel | 95 | 118 |
| 2 | Air leaving desiccant wheel | 81 | 68 |
| 3 | Air leaving second desiccant wheel | 122 | 12 |
| 4 | Air leaving evaporative cooler | 85 | 12 |
| 5 | Air leaving coil 1626 | 55 | 12 |
| 6 | Air leaving evaporative cooler 1621 | 40 | 34 |
| 7 | Mixture of plenum air and primary air | 58 | 49 |
| 8 | Space conditions (40% relative humidity) | 75 | 54 |
| 9 | Plenum conditions | 77 | 54 |
| 10 | Air leaving terminal unit cooling coil | 64 | 54 |

Figure 92:
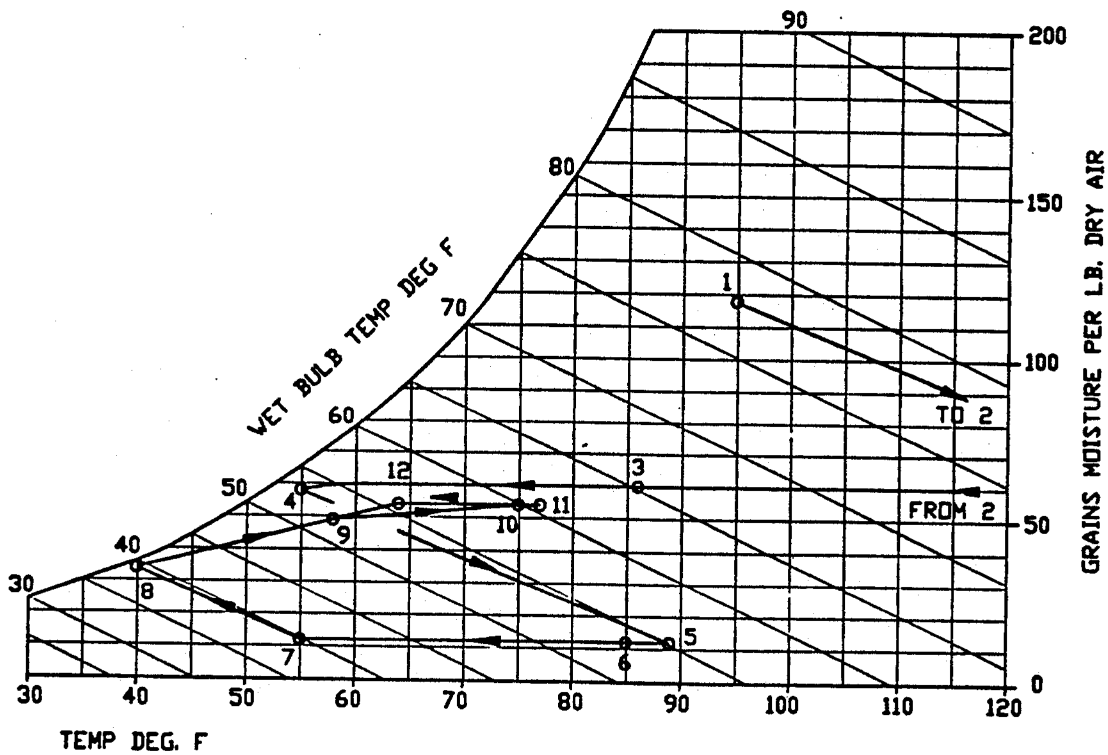

FIG. 92 is a psychrometric chart showing the condition of air at various points in the operation of the apparatus of FIG. 74. The points, the description of each point, the dry bulb temperature ("Temp") in °F. of the air at each point and the moisture content (in grains of moisture per pound of dry air) of the air at each point are given in the following table.

| Point | Description | Temp | Moisture |
|---|---|---|---|
| 1 | Outside air entering desiccant wheel | 95 | 118 |
| 2 | Air entering sensible wheel | 137 | 60 |
| 3 | Air entering pre-cooling coil 1648 | 86 | 60 |
| 4 | Air entering second desiccant wheel | 55 | 58 |
| 5 | Air leaving second desiccant wheel | 89 | 12 |
| 6 | Air leaving indirect evaporative cooler | 85 | 12 |
| 7 | Air leaving the cooling coil 1651 | 55 | 12 |
| 8 | Air leaving the evaporative cooler 1652 | 40 | 34 |
| 9 | Supply air to space | 58 | 49 |
| 10 | Space conditions (40% relative humidity) | 75 | 54 |
| 11 | Plenum conditions | 77 | 54 |
| 12 | Air leaving terminal unit cooling coil | 58 | 49 |

Figure 93:
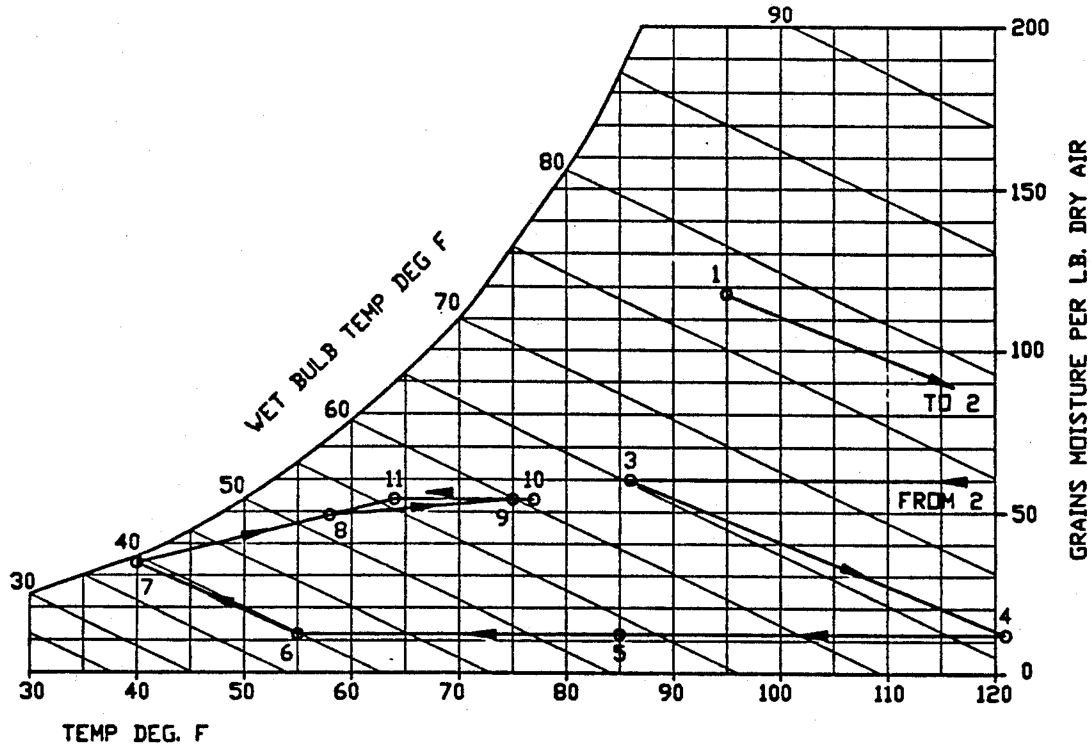

FIG. 93 is a psychrometric chart showing the condition of air at various points in the operation of the apparatus of FIG. 75. The points, the description of each point, the dry bulb temperature ("Temp") in °F. of the air at each point and the moisture content (in grains of moisture per pound of dry air) of the air at each point are given in the following table.

| Point | Description | Temp | Moisture |
|---|---|---|---|
| 1 | Outside air entering desiccant wheel | 95 | 118 |
| 2 | Air entering sensible wheel | 137 | 60 |
| 3 | Air entering second desiccant wheel | 86 | 60 |
| 4 | Air leaving desiccant wheel | 121 | 12 |
| 5 | Air leaving evaporative cooler 1685 | 85 | 12 |
| 6 | Air leaving after cooling coil | 55 | 12 |
| 7 | Air leaving evaporative cooler | 40 | 34 |
| 8 | Supply air to space | 58 | 49 |
| 9 | Space conditions | 75 | 54 |
| 10 | Plenum conditions | 77 | 54 |
| 11 | Air leaving terminal cooling coil | 64 | 54 |

Figure 94:
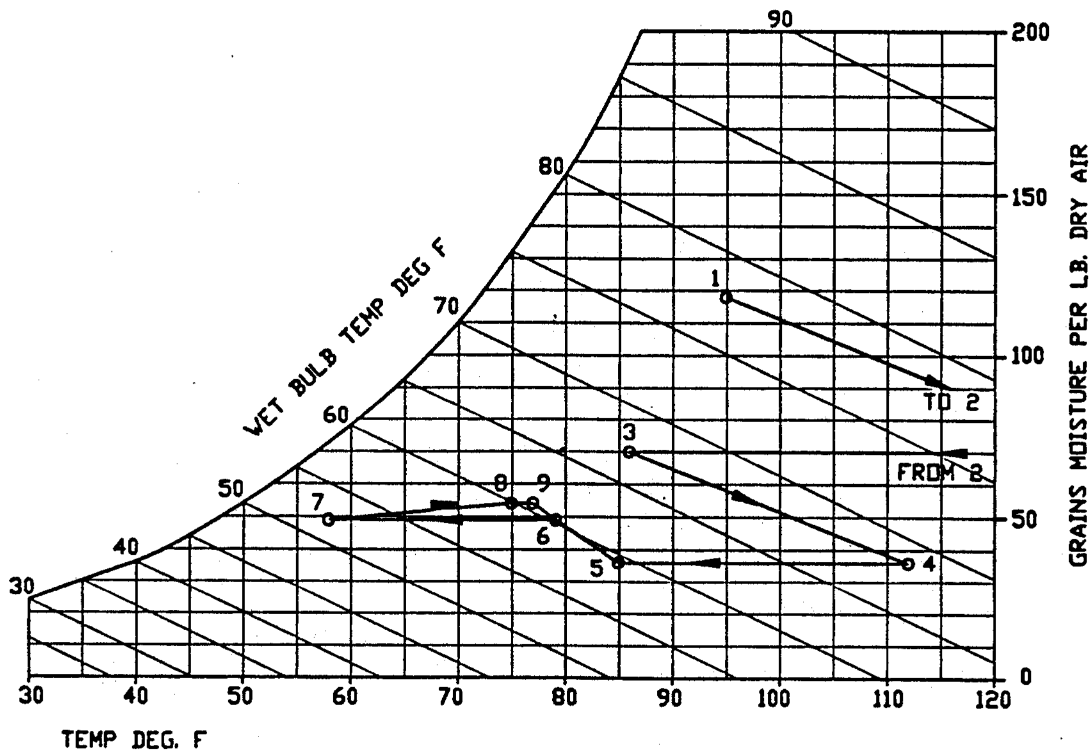

FIG. 94 is a psychrometric chart showing the condition of air at various points in the operation of the apparatus of FIG. 76. The points, the description of each point, the dry bulb temperature ("Temp") °F. of the air at each point and the moisture content (in grains of moisture per pound of dry air) of the air at each point are given in the following table.

| Point | Description | Temp | Moisture |
|---|---|---|---|
| 1 | Outside air entering desiccant wheel | 95 | 118 |
| 2 | Air entering sensible wheel | 131 | 70 |
| 3 | Air entering second desiccant wheel | 86 | 70 |
| 4 | Air leaving second sensible wheel | 112 | 36 |
| 5 | Air leaving evaporative cooler 1719 | 85 | 36 |
| 6 | Mixture of plenum air and primary air | 79 | 49 |
| 7 | Supply air to space | 58 | 49 |
| 8 | Space conditions (40% relative humidity) | 75 | 54 |
| 9 | Plenum conditions | 77 | 54 |

Figure 95:
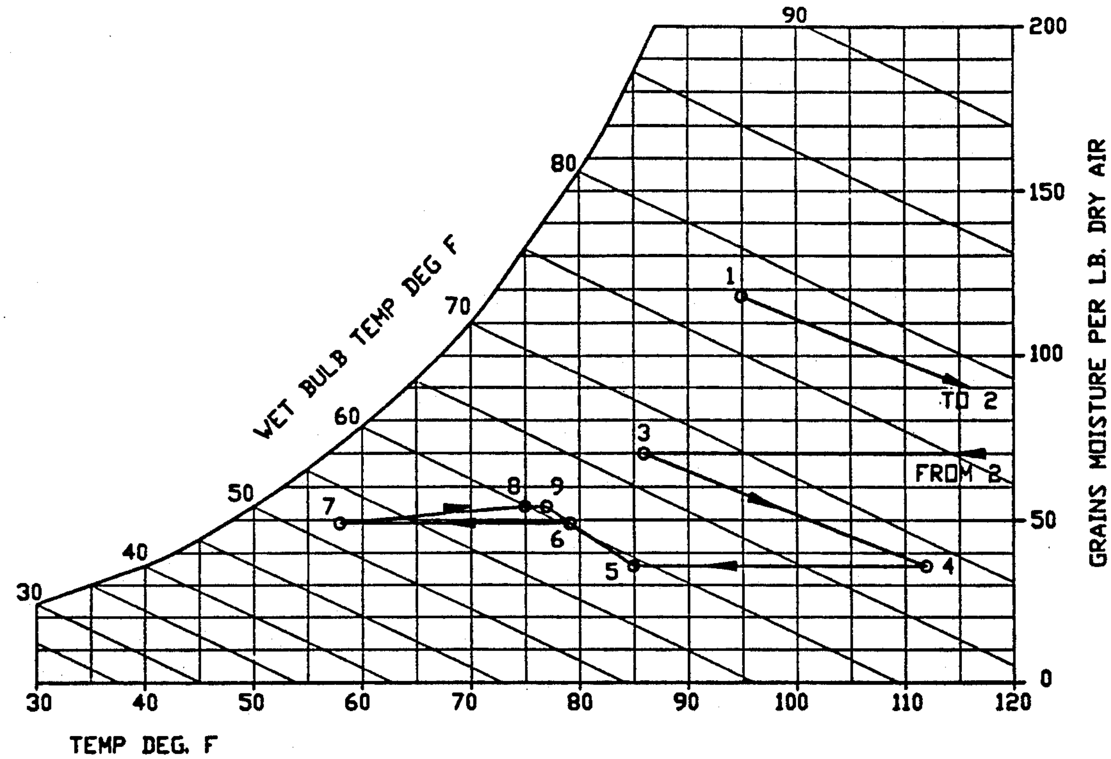

FIG. 95 is a psychrometric chart showing the condition of air at various points in the operation of the apparatus of FIG. 77. The points, the description of each point, the dry bulb temperature ("Temp") in °F. of the air at each point and the moisture content (in grains of moisture per pound of dry air) of the air at each point are given in the following table.

| Point | Description | Temp | Moisture |
|---|---|---|---|
| 1 | Outside air entering desiccant wheel | 95 | 118 |
| 2 | Air entering sensible wheel | 131 | 70 |
| 3 | Air entering second desiccant wheel | 86 | 70 |
| 4 | Air leaving second sensible wheel | 112 | 36 |
| 5 | Air leaving evaporative cooler | 85 | 36 |
| 6 | Mixture of plenum air and primary air | 79 | 49 |
| 7 | Supply air to space | 58 | 49 |
| 8 | Space conditions (40% relative humidity) | 75 | 54 |
| 9 | Plenum conditions | 77 | 54 |

Figure 96:
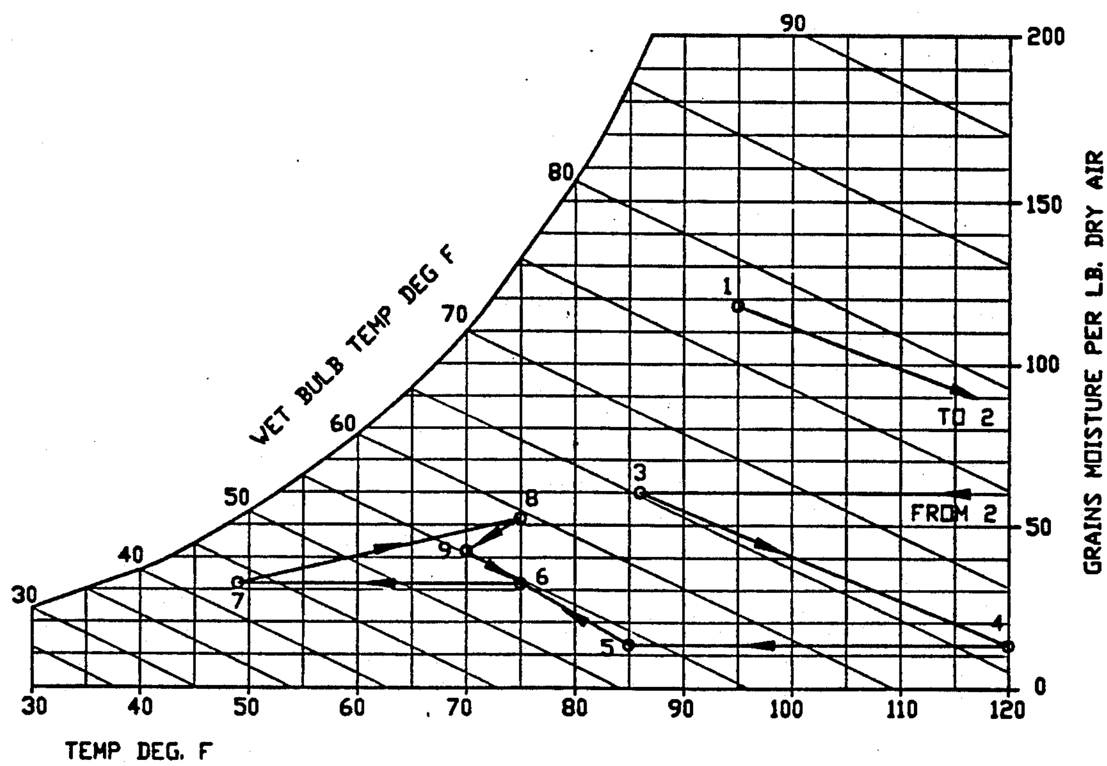

FIG. 96 is a psychrometric chart showing the condition of air at various points in the operation of the apparatus of FIG. 78. The points, the description of each point, the dry bulb temperature ("Temp") in °F. of the air at each point and the moisture content (in grains of moisture per pound of dry air) of the air at each point are given in the following table.

| Point | Description | Temp | Moisture |
|---|---|---|---|
| 1 | Outside air entering desiccant wheel | 95 | 118 |
| 2 | Air entering sensible wheel | 137 | 60 |
| 3 | Air entering second desiccant wheel | 86 | 60 |
| 4 | Air entering indirect evaporative cooler | 120 | 13 |
| 5 | Air leaving evaporative cooler | 85 | 13 |
| 6 | Mixture of conditioned air and return air | 75 | 32 |
| 7 | Supply air to space | 49 | 32 |
| 8 | Space conditions (40% relative humidity) | 75 | 52 |
| 9 | Return air (through refrigerated cases) | 70 | 42 |

Figure 97:
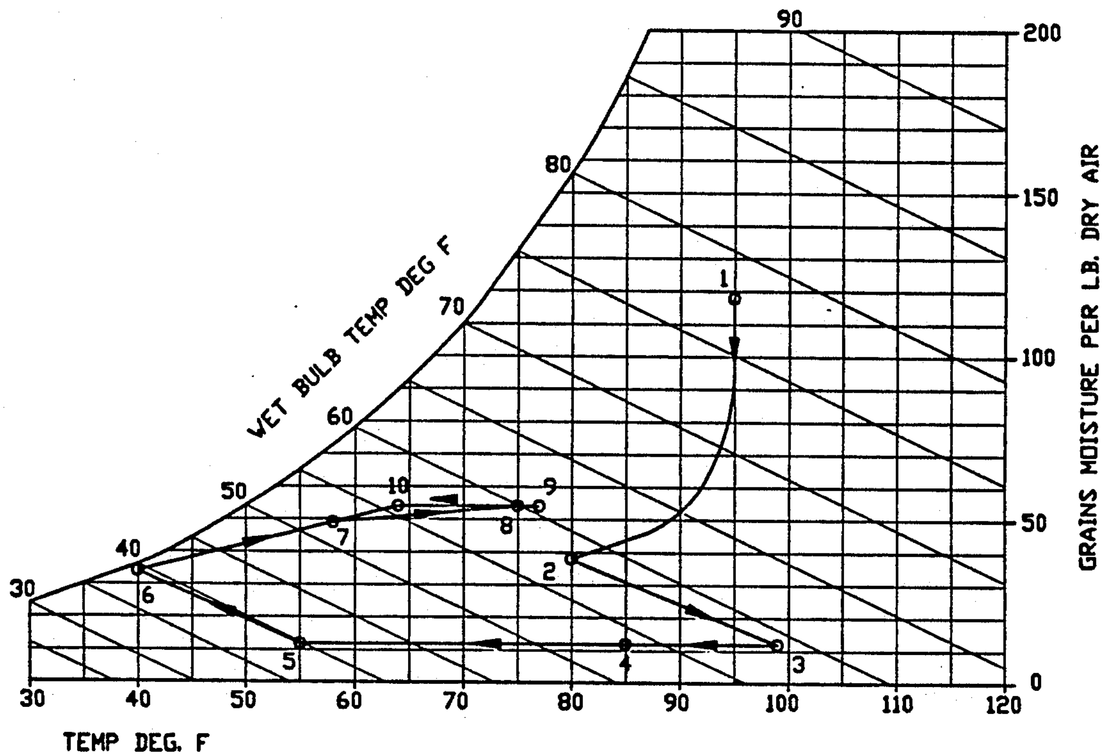

FIG. 97 is a psychrometric chart showing the condition of air at various points in the operation of the apparatus of FIG. 79. The points, the description of each point, the dry bulb temperature ("Temp") in °F.) of the air at each point and the moisture content (in grains of moisture per pound of dry air) of the air at each point are given in the following table.

| Point | Description | Temp | Moisture |
|---|---|---|---|
| 1 | Outside air entering desiccant wheel | 95 | 118 |
| 2 | Air liquid desiccant dehumidifier | 80 | 38 |
| 3 | Air leaving desiccant wheel | 99 | 12 |
| 4 | Air leaving indirect evaporative cooler | 85 | 12 |
| 5 | Air leaving cooling coil 1811 | 55 | 12 |
| 6 | Supply air to induction unit 1813 | 40 | 34 |
| 7 | Supply air to space | 58 | 49 |
| 8 | Space conditions (50% relative humidity) | 75 | 54 |
| 9 | Plenum conditions | 77 | 54 |
| 10 | Air leaving terminal unit cooling coil | 64 | 54 |

Apparatus shown in FIG. 101 comprises a generator-condenser 1884, an evaporator 1885 and an absorber 1886 which, together, constitute refrigeration apparatus. A vapor compressor 1887 driven by a gas turbine 1888 powers the generator-condenser 1884. A pump 1889 directs a dilute liquid desiccant, e.g., a lithium chloride solution, from the absorber 1886 to sprays 1890 in the generator-condenser 1884, where it is sprayed onto a separator surface 1891 on which it flows downwardly, as indicated by arrows 1892. The vapor-compressor 1887, driven by the gas turbine 1888, pumps fluid from the side of the separator surface 1891 which faces the sprays 1890 to the opposite side, the flow being through an inlet 1893 to the vapor compressor 1887, and from the vapor compressor 1887 through an outlet 1894 to the opposite side of the separator surface 1891. This flow of fluid establishes a vacuum on the side of the separator surface 1891 which faces the sprays 1890, and a super atmospheric pressure on the opposite side of the surface 1891. The vacuum causes evaporation of the hygroscopic liquid, and the absorption of heat from the surface 1891, while the super atmospheric pressure on the other side of the surface 1891 causes condensation, which, because of the lowered temperature, occurs preferentially on the surface 1891. Hygroscopic liquid which is not evaporated is concentrated by evaporation of water vapor therefrom, and flows down the surface 1891 into a conduit 1895, from which it flows as indicated by an arrow through an expansion valve 1896, and is sprayed from nozzles in the absorber 1886. Spraying of the concentrated hygroscopic liquid in the absorber 1886 establishes a low water vapor pressure therein, causing water that is circulated by a pump 1897 and sprayed from nozzles 1898 in the evaporator 1885 to vaporize, and flow through a line 1899 into the absorber 1886. Evaporation of water in the evaporator 1885 reduces the temperature therein, and removes heat from a heat exchanger 1900 therein. Condensate flows from the bottom of the generator-condenser 1884 through an expansion valve 1901, as indicated by an arrow to the evaporator 1885, while a pump 1902 circulates a heat transfer fluid through the heat exchanger 1900, through a coil 1903, and back to the pump 1902, so that heat is transferred from the coil 1903. In the absorber 1886, water vapor from the evaporator 1885 is absorbed in the concentrated hygroscopic liquid, diluting the hygroscopic liquid and releasing its heat of sorption. The heat of sorption is transferred to a heat exchanger 1904, and to a heat transfer fluid circulated therethrough and to a cooling tower 1905, from which it is rejected.

Air to be conditioned, which can be outside air or a mixture of outside air and return air from a building served by the apparatus, flows through a fan 1906, in heat transfer relationship with the coil 1903, and in heat transfer relationship with a second coil 1907 and is then delivered to a building served by the apparatus. The second coil is served by a second refrigeration apparatus which is described below.

Heat from the gas turbine 1888, as indicated by lines 1908 and 1909 is transferred to a heat exchanger 1910 inside a generator 1911 of second refrigeration apparatus which additionally includes a condenser 1912, an evaporator 1913 and an absorber 1914. Heat from the exchanger 1910 causes water to boil off from a hygroscopic liquid, e.g., a lithium chloride solution, in the generator 1911. The steam generated in the generator 1911 flows through a line 1915 to a heat exchanger 1916 in a second generator 1917 and water vapor from the second generator 1917, as indicated by an arrow 1918, flows into the condenser 1912, where it is condensed by heat transfer to a heat exchanger 1919. Liquid water, then, flows from the condenser 1912 through an expansion valve 1920 in a line 1921, mixing with water recirculated by a pump 1922 before being sprayed in the evaporator 1913 from nozzles 1923.

Concentrated desiccant flows from the second generator 1917 through an expansion valve 1924 in a line 1925, and is sprayed from nozzles in the absorber 1914. The concentrated desiccant liquid causes a low water vapor pressure inside the absorber 1914 which, in turn, causes water sprayed in the evaporator 1913 to vaporize and to flow into the absorber 1914, where it is absorbed in, and dilutes, the concentrated hygroscopic liquid. Heat of sorption is transferred from the absorber 1914 by a heat exchanger 1926, from which heat is transferred to a fluid circulated by a pump 1927, the fluid flow being from a cooling tower 1928 through the pump 1927 and a line 1929 to the heat exchanger 1926, and back through a line 1930 to nozzles 1931 from which it is sprayed inside the cooling tower 1928. Pumps 1932 and 1933 cause dilute hygroscopic liquid to flow from the absorber 1914 to the generator 1911 and to the second stage generator 1917, respectively. The heat transfer fluid from the cooling tower 1928 is also circulated to the heat exchanger 1919 in the condenser 1912 from the line 1930. A pump 1934 circulates water or another heat transfer fluid from the coil 1907 to a heat exchanger 1935 in the evaporator 1913, where it is cooled, and back to the coil 1907.

Much of the apparatus of FIG. 102 is the same as that of FIG. 100, including the regenerator 1545, the dehumidifier 1546, the vapor compressor 1547, expansion valve 1549, the line 1556, the pump 1557, the fan 1559, the engine 1590 from which heat is transferred to the heat exchanger 1591 from which heat is transferred to supply regenerating heat for the second liquid desiccant dehumidification apparatus which comprises the regenerator 1592 and the dehumidifier 1593. The evaporative cooler 1594 of FIG. 100 has been replaced, in the FIG. 102 apparatus, with a heat exchange coil 1936 to which desiccant is circulated by the pump 1595 from the sump 1596, and then flows as to the dehumidifier 1593 where it is sprayed from nozzles 1599, and from which it flows back to the sump 1596. Heat is transferred from the desiccant in the heat exchanger 1936 to chilled water which is supplied thereto. Desiccant also flows from the sump 1596 to the sump 1602, from which the pump 1603 directs some of the desiccant through the line 1604, and back to the sump 1596 and directs the rest of the desiccant through the line 1605, through the heat exchanger 1591 where it is heated, and then through the line 1606 to nozzles 1607 from which it is sprayed in the regenerator 1592, flowing back into the sump 1602. Regenerating air, as indicated by the arrows 1608 and 1609, is directed by the blower 1610 through the regenerator 1592.

The cooling tower 1583 of the apparatus of FIG. 100 has been replaced, in the FIG. 102 apparatus with an evaporative cooler 1937 to serve the cooling coil 1587 and building relief air, as indicated by arrows 1938 and 1939, is directed through the evaporative cooler 1937, in contact with water circulated through a line 1940 by a pump 1941, through the cooling coil 1587 and sprayed from nozzles 1942 in the evaporative cooler 1937.

The apparatus of FIG. 103 includes the refrigeration part of the apparatus of FIG. 101, including the generator condenser 1884, the evaporator 1885, the absorber 1886, the vapor compressor 1887, the gas turbine 1888, the cooling tower 1928, and the various pumps, valves and the like. In addition, the FIG. 103 apparatus has a stirling engine 1943 which is operably connected as indicated by lines 1944 and 1945 to receive heat from the gas turbine 1888 and a second generator condenser, designated 1884', a second evaporator, designated 1885', a second absorber, designated 1886', a second vapor compressor, designated 1887', and the various pumps, valves and the like, all designated by the reference numerals used in FIG. 101, followed by a prime ('). The stirling engine 1943 of FIG. 103 is operably connected to drive the second generator condenser 1884'. The operation of the refrigeration apparatus of FIG. 103 is as previously described. A fan 1946 directs air to be conditioned in heat transfer relationship with two coils, 1947 and 1948 and the, as indicated by an arrow 1949, to a space to be conditioned. Chilled water from the evaporator 1885 serves the coil 1947, while chilled water from the evaporator 1885' serves the coil 1948.

Apparatus shown in FIG. 104 is similar to that of FIG. 100, including the regenerator 1545, the dehumidifier 1546, the vapor compressor 1547, expansion valve 1549, the line 1556, the pump 1557, the fan 1559, the cooling tower 1583, and the lines 1584 and 1585. A gas turbine 1950 drives the vapor compressor 1547 and supplies heat, as indicated by lines 1951 and 1952 to a stirling engine 1953, which drives a vapor compressor 1954 of a second regenerator, designated 1545', which is substantially identical in structure and operation with the regenerator 1545. The regenerator 1545' replaces the regenerator 1592 of the FIG. 100 apparatus, serving the second dehumidifier 1593 and the evaporative cooler 1594. Hygroscopic liquid flowing from the dehumidifier 1593 flows through an expansion valve 1955 before it reaches the regenerator 1545'. A pump 1557' directs concentrated hygroscopic liquid through the heat exchanger 1597 and back to sprays in the dehumidifier 1593.

Apparatus shown in FIG. 105 is similar to that of FIG. 99, including the regenerator 1545, the dehumidifier 1546, the vapor compressor 1547, expansion valve 1549, the line 1556, the pump 1557, the fan 1559, the cooling tower 1583, and the lines 1584 and 1585. The gas turbine 1548 supplies heat, as indicated by lines 1956 and 1957 to a stirling engine 1958, which drives a vapor compressor 1959 of a generator condenser 1960, which replaces the generator 1567 and the condenser 1568 of the FIG. 99 apparatus, and serves the evaporator, designated 1569' and the absorber 1570'.

Apparatus shown in FIG. 106 is similar to that of FIG. 103, including the generator-condenser 1884, the evaporators 1885 and 1885', the absorbers 1886 and 1886', the gas turbine 1888, the pumps 1889 and 1889', the sprays 1890, the separator surface 1891, the expansion valves 1896 and 1901. The stirling engine 1943, in FIG. 106, drives a vapor compressor 1887' in parallel with the vapor compressor 1887, so that the two vapor compressors serve the single generator-condenser 1884.

Apparatus shown in FIG. 107 is similar to that of FIG. 104, including the regenerator 1545, the dehumidifiers 1546 and 1593, the expansion valves 1549 and 1955, the line 1556, the pump 1557, the fan 1559, and the cooling tower 1583. The stirling engine 1953, in FIG. 107, drives a vapor compressor 1547' in parallel with a vapor compressor 1547, which is driven by the gas turbine 1950, so that the two vapor compressors serve the single regenerator 1545, which, in turn, serves the dehumidifiers 1546 and 1593.

Apparatus shown in FIG. 108 comprises a desiccant dehumidifier 1883, a heat exchanger 1884, a coil 1885, a heat exchanger 1886 and a heating coil 1887. Air enters the apparatus as indicated by an arrow 1888, passing through a segment of the desiccant dehumidifier 1883, a fan 1889, in heat exchange relationship with the heat exchanger 1884, the coil 1885, the heat exchanger 1886 and the heating coil 1887 before being delivered to a space served by the apparatus as indicated by an arrow 1890. Return air leaves the space served, which can be a supermarket, as indicated by an arrow 1891, passing through a fan 1892 and either through a segment of the desiccant wheel 1883 as indicated by an arrow 1893 or to the suction side of the fan 1889 as indicated by an arrow 1894. When the space served is a supermarket, the return air can advantageously flow through refrigerated display cases (not illustrated in FIG. 108) in the market before leaving as indicated by the arrow 1891.

The coil 1885 is served by a refrigeration/ice thermal storage subsystem 1895, as indicated by a line 1896, and can be operated to provide a measure of humidity control by throttling the flow of chilled water to the coil 1885, as required to control humidity, whenever a full flow causes excessive dehumidification. The fan 1889 can also be operated to provide humidity control, increasing or decreasing the flow of air when the humidity is high or low. Heat from the condenser (not illustrated in FIG. 108) of the refrigeration/ice thermal storage subsystem 1895 can be transferred to a cooling tower 1897 as indicated by a line 1898.

The heating coil 1887 is served by a unit 1899, which can be boiler, a direct fired heater, a heat recovery means, or the like.

A pump 1900 circulates a heat transfer fluid through the heat exchanger 1886, through the heat exchanger 1884, and back to the pump 1900, so that heat is transferred from air leaving the fan 1889 to air entering the coil 1887. A valve 1901 is modulated by a controller 1902, under the control of a thermostat 1903, to control the temperature of the air leaving the heat exchanger 1886 as required for temperature control of the space served.

It will be appreciated that the kind of temperature control shown in FIG. 108 and discussed above in connection therewith can be used in any of the other apparatus shown herein where heat is transferred from air entering the apparatus to air delivered to a space or spaces to be conditioned, and that such temperature control can supplement that provided by variable air volume apparatus or can constitute the sole means for controlling the temperature of the space or spaces served.

FIG. 109 is a psychrometric chart showing the condition of air at various points in the summer cycle operation of the apparatus of FIG. 108. The points, the description of each point, the dry bulb temperature ("Temp") in ° F. of the air at each points and the moisture content (in grains of moisture per pound of dry air) of the air at each point are given in the following table.

| Point | Description | Temp | Moisture |
|---|---|---|---|
| 1 | Outside air entering desiccant wheel 1884 | 95 | 118 |
| 2 | Air leaving the desiccant wheel 1883 | 74 | 54 |
| 3 | Mix of point 2 air and return air | 71 | 45 |
| 4 | Air entering the heat exchanger 1884 | 75 | 45 |
| 5 | Air entering the coil 1885 | 66 | 45 |
| 6 | Air entering the heat exchanger 1886 | 40 | 34 |
| 7 | Supply air to the space | 49 | 34 |
| 8 | Space condition | 75 | 52 |
| 9 | Return air condition | 70 | 42 |

FIG. 110 is a psychrometric chart showing the condition of air at various points in the winter cycle operation of the apparatus of FIG. 108. The points, the description of each point, the dry bulb temperature ("Temp") in ° F. of the air at each point and the moisture content (in grains of moisture per pound of dry air) of the air at each point are given in the following table.

| Point | Description | Temp | Moisture |
|---|---|---|---|
| 1 | Outside air entering desiccant wheel 1884 | 57 | 40 |
| 2 | Mix of outside air and return air | 64 | 42 |
| 3 | Air entering the heat exchanger 1884 | 68 | 42 |
| 4 | Air entering the coil 1885 | 54 | 42 |
| 5 | Air entering the heat exchanger 1886 | 40 | 34 |
| 6 | Air entering the heating coil 1887 | 54 | 34 |
| 7 | Supply air to the space | 65 | 34 |
| 8 | Space condition | 75 | 52 |
| 9 | Return air condition | 70 | 42 |

Apparatus shown in FIG. 111 comprises a desiccant dehumidifier 1904, an indirect evaporative cooler 1905, a desiccant dehumidifier 1906, an indirect evaporative cooler 1907 and a DX coil 1908 and a condensing unit 1909 which serves the DX coil 1908. Air enters the apparatus as indicated by an arrow 1910, passing through a segment of the desiccant dehumidifier 1904, the indirect evaporative cooler 1905, a fan 1911, a segment of the desiccant dehumidifier 1906, the indirect evaporative cooler 1907, a fan 1912 and in heat exchange relationship with the DX coil 1908 before being delivered to a space served by the apparatus as indicated by an arrow 1913. Return air leaves the space served, e.g., a supermarket, as indicated by an arrow 1914, and is exhausted as indicated by an arrow 1915 or passes through a fan 1916 to the suction side of the fan 1911 or to the suction side of the fan 1912 as indicated by arrows 1917 and 1918. When the space served is a supermarket, the return air can advantageously flow through refrigerated display cases (not illustrated in FIG. 111) in the market before leaving as indicated by the arrow 1914.

Outside regenerating air enters the apparatus in two streams, indicated by arrows 1919, one stream flowing through a fan 1920 in heat transfer relationship with a heat exchanger 1921 and a heating coil 1922 before flowing in regenerating relationship with a segment of the desiccant dehumidifier 1906 and in heat exchange relationship with a heat exchanger 1923 and being discharged from the apparatus as indicated by an arrow 1924. The other stream of outside air flows through a fan 1925, in heat transfer relationship with a heat exchanger 1926 and a heating coil 1927 before flowing in regenerating relationship with a segment of the desiccant dehumidifier 1904 and in heat exchange relationship with a heat exchanger 1928 and being discharged from the apparatus as indicated by an arrow 1928. Pumps 1930 and 1931 circulate a heat transfer fluid between the heat exchangers 1926 and 1928, and between the heat exchangers 1921 and 1923 as required to conserve regenerating heat which is supplied to the heating coils 1922 and 1927 from a cogenerator 1932 which also supplies electricity to the building served by the apparatus, as indicated by an arrow 1933.

FIG. 112 is a psychrometric chart showing the condition of air at various points in the summer cycle operation of the apparatus of FIG. 111. The points, the description of each point, the dry bulb temperature ("Temp") in ° F. of the air at each point and the moisture content (in grains of moisture per pound of dry air) of the air at each point are given in the following table.

| Point | Description | Temp | Moisture |
|---|---|---|---|
| 1 | Outside air entering the desiccant wheel 1904 | 88 | 143 |
| 2 | Air leaving the desiccant wheel 1904 | 132 | 80 |
| 3 | Air leaving the evaporative cooler 1905 | 90 | 80 |
| 4 | Mixture entering the desiccant wheel 1906 | 84 | 69 |
| 5 | Air leaving the second desiccant wheel 1906 | 125 | 13 |
| 6 | Air leaving the second evaporative cooler 1907 | 90 | 13 |
| 7 | Mixture entering the fan 1912 | 80 | 39 |
| 8 | Supply air to the space | 49 | 39 |
| 9 | Space condition | 70 | 52 |

Apparatus shown in FIG. 113 comprises a liquid desiccant dehumidifier 1934, a cooling coil 1935, a heat exchanger 1936, and a heating coil 1937. Air enters the apparatus as indicated by an arrow 1938, passing through the desiccant dehumidifier 1934, a fan 1939 and in heat exchange relationship with the cooling coil 1935, with the heat exchanger 1936 and with the heating coil 1937 before being delivered to a space served by the apparatus as indicated by an arrow 1940. Return air leaves the space served, e.g., a supermarket, as indicated by an arrow 1941, and passes through a fan 1942 and a regenerator 1943 for the dehumidifier 1934 before being discharged from the apparatus as indicated by an arrow 1944. The return air flows through refrigerated display cases 1945 in the supermarket before leaving as indicated by the arrow 1941.

A pump 1946 causes a liquid desiccant, e.g., a lithium chloride solution, to flow from a sump 1947 into which it flows from the regenerator 1943, to the heat exchanger 1936 and then to nozzles 1948 from which it is sprayed inside the dehumidifier 1934 in dehumidifying relationship with air flowing therethrough, as previously described. A three way valve 1949 is modulated as required by a controller 1950 in response to a signal from a thermostat 1951 to maintain a predetermined temperature in the space served by the apparatus. A pump 1952 causes desiccant to flow from a sump 1953 into which it flows from the dehumidifier 1934 through a heat exchanger 1954 to nozzles 1955 from which it is sprayed inside the regenerator 1943 in regenerating relationship with air flowing therethrough. Heat can be supplied to the heat exchanger 1954 and to the heating coil 1937 as indicated by lines 1956 and 1957 from a heat source 1958, which can be a boiler, a direct fired heater, a cogenerator, means for recovering heat from the refrigerant of refrigeration apparatus which serves display cases, or the like.

Heat is transferred from the cooling coil 1935 as indicated by a line 1959 to ice stored in apparatus 1960 for making and storing ice. A cooling tower 1961, as indicated by a line 1962, serves the apparatus 1960 by rejecting heat as required to make ice.

Apparatus shown in FIG. 114 comprises a solid desiccant dehumidifier 1963, a cooling coil 1964 and a heat exchanger 1965. Outside air enters the apparatus as indicated by an arrow, passes through a fan 1966, in heat transfer relationship with the cooling coil 1964 and in heat transfer relationship with the heat exchanger 1965 before being delivered to induction mixing units, one of which, designated 1967, is shown in FIG. 114. Each of the induction mixing units 1967 receives conditioned air as indicated by an arrow and return air as indicated by an arrow 1968 and delivers a mixture of return air and conditioned air, as indicated by an arrow 1969, to the space it serves. Each of the induction units 1967 has a unitary heat pump (not illustrated in FIG. 114) which pumps heat from return air, before that air is mixed with conditioned air, to water that is circulated from a cooling tower 1970 to each of the units 1966 as indicated by a line 1971.

Heat is transferred from the cooling coil 1964 as indicated by a line 1972 to ice stored in apparatus 1973 for making and storing ice by pumping heat from water to a heat transfer fluid that is circulated from the cooling tower 1970, as indicated by a line 1974.

Relief air from the spaces served by the apparatus of FIG. 114, as indicated by an arrow 1975, passes in heat exchange relationship with the heat exchanger 1965, where heat is transferred from the relief air to air that has been cooled by heat transfer to the cooling coil 1964, through a fan 1976 and in regenerating relationship with a segment of the dehumidifier 1963 before being discharged from the apparatus as indicated by an arrow 1977.

Apparatus shown in FIG. 115 comprises a liquid desiccant dehumidifier 1978, a cooling coil 1979, a heat exchanger 1980, and a heating coil 1981. Outside air enters the apparatus as indicated by an arrow 1982, passing through the desiccant dehumidifier 1978, a fan 1983 and in heat exchange relationship with the cooling coil 1979, with the heat exchanger 1980 and with the heating coil 1981 before being delivered to induction mixing units, one of which, designated 1984, is shown in FIG. 114. Each of the induction mixing units 1984 receives conditioned air as indicated by an arrow 1985 and return air as indicated by an arrow 1986 and delivers a mixture of return air and conditioned air, as indicated by an arrow 1987, to the space it serves. Return air leaves the space served as indicated by an arrow 1988, and passes, as previously described, into the induction mixing units 1984, or through a fan 1989 and a regenerator 1990 for the dehumidifier 1978 before being discharged from the apparatus as indicated by an arrow 1991.

A pump 1992 causes a liquid desiccant, e.g., a lithium chloride solution, to flow from a sump 1993 into which it flows from the regenerator 1990, to the heat exchanger 1980 and then to the dehumidifier 1978 where it is sprayed in dehumidifying relationship with air flowing therethrough, as previously described. A pump 1994 causes desiccant to flow from a sump 1995 into which it flows from the dehumidifier 1978 through a heat exchanger 1996 to nozzles 1997 from which it is sprayed inside the regenerator 1990 in regenerating relationship with air flowing therethrough. Heat can be supplied to the heat exchanger 1996 and to the heating coil 1981 as indicated by lines 1998 and 1999 from a heat source 2000, which can be a boiler, a direct fired heater, a cogenerator, means for recovering heat from the refrigerant of refrigeration apparatus which serves display cases, or the like.

Heat is transferred from the cooling coil 1979 as indicated by a line 2001 to ice stored in apparatus 2002 for making and storing ice. A cooling tower 2003, as indicated by a line 2004, serves the apparatus 2002 by rejecting heat as required to make ice.

The operation of the unitary heat pumps (not illustrated) in the induction mixing units 1984 and 1967 (FIG. 114) is controlled by a thermostat/controller 2005 to maintain a predetermined temperature in the spaces served. Heat is transferred from the unitary heat pumps (not illustrated in FIG. 115) in the mixing units 1984 to a heat transfer fluid and is rejected from the system in the cooling tower 2003, as indicated by a line 2006. It will be appreciated that a sensible cooling coil can be used in the induction mixing units 1984 and 1967 (FIG. 114) instead of the unitary heat pumps (not illustrated) which were described, and can be used to control temperature by circulating relatively high temperature chilled water therethrough as required for this purpose.

Apparatus shown in FIG. 116 comprises a solid desiccant dehumidifier 2007, a heat exchanger 2008, a cooling coil 2009, a heat exchanger 2010, and a heating coil 2011. Outside air enters the apparatus as indicated by an arrow 2012, passes through a segment of the solid desiccant dehumidifier 2007, through a fan 2013, in heat transfer relationship with the heat exchanger 2008, in heat transfer relationship with the cooling coil 2009, in heat transfer relationship with the heat exchanger 2010 and in heat transfer relationship with the heating coil 2011 before being delivered to the space or spaces served.

A pump 2014 circulates a heat transfer fluid between the heat exchangers 2008 and 2010. A controller 2015, in response to a signal from a thermostat 2016, modulates a three-way valve 2017 as required to maintain a predetermined temperature within the space served.

Apparatus 2018 for making and storing ice serves the cooling coil 2009, as indicated by a line 2019, by transferring heat from the cooling coil 2009 to ice stored by the apparatus 2018, which pumps heat from water as required to make ice to a heat transfer fluid that is circulated from a cooling tower 2020, as indicated by a line 2021.

Relief air from the spaces served by the apparatus of FIG. 116, as indicated by an arrow 2022, passes through a fan 2023 and in regenerating relationship with a segment of the dehumidifier 2007 before being discharged from the apparatus as indicated by an arrow 2024. When the apparatus serves a supermarket, it is desirable that the relief air pass in contact with the refrigerated display cases therein before entering the fan 2023.

Heat from any suitable source, for example, the compressed refrigerant of the refrigeration apparatus (not illustrated in FIG. 116) which serves refrigerated cases in a supermarket, is transferred to a heat transfer fluid in a heat exchanger 2025. The heat transfer fluid is circulated to the heating coil 2011 when the conditioned air requires heat, to the apparatus 2018 where it is cooled by heat transfer to ice made and stored by the apparatus, or both. Cooling the refrigerant in the heat exchanger 2025 improves the efficiency of the refrigeration apparatus (not illustrated) which serves the refrigerated cases and, therefore, conserves energy whenever the apparatus 2018 has produced more ice on night cycle than is required to serve the cooling coil 2009. An optimizer controller 2026 sets a valve 2027 to control the extent of cooling of the compressed refrigerant to achieve optimum energy conservation.

It will be appreciated that the compressed refrigerant from refrigeration apparatus which serves refrigerated cases in a supermarket can advantageously be cooled in ways other than by transfer to ice as specifically discussed above in connection with FIG. 116. For example, water chilled in any other way can be used for this purpose and will reduce the energy requirements of the refrigeration apparatus which serves the display cases. When ice made at night is used for this purpose, the entire reduction is realized, insofar as daytime use of electrical energy is concerned, which is also true if absorption refrigeration apparatus or compression refrigeration apparatus driven by a direct fired engine is used to chill the water used for this purpose.

Apparatus shown in FIG. 117 comprises a solid desiccant dehumidifier 2028, a cooling coil 2029, a heat exchanger 2030 and a heating coil 2031. Outside air enters the apparatus as indicated by an arrow 2032, passes through a fan 2033, in heat transfer relationship with the cooling coil 2029, in heat transfer relationship with the heat exchanger 2030 and in heat transfer relationship with the heating coil 2031 before being delivered to a space served as indicated by an arrow 2034. A controller 2035 controls the operation of the heat exchanger 2030 in response to signals from a thermostat 2036 to maintain the space served at a predetermined temperature.

Apparatus 2037 for making and storing ice serves the cooling coil 2029, as indicated by a line 2038, transferring heat from the coil to ice made by the apparatus by pumping heat from water to a heat transfer fluid that is circulated, as indicated by a line 2039, from a cooling tower 2040 where the heat is rejected from the apparatus.

Relief air from the spaces served by the apparatus of FIG. 117, as indicated by an arrow 2041, passes through refrigerated cases 2042, in heat exchange relationship with the heat exchanger 2030, where heat is transferred from the relief air to air that has been cooled by heat transfer to the cooling coil 2029, through a fan 2043 and in regenerating relationship with a segment of the dehumidifier 2028 before being discharged from the apparatus as indicated by an arrow 2044.

A source 2045, which can be a boiler, a direct fired heater, a cogenerator, means for recovering heat from the refrigerant of refrigeration apparatus which serves display cases, or the like, as indicated by a line 2046, provides heat when required by the heating coil 2031.

The apparatus of FIGS. 116 and 117 also includes a bypass 2047 through which outside air under the control of a damper 2048 can bypass the desiccant dehumidifier 2007 (FIG. 116) or 2028 (FIG. 117), entering the apparatus without being dehumidified on the suction side of the fan 2013 (FIG. 116) or 2033 (FIG. 117). Similarly, the apparatus has a duct 2049 through which return air can flow to the suction side of the fan 2013 (FIG. 116) or 2033 (FIG. 117).

FIG. 118 is a psychrometric chart showing the condition of air at various points in the summer cycle operation of the apparatus of FIG. 113. The points, the description of each point, the dry bulb temperature ("Temp") in ° F. of the air at each point and the moisture content (in grains of moisture per pound of dry air) of the air at each point are given in the following table.

| Point | Description | Temp | Moisture |
|---|---|---|---|
| 1 | Outside air entering the dehumidifier 1934 | 95 | 118 |
| 2 | Air leaving the dehumidifier 1934 | 69 | 69 |
| 3 | Mix of point 2 air and return air | 70 | 47 |

-continued

| Point | Description | Temp | Moisture |
|---|---|---|---|
| 4 | Air entering the coil 1935 | 74 | 47 |
| 5 | Air leaving the coil 1935 | 40 | 34 |
| 6 | Air leaving the reheat coil 1936 | 49 | 34 |
| 7 | Space conditions | 75 | 52 |
| 8 | Return Air entering the fan 1942 | 70 | 42 |

FIG. 119 is a psychrometric chart showing the condition of air at various points in the summer cycle operation of the apparatus of FIG. 114. The points, the description of each point, the dry bulb temperature ("Temp") in ° F. of the air at each point and the moisture content (in grains of moisture per pound of dry air) of the air at each point are given in the following table.

| Point | Description | Temp | Moisture |
|---|---|---|---|
| 1 | Outside air entering the desiccant wheel 1963 | 95 | 118 |
| 2 | Air leaving the desiccant wheel 1963 | 63 | 64 |
| 3 | Air Entering the coil 1964 | 67 | 64 |
| 4 | Air leaving the coil 1964 | 40 | 34 |
| 5 | Air leaving the heat exchanger 1965 | 60 | 34 |
| 6 | Mixture of primary and plenum air to the Units 1967 | 73 | 49 |
| 7 | Supply air to the space | 58 | 49 |
| 8 | Space condition | 75 | 52 |
| 9 | Return air, plenum condition | 77 | 52 |
| 10 | Return air leaving the heat exchanger 1965 | 57 | 52 |

FIG. 120 is a psychrometric chart showing the condition of air at various points in the summer cycle operation of the apparatus of FIG. 115. The points, the description of each point, the dry bulb temperature ("Temp") in ° F. of the air at each point and the moisture content (in grains of moisture per pound of dry air) of the air at each point are given in the following table.

| Point | Description | Temp | Moisture |
|---|---|---|---|
| 1 | Outside air entering the dehumidifier 1978 | 95 | 118 |
| 2 | Air leaving the dehumidifier 1978 | 65 | 76 |
| 3 | Air entering the coil 1979 | 69 | 76 |
| 4 | Air leaving the coil 1979 | 40 | 34 |
| 5 | Air leaving the reheat coil 1981 | 60 | 34 |
| 6 | Mixture of Primary and Plenum air | 73 | 49 |
| 7 | Supply air to the space | 58 | 49 |
| 8 | Space condition | 75 | 54 |
| 9 | Return air, plenum conditions | 77 | 54 |

FIG. 121 is a psychrometric chart showing the condition of air at various points in the summer cycle operation of the apparatus of FIG. 116. The points, the description of each point, the dry bulb temperature ("Temp") in ° F. of the air at each point and the moisture content (in grains of moisture per pound of dry air) of the air at each point are given in the following table.

| Point | Description | Temp | Moisture |
|---|---|---|---|
| 1 | Outside air entering the desiccant wheel 2007 | 95 | 118 |
| 2 | Air leaving the desiccant wheel 2007 | 74 | 54 |
| 3 | Mix of point 2 air and return air | 71 | 45 |
| 4 | Air entering the heat exchanger 2008 | 75 | 45 |
| 5 | Air entering the coil 2009 | 66 | 45 |

-continued

| Point | Description | Temp | Moisture |
|---|---|---|---|
| 6 | Air entering the heat exchanger 2010 | 40 | 34 |
| 7 | Supply air to the space | 49 | 34 |
| 8 | Space condition | 75 | 52 |
| 9 | Return air condition | 70 | 42 |

FIG. 122 is a psychrometric chart showing the condition of air at various points in the summer cycle operation of the apparatus of FIG. 117. The points, the description of each point, the dry bulb temperature ("Temp") in ° F. of the air at each point and the moisture content (in grains of moisture per pound of dry air) of the air at each point are given in the following table.

| Point | Description | Temp | Moisture |
|---|---|---|---|
| 1 | Outside air entering the desiccant wheel 2028 | 95 | 118 |
| 2 | Air leaving the desiccant wheel 2028 | 66.5 | 54 |
| 3 | Mix of point 2 air and return air | 62.5 | 45 |
| 4 | Air entering the cooling coil 2029 | 66.5 | 45 |
| 5 | Air leaving the coil 2029 | 40 | 34 |
| 6 | Air leaving the heat exchanger 2030 | 49 | 34 |
| 7 | Space condition | 75 | 52 |
| 8 | Return air conditions (Through cases) | 70 | 42 |
| 9 | Return air leaving the heat exchanger 2030 | 61 | 42 |

Numerous control arrangements have been disclosed herein for apparatus according to the invention which supplies cold, dehumidified primary air (i.e., air at a temperature below about 55° F., 13° C., having an absolute humidity ratio sufficiently low that it is incapable, at the rate at which it is required for humidity control, of handling the maximum design cooling load) to induction mixing units, and, ultimately, to the spaces they serve, while air is withdrawn from the spaces and mixed with cold, dehumidified primary air, and the mixtures are supplied to the spaces, and sensible heat is transferred to a heat transfer element from the withdrawn air, from the cold, dehumidified primary air, or from the mixtures. It is preferred that the rate at which the cold, dehumidified primary air is introduced into the induction mixing units be controlled to control humidity in the spaces and in response to a signal from a humidistat, and that heat be transferred to the heat transfer element, for temperature control and in response to a signal from a thermostat, and:

(1) on start-up, that heat transfer to the heat transfer device be prevented until a humidistat signal indicates that humidity control has been established, and, after humidity control has been established,
  - (a) that the rate at which cold primary air is supplied to the induction mixing units be varied, as required for humidity control, in response to a humidistat signal while the rate of heat removal is varied, as required for temperature control, in response to a thermostat signal, so long as the rate at which heat is being transferred to the heat transfer element is below the maximum transfer rate capability, and
  - (b) whenever the rate at which heat is being transferred to the heat transfer element is at the maximum transfer rate capability, and further cooling is needed, that the rate at which cold primary air is supplied to the induction mixing units be varied, as required for temperature control, in response to a thermostat signal while the rate at which heat is transferred to the heat transfer element remains at the maximum rate capability.

Heat transfer can be accomplished:

(a) by causing a cooled heat transfer fluid to flow through coils that are in heat transfer relationship with the withdrawn air, the cold, dehumidified primary air, or the mixture, or (b) by pumping heat from coils that are so positioned to a heat transfer fluid.

When heat is pumped from the coils to a heat transfer fluid, the heat pumping can be reversed so that heat is pumped to the coils and heating is accomplished. This mode of operation is commenced when the thermostat senses a temperature below the control temperature and no sensible heat is being pumped to the heat transfer element, and involves controlling the rate of flow of cold primary air in response to a signal from the humidistat for humidity control and controlling the rate at which heat is pumped to the heat transfer element in response to a signal from a thermostat for temperature control.

Where the apparatus differs from that described in the preceding paragraph only in that the primary air is either neutral or warm, the preferred control is the same, except the maximum cooling possible occurs when heat is being removed at the maximum rate available.

When apparatus according to the invention is controlled as described in the two preceding paragraphs, a single humidistat which measures the humidity of return air from all zones being conditioned will be adequate if there are only minor variations in humidity while, in others, one humidistat per floor or per induction mixing unit will be required. It is preferred that the humidistats used measure absolute humidity, although satisfactory operation can be achieved using humidistats which measure relative humidity.

Which apparatus is optimum for any given installation depends upon such factors as the local climate, including both temperatures and humidities and the local rate structures for electricity, gas and fuel oil, including not only cost per unit of energy, but also demand charges and incentives. In general, it is necessary to provide conditioned air at a sufficiently low humidity that only a small quantity thereof is required for humidity control, to deliver only a small quantity of the low humidity conditioned air, and to circulate a heat transfer fluid, preferably, in most cases, through at least part of a sprinkler system, for on site use, i.e., for heat transfer to cooling coils located in or adjacent a space being conditioned, rather than in an equipment room, to remove sensible heat. It is usually important to vary the rate at which the low humidity air is delivered so that humidity control is achieved, but over dehumidification is avoided. The low humidity conditioned air can be made by chemical dehumidification, using ice that was produced on night cycle, or using a low temperature coil from which heat is transferred directly to the refrigerant of a refrigeration unit. Similarly, the heat can be removed from water that is circulated to carry the sensible heat load by absorption refrigeration apparatus, by compression refrigeration, or with ice. When cogeneration is used, it is important to waste neither the shaft work nor the heat; the heat can be used on winter cycle for heating and on summer cycle either to regenerate a desiccant or as an energy source for absorption refrigeration apparatus, while the shaft work can be used, summer and winter, either to generate electricity or to drive compressors, pumps, blowers and the like.

Most of the apparatus that is shown in the attached drawings transfers heat to evaporatively cooled water. This is advantageous over transferring heat to water that has been chilled by refrigeration, because there are substantial savings in energy. However, ground water, for example from wells, when it is available, may also be at least equally advantageous, particularly in climates where high humidity limits the use of evaporative cooling. When used, ground water should usually be circulated through a heat exchanger and returned to the ground. A suitably treated heat transfer fluid can then be chilled by heat exchange with the ground water and used in place of the evaporatively cooled water that has been described above. For example, the apparatus of FIG. 27 can be modified by elimination of the dehumidifier 572 and of the cooling tower 580, and by connecting ground water to the heat exchanger 620 and to the lines 688 and 689.

It is important that air conditioning apparatus introduce sufficient fresh or ventilation air into a building to prevent the accumulation of excessive concentrations of such inert gases as radon. Apparatus for determining the concentrations of such inert gases and for controlling ventilation air to keep their concentrations within safe limits is not presently available; occupants are not capable of detecting dangerously high concentrations of these gases. As a consequence, there is presently no mechanism for monitoring a variable to determine whether or not ventilation is adequate in a building. The apparatus of the instant invention makes the occupants of a building sensors to detect the inadequacy of ventilation; this occurs because the primary, conditioned air is relied upon to control humidity, and is circulated at a rate which is at least adequate for ventilation and at a sufficiently low moisture content that it also provides humidity control. If the apparatus is properly designed, and if it provides humidity control, it also provides adequate ventilation; if the apparatus fails to provide humidity control, ventilation may be inadequate, but the problem will be solved to quiet the complaints of the occupants.

The apparatus of FIG. 29 is admirably suited for a building which is equipped with lighting fixtures that are disclosed in U.S. Pat. No. 3,828,180. These fixtures are water-cooled, and also have dampers which snap open when the fixture temperature exceeds a set point, for example, because the water flow has been stopped. When the dampers are open, air can flow through the fixtures either into the plenum above the ceilings 737 and from thence into the induction mixing units 724, or directly into the recirculated air inlets of the induction mixing units 724. It is thus possible to use heat from the lights when needed or to reject that when that is desirable.

By way of example, the lighting fixtures of said U.S. Pat. No. 3,828,180 can be zoned so that those which serve interior portions of the building constitute one zone and there is an additional zone corresponding with each of the induction mixing units 724. Since there is always a heat gain in interior portions of a building, winter and summer, it is preferable that the lighting fixtures which serve the interior portions of the building receive chilled water from the sprinkler system whenever the air conditioning apparatus is operating; accordingly, there is usually no need to provide valves to control the flow of chilled water through these fixtures.

Any given perimeter zone, however, may have greater or lesser heat gains or losses than other perimeter zones, or may have heat losses when other perimeter zones have heat gains. Therefore, it is desirable that there be individual control of the flow of heat transfer fluid to the lights to the perimeter zone served by each of the induction mixing units 724. On summer cycle, the flow of cold, dehumidified air to each induction mixing unit 724 is then controlled to maintain a desired humidity, and heat is pumped or transferred to the heat transfer fluid to cool the recirculated air if further sensible cooling is required; the heat transfer fluid is circulated to the lights that serve all of the zones where the induction mixing units 724 are operating in this way. However, when minimum flow of dehumidified air required for ventilation or for humidity control causes too low a temperature in any zone, the flow of heat transfer fluid to the lights serving that zone can be stopped so that lighting heat will cause the dampers in the fixtures to open and air heated by the lights will flow into the plenum and into the induction mixing units 724. So long as lighting heat is capable of causing sufficient reheat, the flow of heat transfer fluid can be modulated to maintain the desired temperature. Heat is pumped from the circulated heat transfer fluid only if lighting heat is incapable of maintaining the desired temperature.

The FIG. 29 apparatus with the lighting fixtures of said U.S. Pat. No. 3,828,180 can operate in the same manner on winter cycle; whenever lighting intensity is comparatively high, heat from the lights supplemented by the heat pumps in the induction mixing units 724 will provide all of the heat required when the building is occupied and heat from the heat recovery unit 404 supplemented by the heat pumps will provide all of the heat that is required when the building is not occupied.

The apparatus of FIG. 29 can also be modified to accommodate a space that sometimes requires a several fold increase in the rate at which conditioned air is supplied; a laboratory, for example, has such a requirement whenever an exhaust hood is operated. For example, the requirement of a laboratory for conditioned air may jump from 0.2 cfm per square foot of floor space to 1.0 cfm when the exhaust fan in its hood is energized. The apparatus of FIG. 29 can satisfy this requirement when a velocity sensor is added to the conditioned air inlet and, whenever the exhaust fan in the hood is energized, the flow of conditioned air to the induction mixing unit 724 is controlled to maintain the required velocity, for example, that which corresponds to a flow of 1.0 cfm per square foot of floor space. Heat can be pumped to or from recirculated air as previously described, or heat can be transferred to recirculated air from an electric heater or transferred from recirculated air to a heat transfer fluid, as required to maintain the temperature desired in the space.

It will be appreciated that various changes and modifications can be made from the specific details of the invention as shown in the attached drawings and described with reference thereto without departing from the spirit and scope thereof as defined in the appended claims.

For example, lithium chloride solutions have been described as aqueous desiccants, but other solutions are also operable, including other lithium halides, calcium chloride, and even glycol solutions. In one aspect, the invention involves the use of air conditioning apparatus to perform one function on day cycle and a different function on night cycle, one function during winter operation and a different function during summer operation, and minimizing the size of equipment required by storing what is made during one mode of operation for use at a different time in a different mode of operation. For example, on summer operation, ice produced on night cycle is used on day cycle to minimize energy requirements and to enable a given air conditioning job to be performed with smaller equipment than would otherwise be required. Similarly, on winter-night cycle, heat is stored and ice is made; both are used on day cycle.

The apparatus of FIG. 31 can be modified by adding a heat engine (not illustrated) to drive the compressor 340, and heat from the engine can be supplied to energize the absorption apparatus which includes the evaporator 775 or to heat the water which flows through the lines 777 and 778. Similarly, heat from the cogenerator 387 can be supplied to energize the absorption apparatus which includes the evaporator 775 or to heat the water which flows through the lines 777 and 778. Also, the refrigeration apparatus which includes the compressor 340 can be replaced by a centrifugal package chiller which circulates a glycol, e.g., an aqueous solution containing 30 to 50 percent by weight ethylene glycol.

It will be appreciated that apparatus which includes a reheat coil, e.g., the reheat coil 831 of FIG. 35, or a coil to which heat is pumped for reheat, e.g., the coil 728 of the induction mixing unit 724 of FIG. 29 and a cooling coil should be operated so that the cooling coil and the reheat coil do not operate at the same time as they would be, in essence, opposing one another. When cooling is required, reheat is not, and vice versa.

The apparatus of FIG.-28 can be modified by using a heat pipe to transfer heat from air cooled by heat exchange with the coil 701 to incoming air. For example, the condensing section of a heat pipe can be substituted for the coil 703 and the evaporating section of the heat pipe can be substituted for the coil 700; a pump in a liquid return line would then pump condensate from the condensing section to the evaporating section, and a valve in a vapor pipe would control the operation of the heat pipe. Similarly, heat pipes can be substituted for the heat exchangers 1884 and 1886 of the apparatus of FIG. 108, and the flow of either liquid or vapor between the condensing portions and the evaporating portions can be regulated as required for temperature control.

The apparatus of FIG. 77 includes a heat exchanger 1751 of the rotating wheel type where a warm stream flows through one segment, transferring heat to the wheel, while a cooler stream flows through another segment and is heated by the wheel. Heat pipes can be substituted for the heat exchanger 1751 in the apparatus of FIG. 77 as can heat exchangers which include two coils and means for circulating a heat transfer fluid through the coils, e.g., the heat exchangers 1761 and 1763 of the FIG. 77 apparatus. Indeed, heat exchangers of the three types are generally interchangable in apparatus according to the invention.

The apparatus of FIG. 100, 104 or 107 can be substituted for the solid desiccant dehumidifier and engine of the apparatus of FIG. 60. Similarly, the apparatus of FIG. 101, 103 or 106 can be substituted for the absorption machine of FIG. 60. Further, both substutions can be made.

The apparatus of FIG. 100, 104 or 107 can be substituted for the liquid desiccant dehumidifier of the apparatus of FIG. 61, provided that the apparatus of FIG.

101, 103 or 106 is also substituted for the engine chiller of FIG. 61.

The apparatus of FIG. 100, 104 or 107 can be substituted for the solid desiccant wheels of the apparatus of FIG. 62, as can the apparatus of FIG. 101, 103 or 106 be substituted for the absorption machine of FIG. 62. Also, both substitutions can be made.

The apparatus of FIG. 100, 104 or 107 can be substituted for the liquid desiccant dehumidifier of the apparatus of FIG. 63, as can the apparatus of FIG. 101, 103 or 106 be substituted for the absorption machine of the apparatus of FIG. 63. Also, both substitutions can be made.

The apparatus of FIG. 100, 104 or 107 can be substituted for the liquid desiccant dehumidifier of the apparatus of FIG. 64, as can the apparatus of FIG. 101, 103 or 106 be substituted for the absorption machine of the apparatus of FIG. 64. Again, both substitutions can also be made.

The apparatus of FIG. 100, 104 or 107 can be substituted for the solid desiccant dehumidifier of the apparatus of FIG. 65, as can the apparatus of FIG. 101, 103 or 106 be substituted for the absorption machine of the apparatus of FIG. 65. Likewise, both substitutions can be made.

The apparatus of FIG. 100, 104 or 107 can be substituted for the solid desiccant dehumidifier of the apparatus of FIG. 66, as can the apparatus of FIG. 101, 103 or 106 be substituted for the absorption machine of the apparatus of FIG. 66. Once more, both substitutions can also be made.

The apparatus of FIG. 100, 104 or 107 can be substituted for the liquid desiccant dehumidifier of the apparatus of FIG. 72, provided that the apparatus of FIG. 101, 103 or 106 is also substituted for the engine chiller, solar collector and storage means of the apparatus of FIG. 72.

The apparatus of FIG. 100, 104 or 107 can be substituted for the liquid and solid desiccant dehumidifiers of the apparatus of FIG. 79, provided that the apparatus of FIG. 101, 103 or 106 is also substituted for the engine chiller of the apparatus of FIG. 79.

For purposes of illustration, some of the reheat coils, for example the coil 831 in FIG. 35, some of the dampers, for example the damper 793 in FIG. 33, and the condensing sections of some of the heat pipes, for example, the condensing section 846 in FIG. 37, appear to be in ducts which serve associated induction mixing units. Ordinarily, the dampers, reheat coils and condensing sections would all be a part of the induction mixing units they serve, although it would also be possible for them to be contained in associated ducts.

The various cogenerators to which reference is made herein can be diesel engines, Otto cycle, or gas turbine (Brayton cycle) engines. A Stirling engine can also be used, with its shaft coupled directly to an electric generator or to a second Stirling engine, which then acts as a heat pump.

I claim:

1. Air conditioning apparatus comprising a plurality of air outlets each of which is operable to deliver air to a space to be conditioned, means including refrigeration apparatus operable to make ice by pumping heat from water to a heat sink and to store such ice, means for dehumidifying outside air or a mixture of outside air and return air, said dehumidifying means including a coil, means for causing air to be dehumidified to flow in heat transfer relationship with said coil, and means for circulating a low temperature heat transfer fluid through said coil, said circulating means including means for transferring heat from the heat transfer fluid to ice made and stored by said means operable to make and store ice, means for circulating dehumidified air to said air outlets at a rate per unit of area in the spaces served by said air outlets which varies between a predetermined minimum rate greater than zero and a maximum rate, the maximum rate being substantially less than that which would be required to maintain the design temperature in each of the spaces at the maximum design cooling load with air supplied to the space at a dry bulb temperature of 55° F., means operable to control its moisture content and temperature so that the dehumidified air is incapable, at the rate at which it is required for humidity control, of maintaining the desired space temperature at the maximum design cooling load, means operable to control the rates at which dehumidified air is delivered by said air outlets to the spaces they serve to ones not less than the predetermined minimum rate and means for controlling the temperature of the air delivered by said air outlets to maintain the temperature of the spaces within control limits.

2. Apparatus as claimed in claim 1 which additionally includes means for transferring heat from air that has not yet flowed in heat transfer relationship with said coil to air that has flowed in heat transfer relationship with said coil.

3. Apparatus as claimed in claim 1 wherein said means for transferring heat to the dehumidified air delivered to said air outlets is operable so to transfer heat from the outside air or from the mixture of outside air and return air that is caused to flow in heat transfer relationship with said coil.

4. Air conditioning apparatus as claimed in claim 1 wherein each of said plurality of air outlets is an induction mixing box which is operable to induce air to flow from the space it serves and to return a mixture of induced air and conditioned air to the space.

5. Air conditioning apparatus as claimed in claim 1 wherein each of said plurality of air outlets is an induction mixing box which is operable to induce air to flow from the space it serves and to return a mixture of induced air and conditioned air to the space, and which additionally includes a cooling coil in heat transfer relationship with air each of said induction units induced to flow from the space it serves or mixture of conditioned air with such induced air, and means for transferring heat to a heat sink from each of said cooling coils.

6. Air conditioning apparatus as claimed in claim 5 wherein at least some of said means for transferring heat to a heat sink from each of said cooling coils comprises refrigeration apparatus operable to pump heat from one of said cooling coils to a heat sink.

7. Air conditioning apparatus as claimed in claim 6 wherein at least some of said refrigeration apparatus is also operable to pump heat from a heat sink to one of said cooling coils.

8. Air conditioning apparatus as claimed in claimed 5 wherein said means for transferring heat to a heat sink from each of said cooling coils includes a circulating system operable to circulate a heat transfer fluid to each of said cooling coils and means for transferring heat from the circulated fluid.

9. Apparatus as claimed in claim 3 wherein each of said plurality of air outlets is an induction mixing box which is operable to induce air to flow from the space it serves and to return a mixture of induced air and conditioned air to the space, and which additionally includes a heating coil in heat transfer relationship with conditioned air, with air each of said induction units induces to flow from the space it serves or with a mixture of conditioned air with such induced air, and means for transferring heat from a heat sink to each of said heating coils.

10. Apparatus as claimed in claim 9 wherein said means for transferring heat to the dehumidified air delivered to said air outlets is operable so to transfer heat from the outside air or from the mixture of outside air and return air that is caused to flow in heat transfer relationship with said dehumidifying coil.

11. Air conditioning apparatus comprising a plurality of air outlets each of which is operable to deliver air to a space to be conditioned, means for dehumidifying outside air or a mixture of outside air and return air, said dehumidifying means including a dehumidifying coil, means for causing air to be dehumidified to flow in heat transfer relationship with said coil, refrigeration apparatus, and means for transferring heat from said coil to said refrigeration apparatus, means for circulating dehumidified air to said air outlets at a rate per unit of area in the spaces served by said air outlets which varies between a predetermined minimum rate greater than zero and a maximum rate, the maximum rate being substantially less than that which would be required to maintain the design temperature in each of the spaces at the maximum design cooling load with air supplied to the spaces at a dry bulb temperature of 55° F., means operable to control its moisture content and temperature so that the dehumidified air is incapable, at the rate at which it is required for humidity control, of maintaining the desired space temperature at the maximum design cooling load, means operable to control the rate at which dehumidified air is delivered by said air outlets to the spaces they serve to ones not less than the predetermined minimum rate and higher than that minimum when required to maintain a monitored condition of the space within control limits.

12. An air conditioning system as claimed in claim 11 which additionally includes a plurality of cooling means each of which is operable, when heat is transferred therefrom, to lower the temperature of one of the spaces, means operable to circulate a heat transfer fluid through a building served by the system, means for transferring heat from each of said cooling means to the circulated heat transfer fluid, and means for transferring heat from the circulated heat transfer fluid to a heat sink.

13. An air conditioning system as claimed in claim 12 wherein each of the plurality of air outlets is an induction mixing unit operable to induce air to flow from the space it serves and to return to the space a mixture of induced air and conditioned air, and each of said cooling means is a second coil positioned for heat transfer with air one of said induction mixing units induces to flow from the space it serves or a mixture of conditioned air with such induced air.

14. An air conditioning system as claimed in claim 13 wherein said means for transferring heat from said second cooling coils to a heat sink comprises refrigeration apparatus which is operable to pump heat from said cooling coils to the circulated heat transfer fluid or from the circulated heat transfer fluid to the heat sink.

15. An air conditioning system as claimed in claim 13 which additionally includes means including refrigeration apparatus for making and storing ice, and wherein the system is operable to transfer heat from said second cooling coils to ice made and stored by said means.

16. An air conditioning system as claimed in claim 15 which additionally includes an evaporative cooler which is operable to transfer heat from the circulated heat transfer fluid to the heat sink.

17. An air conditioning system as claimed in claim 14 which additionally includes means including refrigeration apparatus for making and storing ice, and wherein the system is operable to transfer heat from said second cooling coils to ice made and stored by said means.

18. An air conditioning system as claimed in claim 17 which additionally includes an evaporative cooler which is operable to transfer heat from the circulated heat transfer fluid to the heat sink.

19. An air conditioning system as claimed in claim 14 wherein said refrigeration apparatus is absorption refrigeration apparatus, and is operable to pump heat from the circulated heat transfer fluid to the heat sink.

20. An air conditioning system as claimed in claim 19 which additionally includes an evaporative cooler which is operable to transfer heat from the circulated heat transfer fluid to the heat sink.

21. An air conditioning system as claimed in claim 15 wherein said refrigeration apparatus of said means for making and storing ice is also operable to pump heat from the circulated heat transfer fluid to the heat sink.

22. An air conditioning system as claimed in claim 21 which additionally includes an evaporative cooler which is operable to transfer heat from the circulated heat transfer fluid to the heat sink.

23. An air conditioning system as claimed in claim 13 which additionally includes a plurality of third coils each of which is positioned for heat transfer with conditioned air delivered to one of said induction mixing units, air said induction mixing unit induces to flow from the space or a mixture of the two and a plurality of heat pumps, each of which is operable to pump heat to the circulated heat transfer fluid from one of said plurality of third coils.

24. An air conditioning system as claimed in claim 23 which additionally includes an evaporative cooler which is operable to transfer heat from the circulated heat transfer fluid to the heat sink.

25. An air conditioning system as claimed in claim 13 wherein each of said induction mixing units includes means operable to control the rate at which it delivers conditioned air to the space it serves.

26. An air conditioning system as claimed in claim 14 wherein each of said induction mixing units includes means operable to control the rate at which it delivers conditioned air to the space it serves.

27. An air conditioning system as claimed in claim 14 which additionally includes a plurality of third coils each of which is positioned for heat transfer with conditioned air delivered to one of said induction mixing units, air said induction mixing unit induces to flow from the space or a mixture of the two, and wherein said refrigeration apparatus comprises a plurality of heat pumps, each of which is operable to pump heat to the circulated heat transfer fluid from one of said plurality of third coils.

28. An air conditioning system as claimed in claim 27 which additionally includes an evaporative cooler which is operable to transfer heat from the circulated heat transfer fluid to the heat sink.

29. An air conditioning system as claimed in claim 27 which additionally includes a plurality of means, each of which is operable in a first position and inoperable in a second position, to prevent the flow of the circulated heat transfer fluid through one of said second cooling coils.

30. An air conditioning system as claimed in claim 14 wherein said means for transferring heat from the circulated heat transfer fluid to a heat sink includes compression refrigeration apparatus.

31. An air conditioning system as claimed in claim 30 which additionally includes an evaporative cooler which is operable to transfer heat from the circulated heat transfer fluid to the heat sink.

32. An air conditioning system as claimed in claim 17 wherein said refrigeration apparatus of said means for making and storing ice is also operable to pump heat from the circulated heat transfer fluid to the heat sink.

33. An air conditioning system as claimed in claim 14 which additionally includes a plurality of third coils each of which is positioned for heat transfer with conditioned air delivered to one of said induction mixing units, air said induction mixing unit induces to flow from the space or a mixture of the two, and a plurality of heat pumps each of which is operable to pump heat from the circulated heat transfer fluid to one of said plurality of third coils.

34. An air conditioning system as claimed in claim 13 which additionally includes a plurality of third coils each of which is positioned for heat transfer with conditioned air delivered to one of said induction mixing units, air said induction mixing unit induces to flow from the space or a mixture of the two, and a plurality of heat pumps each of which is operable to pump heat from the circulated heat transfer fluid to one of said plurality of third coils.

35. An air conditioning system as claimed in claim 11 which additionally includes a first dehumidifier which uses a desiccant and means for regenerating the desiccant of said dehumidifier by directing relief air from a building served by the system in regenerating relationship therewith, and means for causing the outside air to flow in dehumidifying relationship with said first dehumidifier before it flows in heat exchange relationship with said dehumidifying coil so that the air is conditioned by heat transfer to said coil.

36. An air conditioning system as claimed in claim 11 wherein each of said plurality of air outlets is an induction mixing unit which includes a fan and is operable, when said fan is energized, to induce air to flow from the space it serves and to return a mixture of induced air and conditioned air to the space, and which additionally includes a coil in heat transfer relationship with air each of said induction units induces to flow from the space it serves or a mixture of conditioned air with such induced air, means for transferring heat to a heat sink from each of said coils, and a control for each of said coils of said induction mixing units, each of said controls being effective in a first position and ineffective in a second position to prevent the transfer of heat from the one of said coils which serves a given space.

37. An air conditioning system as claimed in claim 36 wherein each of said controls is responsive to a signal from a sensor which indicates occupancy of the space and assumes the second position in response to a signal indicating that the space served by the associated one of said coils is occupied.

38. An air conditioning system as claimed in claim 11 which additionally includes means for cooling a fluid by transferring heat from the fluid to air that has been conditioned by heat transfer to said cooling coil and means for heating the cooled fluid by transferring heat thereto from air that is yet to be conditioned by contact with said cooling coil.

39. Apparatus as claimed in claim 11 which additionally includes a first cooling coil and means for transferring heat from said first cooling coil to a heat sink, and means for causing the outside air or the mixture of outside air and return air to flow in heat transfer relationship with said first cooling coil before it flows in heat exchange relationship with said dehumidifying coil.

40. An air conditioning system as claimed in claim 39 wherein said means for transferring heat from said first coil to a heat sink comprises absorption refrigeration apparatus.

41. An air conditioning system as claimed in claim 39 wherein said means for transferring heat from said first coil to a heat sink comprises said refrigeration apparatus to which heat is transferred from said dehumidifying coil.

42. An air conditioning system as claimed in claim 11 which additionally includes a first dehumidifier which uses a desiccant and means for regenerating the desiccant of said dehumidifier by directing relief air from a building served by the system in regenerating relationship therewith, means for causing the outside air to flow in dehumidifying relationship with said first dehumidifier before it flows in heat exchange relationship with said dehumidifying coil, and means for mixing return air from the building served by the system with air that has been dehumidified by said first dehumidifier before that air flows in heat transfer relationship with said dehumidifying coil so that the mixture of dehumidified air and return air is conditioned by heat transfer to said coil.

43. An air conditioning system as claimed in claim 11 wherein each of said plurality of air outlets is an induction mixing unit including a conditioned air inlet and an outlet to an associated space, and is operable when conditioned air enters said conditioned air inlet and flows through said unit and said outlet to induce a flow of air from the space into said induction mixing unit, mixture of the induced air with the conditioned air, and delivery of the mixture of induced air and conditioned air through the outlet to the associated space.

44. An air conditioning system as claimed in claim 43 which additionally includes a first dehumidifier which uses a desiccant and means for regenerating the desiccant of said dehumidifier by directing relief air from a building served by the system in regenerating relationship therewith, and means for causing the outside air to flow in dehumidifying relationship with said first dehumidifier before it flows in heat exchange relationship with said dehumidifying coil so that the air is conditioned by heat transfer to said coil.

45. An air conditioning system as claimed in claim 11 wherein each of said plurality of air outlets in an induction mixing unit which includes a fan and is operable, when said fan is energized, to induce air to flow from the space it serves and to return a mixture of induced air and conditioned air to the space, and which additionally includes a control operably associated with each of said induction mixing units, each of said controls being effective in a first position and ineffective in a second position to prevent the operation of the fan of the associated one of said induction mixing units.

46. An air conditioning system as claimed in claim 45 wherein said control is responsive to a signal from a sensor and assumes the second position in response to such a signal indicating that the space served by the associated one of said fans is occupied.

47. An air conditioning system as claimed in claim 11 which additionally includes a first dehumidifier which uses a desiccant and means for regenerating the desiccant of said dehumidifier by directing air and heat including heat of sorption from said first dehumidifier into regenerating relationship therewith, and means for causing the outside air to flow in dehumidifying relationship with said first dehumidifier before it flows in heat exchange relationship with said dehumidifying coil so that the air is conditioned by heat transfer to said coil.

48. Apparatus as claimed in claim 14 which additionally includes a plurality of third colling coils each of which is positioned for heat transfer with air one of said induction mixing units induces to flow from the space it serves or a mixture of conditioned air with such induced air, and means for transferring heat from each of said third cooling coils to a heat sink.

49. Air conditioning apparatus comprising a plurality of air outlets each of which is operable to deliver air to a space to be conditioned, means including refrigeration apparatus operable to pump heat to a heat sink, means for dehumidifying outside air or a mixture of outside air and return air, said dehumidifying means including a coil, means for causing air to be dehumidified to flow in heat transfer relationship with said coil to produce dehumidified cold air by cooling the air to condense water vapor therefrom, and means for circulating a low temperature heat transfer fluid through said coil, said refrigeration apparatus being operatively connected with said circulating means to pump heat from the heat transfer fluid to the heat sink, means for circulating dehumidified air to said air outlets at a rate per unit of area in the spaces served by said air outlets which varies between a predetermined minimum rate greater than zero and a maximum rate, the maximum rate being substantially less than that which would be required to maintain the design temperature in each of the spaces at the maximum design cooling load with air supplied to the space at a dry bulb temperature of 55° F., means operable to control the rates at which dehumidified air is delivered by said air outlets to the spaces they serve to ones not less than the predetermined minimum rate and means for controlling the temperature of the air delivered by said air outlets to maintain the temperature of the spaces within control limits.

50. Air conditioning apparatus comprising a plurality of air outlets each of which is operable to deliver air to a space to be conditioned, means including refrigeration apparatus operable to make ice by pumping heat from water to a heat sink and to store such ice, means for dehumidifying air, said dehumidifying means including cooling means, a dehumidifying and cooling coil, heating means, means for circulating a low temperature heat transfer fluid through said hehumidifying and cooling coil, said circulating means including means for transferring heat from the heat transfer fluid to ice made and stored by said means operable to make and store ice, and means for causing outside air to flow in heat transfer relationship with said cooling means, with said dehumidifying and cooling coil, and with said heating means to produce cooled air by heat transfer to said cooling means, dehumidified cold air by heat transfer to said dehumidifying and cooling coil, whereby the air is cooled and water vapor is condensed therefrom, and heated dehumidified air by heat transfer from said heating means to the dehumidified cold air, means operatively connecting said cooling means and said heating means so that heat transferred from the outside air by said cooling means is transferred by said heating means to the dehumidified cold air, means for circulating heated dehumidified air to each of said air outlets at a rate sufficient to provide ventilation and to maintain the humidity of the space served by each within control limits, means for adding heat to the heated dehumidified air after it flows in heat transfer relationship with said heating means and before it is delivered to the space, means for sensing space temperature, and means responsive to said last-named means, and operable to control said means for adding heat to the heated dehumidified air to maintain the sensed space temperature within control limits.

51. Apparatus as claimed in claim 49 wherein said means for causing outside air to flow in heat transfer relationship with said cooling means, with said dehumidifying and cooling coil, and with said heating means is operable to cause a mixture of outside air and return air so to flow.

52. Apparatus as claimed in claim 49 or 50 which additionally includes a desiccant enthalpy exchanger and means operable to direct relief air from a building served by the apparatus in regenerating relationship with said enthalpy exchanger, and wherein said dehumidfying means is operable to cause outside air to flow in dehumidifying relationship with said enthalpy exchanger before it flows in heat transfer relationship with said cooling means.

53. Air conditioning apparatus as claimed in claim 49 or 50 wherein each of said plurality of air outlets is an induction mixing unit which is operable to induce air to flow from the space it serves and to return a mixture of induced air and conditioned air to the space.

54. Air conditioning apparatus as claimed in claim 49 or 50 wherein each of said plurality of air outlets is an induction mixing unit which is operable to induce air to flow from the space it serves and to return a mixture of induced air conditioned air to the space, and which additionally includes a cooling coil in heat transfer relationship with conditioned air, air each of said induction units induces to flow from the space it serves or a mixture of conditioned air with such induced air, and means for transferring heat to a heat sink from each of said cooling coils.

55. Air conditioning apparatus as claimed in claim 49 or 50 wherein each of said plurality of air outlets is an induction mixing unit which is operable to induce air to flow from the space it serves and to return a mixture of induced air and conditioned air to the space, and wherein said means for adding heat to the heated dehumidified air includes a heating coil in heat transfer relationship with conditioned air, air each of said induction units induces to flow from the space it serves or a mixture of conditioned air with such induced air, and means for transferring heat from a heat sink to each of said heating coils.

56. Air conditioning apparatus as claimed in claim 55 wherein at least some of said means for transferring heat from a heat sink to each of said heating coils comprises refrigeration apparatus operable to pump heat to one of said heating coils from a heat sink.

57. Air conditioning apparatus as claimed in claim 56 wherein said refrigeration apparatus operable to pump heat to one of said heating coils is also operable to pump heat to a heat sink from said heating coil.

58. Air conditioning apparatus as claimed in claim 55 which additionally includes means comprising heat pumps operable to pump heat to a heat sink from air said induction units induce to flow from the spaces they serve, conditioned air, or a mixture of conditioned air with such induced air.

59. Air conditioning apparatus as claimed in claim 55 wherein said means for transferring heat from a heat sink to each of said heating coils includes a circulating system operable to circulate a heat transfer fluid to each of said heating coils and means for transferring heat from the circulated fluid to said heating coils.

60. Air conditioning apparatus comprising a plurality of air outlets each of which is operable to deliver air to a space to be conditioned, means operatively associated with each of said air outlets, and operable to control the rate at which air circulated thereto is delivered to the space served, means including refrigeration apparatus operable to make ice by pumping heat from water to a heat sink and to store such ice, means for dehumidifying air, said dehumidifying means including cooling means, a dehumidifying and cooling coil, heating means, means for circulating a low temperature heat transfer fluid through said dehumidifying and cooling coil, said circulating means including means for transferring heat from the heat transfer fluid to ice made and stored by said means operable to make and store ice, and means for causing outside air to flow in heat transfer relationship with said cooling means, with said dehumidifying and cooling coil, and with said heating means to produce cooled air by heat transfer to said cooling means, dehumidified cold air by heat transfer to said dehumidifying and cooling coil, whereby the air is cooled and water vapor is condensed therefrom, and heated dehumidified air by heat transfer from said heating means to the dehumidified cold air, means operatively connecting said cooling means and said heating means so that heat transferred from the outside air by said cooling means is transferred by said heating means to the dehumidified cold air, means for circulating heated dehumidified air to each of said air outlets at a rate sufficient to provide ventilation and to maintain the humidity of the space served by each within control limits, means for adding heat to the heated dehumidified air after it flows in heat transfer relationship with said heating means and before it is delivered to the space, means for determining a temperature at which the heated dehumidified air is capable of maintaining a control temperature in each of the spaces served by a plurality of said air outlets, means responsive to said last-named means, and operable to control said means for adding heat to the heated dehumidified air to maintain the temperature to which the heated dehumidified air is heated thereby to one at to which the heated dehumidified air is capable of maintaining a control temperature in each of the spaces served by said plurality of air outlets, and means operable to sense the temperature of each of the spaces served and to control the rate at which heated dehumidified air is delivered to each to maintain space temperature within control limits.

61. Apparatus as claimed in claim 60 wherein said means for causing outside air to flow in heat transfer relationship with said cooling means, with said dehumidifying and cooling coil, and with said heating means is operable to cause a mixture of outside air and return air so to flow.

62. Apparatus as claimed in claim 60 which additionally includes a desiccant enthalpy exchanger and means operable to direct relief air from a building served by the apparatus in regenerating relationship with said enthalpy exchanger, and wherein said dehumidifying means is operable to cause outside air to flow in dehumidifying relationship with said enthalpy exchanger before it flows in heat transfer relationship with said cooling means.

63. Air conditioning apparatus as claimed in claim 60 wherein each of said plurality of air outlets is an induction mixing unit which is operable to induce air to flow from the space it serves and to return a mixture of induced air and conditioned air to the space.

64. Air conditioning apparatus as claimed in claim 60 wherein each of said plurality of air outlets is an induction mixing unit which is operable to induce air to flow from the space it serves and to return a mixture of induced air and conditioned air to the space, and which additionally includes a cooling coil in heat transfer relationship with conditioned air, air each of said induction units induces to flow from the space it serves or a mixture of conditioned air with such induced air, and means for transferring heat to a heat sink from each of said cooling coils.

65. Air conditioning apparatus as claimed in claim 60 wherein each of said plurality of air outlets is an induction mixing unit which is operable to induce air to flow from the space it serves and to return a mixture of induced air and conditioned air to the space, and wherein said means for adding heat to the heated dehumidified air includes a heating coil in heat transfer relationship with conditioned air, air each of said induction units induces to flow from the space it serves or a mixture of conditioned air with such induced air, and means for transferring heat from a heat sink to each of said heating coils.

66. Air conditioning apparatus as claimed in claim 65 wherein at least some of said means for transferring heat from a heat sink to each of said heating coils comprises refrigeration apparatus operable to pump heat to one of said heating coils from a heat sink.

67. Air conditioning apparatus as claimed in claim 66 wherein said refrigeration apparatus operable to pump heat to one of said heating coils is also operable to pump heat to a heat sink from said heating coil.

68. Air conditioning apparatus as claimed in claim 65 which additionally includes means comprising heat pumps operable to pump heat to a heat sink from air said induction units induce to flow from the spaces they serve, conditioned air, or a mixture of conditioned air with such induced air.

69. Air conditioning apparatus as claimed in claim 65 wherein said means for transferring heat from a heat sink to each of said heating coils includes a circulating system operable to circulate a heat transfer fluid to each of said heating coils and means for transferring heat from the circulated fluid to said heating coils.

70. Air conditioning apparatus comprising a plurality of air outlets each of which is operable to deliver air to a space to be conditioned, means operatively associated with each of said air outlets, and operable to control the rate at which air circulated thereto is delivered to the space served, means including refrigeration apparatus operable to make ice by pumping heat from water to a heat sink and to store such ice, means for dehumidifying air, said dehumidifying means including cooling means, a dehumidifying and cooling coil, heating means, means for circulating a low temperature heat transfer fluid through said dehumidifying and cooling coil, said circulating means including means for transferring heat from the heat transfer fluid to ice made and stored by said means operable to make and store ice, and means for causing return air to flow in heat transfer relationship with said cooling means, with said dehumidifying and cooling coil, and with said heating means to produce cooled air by heat transfer to said cooling means, dehumidified cold air by heat transfer to said dehumidifying and cooling coil, whereby the air is cooled and water vapor is condensed therefrom, and heated dehumidified air by heat transfer from said heating means to the dehumidified cold air, means operatively connecting said cooling means and said heating means so that heat transferred from the return air by said cooling means is transferred by said heating means to the dehumidified cold air, means for circulating heated dehumidified air to each of said air outlets at a rate sufficient to provide ventilation and to maintain the humidity of the space served by each within control limits, means for adding heat to the heated dehumidified air after it flows in heat transfer relationship with said heating means and before it is delivered to the space, means for determining a temperature at which the heated dehumidified air is capable of maintaining a control temperature in each of the spaces served by a plurality of said air outlets, means responsive to said last-named means, and operable to control said means for adding heat to the heated dehumidified air to maintain the temperature to which the heated dehumidified air is heated thereby to one at which the heated dehumidified air is capable of maintaining a control temperature in each of the spaces served by said plurality of air outlets, and means operable to sense the temperature of each of the spaces served and to control the rate at which heated dehumidified air is delivered to each to maintain space temperature within control limits.

71. Air conditioning apparatus as claimed in claim 70 wherein each of said plurality of air outlets is an induction mixing unit which is operable to induce air to flow from the space it serves and to return a mixture of induced air and conditioned air to the space.

72. Air conditioning apparatus as claimed in claim 70 wherein each of said plurality of air outlets is an induction mixing unit which is operable to induce air to flow from the space it serves and to return a mixture of induced air and conditioned air to the space, and which additionally includes a cooling coil in heat transfer relationship with conditioned air, air each of said induction units induces to flow from the space it serves or a mixture of conditioned air with such induced air, and means for transferring heat to a heat sink from each of said cooling coils.

73. Air conditioning apparatus as claimed in claim 70 wherein each of said plurality of air outlets is an induction mixing unit which is operable to induce air to flow from the space it serves and to return a mixture of induced air and conditioned air to the space, and wherein said means for adding heat to the heated dehumidified air includes a heating coil in heat transfer relationship with conditioned air, air each of said induction units induces to flow from the space it serves or a mixture of conditioned air with such induced air, and means for transferring heat from a heat sink to each of said heating coils.

74. Air conditioning apparatus as claimed in claim 73 wherein at least some of said means for transferring heat from a heat sink to each of said heating coils comprises refrigeration apparatus operable to pump heat to one of said heating coils from a heat sink.

75. Air conditioning apparatus as claimed in claim 74 wherein said refrigeration apparatus operable to pump heat to one of said heating coils is also operable to pump heat to a heat sink from said heating coil.

76. Air conditioning apparatus as claimed in claim 73 which additionally includes means comprising heat pumps operable to pump heat to a heat sink from air said induction units induce to flow from the spaces they serve, conditioned air, or a mixture of conditioned air with such induced air.

77. Air conditioning apparatus as claimed in claim 73 wherein said means for transferring heat from a heat sink to each of said heating coils includes a circulating system operable to circulate a heat transfer fluid to each of said heating coils and means for transferring heat from the circulated fluid to said heating coils.

78. Air conditioning apparatus comprising a plurality of air outlets each of which is operable to deliver air to a space to be conditioned, means including refrigeration apparatus operable to make ice by pumping heat from water to a heat sink and to store such ice, means for dehumidifying air, said dehumidifying means including cooling means, a dehumidifying and cooling coil, heating means, means for circulating a low temperature heat transfer fluid through said dehumidifying and cooling coil, said circulating means including means for transferring heat from the heat transfer fluid to ice made and stored by said means operable to make and store ice, and means for causing return air to flow in heat transfer relationship with said cooling means, with said dehumidifying and cooling coil, and with said heating means to produce cooled air by heat transfer to said cooling means, dehumidified cold air by heat transfer to said dehumidifying and cooling coil, whereby the air is cooled and water vapor is condensed therefrom, and heated dehumidified air by heat transfer from said heating means to the dehumidified cold air, means operatively connecting said cooling means and said heating means so that heat transferred from the return air by said cooling means is transferred by said heating means to the dehumidified cold air, means for circulating heated dehumidified air to each of said air outlets at a rate sufficient to provide ventilation and to maintain the humidity of the space served by each within control limits, means for adding heat to the heated dehumidified air after it flows in heat transfer relationship with said heating means and before it is delivered to the space, means for sensing space temperature, and means responsive to said last-named means, and operable to control said means for adding heat to the heated dehumidified air to maintain the sensed space temperature within control limits.

79. Air conditioning apparatus as claimed in claim 78 wherein each of said plurality of air outlets is an induction mixing unit which is operable to induce air to flow from the space it serves and to return a mixture of induced air and conditioned air to the space.

80. Air conditioning apparatus as claimed in claim 78 wherein each of said plurality of air outlets is an induction mixing unit which is operable to induce air to flow from the space it serves and to return a mixture of induced air and conditioned air to the space, and which additionally includes a cooling coil in heat transfer relationship with conditioned air, air each of said induction units induces to flow from the space it serves or a mixture of conditioned air with such induced air, and means for transferring heat to a heat sink from each of said cooling coils.

81. Air conditioning apparatus as claimed in claim 78 wherein each of said plurality of air outlets is an induction mixing unit which is operable to induce air to flow from the space it serves and to return a mixture of induced air and conditioned air to the space, and wherein said means for adding heat to the heated dehumidified air includes a heating coil in heat transfer relationship with conditioned air, air each of said induction units induces to flow from the space it serves or a mixture of conditioned air with such induced air, and means for transferring heat from a heat sink to each of said heating coils.

82. Air conditioning apparatus as claimed in claim 81 wherein at least some of said means for transferring heat from a heat sink to each of said heating coils comprises refrigeration apparatus operable to pump heat to one of said heating coils from a heat sink.

83. Air conditioning apparatus as claimed in claim 82 wherein said refrigeration apparatus operable to pump heat to one of said heating coils is also operable to pump heat to a heat sink from said heating coil.

84. Air conditioning apparatus as claimed in claim 81 which additionally includes means comprising heat pumps operable to pump heat to a heat sink from air said induction units induce to flow from the spaces they serve, conditioned air, or a mixture of conditioned air with such induced air.

85. Air conditioning apparatus as claimed in claim 81 wherein said means for transferring heat from a heat sink to each of said heating coils includes a circulating system operable to circulate a heat transfer fluid to each of said heating coils and means for transferring heat from the circulated fluid to said heating coils.

86. A method for operating apparatus for conditioning air by transferring therefrom the amount of heat required from time to time to cool the air to a given low temperature, said apparatus comprising a cooling coil, means for causing air to be conditioned to flow in heat transfer relation with the cooling coil and then to a space to be conditioned, an ice storage tank, means for causing a heat transfer fluid to flow from the storage tank to the cooling coil, means operable to transfer a first part of the heat removed from the air being conditioned to at least one heat sink other than ice in the storage tank, and means for returning the heat transfer fluid from the cooling coil to the ice storage tank, said method comprising maintaining the heat transfer fluid flowing from the ice storage tank to the cooling coil at a temperature below the given temperature to which the air being conditioned is cooled, maintaining the temperature at which the first part of the heat removed from the air being conditioned is transferred to the heat sink(s) other than ice higher than the given temperature, and controlling the operation of the ice storage tank so that a second part of the heat transferred from the air being conditioned is transferred from the heat transfer fluid to ice in the storage tank, the first and second parts of the heat transferred equaling the amount of heat transferred from the air being conditioned, whereby a part of the heat removed from the air being conditioned is transferred to at least one heat sink other than ice in the storage tank at a temperature above the given temperature to which conditioned air is cooled, and the rest of such heat is transferred to ice in the storage tank.

87. Apparatus for conditioning air by transferring therefrom the amount of heat required from time to time to cool the air to a given low temperature, said apparatus comprising a cooling coil, means for causing air to be conditioned to flow in heat transfer relation with said cooling coil and then to a space to be conditioned, an ice storage tank, means for causing a heat transfer fluid at a temperature below the given low air temperature to flow from said storage tank to said cooling coil, means operable to transfer, at a temperature above the given low temperature, a first part of the heat removed from the air being conditioned to at least one heat sink other than ice in said storage tank, and means for returning the heat transfer fluid from said cooling coil to said ice storage tank, said apparatus being operable to transfer from the heat transfer fluid to ice in said storage tank a second part of the heat transferred from the air being conditioned, the first and second parts of the heat transferred equaling the amount of heat transferred from the air being conditioned.

* * * * *